(12) United States Patent
Bowman et al.

(10) Patent No.: US 12,552,438 B2
(45) Date of Patent: Feb. 17, 2026

(54) SEAT ASSEMBLY AND SYSTEMS

(71) Applicant: VEER GEAR, LLC, Milton, GA (US)

(72) Inventors: Andrew Bowman, Milton, GA (US);
Brady Schroeder, Milton, GA (US);
Thomas Perrin, Milton, GA (US);
Nicholas Douglas McKay, Milton, GA (US)

(73) Assignee: VEER GEAR LLC, Milton, GA (US)

( * ) Notice: Subject to any disclaimer, the term of this patent is extended or adjusted under 35 U.S.C. 154(b) by 751 days.

(21) Appl. No.: 17/435,816

(22) PCT Filed: Mar. 9, 2020

(86) PCT No.: PCT/US2020/021688
§ 371 (c)(1),
(2) Date: Sep. 2, 2021

(87) PCT Pub. No.: WO2020/185671
PCT Pub. Date: Sep. 17, 2020

(65) Prior Publication Data
US 2022/0144330 A1    May 12, 2022

Related U.S. Application Data

(60) Provisional application No. 62/815,971, filed on Mar. 8, 2019.

(51) Int. Cl.
*B62B 7/12* (2006.01)
*B62B 5/00* (2006.01)

(52) U.S. Cl.
CPC .............. *B62B 7/12* (2013.01); *B62B 5/0003* (2013.01)

(58) Field of Classification Search
CPC .. B62B 7/12; B62B 7/14; B62B 7/142; B62B 7/145; B62B 5/0003; B60N 2/2821; B60N 2/2824; B60N 2/2827; B62J 1/16
See application file for complete search history.

(56) References Cited

U.S. PATENT DOCUMENTS

| 285,665 | A | * | 9/1883 | Peck | .................... | A47C 1/027 |
|---|---|---|---|---|---|---|
| | | | | | | 297/278 |
| 1,059,504 | A | | 4/1913 | Teppert | | |

(Continued)

FOREIGN PATENT DOCUMENTS

| AT | 2936 U1 | 7/1999 |
|---|---|---|
| CN | 1210701 | 3/1999 |

(Continued)

OTHER PUBLICATIONS

Chinese Application No. CN202080019376.0, Office Action, Mailed on Feb. 10, 2023, 15 pages.

(Continued)

*Primary Examiner* — Bryan A Evans
(74) *Attorney, Agent, or Firm* — Harness, Dickey & Pierce, P.L.C.

(57) ABSTRACT

A seat (1000) may include mounting components (1054*a*, 1054*b*) that may mate with corresponding components on other assemblies. The seat may include one or more features that may rotate or move to provide for coupling to the one or more assemblies. Assemblies include, but are not limited to, a stroller, a bicycle adapter, a wagon, a booster seat, a camping chair, a high chair, a stadium seat/picnic table, a hiking pack, an infant carrier, a car seat, a booster car seat, or an airline seat.

28 Claims, 87 Drawing Sheets

(56) References Cited

U.S. PATENT DOCUMENTS

| | | | |
|---|---|---|---|
| 2,563,995 A | 8/1951 | East | |
| 2,767,996 A | 10/1956 | Seyforth | |
| 2,879,072 A | 3/1959 | Rear et al. | |
| 4,440,331 A * | 4/1984 | Schimmels | B62J 7/04 297/130 |
| 4,597,116 A | 7/1986 | Kassai | |
| 4,624,467 A | 11/1986 | Burns | |
| 4,743,063 A * | 5/1988 | Foster, Jr. | B60N 2/2821 297/130 |
| 4,768,806 A | 9/1988 | Tetreault | |
| 4,811,968 A | 3/1989 | Bolden | |
| 4,887,836 A | 12/1989 | Simjian | |
| 5,056,805 A | 10/1991 | Wang | |
| 5,360,222 A | 11/1994 | Bro et al. | |
| 5,538,267 A | 7/1996 | Pasin et al. | |
| 5,772,279 A | 6/1998 | Johnson, Jr. | |
| 5,833,251 A | 11/1998 | Peck | |
| 5,887,935 A | 3/1999 | Sack | |
| 5,957,482 A | 9/1999 | Shorter | |
| 6,053,515 A | 4/2000 | Kelley | |
| 6,220,611 B1 | 4/2001 | Shapiro | |
| 6,286,844 B1 | 9/2001 | Cone, II et al. | |
| 6,641,149 B2 | 11/2003 | Chiappetta et al. | |
| 6,733,026 B1 | 5/2004 | Robberson et al. | |
| 6,845,991 B1 | 1/2005 | Ritucci et al. | |
| 6,902,184 B2 | 6/2005 | Hsu | |
| 6,916,028 B2 | 7/2005 | Shapiro | |
| 6,962,370 B2 | 11/2005 | Simpson | |
| 7,462,009 B2 | 12/2008 | Hartmann et al. | |
| 7,487,977 B2 | 2/2009 | Johnson | |
| 7,523,955 B2 | 4/2009 | Blair | |
| 7,866,686 B2 | 1/2011 | Conaway et al. | |
| 7,992,882 B2 | 8/2011 | Engelman | |
| 8,091,916 B2 | 1/2012 | Shapiro | |
| 8,191,907 B2 | 6/2012 | Watson | |
| 8,388,015 B2 | 3/2013 | Chen | |
| 8,453,771 B1 | 6/2013 | Hirschfeld | |
| 8,456,771 B2 | 6/2013 | Weber et al. | |
| 8,567,866 B2 * | 10/2013 | Carimati Di Carimate | B62B 7/14 297/487 |
| 8,622,404 B2 | 1/2014 | Chen et al. | |
| 8,827,282 B2 | 9/2014 | Schlegel et al. | |
| 8,851,505 B2 | 10/2014 | Van Gelderen et al. | |
| 8,955,855 B2 | 2/2015 | Herlitz et al. | |
| 8,955,869 B2 | 2/2015 | Zehfuss | |
| 8,960,794 B2 * | 2/2015 | St. Pierre | B60N 2/32 297/256.16 |
| 9,108,656 B1 | 8/2015 | Nolan et al. | |
| 9,199,659 B2 | 12/2015 | Chen et al. | |
| 9,327,749 B2 | 5/2016 | Young et al. | |
| 9,333,977 B2 | 5/2016 | Herlitz et al. | |
| 9,365,225 B2 | 6/2016 | Henao | |
| 9,469,324 B2 | 10/2016 | Bowman et al. | |
| 10,077,062 B2 | 9/2018 | Bowman et al. | |
| 10,106,186 B2 | 10/2018 | Choi | |
| 10,507,857 B2 | 12/2019 | Bowman et al. | |
| 10,597,058 B2 | 3/2020 | Bowman et al. | |
| 11,198,460 B2 | 12/2021 | Bowman et al. | |
| 11,214,291 B2 | 1/2022 | Bowman et al. | |
| 2002/0121753 A1 | 9/2002 | Suzuki | |
| 2002/0167214 A1 | 11/2002 | Nelson et al. | |
| 2003/0025301 A1 | 2/2003 | Banuelos, III | |
| 2003/0071427 A1 | 4/2003 | Simione | |
| 2003/0075903 A1 | 4/2003 | Hsia | |
| 2004/0084938 A1 | 5/2004 | Tomas et al. | |
| 2005/0012307 A1 | 1/2005 | Shapiro | |
| 2007/0228697 A1 | 10/2007 | Miller et al. | |
| 2007/0284900 A1 | 12/2007 | Sze | |
| 2008/0174155 A1 | 7/2008 | Engelman | |
| 2009/0001776 A1 | 1/2009 | Bearup et al. | |
| 2009/0033066 A1 | 2/2009 | Saville et al. | |
| 2010/0109271 A1 | 5/2010 | Funakura | |
| 2010/0156060 A1 | 6/2010 | Dotsey et al. | |
| 2010/0194065 A1 | 8/2010 | Mountz et al. | |
| 2011/0025005 A1 | 2/2011 | Howell | |
| 2011/0101649 A1 | 5/2011 | Harding | |
| 2011/0169235 A1 | 7/2011 | Moster | |
| 2011/0170948 A1 | 7/2011 | Williams et al. | |
| 2011/0175332 A1 | 7/2011 | Jones et al. | |
| 2011/0309658 A1 | 12/2011 | Carimati Di Carimate et al. | |
| 2012/0056452 A1 | 3/2012 | Longenecker et al. | |
| 2012/0119457 A1 | 5/2012 | Williams | |
| 2012/0235372 A1 | 9/2012 | Herlitz et al. | |
| 2012/0261961 A1 | 10/2012 | Heisey et al. | |
| 2013/0292987 A1 | 11/2013 | Doucette et al. | |
| 2014/0319884 A1 | 10/2014 | Doucette et al. | |
| 2014/0327218 A1 | 11/2014 | Thomas et al. | |
| 2014/0353945 A1 | 12/2014 | Young et al. | |
| 2015/0210307 A1 | 7/2015 | Kalinin et al. | |
| 2015/0283930 A1 * | 10/2015 | Dayton | B60N 2/60 297/220 |
| 2016/0023674 A1 | 1/2016 | Nolan et al. | |
| 2016/0031469 A1 | 2/2016 | Bowman et al. | |
| 2017/0021850 A1 | 1/2017 | Bowman et al. | |
| 2017/0326019 A1 | 11/2017 | Bramsiepe et al. | |
| 2018/0027989 A1 * | 2/2018 | Pos | B62B 7/142 |
| 2020/0255046 A1 | 8/2020 | Bowman et al. | |

FOREIGN PATENT DOCUMENTS

| | | |
|---|---|---|
| CN | 1365906 A | 8/2002 |
| CN | 101190686 | 6/2008 |
| CN | 101161603 Y | 12/2008 |
| CN | 201626327 U | 11/2010 |
| CN | 102028366 A | 4/2011 |
| CN | 102727002 A | 10/2012 |
| CN | 203137723 U | 8/2013 |
| CN | 103359142 A | 10/2013 |
| CN | 203832526 | 9/2014 |
| CN | 205837068 U | 12/2016 |
| CN | 106660598 A | 5/2017 |
| CN | 207285732 U | 5/2018 |
| CN | 108791451 A | 11/2018 |
| CN | 109278604 A | 1/2019 |
| DE | 202006012430 | 10/2006 |
| EP | 1167157 A1 | 1/2002 |
| EP | 1479590 | 11/2004 |
| EP | 2371231 | 10/2011 |
| GB | 2494897 | 3/2013 |
| JP | 07164937 A | 6/1995 |
| KR | 20040106746 A | 12/2004 |
| KR | 101573235 B1 | 11/2015 |
| NL | 2007020 C2 | 6/2011 |
| NL | 2007020 | 1/2013 |
| WO | 2004002802 | 1/2004 |
| WO | 2011106855 A1 | 9/2011 |
| WO | 2014023927 A2 | 2/2014 |
| WO | 2015038373 | 3/2015 |
| WO | 2016018713 | 2/2016 |
| WO | 2018067450 | 4/2018 |

OTHER PUBLICATIONS

Canadian Application No. CA3,131,601 , Office Action, Mailed on Aug. 23, 2023, 3 pages.
Chinese Application No. CN202080019376.0 , Office Action, Mailed on Jul. 31, 2023, 14 pages.
European Application No. EP20716318.9 , Office Action, Mailed on Jul. 11, 2023, 3 pages.
Britax B-Agile Lightweight Stroller, Black I One Hand Fold + Easy to Maneuver + Large UV50+ Canopy: Baby, Amazon.com, 2013, 16 pages.
Bugaboo Car Seat Adapter Donkey, 2013, 4 pages.
Litigation-Civil Coversheet filed Jan. 28, 2020, 2 pages.
Combo Pram Luna Milano Violet-Prams-BambinoWorld, Pram Luna, 2014, 3 pages.
Complaint for Declaratory Judgement of Invalidity, Litigation, Case: 3:20-cv-00030-TMR Doc#: 1, Jan. 27, 2020, 8 pages.

(56) References Cited

OTHER PUBLICATIONS

Evenflo Company Inc's Answer to Vear Geer LLC's Counterclaim for Patent Infringement and Counterclaim for Declaratory Judgment of Invalidity, Litigation, Case No. 3:20-cv-00030, May 19, 2020, 11 pages.
Jeep Wrangler Stroller Wagon with Included Car Seat Adapter By Delta Children—Gray : Target, Bedford Park, 2019, 10 pages.
Joint Claim Construction and Prehearing Statement Pursuant to S.D. Ohio Pat. R. 105.2 (D), Litigation-Joint Claim, Case No. 3:20-cv-00030, Jan. 28, 2021, 34 pages.
Litigation-Defendant Veer Gear LLC's Opening Claim Constructions Brief, Case: 3:20-cv-00030-TMR Doc#, Apr. 13, 2021, 39 pages.
Litigation-Defendant Veer Gear's Reply in Support of Opening Claim Construction Brief, United States District Court for the Southern District of Ohio Western Division, May 27, 2021, 26 pages.
Litigation-Plaintiff/Counterclaim Defendant Evenflo Company, Inc. 's, S.D. Ohio Pat. R. 105.4(a) Opening Claim Construction Brief, Apr. 13, 2021, 22 pages.
Litigation-Memorandum Opinion, Signed by Judge Thomas M. Rose, Aug. 24, 2021, pp. 1-20.
Veer Gear LLC's Answer to Evenflo Company Inc.'s Complaint for Declaratory Judgment of Invalidity and CounterClaim for Patent Infringement, Litigation, Case No. 3:20-cv-00030, Apr. 28, 2020, 280 pages.
Veer Gear LLC's Answer to Evenflo Company Inc.'s Counterclaim for Declaration Judgment of Invalidity of U.S. Pat. No. 10,597,058, Case: 3:20-cv-00030-TMR Doc#: 11, Jun. 8, 2020, 4 pages.
Chinese Application No. CN201780061161.3, Office Action, Mailed on Dec. 31, 2020, 22 pages.
International Application No. PCT/US2014/053780, International Search Report and Written Opinion, Mailed on Feb. 6, 2015, 11 pages.
International Application No. PCT/US2015/041743, International Search Report and Written Opinion, Mailed on Oct. 9, 2015, 9 pages.
International Application No. PCT/US2017/054739, International Search Report and Written Opinion, Mailed on Dec. 15, 2017, 14 pages.
Schroeder, "Standard Consumer Safety Performance Specification for Carriages and Strollers", ASTM, Designation: F833-15, Feb. 13, 2016, 23 pages.
International Application No. PCT/US2014/053780, International Search Report, Mailed on Apr. 4, 2017, 8 pages.
U.S. Appl. No. 14/750,344, Notice of Allowance, Mailed on Jun. 20, 2016, 8 pages.
U.S. Appl. No. 15/284,166, Non-Final Office Action, Mailed on Oct. 2, 2017, 9 pages.
U.S. Appl. No. 15/284,166, Notice of Allowance, Mailed on May 18, 2018, 6 pages.
U.S. Appl. No. 16/132,764, Non-Final Office Action, Mailed on Jan. 28, 2019, 11 pages.
U.S. Appl. No. 16/132,764, Notice of Allowability, Aug. 28, 2019, 5 pages.
U.S. Appl. No. 16/132,764, Notice of Allowance, Mailed on Jun. 26, 2019, 8 pages.
U.S. Appl. No. 16/132,764, Notice of Allowance, Mailed on Nov. 22, 2019, 8 pages.
U.S. Appl. No. 16/795,010, "Corrected Notice of Allowability", Nov. 24, 2021, 5 pages.
U.S. Appl. No. 16/795,010, "Corrected Notice of Allowability", Oct. 27, 2021, 5 pages.
U.S. Appl. No. 16/795,010, Non-Final Office Action, Mailed on Oct. 7, 2020, 7 pages.
U.S. Appl. No. 16/795,010, Notice of Allowance, Mailed on Jul. 14, 2021, 8 pages.
Chinese Application No. CN201780061161.3, Notice of Decision to Grant, Mailed on Jun. 23, 2021, 6 pages.

European Application No. EP17785117.7, Office Action, Mailed on Feb. 8, 2021, 4 pages.
European Application No. EP17785117.7, Office Action, Mailed on Apr. 23, 2020, 5 pages.
International Application No. PCT/US2015/041743, International Preliminary Report on Patentability, Mailed on Jan. 31, 2017, 7 pages.
International Application No. PCT/US2017/054739, International Preliminary Report on Patentability, Mailed on Apr. 18, 2019, 11 pages.
EP Application No. EP17785117.7 , Office Action, Mailed on Dec. 22, 2021, 6 pages.
Veer Gear LLC's Answer to Evenflo Company Inc.'s Complaint for Declaratory Judgment of Invalidity and Supplemental CounterClaims for Patent Infringement, Litigation, Case No. 3:20-cv-00030, Feb. 15, 2022, 32 pages.
Evenflo Company Inc.'s Answer to Veer Gear LLC's Supplemental CounterClaims for Patent Infringement, Litigation, Case No. 3:20-cv-00030, Mar. 7, 2022, 16 pages.
Litigation-Plaintiff Evenflo Company, Inc.'s Amended Invalidity Contentions, Case 3:20-cv-00030, Apr. 4, 2022, 66 pages.
Litigation-Plaintiff Evenflo Company, Inc.'s S.D. Ohio Pat. R. 103.4 Disclosure of Amended Invalidity Contentions, Case No. 3:20-cv-00030, Oct. 7, 2021, 194 pages.
Litigation-Plaintiff Evenflo Company, Inc.'s S.D. Ohio Pat. R. 103.4 Disclosure of Invalidity Contentions, Case No. 3:20-cv-00030, Oct. 26, 2020, 150 pages.
Invalidity Chart for U.S. Pat. No. 10,106,186 titled "Baby Wagon with Improved Ease of Use" to Yejin Choi ("Choi '186"), Apr. 4, 2022, 198 pages.
Invalidity Chart for U.S. Patent Publication No. 2010/0156060 titled "Reversible Stroller Handle" to Michael A. Dotsey, et al. ("Dotsey '6060"), Apr. 4, 2022, 127 pages.
Invalidity Chart for U.S. Pat. No. 6,916,028 titled "Collapsible Compact Carrier Device with Collapsible Wheel Construction" to Richard N. Shapiro ("Shapiro '028"), Apr. 4, 2022, 314 pages.
Invalidity Chart for U.S. Pat. No. 4,116,465 titled "Baby Carriages" to Owen F. Maclaren ("MacLaren '465"), Apr. 4, 2022, 183 pages.
Invalidity Chart for U.S. Patent Publication No. 2017/0326019 titled "Mobile Walking and Transport Aid Device" to Hodger Bramsiepe and Guenter Kurt Rood ("Bramsiepe '6019"), Apr. 4, 2022, 162 pages.
Invalidity Chart for U.S. Pat. No. 9,327,749 titled "Foldable Wagon" to Matthew E. Young, Randall A. Sandlin, Thomas K. Schlegel, and Cameron Eckert ("Young '749"), Apr. 4, 2022, 220 pages.
Invalidity Chart for U.S. Pat. No. 4,746,140 titled "Baby Carriage" to Kenzou Kassai ("Kassai '140"), Apr. 4, 2022, 221 pages.
Invalidity Chart for U.S. Pat. No. 4,834,415 titled "Dual-Seat Foldable Baby Cart" to Bruce Yee ("Yee '415"), Apr. 4, 2022, 164 pages.
Invalidity Chart for U.S. Patent Publication No. 2002/0121753 titled Folder Stroller to Yoshiyuki Suzuki ("Suzuki '1753"), Apr. 4, 2022, 125 pages.
Invalidity Chart for U.S. Pat. No. 5,056,805 titled "Stroller" to Chia-Ho Wang ("Wang '805"), Apr. 4, 2022, 129 pages.
Invalidity Chart with Combination Citations, Apr. 4, 2022, 215 pages.
Invalidity Chart for U.S. Pat. No. 9,108,656 titled "Collapsible Wagon" to Patrick Nolan, Mike Dotsey, Noah Dingler, and Brady Schroeder ("Nolan '656"), Apr. 4, 2022, 199 pages.
Invalidity Chart for U.S. Patent Publication No. 2010/0109271 titled "Stroller" to Funakura ("Funakura '9271"), Apr. 4, 2022, 174 pages.
Invalidity Chart for U.S. Pat. No. 9,365,225 titled "Transformative Hand Cart" to Elvis Henao ("Henao '225"), Apr. 4, 2022, 330 pages.
Invalidity Chart for U.S. Patent Publication No. 2010/0156069 A1 titled "Wagon with Seats" to Zhaosheng Chen ("Chen '6069"), Apr. 4, 2022, 326 pages.
Joint Claim Construction and Pre-Hearing Statement, Litigation, Case No. 3:20-cv-00030, May 27, 2022, 15 pages.
U.S. Appl. No. 62/307,726, Appendix to Joint Claim Construction and Pre-Hearing Statement, Litigation, Case No. 3:20-cv-00030, Jun. 27, 2022, 44 pages.

(56) References Cited

OTHER PUBLICATIONS

U.S. Appl. No. 62/305,017, Appendix to Joint Claim Construction and Pre-Hearing Statement, Litigation, Case No. 3:20-cv-00030, Jun. 27, 2022, 39 pages.
Dictionary Definitions, Appendix to Joint Claim Construction and Pre-Hearing Statement, Litigation, Case No. 3:20-cv-00030, Jun. 27, 2022, 229 pages.
Dictionary Definitions, Corrected Appendix to Joint Claim Construction and Pre-Hearing Statement, Litigation, Case No. 3:20-cv-00030, Jul. 5, 2022, 234 pages.
Brief by Plaintiff Evenflo Company, Inc., Case No. 3:20-cv-00030, Jul. 29, 2022, 25 pages.
Brief by Defendant Veer Gear LLC., with Exhibits 1 and 2, Case No. 3:20-cv-00030, Jul. 29, 2022, 123 pages.
Response Claim Construction Brief re USP '460 by Defendant Veer Gear LLC, Case No. 3:20-cv-00030, Aug. 26, 2022, 27 pages.
Response Claim Construction Brief by Counter Defendants Evenflo Company, Inc., with Exhibit H, Case No. 3:20-cv-00030, Aug. 26, 2022, 70 pages.
Transcript of Proceedings, Claim Construction Hearing., Case No. 3:20-cv-00030, Oct. 6, 2022, 87 pages.
Memorandum and Opinion, Case No. 3:20-cv-00030, Nov. 28, 2022, 19 pages.
Motion for Partial Reconsideration by Defendant, Case No. 3:20-cv-00030, Dec. 6, 2022, 6 pages.
U.S. Appl. No. 17/450,026, Non-Final Office Action mailed Dec. 22, 2022, 7 pages.
U.S. Appl. No. 17/450,026, Notice of Allowance mailed Jun. 12, 2023, 7 pages.
Chinese Application No. CN202080019376.0, Notice of Decision to Grant, Mailed on Oct. 26, 2023, 6 pages.
International Application No. PCT/US2020/021688, International Preliminary Report on Patentability, Mailed on Sep. 23, 2021, 7 pages.
International Search Report and Written Opinion, Jun. 17, 2020, 11 pages.
Australian Application No. AU2020234543, "First Examination Report", Sep. 30, 2022, 4 pages.
Canadian Application No. 3,131,601, "First Examination Report", Dec. 7, 2022, 5 pages.
Australian Notice of Acceptance Corresponding to Application No. 2020234543, mailed Feb. 13, 2023.
Australian Examination Report Corresponding to Application No. 2023201950, mailed May 31, 2024.
Australian Notice of Acceptance Corresponding to Application No. 2023201950, mailed Nov. 4, 2024.
Extended European Search Report Corresponding to Application No. 25191479.2, mailed Oct. 1, 2025.

\* cited by examiner

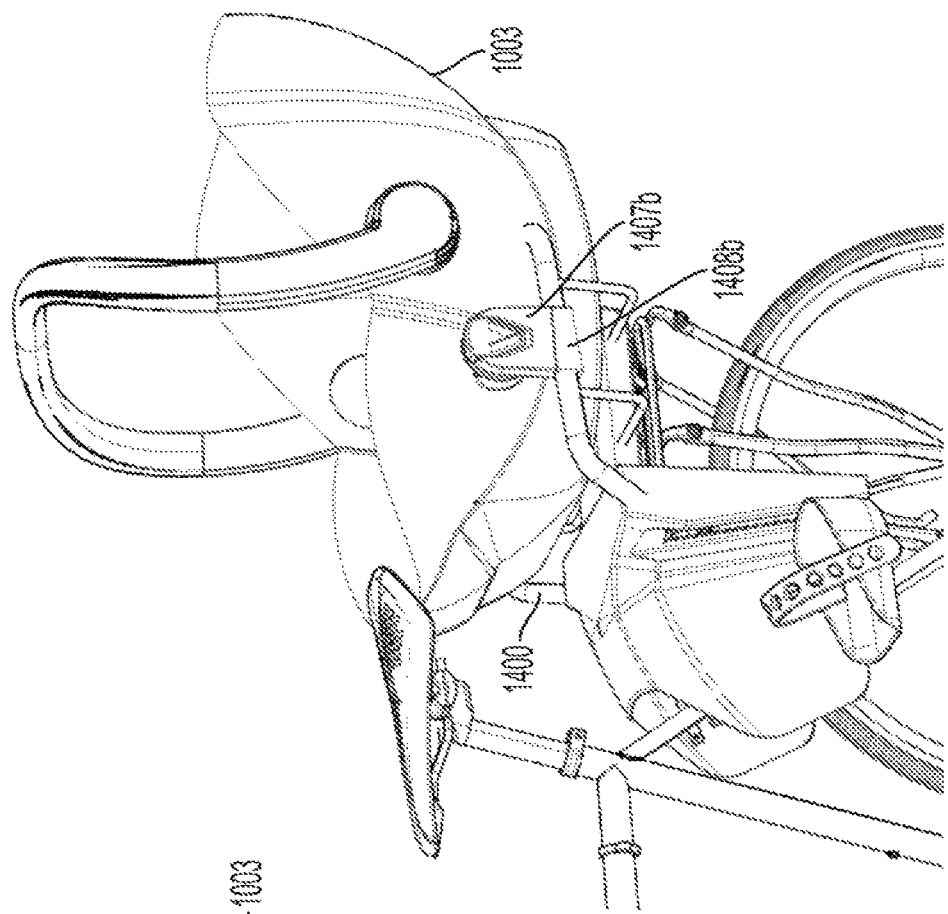
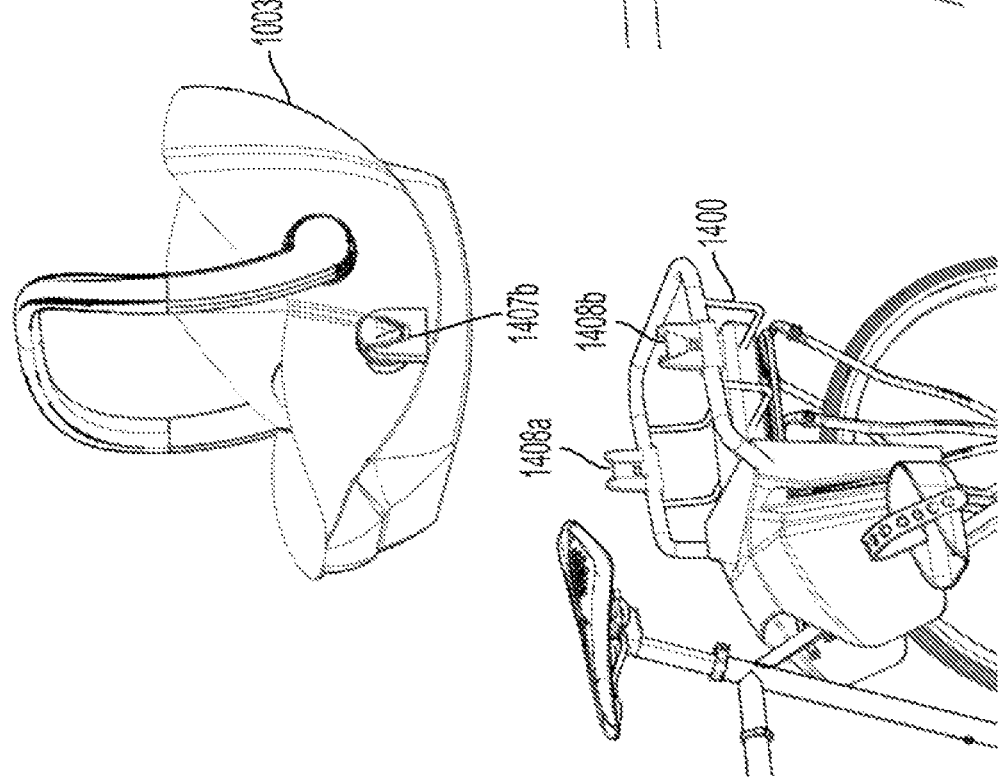
FIG. 33B
FIG. 33A

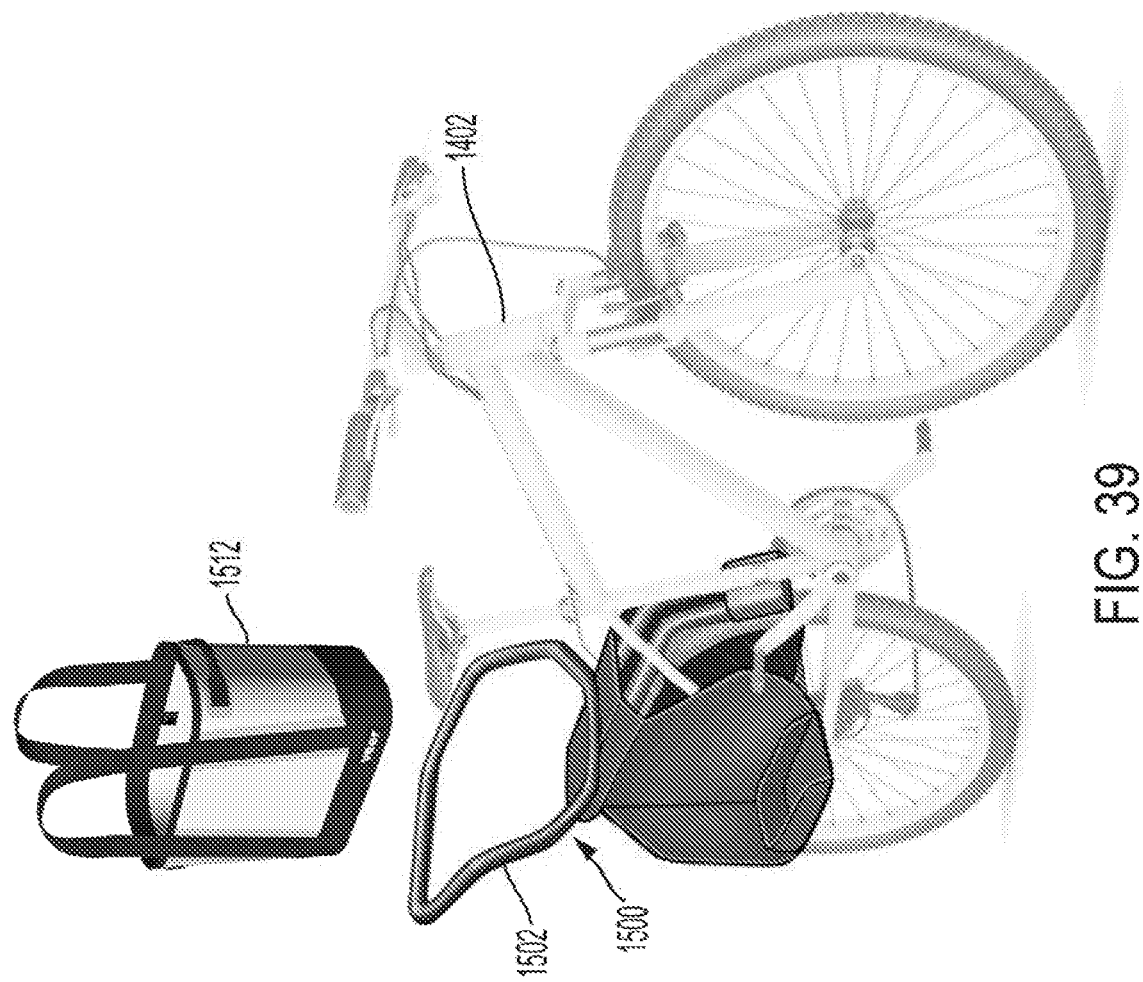

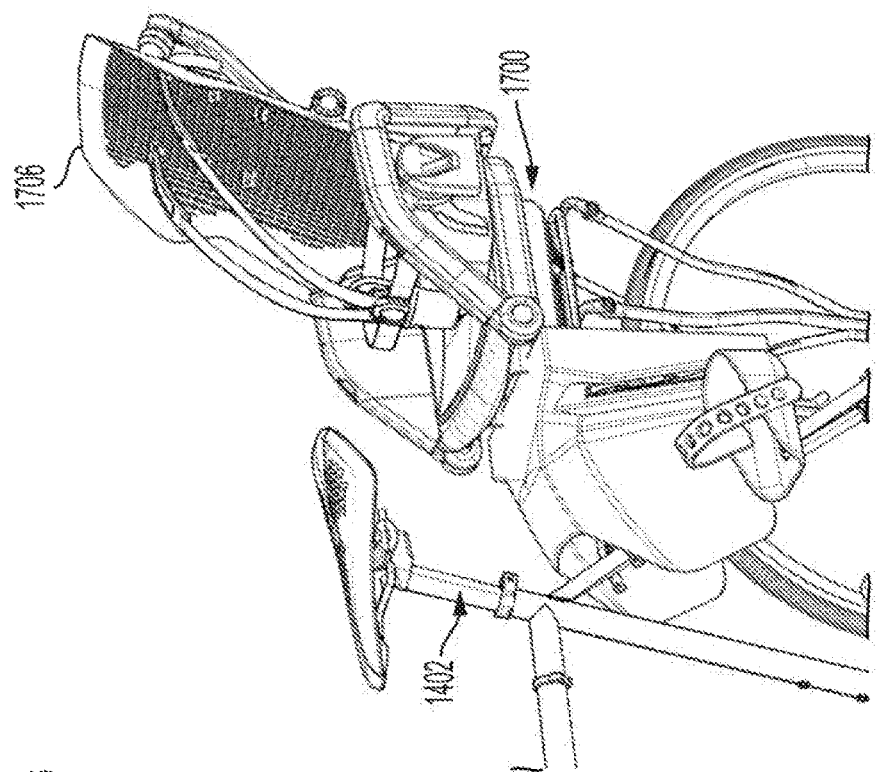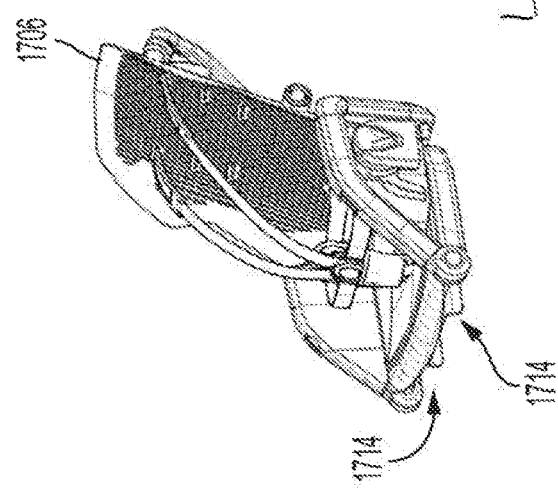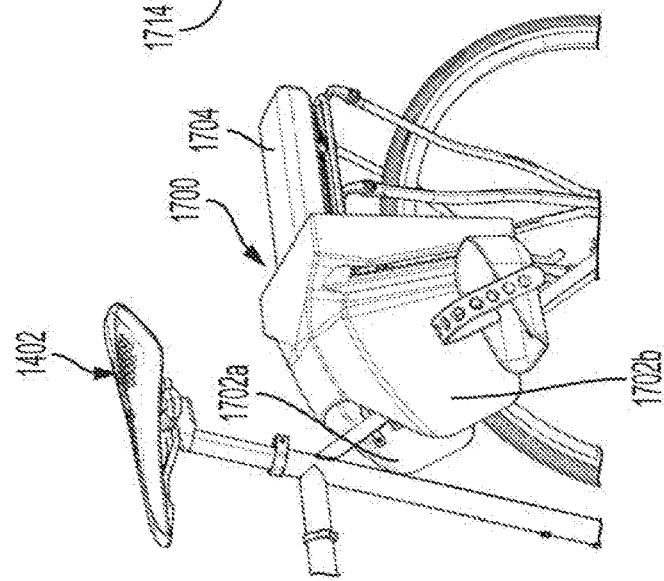
FIG. 41A
FIG. 41B

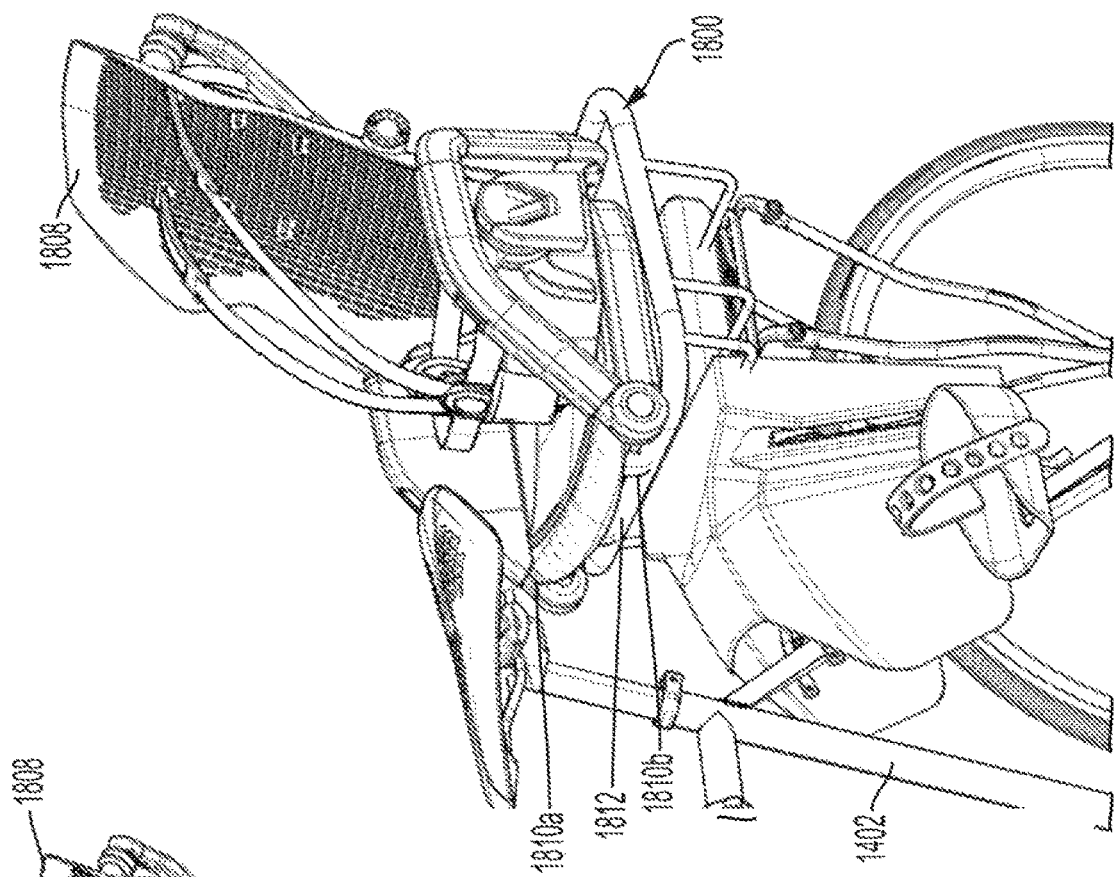
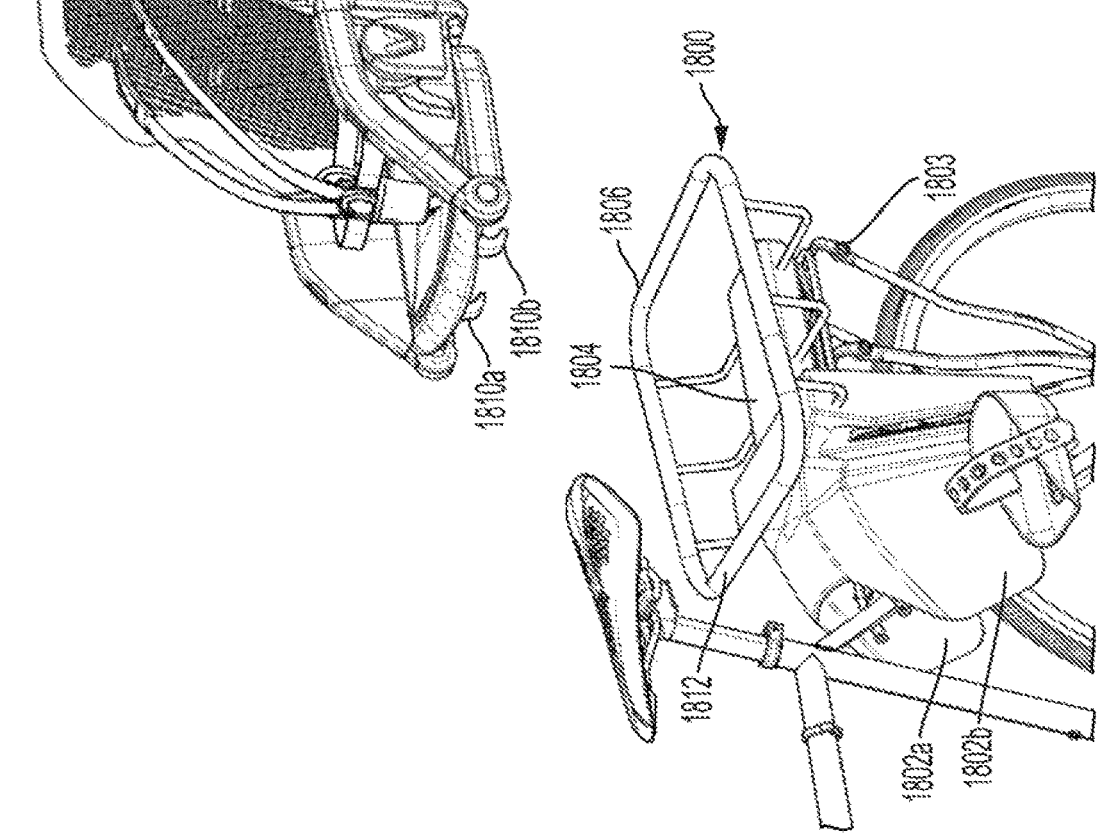

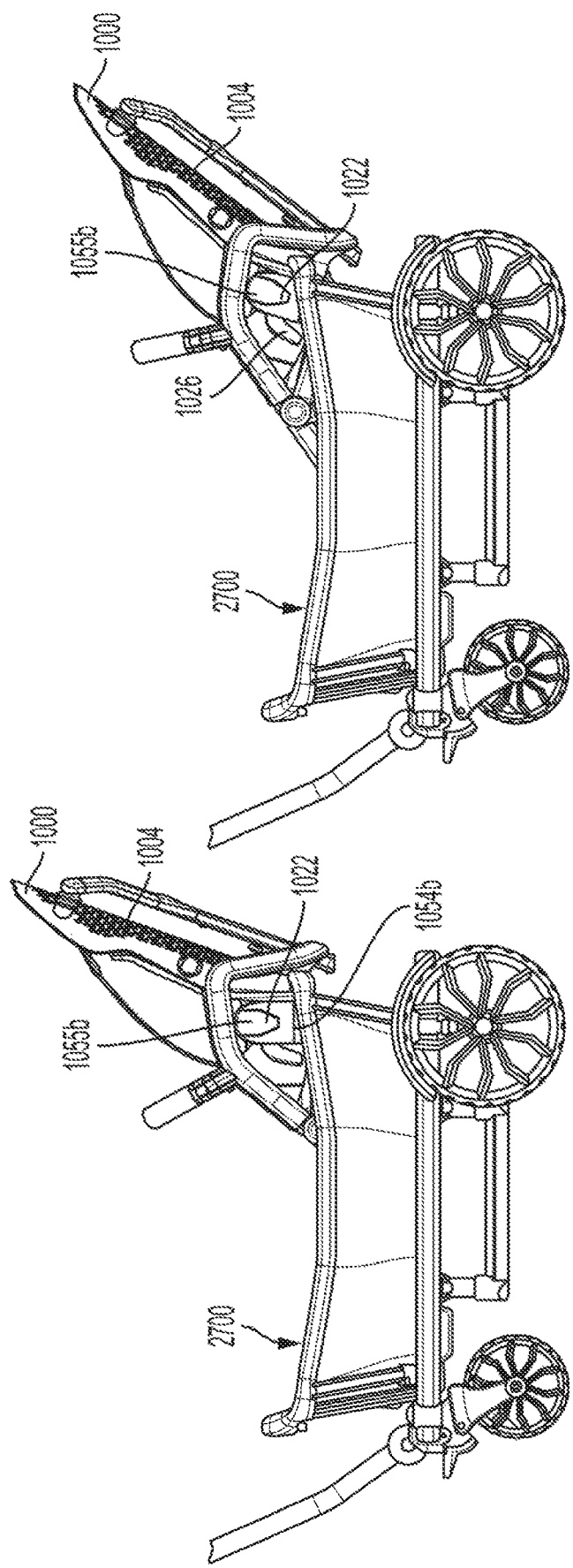

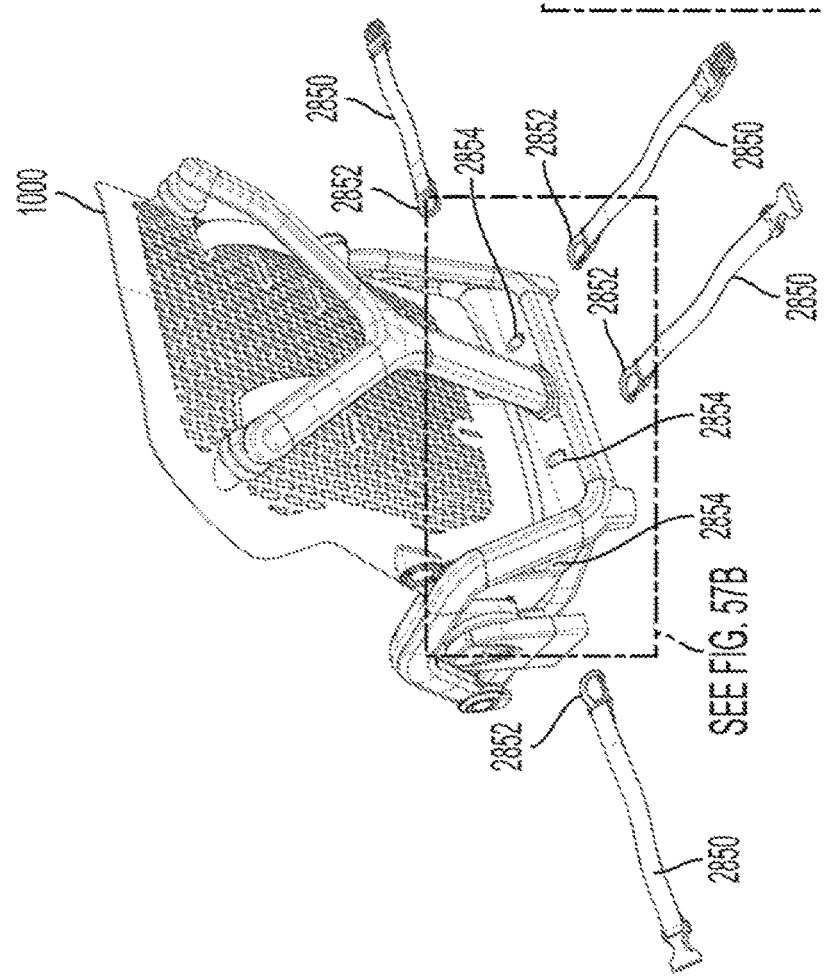
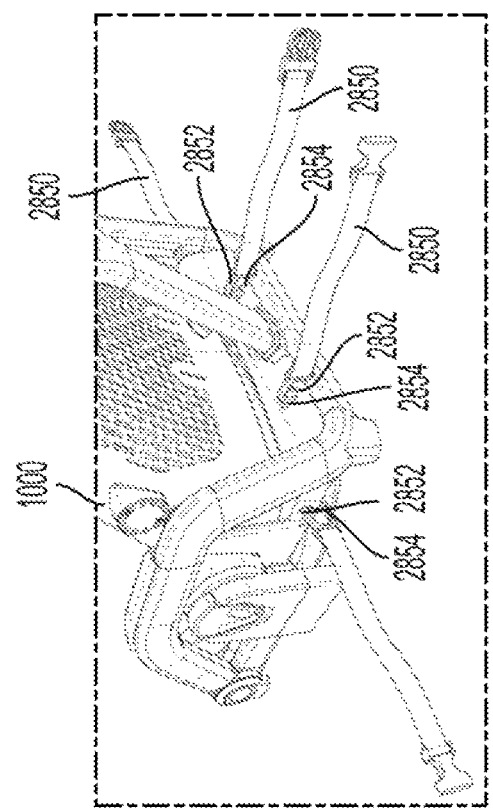
FIG. 57A
FIG. 57B

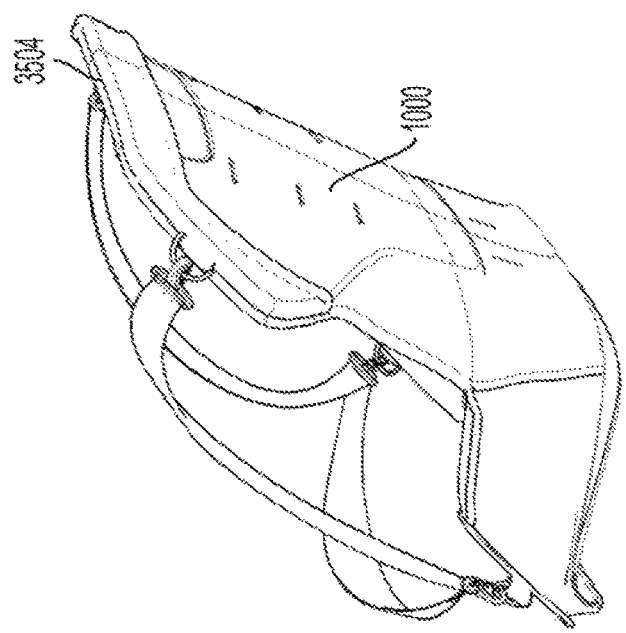
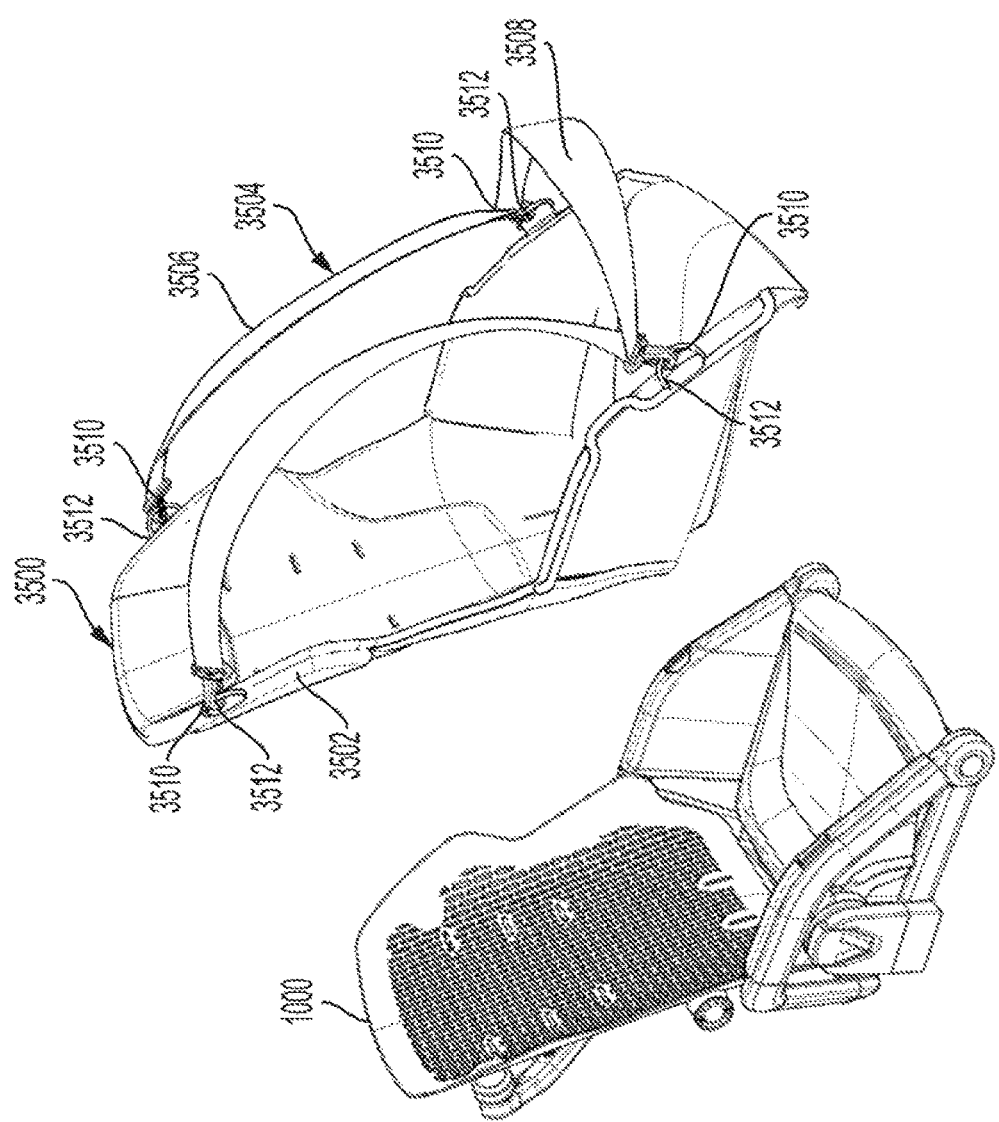
FIG. 69B
FIG. 69A

SEAT ASSEMBLY AND SYSTEMS

CROSS-REFERENCE TO RELATED APPLICATION

This application claims the priority benefit of U.S. Provisional Patent Application Ser. No. 62/815,971 filed Mar. 8, 2019, which is incorporated herein by reference in its entirety for all purposes.

FIELD OF THE INVENTION

The present invention relates generally to assemblies and systems for the conveyance and seating of children, for example, but not limited to child seats for use with a stroller, a bicycle or bicycle adapter, a hiking pack, a wagon or other conveyance device seats, a booster seat, a high chair, a stadium seat, an outdoor seat, and the like.

BACKGROUND

Parents and caregivers of young children often purchase and store multiple products for carrying, moving, or otherwise conveying their children from place to place and securing them during transit. For example, caregivers may have a stroller, a wagon, a bicycle seat, a hiking pack, an infant carrier, a car seat, an airline approved seat, or other assembly or system for moving children from one location to another or securing a child in a vehicle or an airplane. Caregivers may also have a high chair, a booster seat, and a child seat (e.g. for providing seating for the child outside at a park, backyard, playground, campsite, etc.). Purchasing so many products can be expensive and can require sufficient space to store the various products.

SUMMARY

Generally described, aspects of the present disclosure relate generally to a child seat that may be coupled to various assemblies or devices for providing a range of functionalities with minimal equipment. In some aspects, the child seat may be mounted to a stroller frame. In some aspects, the child seat may be coupled to a bicycle or a bicycle adapter to provide a child carrier on a front or rear of an adult bicycle. In some aspects, the child seat may be coupled to a wagon or similar conveyance device. In some aspects, the child seat may be coupled to a chair frame for providing a chair, including, but not limited to, a chair assembly for outdoor seating, a booster chair assembly, or a high chair assembly. The seat may also couple to an assembly to convert to an airline seat, a car seat, or a car booster seat. In some aspects, the child seat may be convertible to an infant carrier or a hiking pack.

Accordingly, providing a child seat that may be coupled to other devices or assemblies can provide for convenience for parents of children while minimizing the amount of products a parent must purchase and store. The seat may including coupling components that may be coupled to the various devices or assemblies, though in some aspects, the seat may couple to the various devices or assemblies in different ways.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIG. 33A depicts an infant seat that is coupleable to the bicycle adapter that is coupled to the bicycle, according to aspects of the present disclosure.

FIG. 33B depicts the infant seat being coupled to the bicycle adapter that is coupled to the bicycle, according to aspects of the present disclosure.

FIG. 39 depicts a bag that may be positioned within the bicycle adapter coupled to the bicycle, according to aspects of the present disclosure.

FIG. 41A depicts a bicycle adapter, a seat, and a bicycle, according to aspects of the present disclosure.

FIG. 41B depicts the seat coupled to the bicycle adapter, with the bicycle adapter coupled to the bicycle, according to aspects of the present disclosure.

FIG. 42A depicts a bicycle adapter, a seat, and a bicycle, according to aspects of the present disclosure.

FIG. 42B depicts the seat coupled to the bicycle adapter, with the bicycle adapter coupled to the bicycle, according to aspects of the present disclosure.

FIGS. 53A-53C depict the seat in various positions while coupled to a wagon assembly, according to aspects of the present disclosure.

FIGS. 57A-57B depict a system including the seat and a harness assembly, according to aspects of the present disclosure.

FIGS. 69A-69B depict a system including the seat and a carrier assembly, according to aspects of the present disclosure.

DETAILED DESCRIPTION

Generally described, the present invention relates to a child seat that may be coupled to various assemblies or devices for providing a range of functionalities with minimal equipment. The seat may include a calf support that may be removable, foldable, or otherwise movable to provide for coupling the seat to one or more assemblies or converting the seat to one or more orientations. The seat may also include mounting or coupling components that may be sized and shaped to couple to complementary mounting or coupling components on other assemblies, for example but not limited to, a stroller, a bicycle adapter or bicycle, a wagon, a chair assembly, booster seat harness assemblies, a hiking pack assembly, an infant carrier assembly, or an airplane seat harness assembly. The seat either alone or when coupled to various assemblies may adhere to various safety standards associated with various uses of the seat, for example the safety standards as set forth in Table 1.1.1 herein.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Exemplary Non-Limiting Seat Embodiments

Figure 1B:
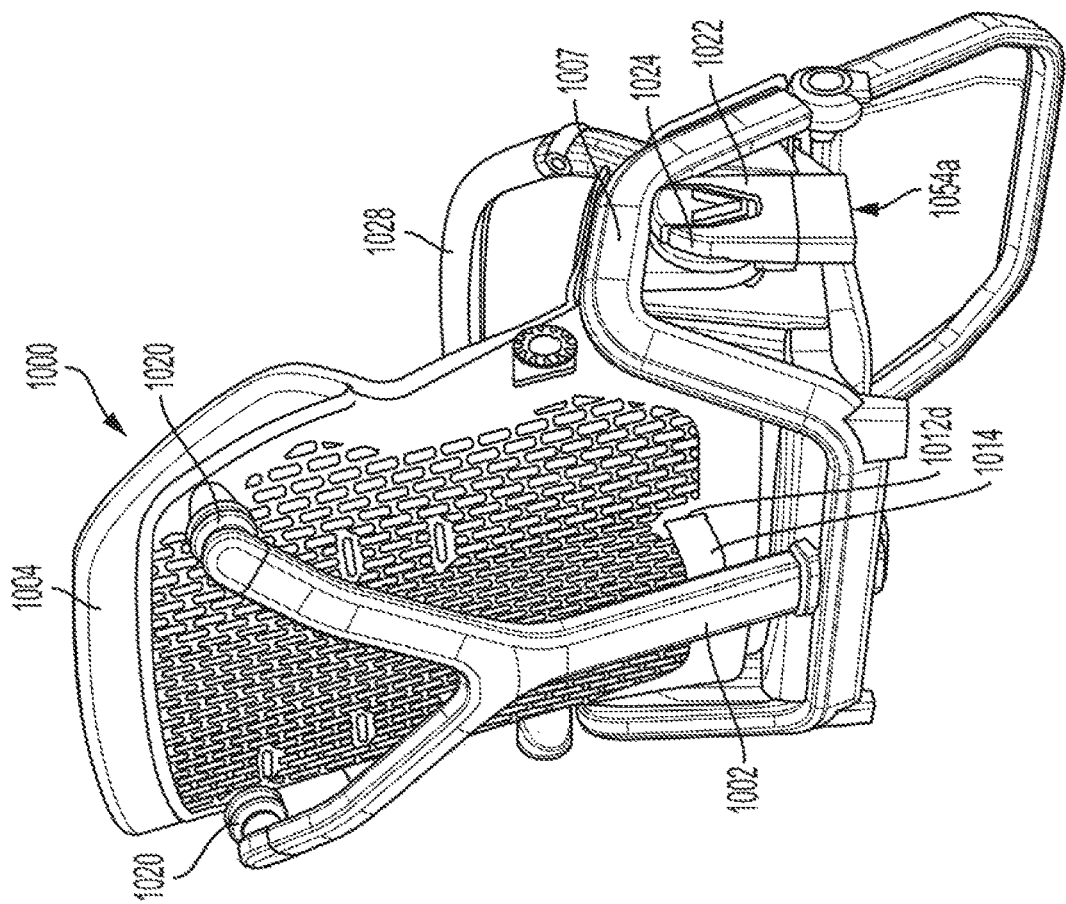
FIG. 1B depicts a rear perspective view of the seat according to aspects of the present disclosure.
Figure 1A:
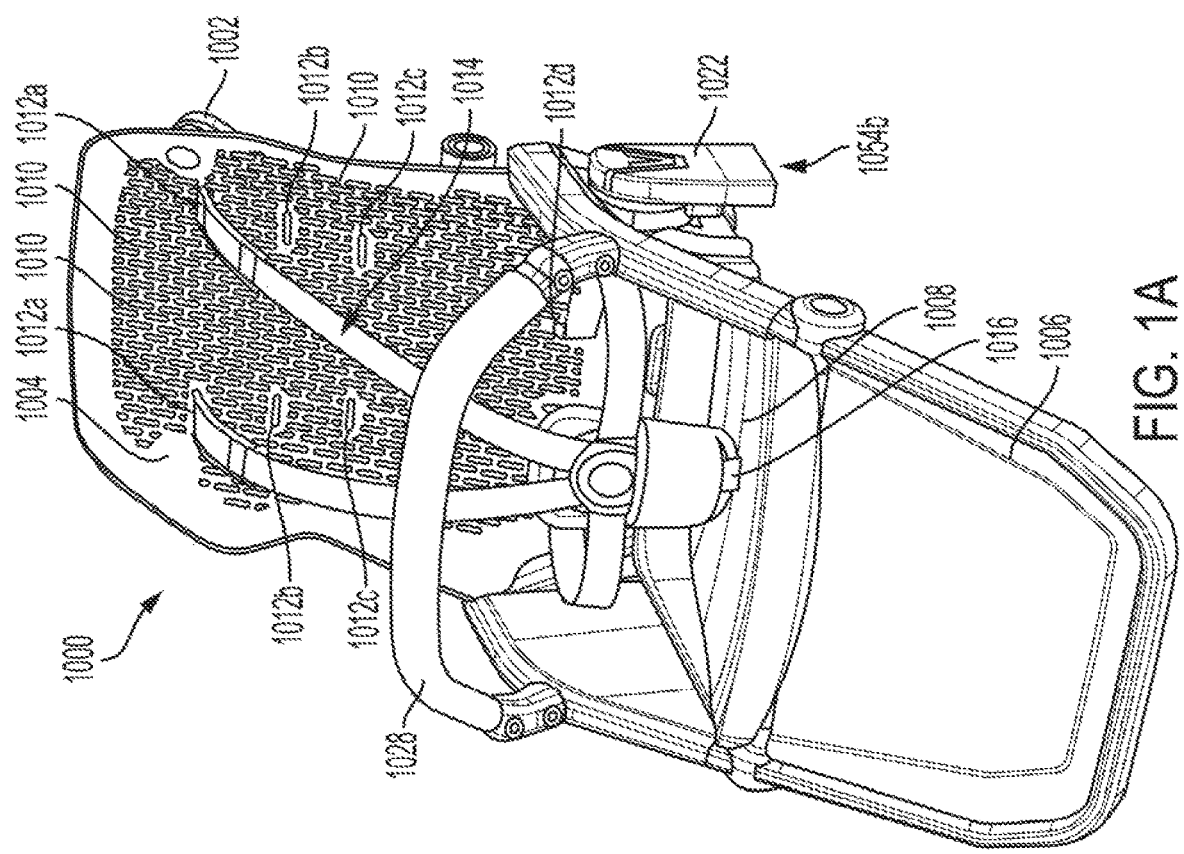
FIG. 1A depicts a front perspective view of a seat according to aspects of the present disclosure.
Figure 51B:
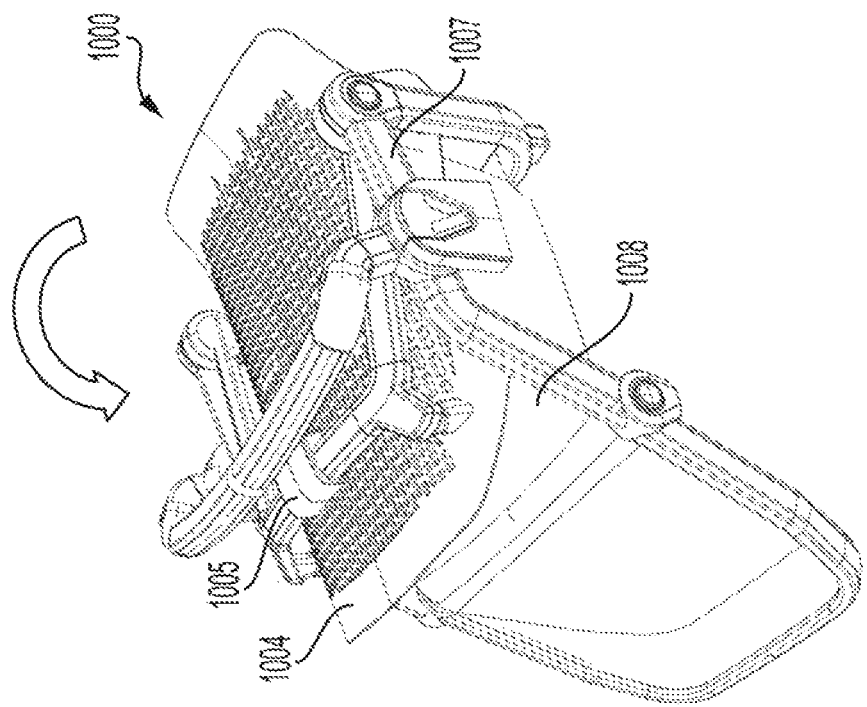
FIGS. 51A-51D depict a seat in various positions, according to aspects of the present disclosure.
Figure 51A:
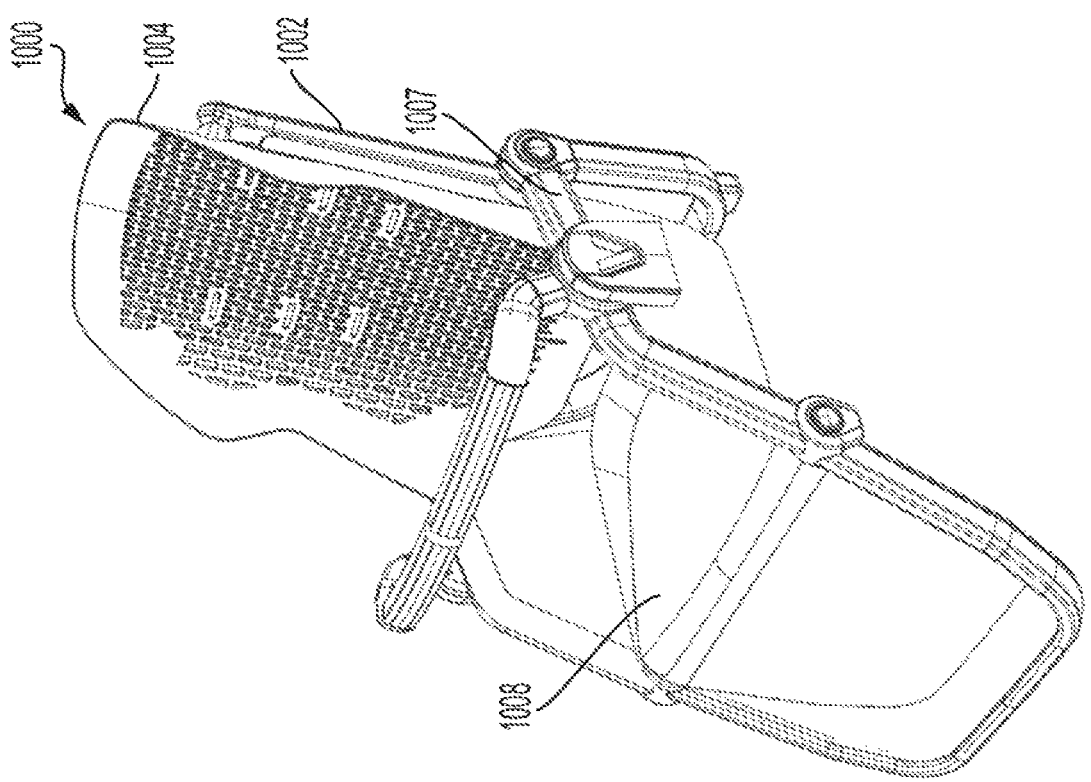
Figure 51D:
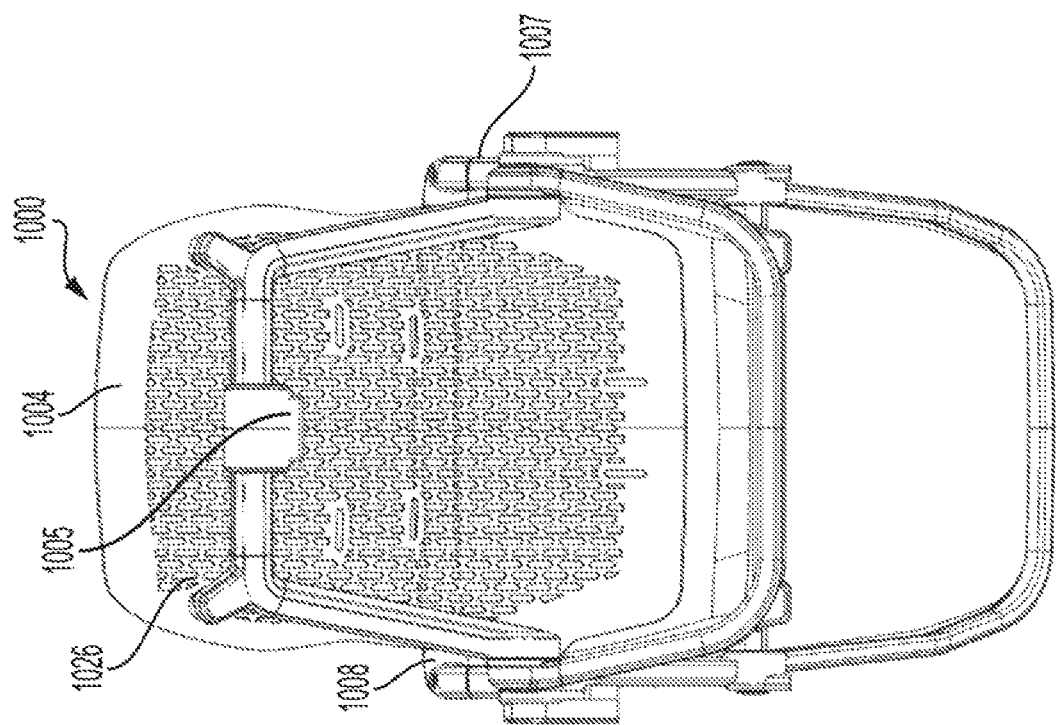
Figure 51C:
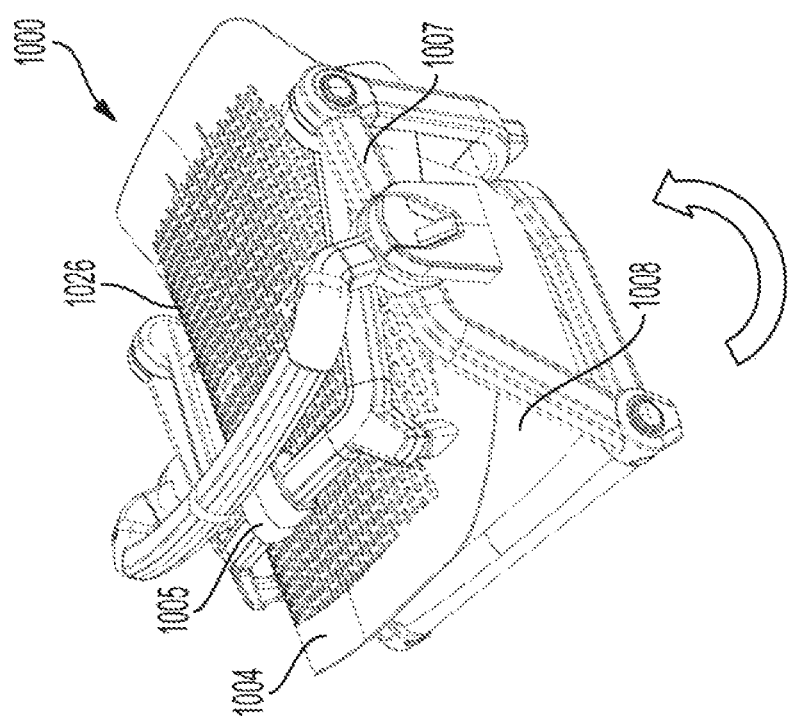

FIG. 1A depicts a front perspective view of a non-limiting exemplary embodiment of a seat 1000 according to the present disclosure. FIG. 1B provides a rear perspective view of the seat 1000. The seat 1000 may comprise a polymer material, for example, but not limited to, polyethylene, polypropylene, polytetrafluoroethylene, thermoplastics, or other suitable materials. The seat 1000 may comprise a rear exoskeleton (or rear frame member) 1002, a back support 1004, a calf support 1006, and a seat pan 1008. The rear frame member 1002 is shown in FIG. 1B as being generally Y-shaped, though other shapes and orientations of the rear frame member 1002 may be used. For example, FIGS. 51A-C depicts the seat 1000 having the rear frame member 1002 in an alternative arrangement in which the rear frame member 1002 is generally rectangular. As previously state, other orientations of the rear frame member 1002 may be used without departing from the scope of the present disclosure.

The back support 1004, the calf support 1006, and/or the seat pan 1008 may comprise a polymer material which may provide for ease of cleaning the seat 1000, including but not limited to, the ability to clean the seat 1000 with cleaning wipes and the ability to wash the seat 1000 with water. In some aspects, the back support 1004, calf support 1006, and/or the seat pan 1008 may be at least partially manufactured via molding. The back support 1004, the calf support 1006, and/or the seat pan 1008, are not limited to polymer materials and may comprise any suitable material that may provide improved cleaning of the seat 1000, for example using soap and water or disinfectant cleaning wipes. The back support 1004 may comprise multiple cutouts 1010 that together form a honeycomb design of the back support 1004. The multiple cutouts 1010 may reduce the weight of the seat 1000 and may also provide for improved airflow or venting through the back support 1004 such that a child sitting in the seat 1000 may have increased airflow and temperature comfort in the seat 1000. The multiple cutouts 1010 forming the honeycomb design may also provide for greater flexibility or bendability of the back support 1004 which may provide for additional suspension or shock absorption to improve the comfort of the child riding in the seat 1000. Increased flexibility in the back support 1004 may also improve the comfort of the child sitting in the seat 1000. In addition, by reducing the weight of the seat 1000, the seat 1000 may more easily be transported from place to place via either a stroller (e.g. FIGS. 22-28), a bicycle (e.g. FIG. 29-50) or other means (i.e. being carried, shipped, etc.). In addition, when coupled to another assembly (e.g. a stroller as shown in FIGS. 22-28 or a bicycle as shown in FIGS.

29-50), the reduced weight of the seat 1000 may provide for easier use with less effort by the user pushing the stroller or riding the bike.

The back support 1004 may also include openings 1012a, 1012b, 1012c, 1012d that may be sized and shaped to receive a harness apparatus 1014 for securing children of different sizes within the seat 1000. The seat pan 1008 may also receive an opening 1016 for receiving the harness apparatus 1014. The seat 1000 and/or the harness apparatus 1014 may comply with various safety standards related to restraint systems in various products, including, but not limited, to the safety standards identified below in Table 1.1.1 as adopted at the time of the filing of this application. In some aspects, the seat 1000 in combination with an additional assembly may comply with the safety standards identified below in Table 1.1.1 for the various products listed therein.

In addition, as shown in FIG. 51A-D, in some aspects, the back support 1004 may rotate, pivot, or fold relative to the seat pan 1008 from a use position into a storage position about a hub assembly such that the back support 1004 may be positioned between the arm bar 1028 and the seat pan 1008, for example by removing the arm bar 1028, folding the back support 1004 toward the seat pan 1008 and coupling the arm bar 1028 into place to aid in retaining the back support 1004 in the folded (or storage) position. The hub assembly may correspond to a location at which the back support 1004 is coupled to an armrest 1007 of the seat 1000. The back support 1004 may be rotated between the use position and storage position by actuating an actuator 1005 between a locked and an unlocked position. The actuator 1005 is shown in FIGS. 51A-D as a button, though, in some aspects, the actuator 1005 may be a lever or other suitable

TABLE 1.1.1

Global Standards

| Region | Stroller | Wagon | High Chair | Booster Seat | Camping Chair | Bicycle Seat | Hiking Pack |
|---|---|---|---|---|---|---|---|
| USA | ASTM F833-15 | ASTM F404-18a | ASTM F2640-18 | ASTM F2613-17* | ASTM F1625-00 | ASTM F2549-14a |
| Canada | SOR-2016-167 | N/A | N/A | N/A | N/A | N/A |
| Europe | EN 1888:2018-2 | EN 14988:2017 | EN 16120:2012+A2 | | EN 14344:2004 | EN 13209-1:2004 |
| AS/NZ | AS/NZS 2088:2013 | | AS/NZS 4684-2009 | | AS/NZS 4287-2016 | |
| China | GB 14748-2006 | | GB 22793-1/2:2008 | | | |
| Korea | KSG 3316:2007 | | Children's Chair Std. | | | |
| Taiwan | | | CNS 15017 | | | |

Figure 2:
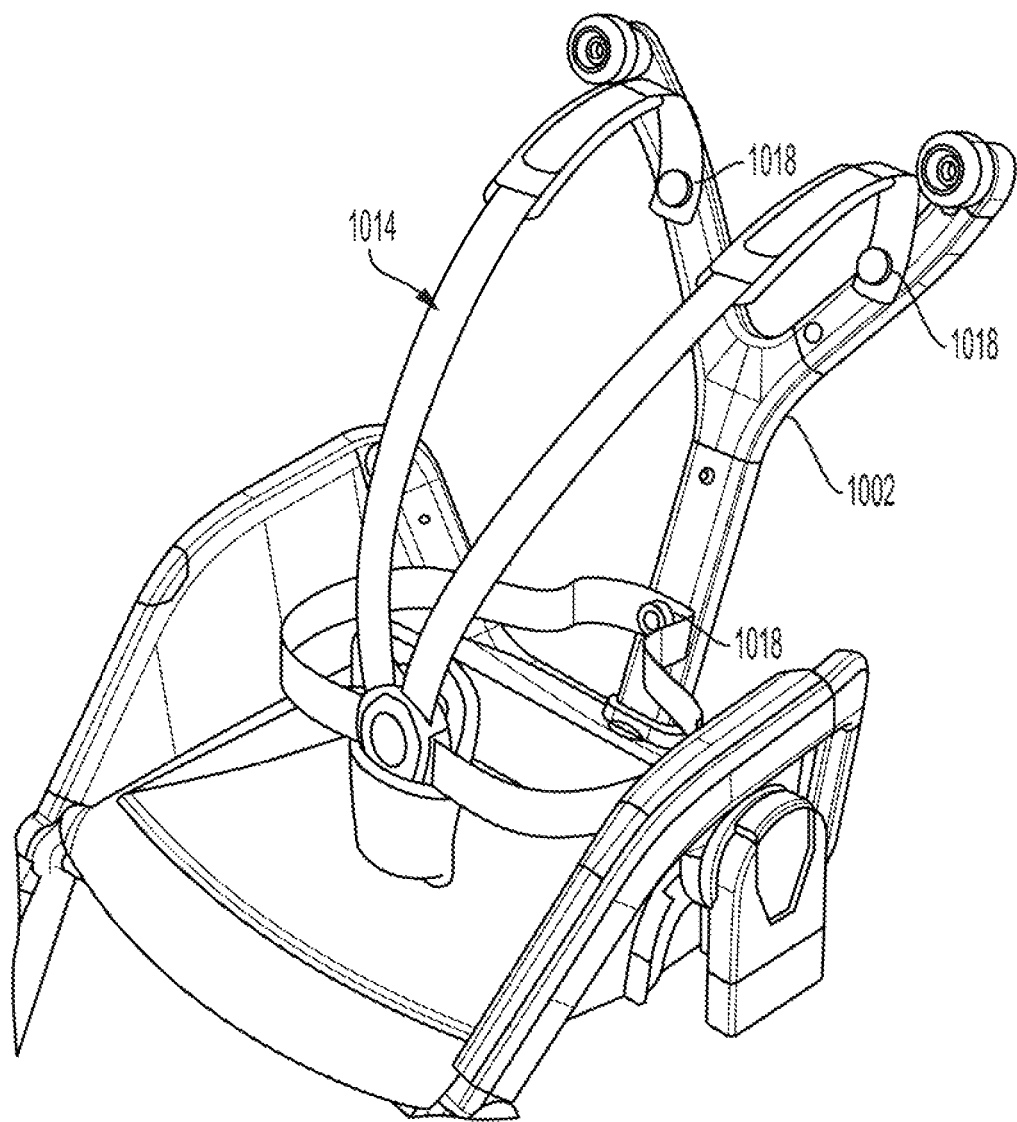
FIG. 2 depicts a front perspective view of the seat according to aspects of the present disclosure.

The harness apparatus 1014 may be coupled to the rear frame member 1002, as shown in FIG. 2 (with back support 1004 removed for ease of viewing). In some aspects, the harness apparatus 1014 may be removably coupled to the seat 1000, for example to permit washing of the harness apparatus 1014. The harness apparatus 1014 being separate from a seat cover or soft goods seat cover of the seat 1000 may permit ease of washing the seat cover. As shown in FIG. 2 the harness apparatus 1014 may be coupled to the rear frame member 1002 via suspension elements, for example energy absorbing shocks 1018. The harness apparatus 1014 may be uncoupled from the rear frame member 1002 and the seat pan 1008, for example for cleaning, storage, shipping, or other purposes. The harness apparatus 1014 may be removably coupled to the rear frame member 1002 and/or the seat pan 1008 via snap fit engagement or other suitable fastening or securing means that apply mechanical, electro-mechanical, piezoelectric, vacuum, magnetic, and/or friction force. As shown in FIG. 1A the harness apparatus 1014 may be a five-point harness, though in other aspects of the present disclosure the harness apparatus 1014 may not constitute a five-point harness.

Figure 1C:
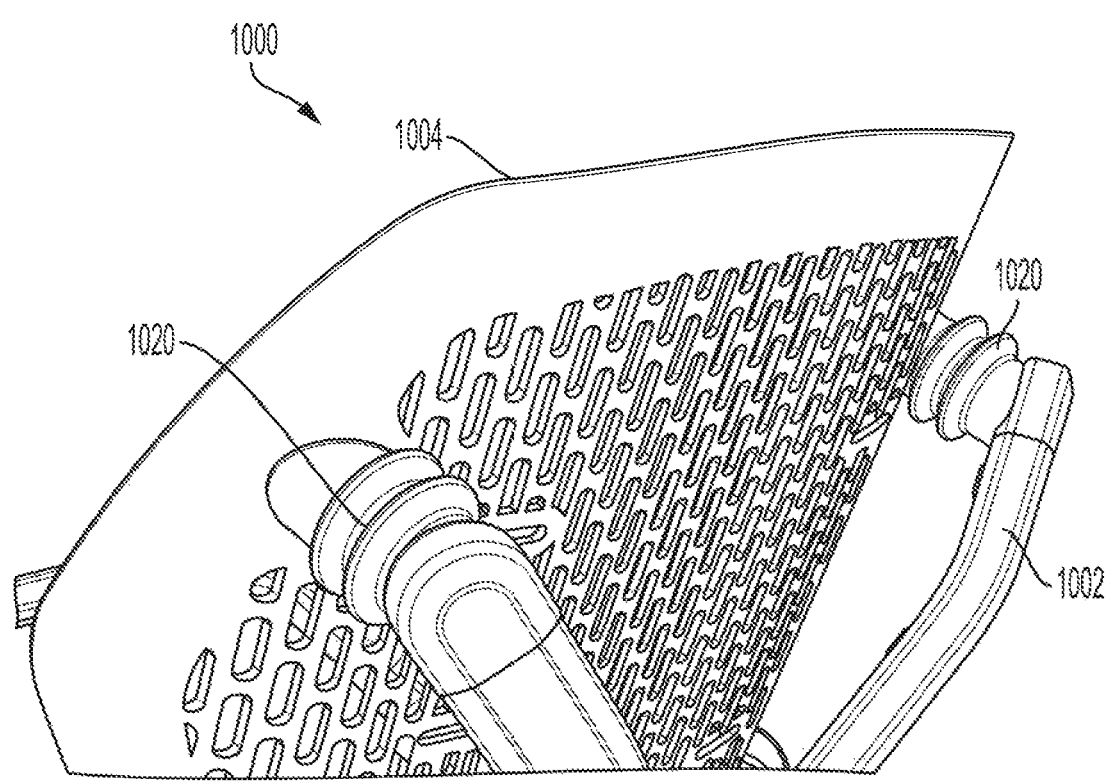
FIG. 1C depicts a rear perspective view of a portion of the seat according to aspects of the present disclosure.

As shown in FIGS. 1B and 1C, the back support 1004 may be coupled to the rear frame member 1002 via energy absorbing shocks 1020. The energy absorbing shocks 1020 may provide for a more comfortable ride in the seat 1000 by a child during use when the seat 1000 is coupled to another assembly, for example, but not limited to, a stroller (see FIGS. 22-28) or a bicycle or bicycle adapter (see FIGS. 29-50). In some aspects, the back support 1004 may be removably coupled to the rear frame member 1002 while in other aspects the back support 1004 may not be uncoupled from the rear frame member 1002. The rear frame member 1002 may have a different shape or orientation than that shown in FIGS. 1B and 1C, for example as shown in FIGS. 51A-D.

actuator. The actuator 1005 is shown as being on the hub assembly, though, in other aspects, it may be located elsewhere on the seat 1000.

Figure 3A:
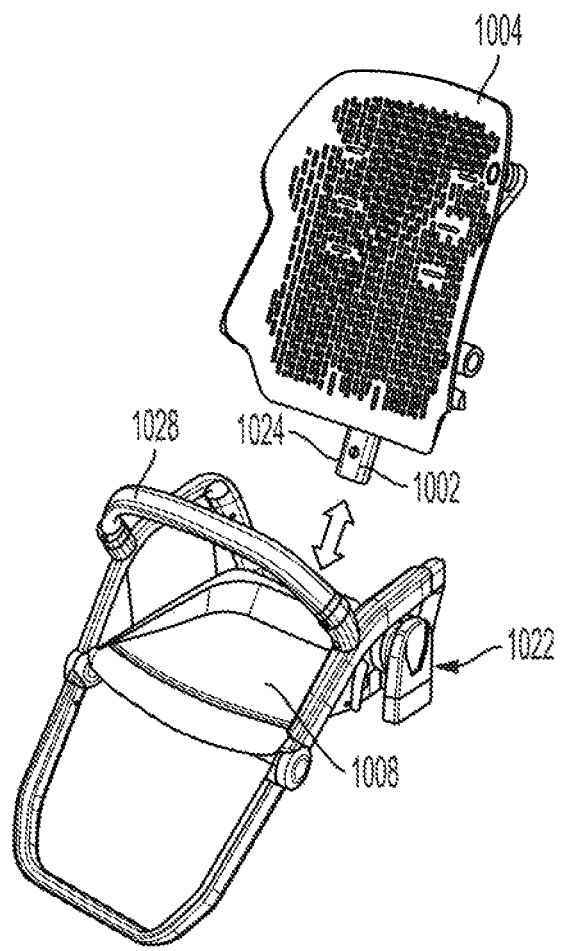
FIG. 3A depicts the seat in a decouple position, according to aspects of the present disclosure.

In some aspects, as shown in FIGS. 1A-C, the rear frame member 1002 may be removably coupled to the seat pan 1008, for example via snap fit engagement or other suitable fastening or securing means that apply mechanical, electro-mechanical, piezoelectric, vacuum, magnetic, and/or friction force. As shown in FIG. 3A the back support 1004 may be decoupled from the seat pan 1008 by decoupling the rear frame member 1002 from the seat pan 1008 via a release button or actuator 1024. The release button 1024 may be positioned on the rear frame 1002 as shown in FIG. 3A. In some aspects, one or more release buttons 1024 may be positioned on one or more of the hub assemblies 1022 (see FIGS. 1A, 1B, 3A, 3B, and 13). In some aspects, both hub assemblies 1022 may each include a release button 1024 (which may include a latch, a button, etc.). In some aspects, only one release button 1024 need be actuated to decouple the rear frame member 1002 from the seat pan 1008, while in other aspects both release buttons 1024 may need to be actuated to decouple the rear frame member 1002 from the seat pan 1008. In some aspects, the release button 1024 may be positioned elsewhere on the seat 1000, for example, but not limited to, on the rear frame member 1002. In some aspects, the release button 1024 may be a latch or other feature. The back support 1004 may also angle or recline relative to the seat pan 1008 via an actuator 1026 that may be positioned on the hub assembly 1022 or elsewhere on the seat 1000. The actuator 1026 may be a lever, a button, or any other suitable feature for controlling the position of the back support 1004.

Figure 3B:
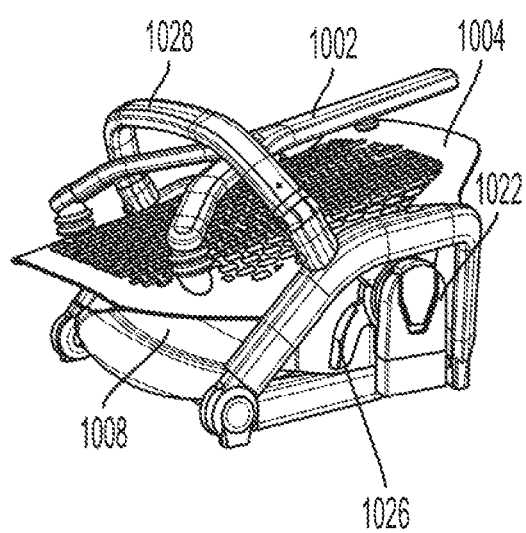
FIG. 3B depicts the seat in a storage position, according to aspects of the present disclosure.

In some aspects, the back support 1004 may be folded down against or positioned adjacent to the seat pan 1008 for reducing the size of the seat 1000 during shipping, storage, or travel. Thus, the seat 1000 may be broken down into smaller parts for ease of storage, shipping, or travel. In some aspects, as shown in FIG. 3B, the rear frame member 1002 and back support 1004 may be sized and shaped to be received between the arm bar 1028 on the seat 1000 and the seat pan 1008, or may simply be positioned adjacent the seat pan 1008 where the arm bar 1028 has been removed. By reducing the size of the seat 1000 shipping costs may be reduced, the seat 1000 may be broken down for travel via car, airline, or other transportation means, and the seat 1000 may be stored temporarily or long term with minimal storage space required. The arm bar 1028 may be removably coupled to the seat 1000 via snap fit engagement or other suitable fastening or securing means that apply mechanical, electromechanical, piezoelectric, vacuum, magnetic, and/or friction force. As shown in FIGS. 51A-C, in some aspect the back support 1004 may fold or pivot towards the seat pan 1008 to position the seat 1000 in a storage position.

As shown in FIGS. 4A-8, the calf support 1006 may be moved from a use position where the calf support 1006 is positioned to support the legs of a child in the seat 1000 to a storage position in which the calf support 1006 does not support the legs of the child and which converts the seat 1000 to a position for another use or to permit the seat 1000 to be coupled to another assembly. Thus, as disclosed herein, in addition to moving the calf support 1006 to an unsupported position relative to the child's legs, the calf support 1006 may also be moved such that the seat 1000 is converted to another use or is able to be coupled to another assembly without the calf support 1006 interfering.

Figure 4A:
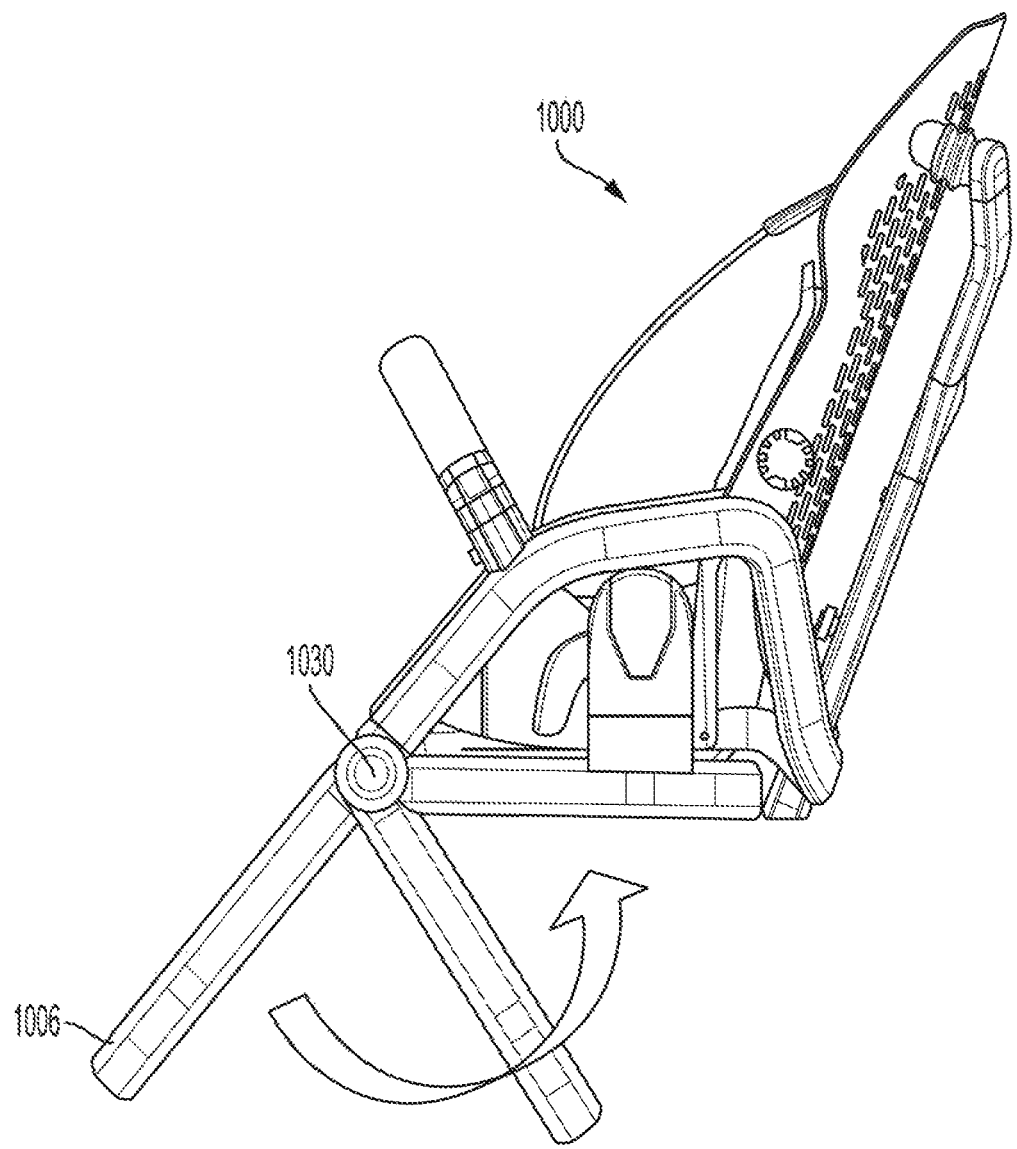
FIG. 4A depicts the seat with a calf support in a use position, according to aspects of the present disclosure.
Figure 4B:
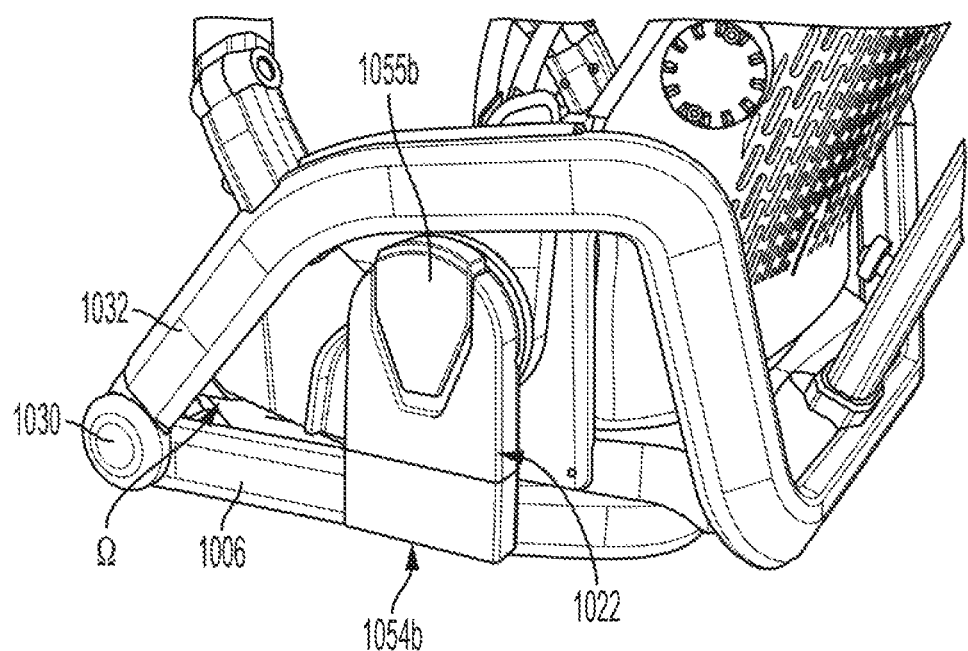
FIG. 4B depicts the seat with the calf support in a storage position, according to aspects of the present disclosure.
Figure 4C:
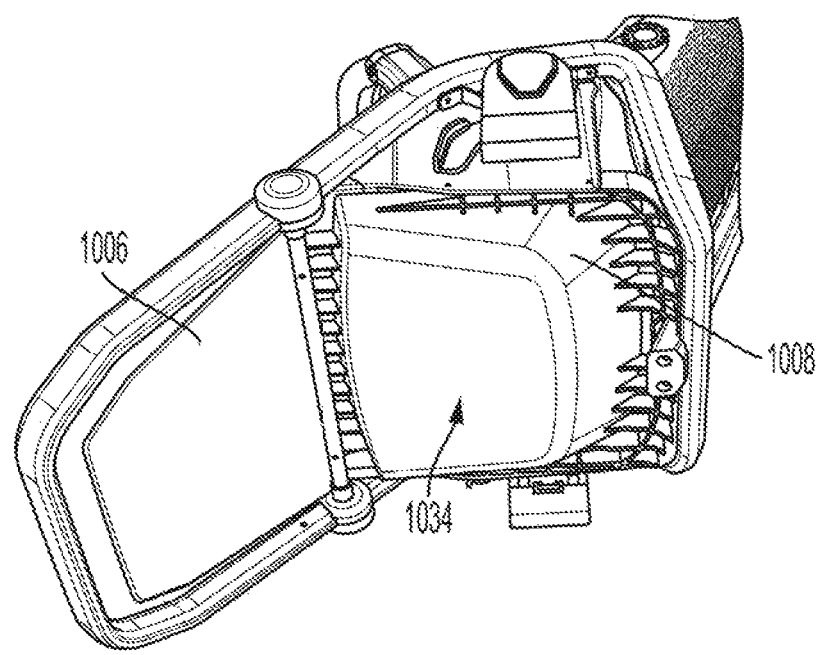
FIG. 4C depicts a bottom perspective view of the seat with the calf support in a use position, according to aspects of the present disclosure.
Figure 4D:
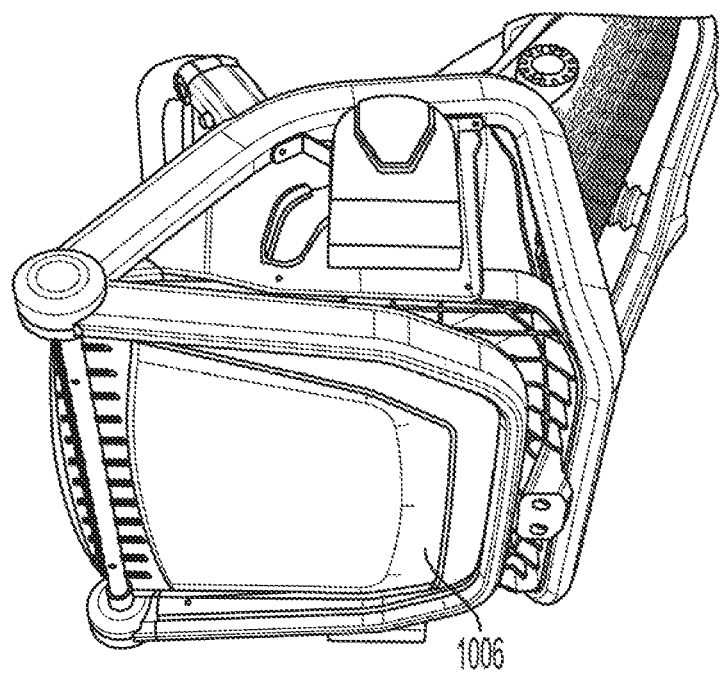
FIG. 4D depicts a bottom perspective view of the seat with the calf support in a storage position, according to aspects of the present disclosure.
Figure 5:
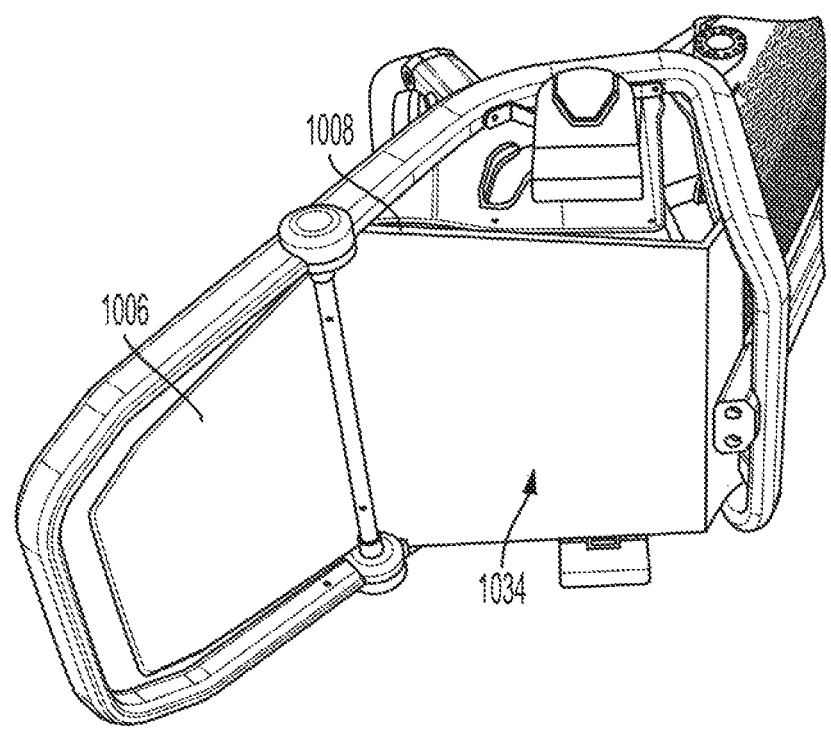
FIG. 5 depicts a bottom perspective view of the seat, according to aspects of the present disclosure.

FIG. 4A depicts an example of the present disclosure in which the calf support 1006 of the seat 1000, may be rotated between the use position (shown in FIG. 4A) and the storage position (shown in FIG. 4B). The calf support 1006 may rotate about via a hub assembly 1030 about a pivot point. The hub assembly 1030 may include an actuator that may move between a locked and an unlocked position for locking the calf support 1006 in a use position or unlocking the calf support 1006 for positioning in a storage position. As shown in FIG. 4B, the hub assembly 1030 may provide for an angle Ω between a frame member 1032 of the seat 1000 and the calf support 1006 when the calf support 1006 is in the storage position to prevent a pinch point between the frame member 1032 and the calf support 1006 that could pinch a child's fingers. As shown in the bottom perspective view of FIG. 4C, the seat pan 1008 and the calf support 1006 may be scalloped or shaped to nest together when the calf support 1006 is in the storage position (as shown in FIG. 4D). The term nest includes configurations in which the calf support 1006 rests at least partially against a bottom surface 1034 of the seat pan 1008 as well configurations in which the calf support rests adjacent to the bottom surface 1034 of the seat pan 1008 in the storage position. In some aspects, for example as shown in FIG. 5, the seat pan 1008 may be flat or angled as opposed to scalloped, however the calf support 1006 may still nest or otherwise rest against or adjacent to the bottom surface 1034 of the seat pan 1008. As shown in FIG. 4A-D, the calf support 1006 may rotate about the pivot point of the hub assembly 1030 to a storage position in which the calf support 1006 is positioned under the seat pan 1008 such that the calf support 1006 nests against the seat pan 1008.

Figure 6:
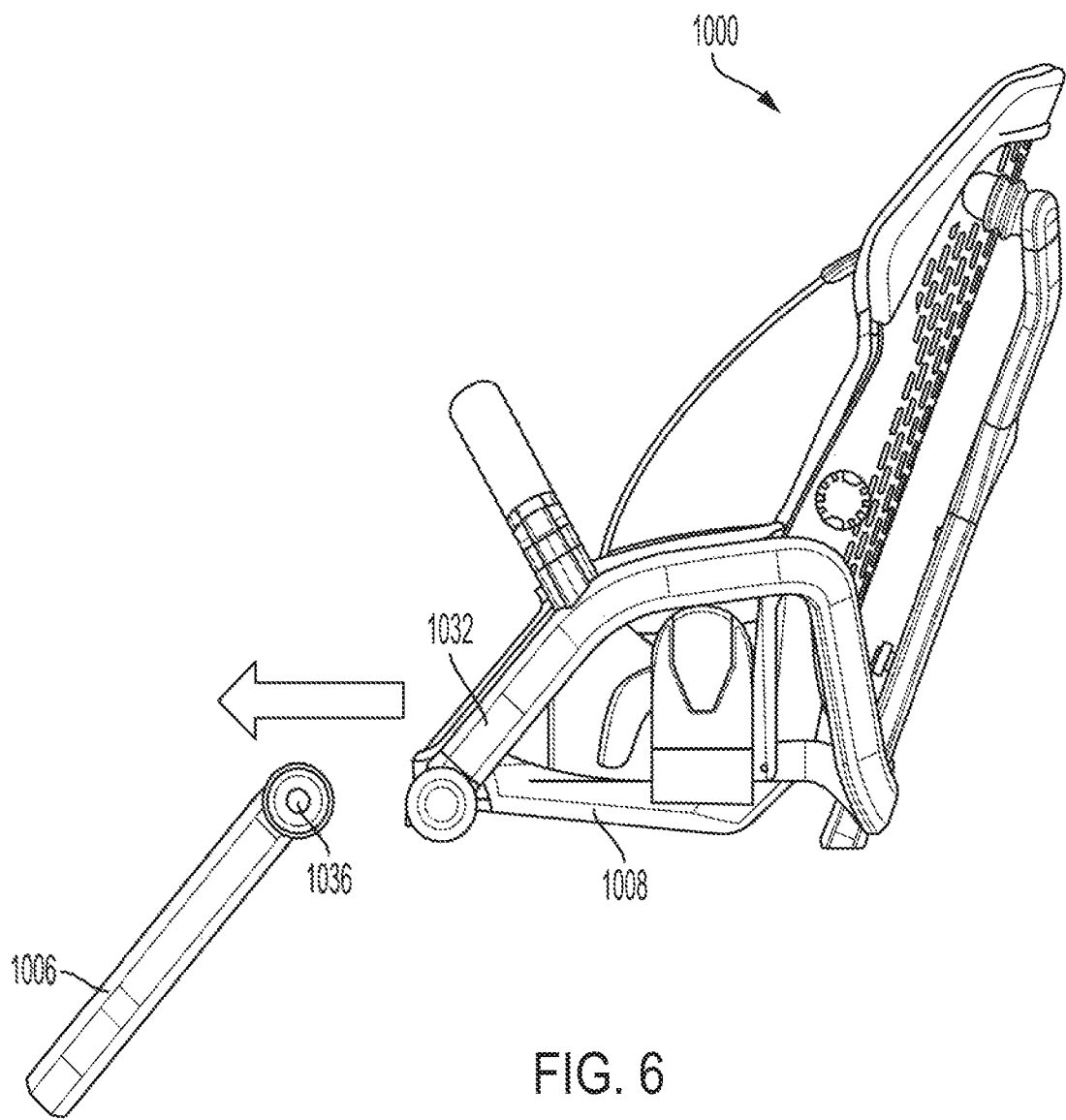
FIG. 6 depicts the seat with the calf support decoupled from the seat, according to aspects of the present disclosure.
Figure 7:
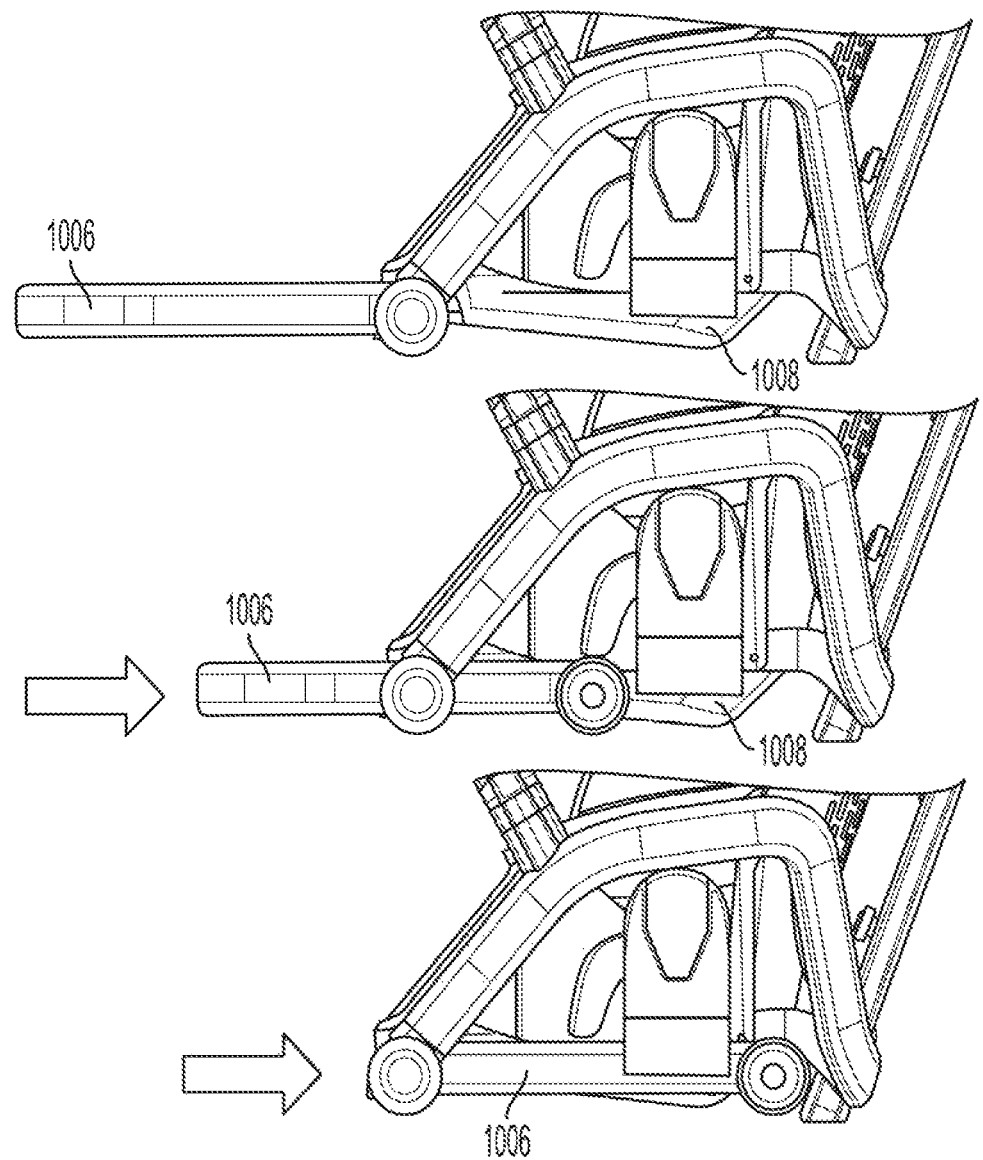
FIG. 7 depicts the seat with the calf support rotated and moved relative to the seat pan for positioning in the storage position, according to aspects of the present disclosure.

While FIGS. 4A-5 depict an aspect of the present disclosure in which the calf support 1006 folds or rotates between the use position and the storage position, other suitable means for moving or manipulating the calf support 1006 to convert the seat 1000 to another use or permit the seat 1000 to couple to another assembly without interference of the calf support 1006, may be used. For example, FIG. 6 depicts an aspect in which the calf support 1006 may be removably coupled to the seat 1000, including, but not limited to, the seat pan 1008. The calf support 1006 may be unlocked and removed from the seat 1000 by actuating an actuator 1036 from a locked to an unlocked position. Though FIG. 6 depicts the actuator 1036 positioned on the calf support 1006, in some aspects, the actuator 1036 may be positioned on the seat pan 1008 or elsewhere on the seat 1000, including, but not limited to, on the frame member 1032. In still yet other aspects of the present disclosure, the calf support 1006 may be slid between the use position and the storage position, for example as shown in FIG. 7. As shown in FIG. 7, the calf support 1006 may be rotated and then slid to the storage position adjacent the seat pan 1008.

Figure 8:
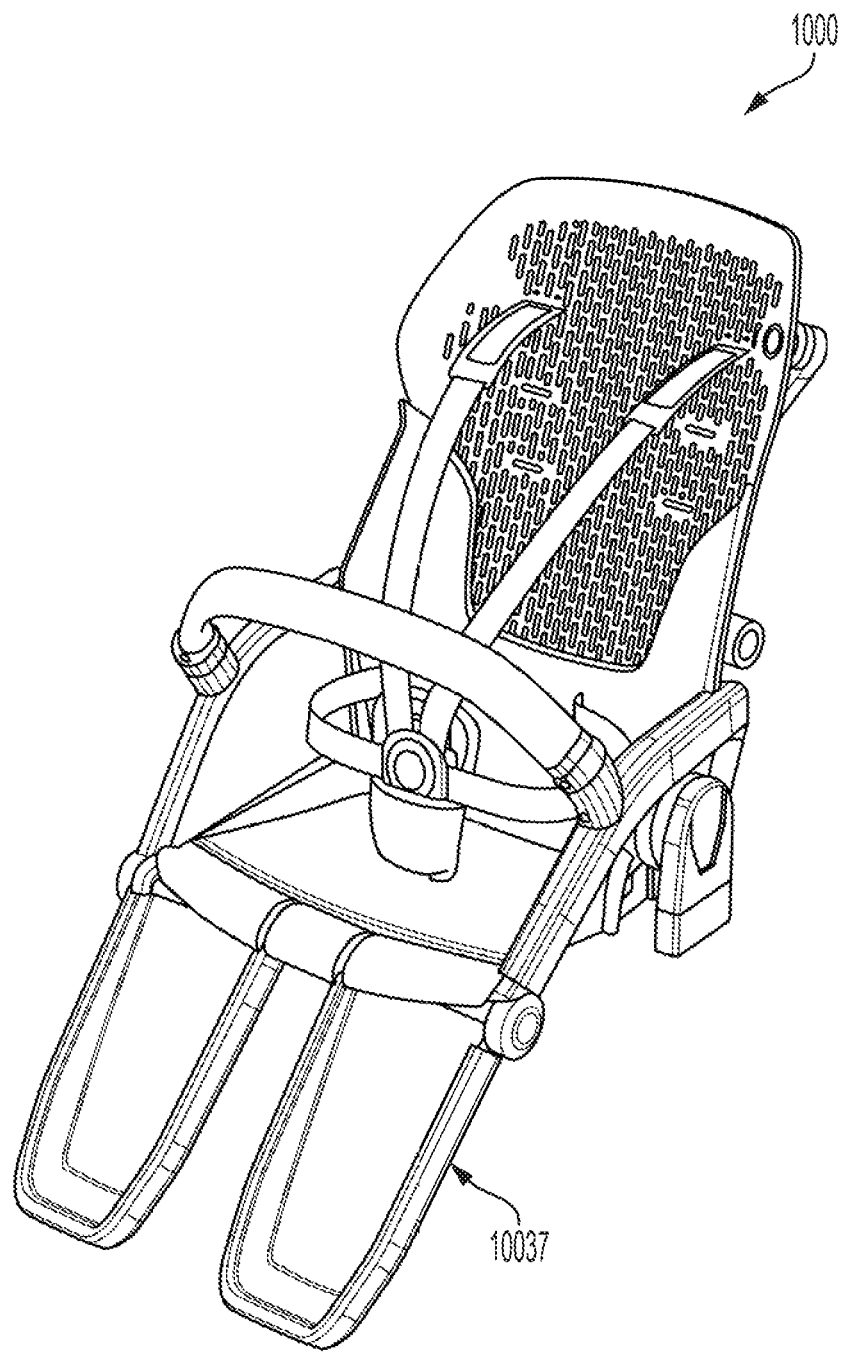
FIG. 8 depicts the seat with a calf support, according to aspects of the present disclosure.

In some aspects, the seat 1000 may include a split calf support 1037 as depicted in FIG. 8. The split calf support 1037 may provide for the seat 1000 being convertible between use with a stroller (see FIGS. 22-28) and use with a bicycle or bicycle adapter (see FIGS. 29-50). In some aspects, the split calf support 1037 may be removably coupled to the seat 1000 such that the split calf support 1037 may be replaced with the calf support 1006.

FIGS. 14A-16D show additional aspects of the present disclosure in which a calf support, for example including but not limited to calf support 1006, can be manipulated or removed to enable moving a seat (e.g. seat 1000) between various assemblies or configurations. In the storage position (including removal of the calf support 1006 from the seat 1000), the calf support 1006 can be positioned to minimize the size of the seat 1000 and to permit the seat 1000 to be coupled to other assemblies such as a stroller, a bike, a high chair, or other assemblies.

Figure 72:
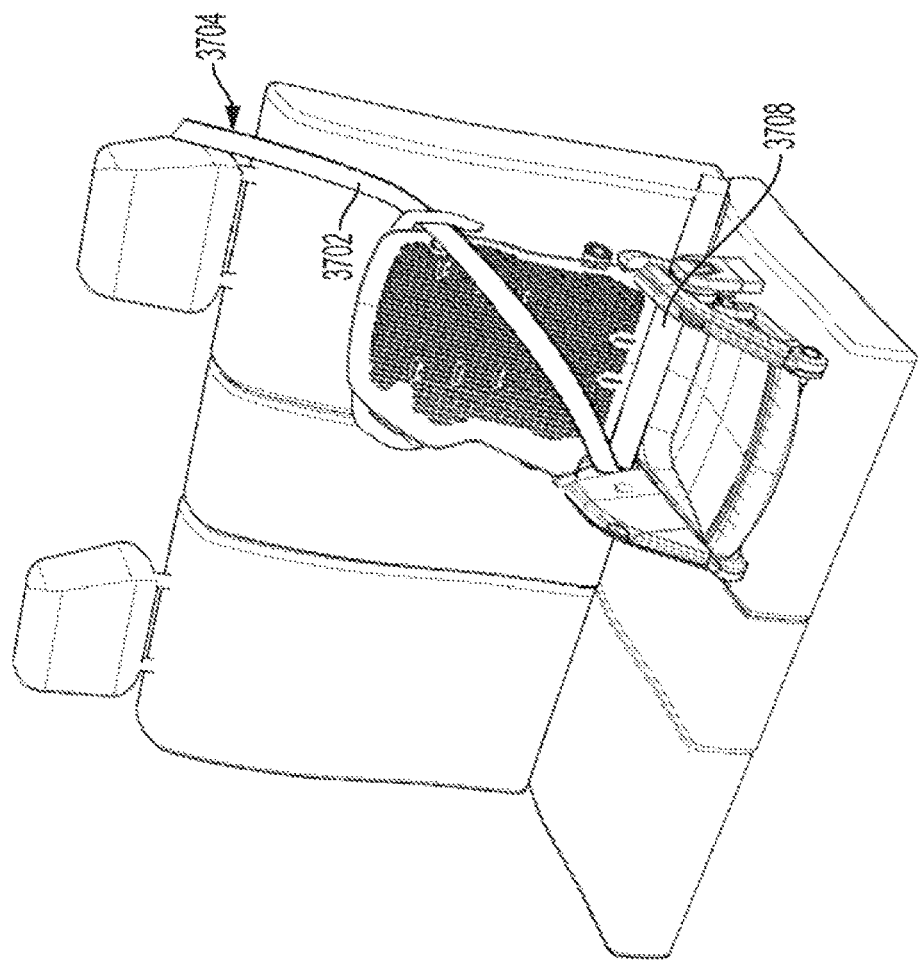
FIG. 72 depicts the seat in use as a booster seat in a vehicle, according to aspects of the present disclosure.

As described herein, the calf support 1006 may be positioned in the storage position for using the seat 1000 in a configuration such as a booster seat (see FIGS. 54-57), a hiking pack (see FIGS. 67-68), an infant carrier (see FIG. 69), a car seat or booster seat (see FIGS. 70-72), or an airplane seat (see FIG. 73-75), or other configurations. The calf support 1006 may be positionable between the use and storage positions via any suitable means including, but not limit to, folding, rotating, removing, decoupling, sliding, or flipping, the calf support 1006 relative to other elements of the seat 1000, or via any other suitable means.

Figure 14B:
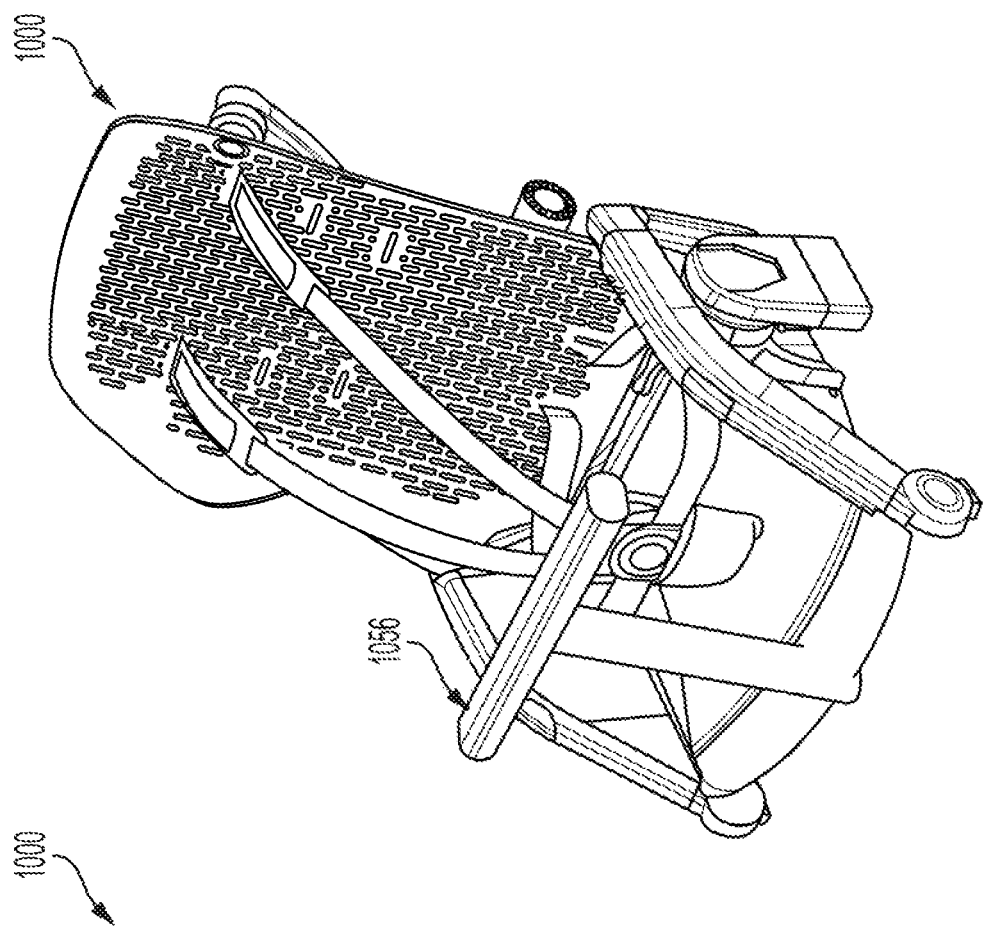
FIG. 14B depicts a calf support of the seat in a storage position, according to aspects of the present disclosure.
Figure 14A:
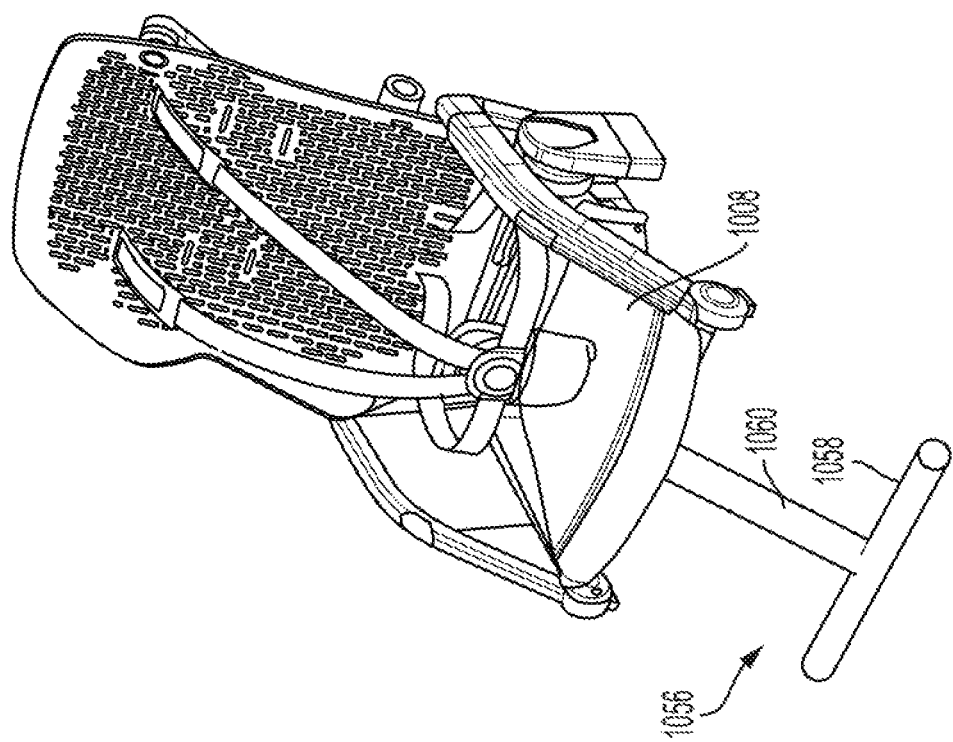
FIG. 14A depicts a calf support of the seat in a use position, according to aspects of the present disclosure.
Figure 15:
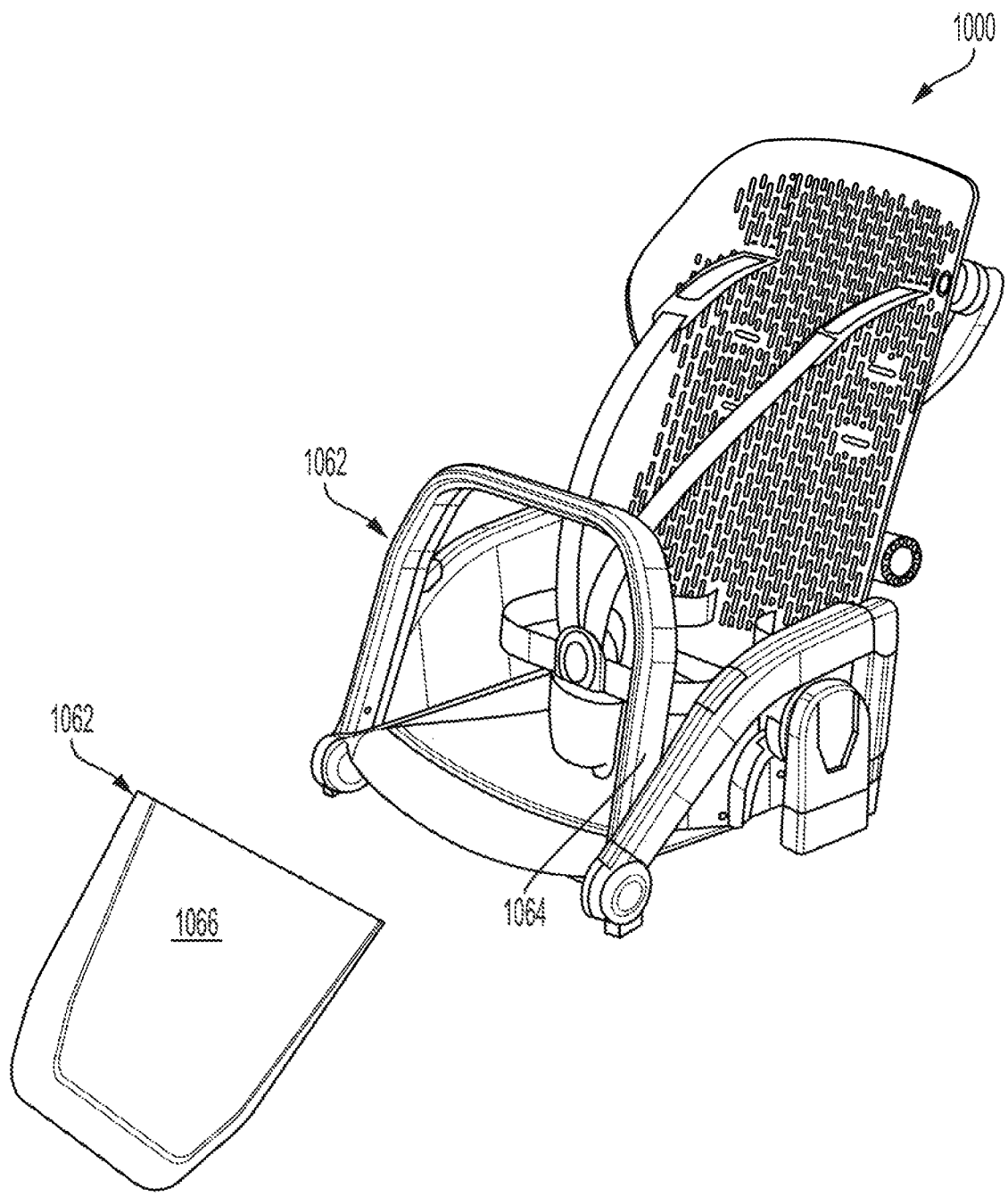
FIG. 15 depicts a calf support of the seat, according to aspects of the present disclosure.
Figure 16A:
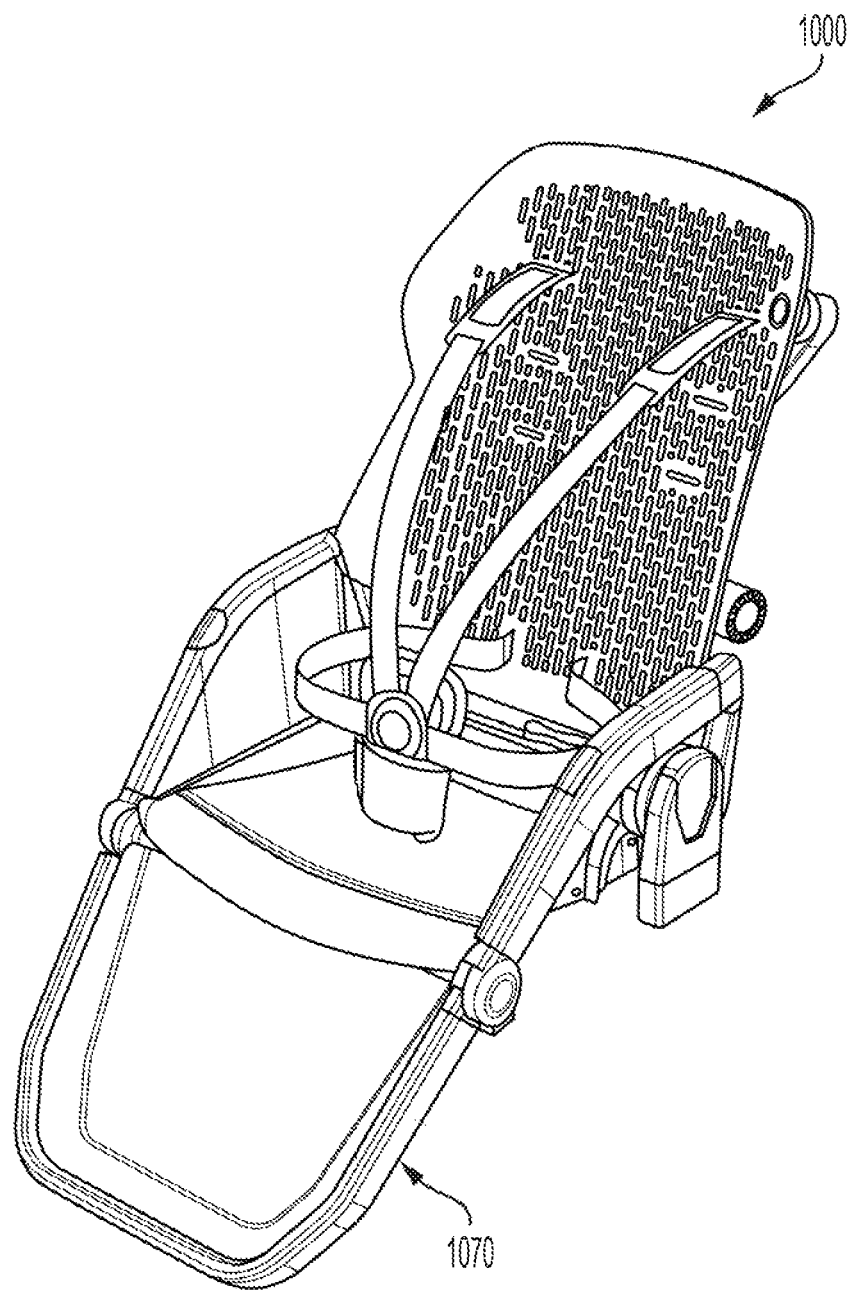
FIGS. 16A-16D depicts a calf support of the seat in various positions, according to aspects of the present disclosure.
Figure 16D:
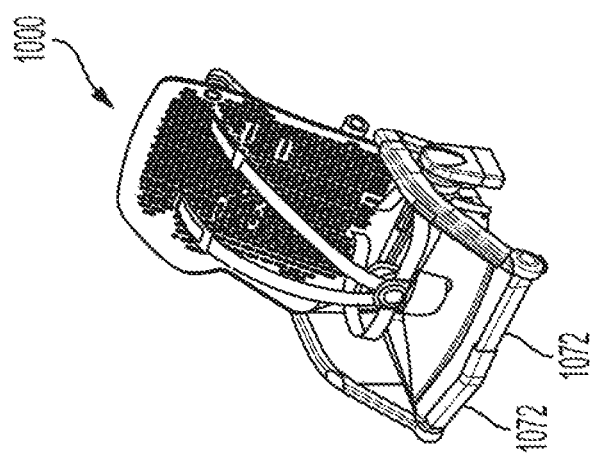
Figure 16C:
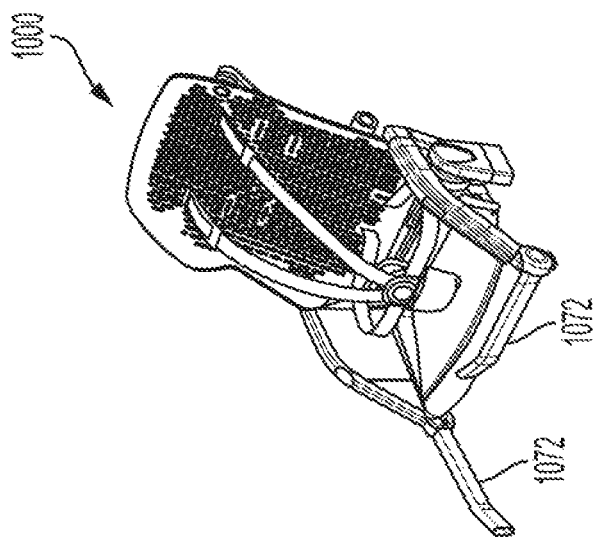
Figure 16B:
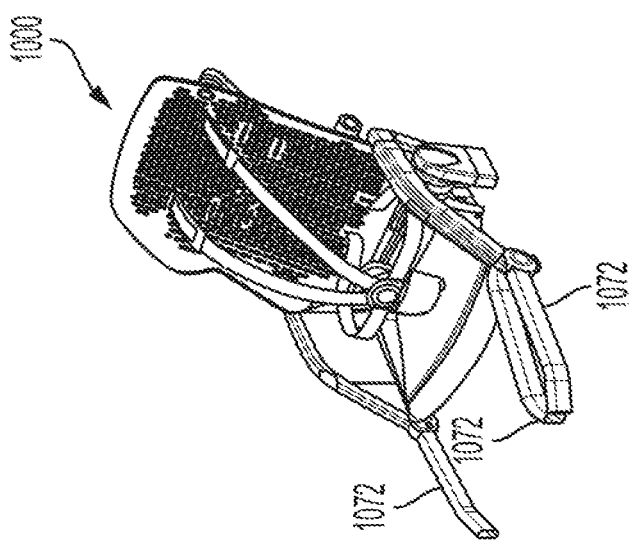
Figure 17:
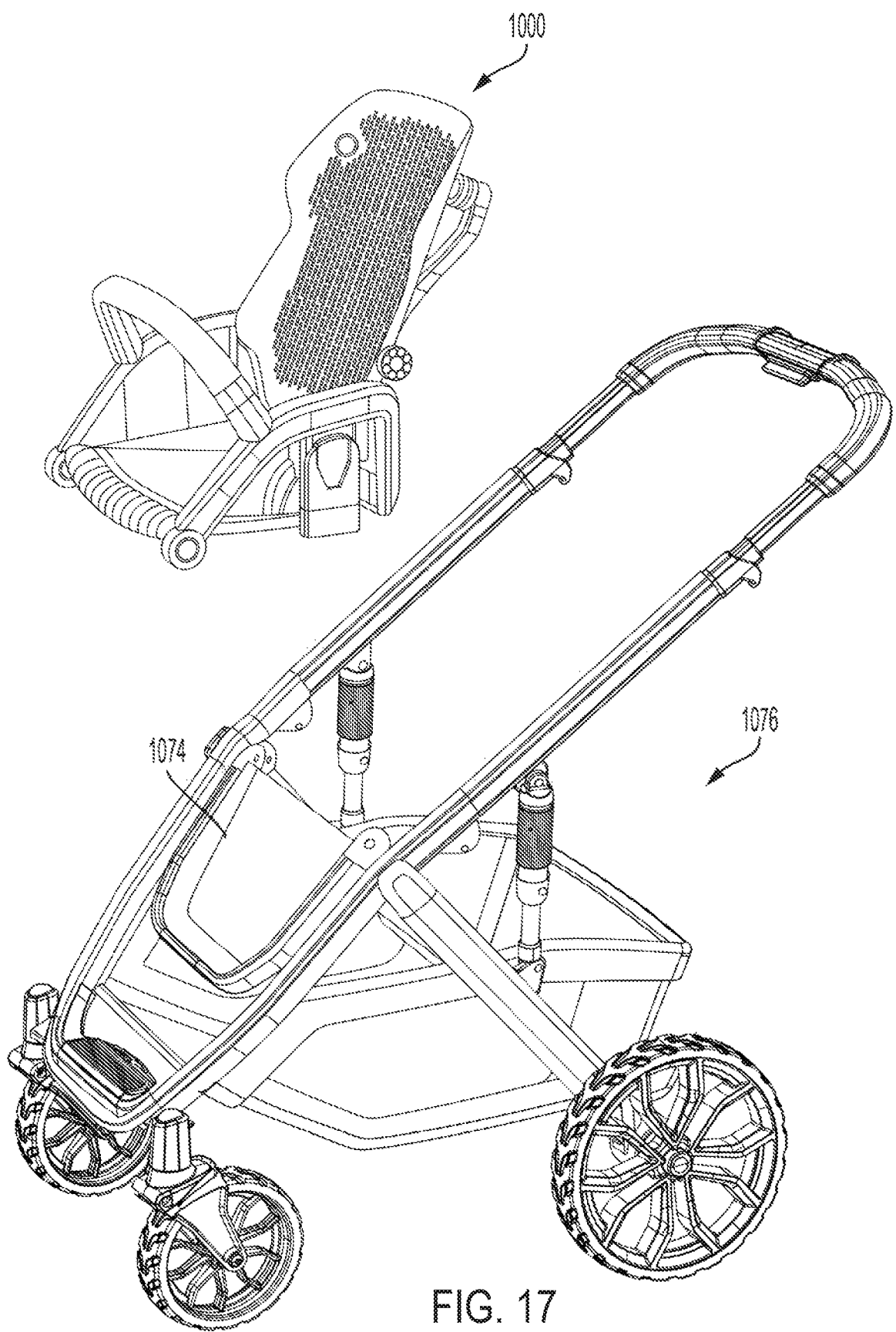
FIG. 17 depicts a stroller assembly that includes a calf support, the stroller assembly being coupleable to the seat, according to aspects of the present disclosure.

The present disclosure contemplates additional means and configurations for providing a calf support that may be coupled to or integral with the seat 1000. For example, FIG. 14A depicts a calf support 1056 having a foot rest 1058 that couples to the seat pan 1008 via an extension member 1060. The calf support 1056 may optionally be rotatable upwards relative to the seat pan 1008 to convert to a holding bar or arm bar for the child, as shown in FIG. 14B. In another embodiment, as shown in FIG. 15, the seat 1000 may include a calf support 1062 comprising a frame member 1064 and a removable fabric backing 1066 that may be coupled to the frame member 1064, such that the calf support (with the fabric backing 1066 removed) may be rotated upwards approximately 90-180 degrees such that the frame member of the calf support converts to an arm bar or grab bar for the seat 1000, as shown in FIG. 15. In still yet other aspects, as shown in FIGS. 16A-D the seat 1000 may include a calf support 1070 that may comprise elements 1072 (including bars, frame members, fabric panels, etc.) that may be linked or coupled together such that the calf support 1070 may be folded into a storage position. In still yet other aspects, the seat 1000 may not include a calf support 1074. In such aspects, for example as shown in FIG.

17, a calf support 1074 may be coupled to another assembly, for example a stroller 1076, where the calf support may be used in conjunction with the seat 1000 when the seat 1000 is coupled to the stroller 1076.

Figure 9A:
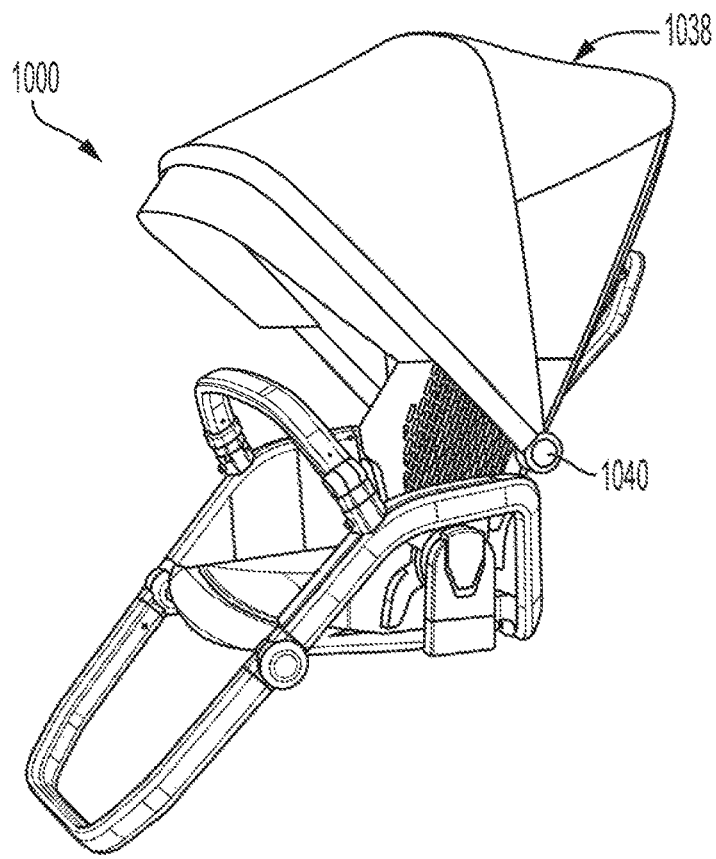
FIG. 9A depicts the seat coupled to a canopy, according to aspects of the present disclosure.
Figure 9B:
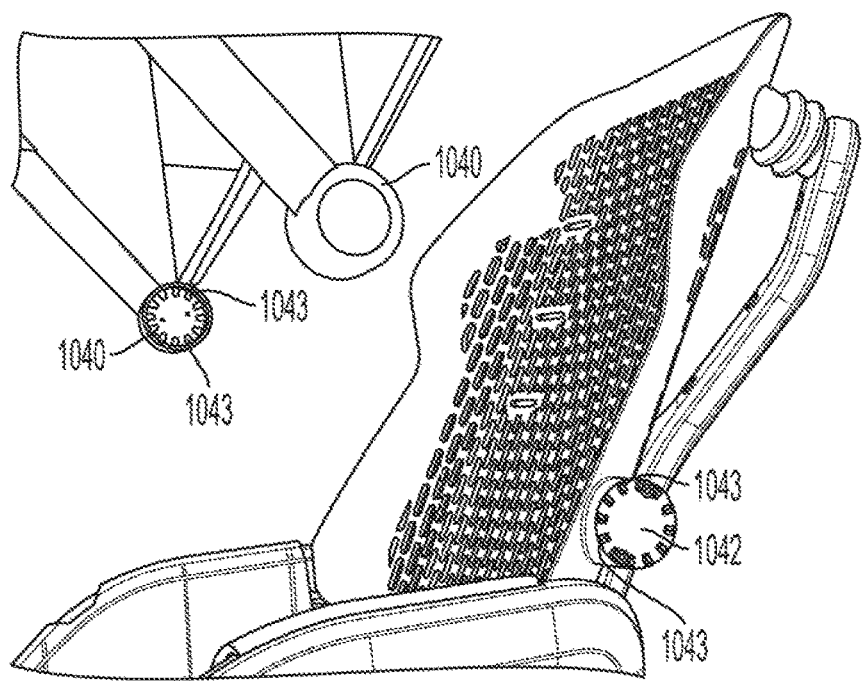
FIG. 9B depicts the seat decoupled from the canopy, according to aspects of the present disclosure.

FIG. 9A and FIG. 9B depict a canopy 1038 that may be removably coupled to the seat 1000. The canopy 1038 may provide for shade or protection of the child in the seat 1000. The canopy 1038 may include hub assemblies 1040 that may couple to the seat 1000 (for example at hub assemblies 1042) via any suitable means including, but not limited to snap fit engagement or other suitable fastening or securing means that apply mechanical, electromechanical, piezoelectric, vacuum, magnetic, and/or friction force. For example, in some aspects, the hub assemblies 1040 and hub assemblies 1042 may comprise one or more magnets 1043. In some aspects, the magnets 1043 may be removably coupled to the hub assemblies 1040 and 1042. The magnets 1043 of the hub assemblies 1040 and 1042 may be oriented such that the hub assemblies 1040 are attracted to the hub assemblies 1042 such that when the hub assemblies 1040 and 1042 are positioned adjacent one another the magnetic force between the magnets 1043 couples the canopy 1038 to the seat 1000. The magnetic attachment between the canopy 1038 and the seat 1000 may allow for the easy removal and installation of the canopy 1038 by making the canopy 1038 relative to the seat 1000.

Figure 10A:
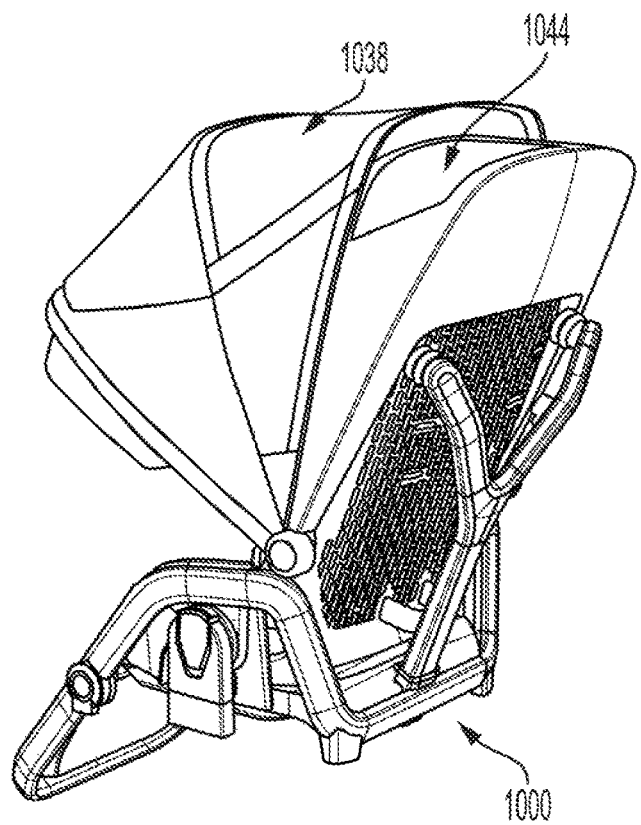
FIG. 10A depicts the canopy in a first position, according to aspects of the present disclosure.
Figure 10B:
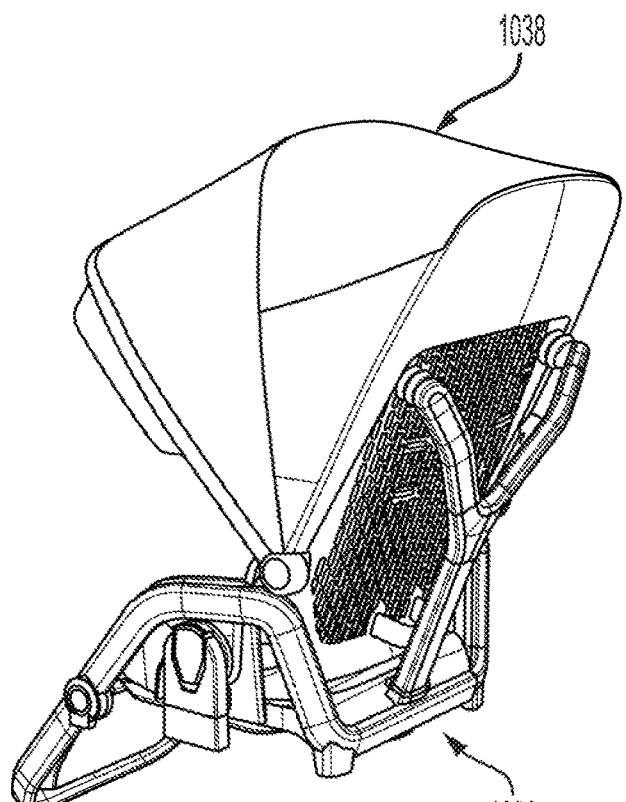
FIG. 10B depicts the canopy in a second position, according to aspects of the present disclosure.

The canopy 1038 may be moveable between multiple positions, for example between an extended position (shown in FIG. 10A) in which a greater surface area of material is expanded to shade the child and an upright position (shown in FIG. 10B) in which less surface are of material is expanded to shade the child. As shown in FIG. 10B, the canopy 1038 may include a panel 1044 that may provide for airflow or venting. In some aspects, the panel 1044 may be a mesh panel or may comprise another material that provides for greater airflow through the panel 1044 as compared to the remainder of the canopy 1038. In some aspects, the panel 1044 may be a see through material, a clear material, a mesh material or another suitable material that provides for viewing through the panel 1044 so that the child may be viewed through the panel 1044 and so that the child may see through the panel 1044. In some aspects, the canopy 1038 may be collapsed to a storage position while coupled to the seat 1000 such that the canopy 1038 is folded into itself and does not shade the child.

Figure 11:
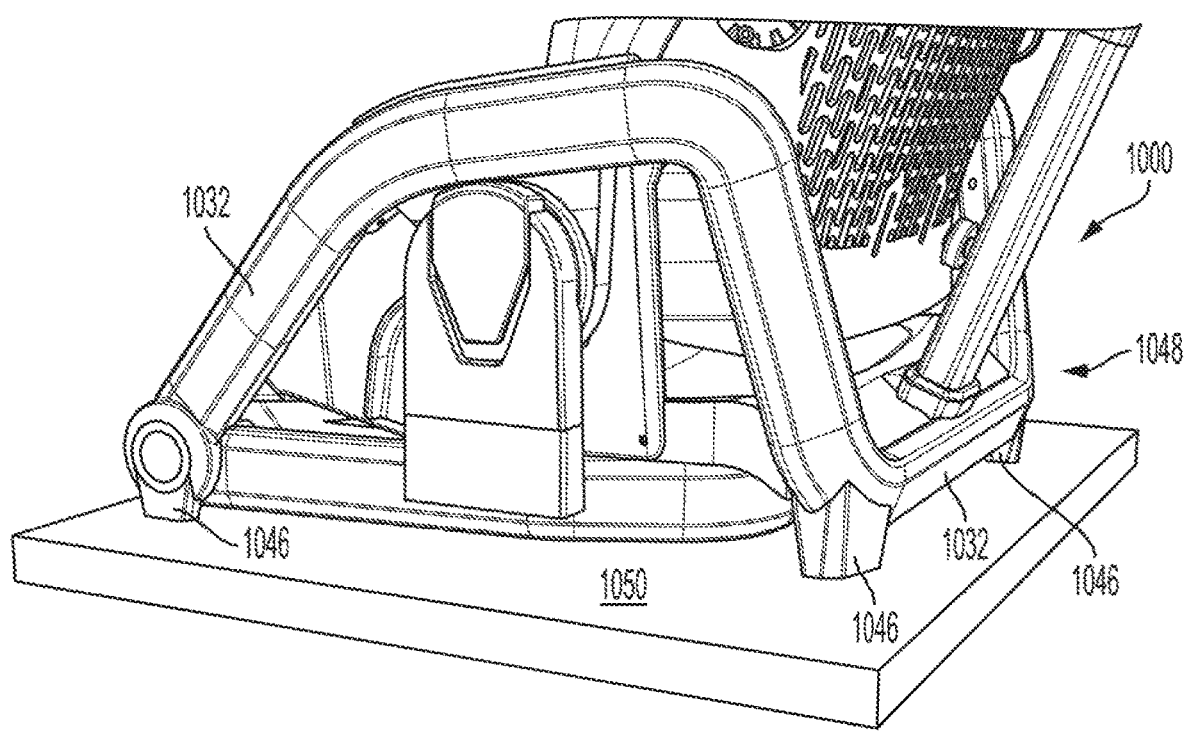
FIG. 11 depicts the seat including multiple feet, according to aspects of the present disclosure.
Figure 18A:
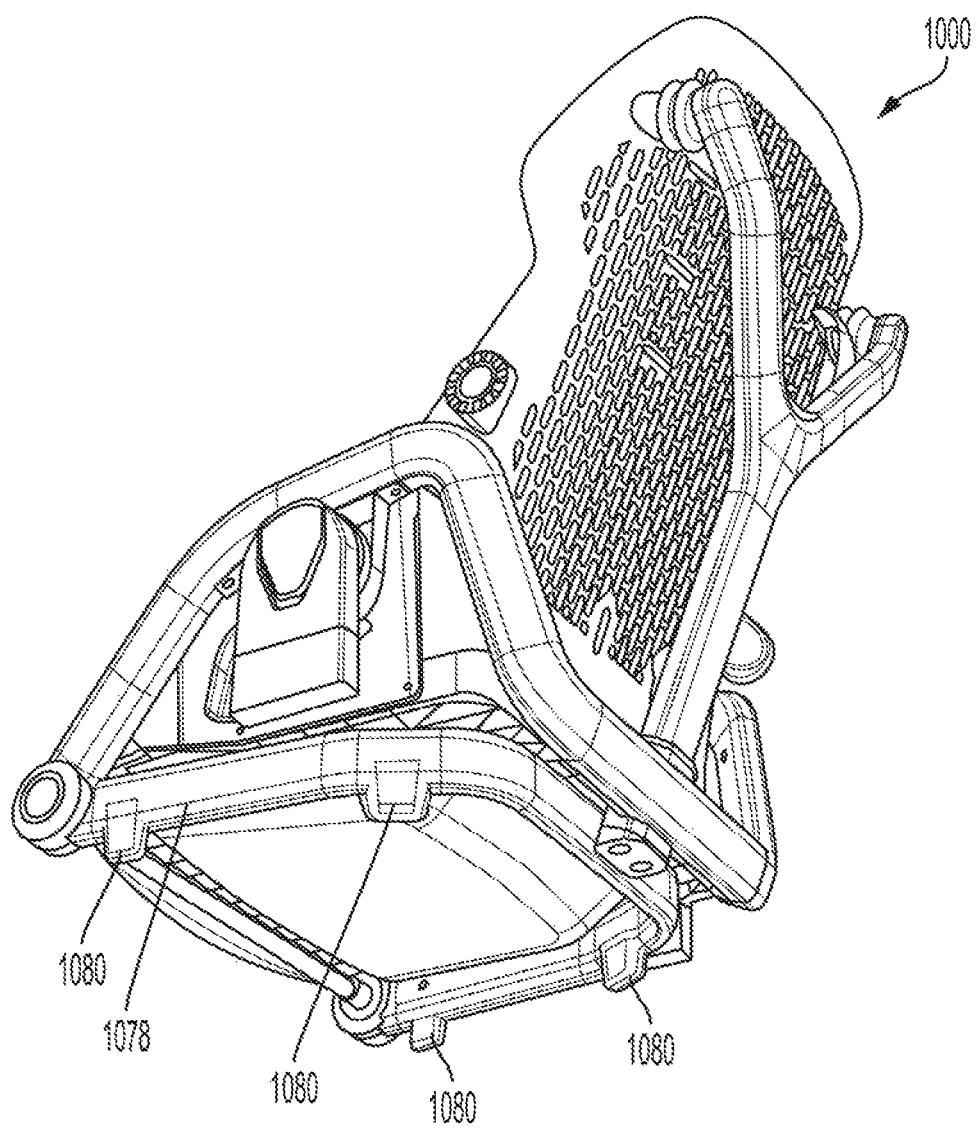
FIGS. 18A-B depicts a calf support that includes projections or feet, according to aspects of the present disclosure.
Figure 18B:
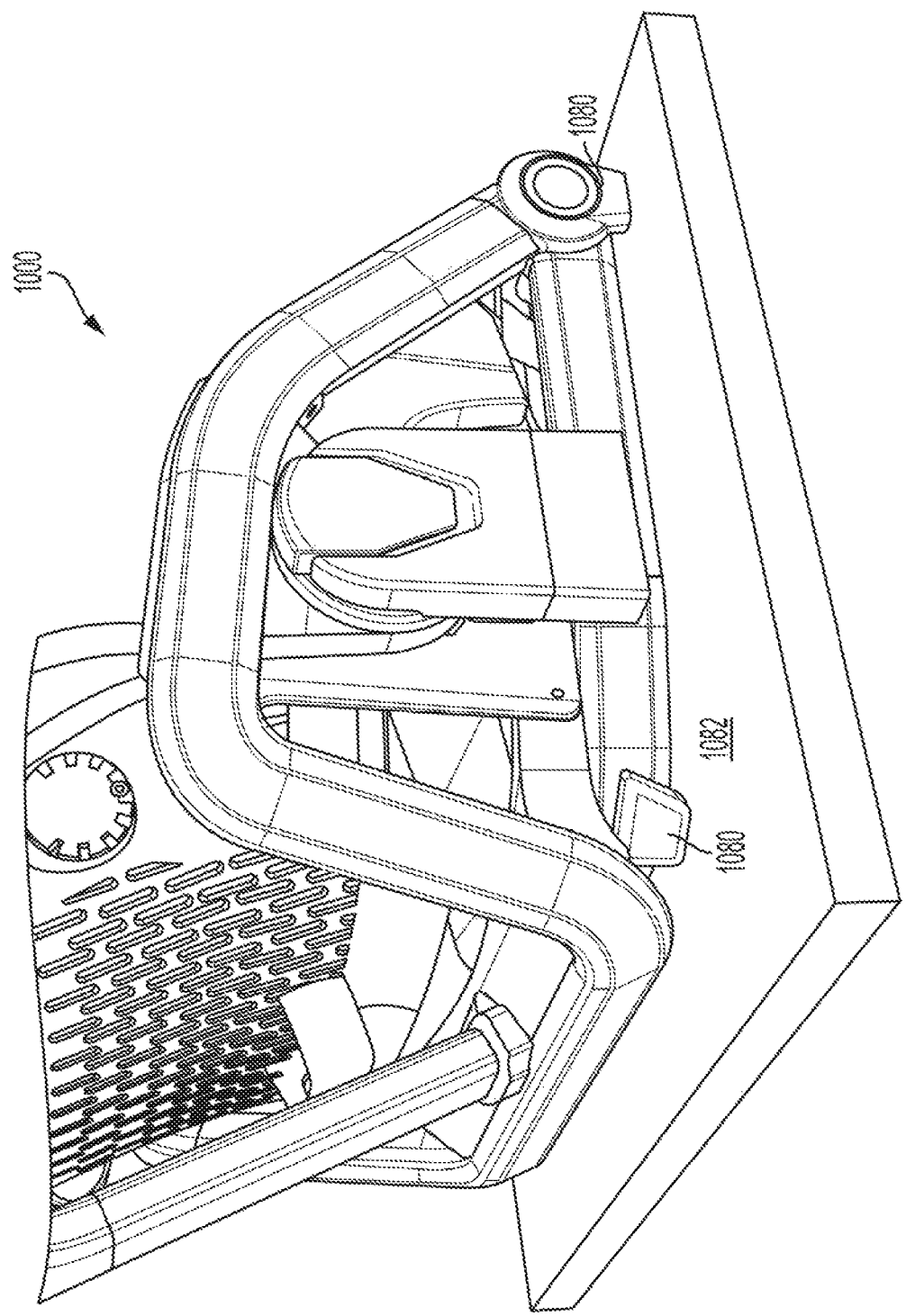

As shown in FIG. 11, the seat 1000 may also include one or more feet 1046 that may extend from a bottom region 1049 of the seat 1000. In some aspects, the feet 1046 may be integrally formed with the seat 1000. In other aspects, the feet 1046 may be removably coupled to the seat 1000. The feet 1046 may be sized and shaped to balance and retain the seat 1000 in a secure sitting position on a surface. For example, the feet 1046 may stabilize the seat 1000 on a surface 1050 such as the flooring of a home, an outdoor ground surface, or on a surface such as a chair seat. In some aspects, the feet 1046 may also include non-slip features (not visible in FIG. 11) which may increase the frictional contact between the feet 1046 and the surface 1050 on which the seat 1000 is positioned, thereby further securing the seat 1000 in place. The non-slip features may comprise a rubberized material or other material that may increase the frictional contact between the feet 1046 and the surface 1050 on which the seat 1000 is positioned. As shown in FIG. 11, the feet 1048 may extend from the frame member 1032 of the seat 1000. Moreover, as shown in FIG. 11, the feet 1046 may be sized to extend beyond the calf support 1006 when the calf support 1006 is in the stored position, such that the feet 1046 contact the surface 1050 on which the seat 1000 is positioned instead (or in addition to) the stored calf support 1006. In some aspects, the feet 1046 may extend from the calf support 1006, for example as shown in FIGS. 18A-B.

Figure 12A:
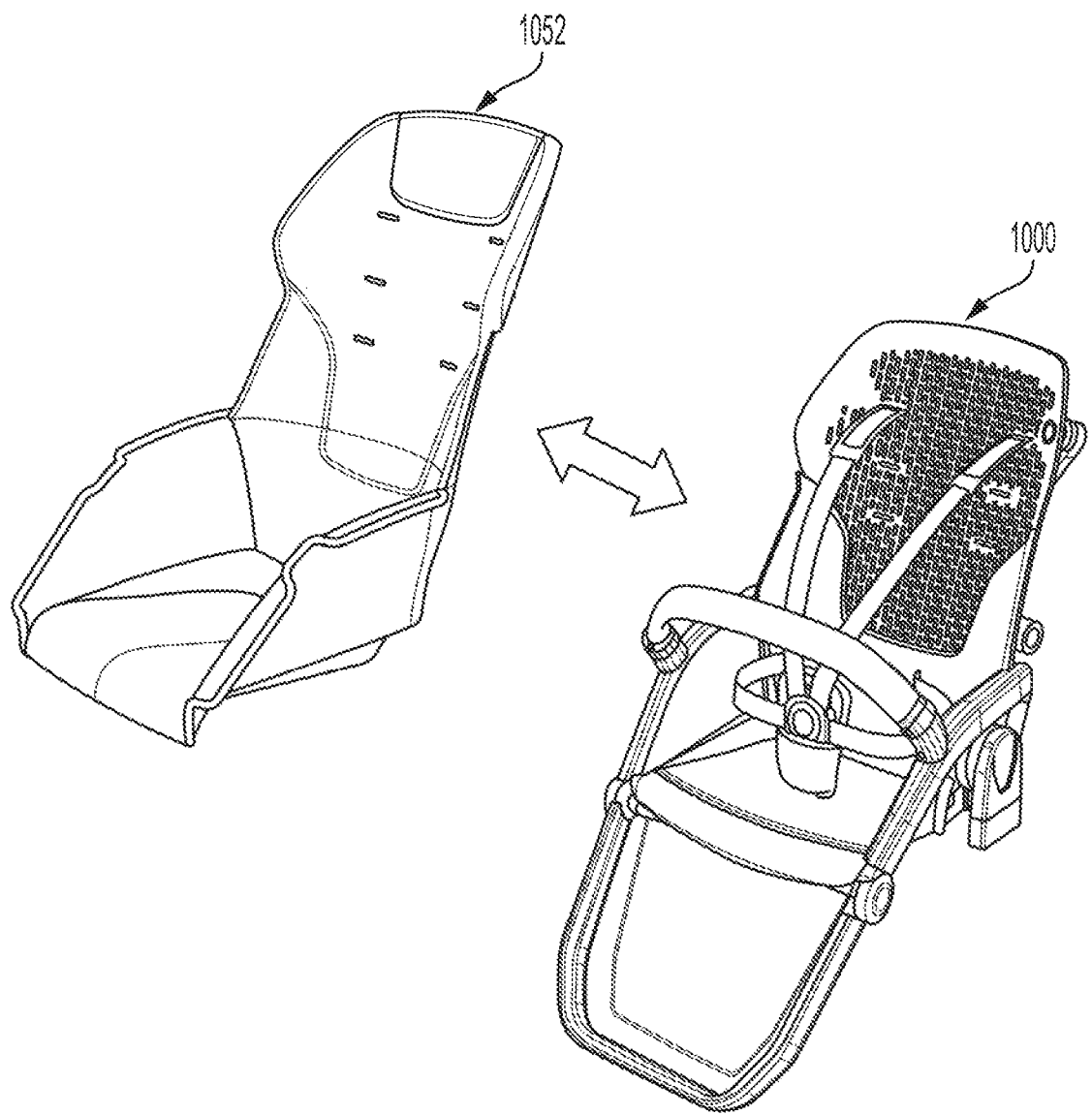
FIG. 12A depicts a seat cover that is coupleable to the seat, according to aspects of the present disclosure.
Figure 12B:
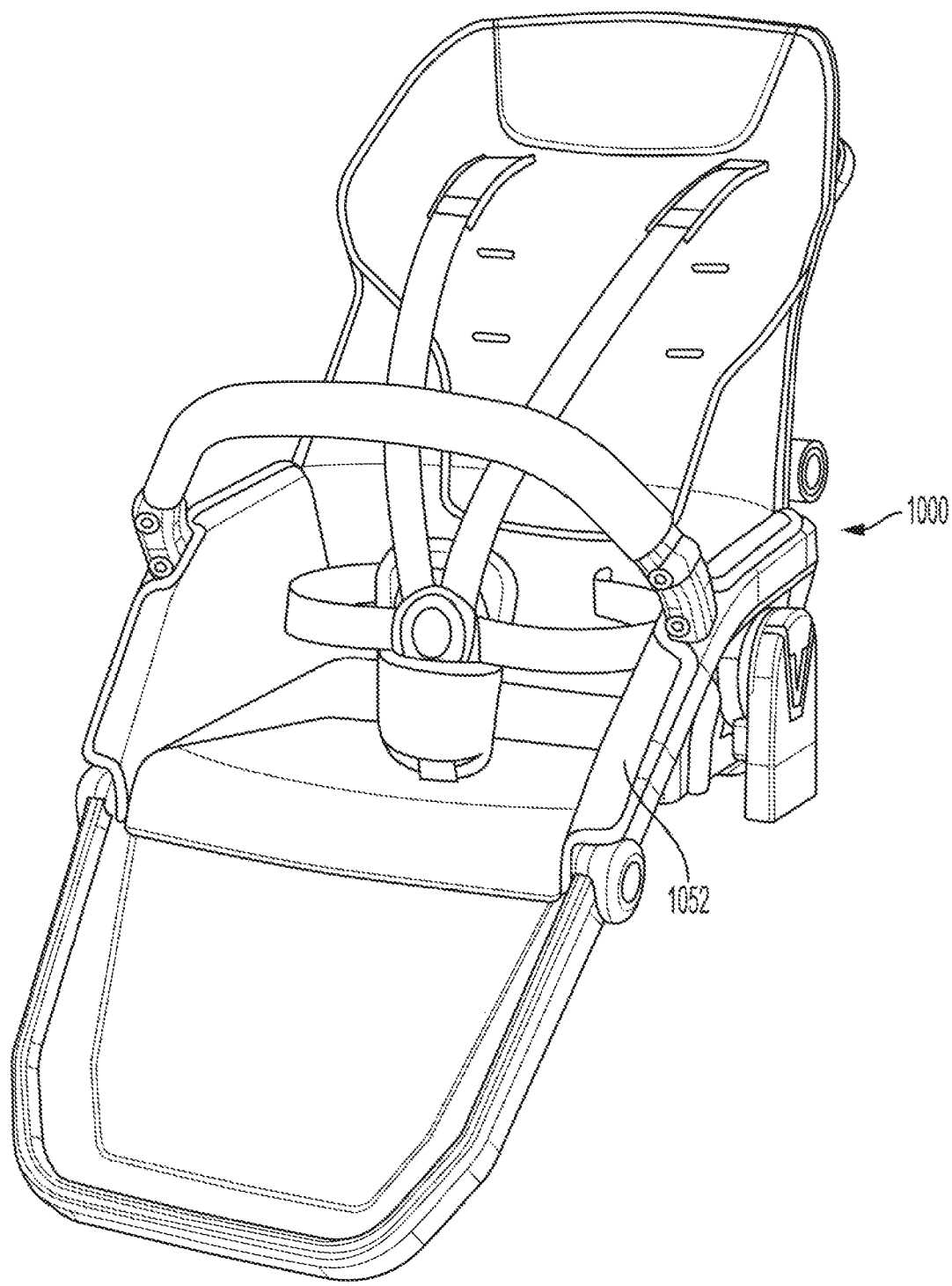
FIG. 12B depicts the seat cover coupled to the seat, according to aspects of the present disclosure.

As shown in FIGS. 12A-C, optional soft goods, including for example a seat cover 1052 may be installed on the seat 1000 (as shown in FIG. 12B). The seat cover 1052 (shown decoupled from the seat 1000 in FIG. 12A) may comprise a fabric material that may be washable, stain resistant, stain proof, and/or fade proof. The seat cover 1052 may also include padding or other material to provide a softer seating environment for the child in the seat 1000 when the seat cover 1052 is coupled to the seat 1000. The seat cover 1052 may be machine washable in its entirety, for example it may not include materials that are not machine washable, for example, but not limited to, cardboard or other support structure features that may prevent the machine washing of the seat cover 1052. For example, the harness apparatus 1014 may not be coupled to the seat cover 1052 so as to permit washing of the seat cover 1052 in a washing machine. The seat cover 1052 may be removably coupled to the seat 1000 via snap fit engagement or other suitable fastening or securing means that apply mechanical, electromechanical, piezoelectric, vacuum, magnetic, and/or friction force. For example, the seat cover 1052 may be coupled to the seat 1000 via hook and loop fasteners. In other aspects, the seat 1000 may include one or more magnets that may be coupled to the seat 1000, including embedded within the seat 1000 (e.g. embedded within the back support 1004, the seat pan 1008, the frame member 1032, and/or the calf support 1006). The magnets may be embedded within the seat 1000 or within a housing assembly to reduce choking and health hazards associated with children swallowing magnets. As shown in FIG. 12C the seat cover 1052 may comprise a seat back portion 1052A and a seat pan portion 1052B which may be coupled together via one or more fasteners 1057. In FIG. 12C the fastener 1507 is shown as a zipper extending across edges 1059a-c of the seat back portion 1052A and edge 1061a-c of the seat pan portion 1052B. In some aspects, the one or more fasteners 1057 may couple the seat back portion 1052A and the seat pan portion 1052B via snap fit engagement or other suitable fastening or securing means that apply mechanical, electromechanical, piezoelectric, vacuum, magnetic, and/or friction force, for example but not included via hook and loop fasteners. The seat back portion 1052A may be coupled to the seat 1000 independently of the seat pan portion 10526 and vice versa. For example, the seat pan portion 1052B may be used without the seat back portion 1052A when the seat 1000 is coupled to a bicycle via an adapter, for example bicycle adapter 1400, or vice versa.

The seat cover 1052 may be removed from the seat 1000 for washing and/or replacement. In some aspects, the seat cover 1052 may be replaced with an alternative seat cover if the seat cover 1052 becomes damaged or stained. In some aspects, the seat cover 1052 may be replaced with an alternative seat cover of a different color or pattern. The seat 1000 need not be used with the seat cover 1052. For example, it may be desirable to use the seat 1000 without the seat cover 1052 when the seat 1000 is intended to be used in an environment where dirt, water, food, and/or drinks will be present. For example, when the seat 1000 may be used as a child seat on the ground outside. In such an example, it may be desirable to use the seat 1000 without the seat cover 1052 so that dirt, water, food, drink, etc. is more easily cleaned from the seat 1000 where the seat 1000 comprises a polymer material. Similarly, as shown in FIGS. 58-64, when the seat 1000 is configured as a camping chair or a high chair, or as shown in FIGS. 54-57 as a booster seat, it may be desirable to use the seat 1000 without the seat cover 1052 for ease of cleaning the seat 1000 itself and to prevent food or drink from dirtying the seat cover 1052 such that it must be cleaned or washed. The seat 1000 comprising a non-fabric material, for example but not limited to a polymer material, may also provide for ease of cleaning in extreme environments, such as when the seat 1000 is coupled to a bicycle and used in muddy conditions that may cover the seat 1000 in mud and dirt.

Figure 13:
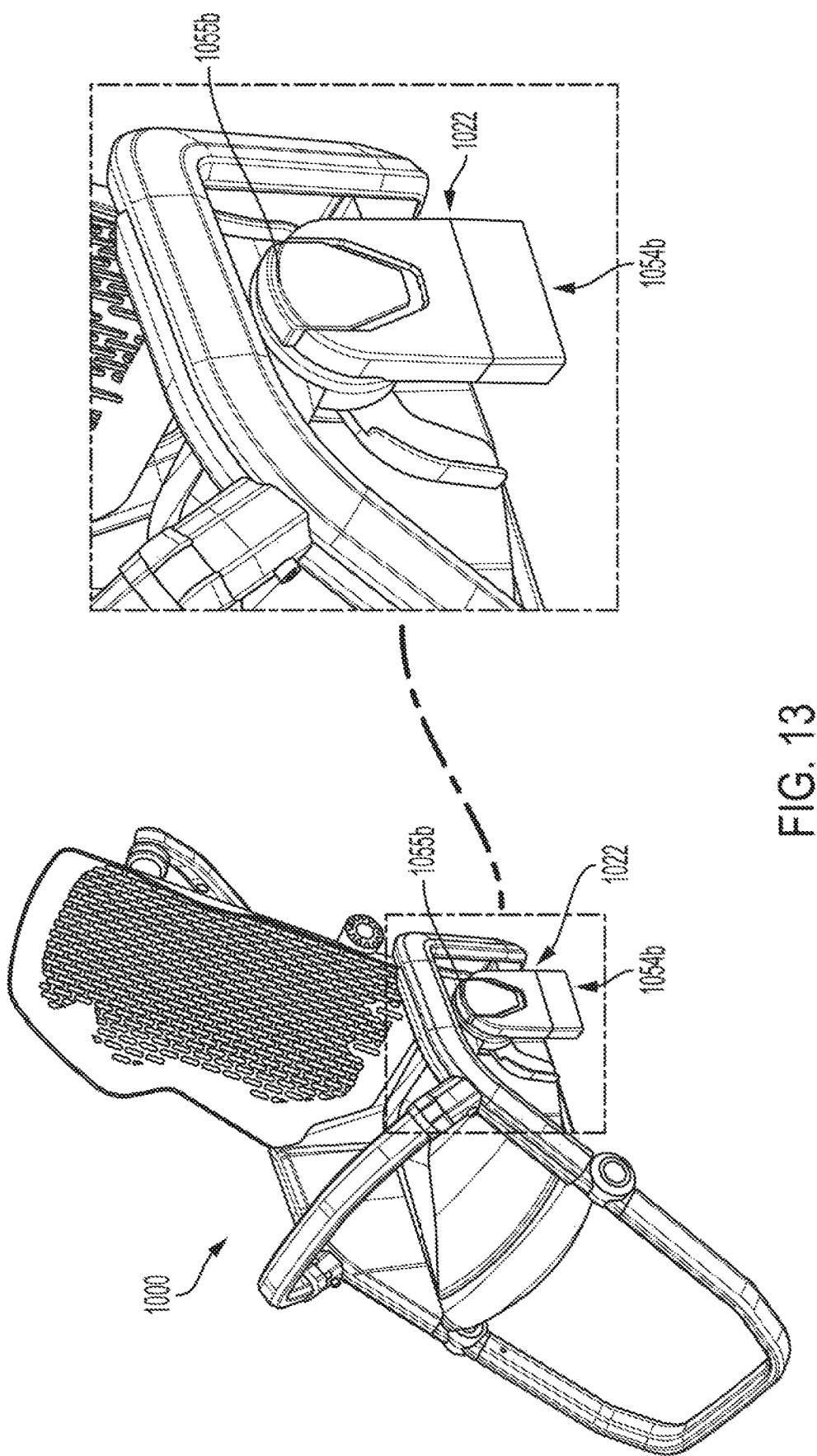
FIG. 13 depicts a perspective view of the seat, according to aspects of the present disclosure.

The seat 1000 may be removably coupled to or converted into multiple assemblies, for example, but not limited to, a stroller, a bicycle or bicycle adapter, a wagon, a dining chair, a high chair, a camping or outdoor chair, an airplane child seat, a hiking pack, and others. As shown in FIG. 13, the seat 1000 may include mounting components 1054*a*, 1054*b* (see also FIG. 1A) on opposite sides of the seat 1000 (only outer surface of mounting component 1054*b* is visible in FIG. 13). In some aspects, the mounting components 1054*a*, 1054*b* may be part of, or adjacent to, the respective hub assemblies 1022 of the seat 1000. In FIG. 13 the mounting component 1054*b* is positioned within the hub assembly 1022 and may be accessible via an opening in the bottom of the hub assembly 1022. In some aspects, the mounting components 1054*a*, 1054*b* are positioned elsewhere on the seat 1000, including, but not limited to, on the frame member 1032, on the seat pan 1008, on the back support 1004, or elsewhere on the seat 1000. The mounting components 1054*a*, 1054*b* may mate with corresponding mounting components on other assemblies that are sized and shaped to couple to the mounting components 1054*a*, 1054*b*, including but not limited to a stroller, a bicycle or bicycle adapter, a wagon, a high chair, a camping or outdoor chair, a hiking pack, or other assemblies. The mounting components 1054*a*, 1054*b* may couple to the corresponding mounting components on the assemblies via snap fit engagement or other suitable fastening or securing means that apply mechanical, electromechanical, piezoelectric, vacuum, magnetic, and/or friction force. The mounting components 1054*a*, 1054*b* may be actuated between a locked and an unlocked position relative to the mounting components on the assemblies via one or more actuators 1055*a*, 1055*b* as shown in FIG. 13 (see also FIG. 4B). The one or more actuators 1055*a*, 1055*b* may be positioned on the seat 1000, for example but not limited to on the hub assemblies 1022 as shown in FIG. 13, or on the other assembly, or in some aspects on a combination of the seat 1000 and the other assembly. Additional examples of options for the location and functionality of the mounting components 1054*a*, 1054*b* of the seat 1000 are described further below though additional structures, locations, and functionality may be used.

In some aspects, as shown in FIG. 18A, the seat 1000 may include a calf support 1078 that may include one or more projections (or features) 1080. While FIG. 18A depicts four projections 1080, more or fewer projections may be included. The projections 1080 may extend out a sufficient distance relative to the calf support 1078 to contact a surface 1082 on which the seat 1000 (as shown in FIG. 18B) is positioned when the calf support 1078 is in a stored position and may act in the same manner as the feet 1048 described with reference to FIG. 11. Thus, the one or more projections 1080 on the calf support 1078 may provide for the stable and secure positioning of the seat 1000 on the surface 1082 (e.g. a floor, an outdoor ground surface, a chair surface, etc.).

Figure 19B:
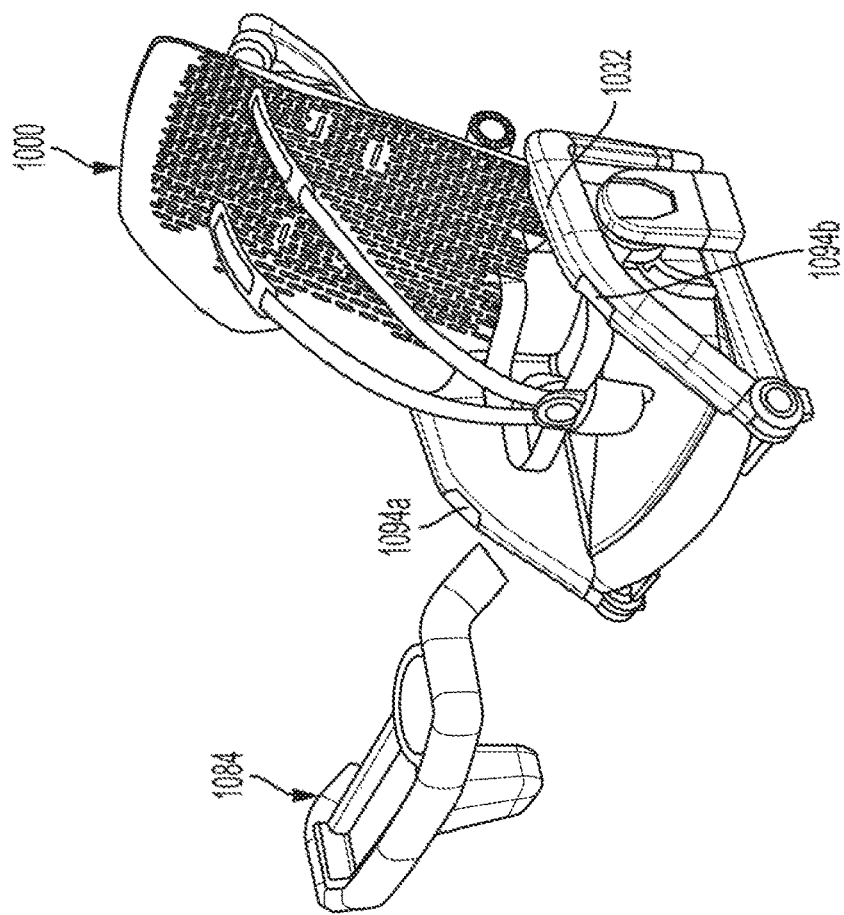
FIGS. 19A-B depicts a tray that is coupleable to the seat, according to aspects of the present disclosure.
Figure 19A:
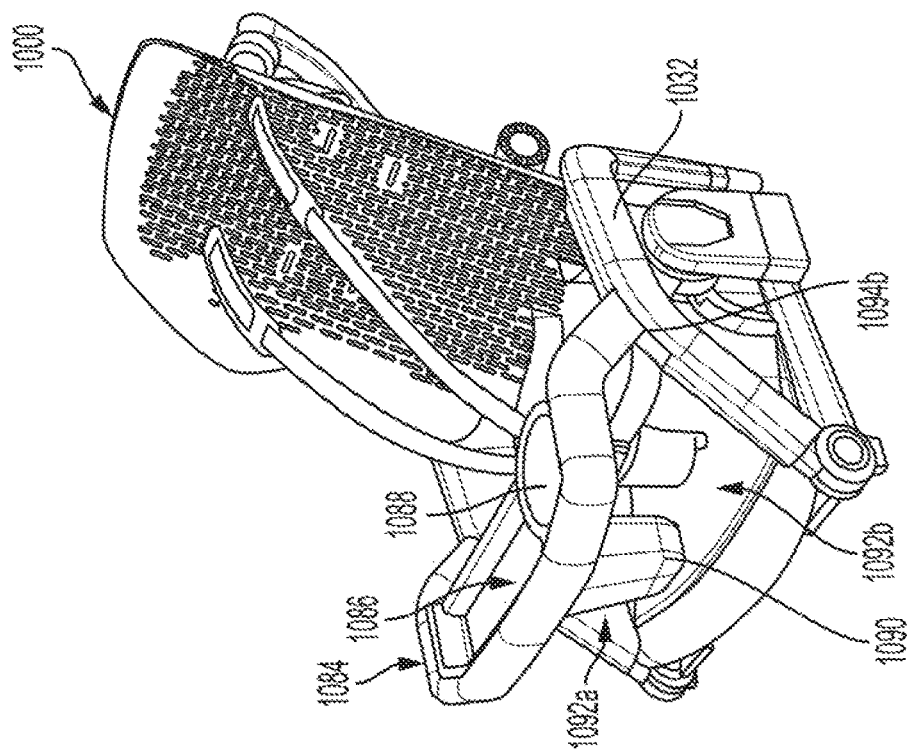
Figure 20B:
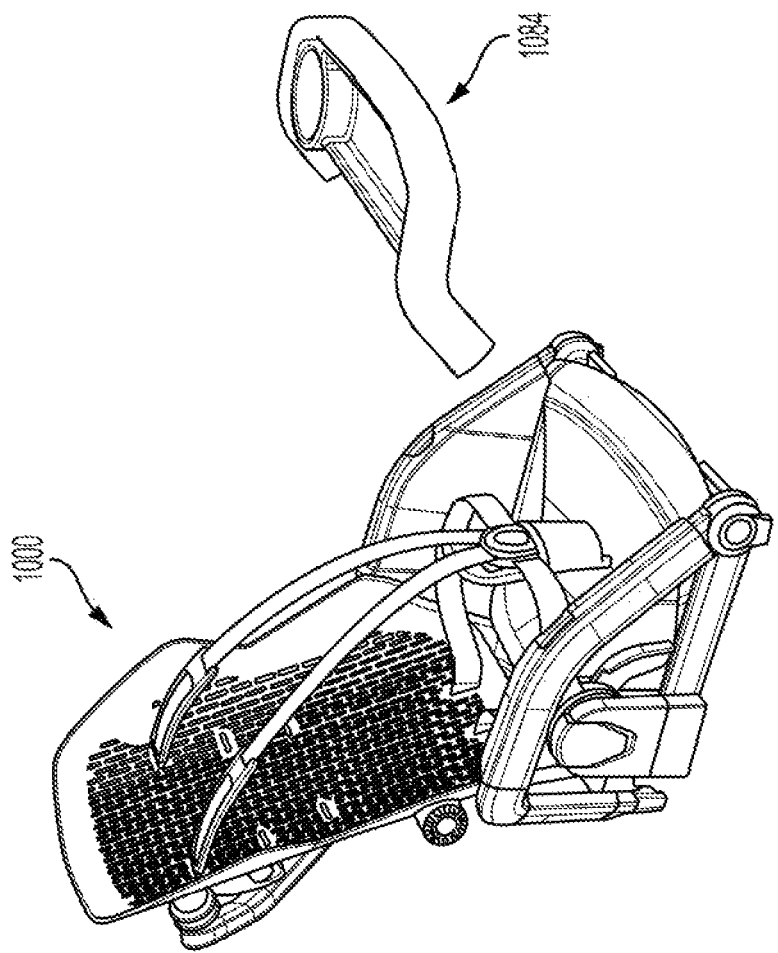
FIGS. 20A-B depicts a tray that is coupleable to the seat, according to aspects of the present disclosure.
Figure 20A:
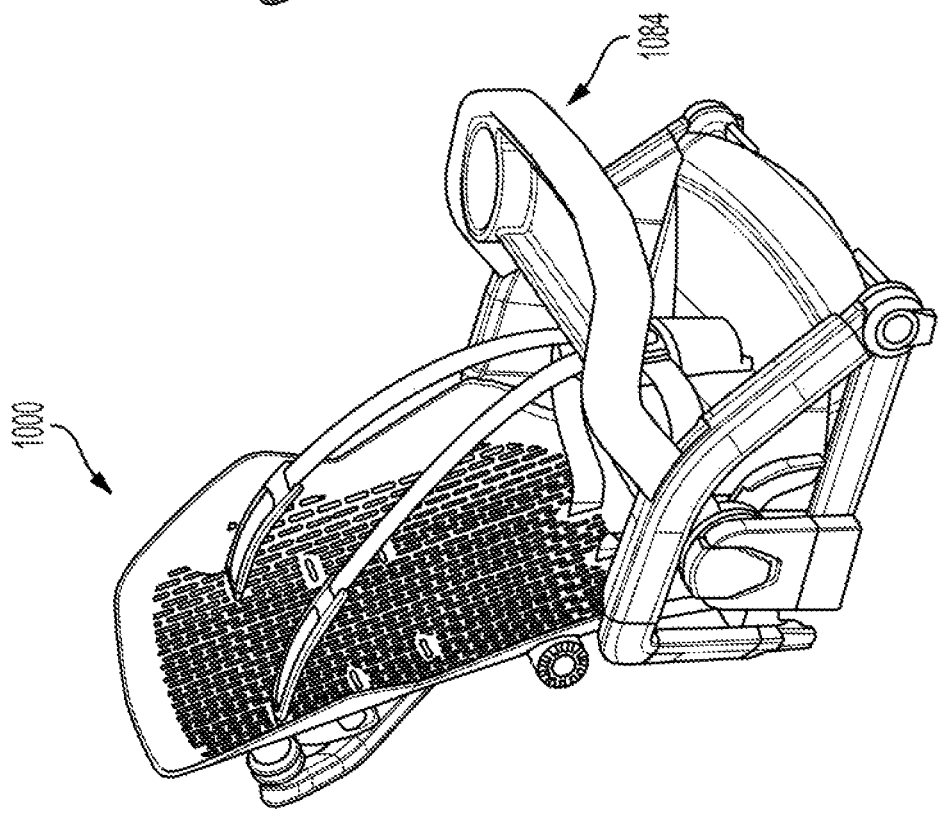

The seat 1000 may include additional accessories. For example, as shown in FIGS. 19A-B, a tray 1084 may be removably coupled to the seat 1000. The tray 1084 may include an eating or playing surface 1086, a cup holder 1088, and a horn 1090. The horn 1090 may provide for aiding in retaining a child within the seat 1000 and may define respective leg openings 1092*a*, 1092*b* between the tray 1084 and the seat pan 1008. FIG. 19A depicts the tray 1084 coupled to the seat 1000, for example via snap fit engagement with openings 1094*a*, 1094*b* in the frame member 1032. In some aspects, the tray 1084 may be removably coupled to the seat 1000 via other suitable fastening or securing means that apply mechanical, electromechanical, piezoelectric, vacuum, magnetic, and/or friction force. In some aspects, the tray 1084 may be coupled to the seat 1000 at different locations on the seat 1000, or in some aspects may be coupled to another assembly (e.g. a stroller, a chair, etc.). In another aspect, the tray 1084 may not include the horn 1090, for example as shown in FIG. 20A and FIG. 20B.

Figure 21B:
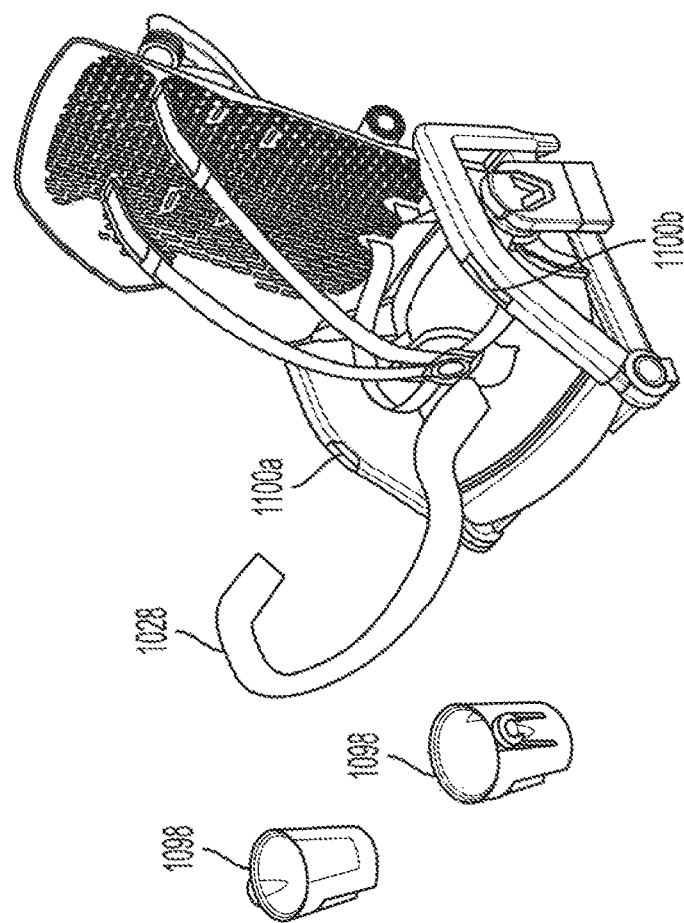
FIGS. 21A-B depicts an arm bar that is coupleable to the seat, according to aspects of the present disclosure.
Figure 21A:
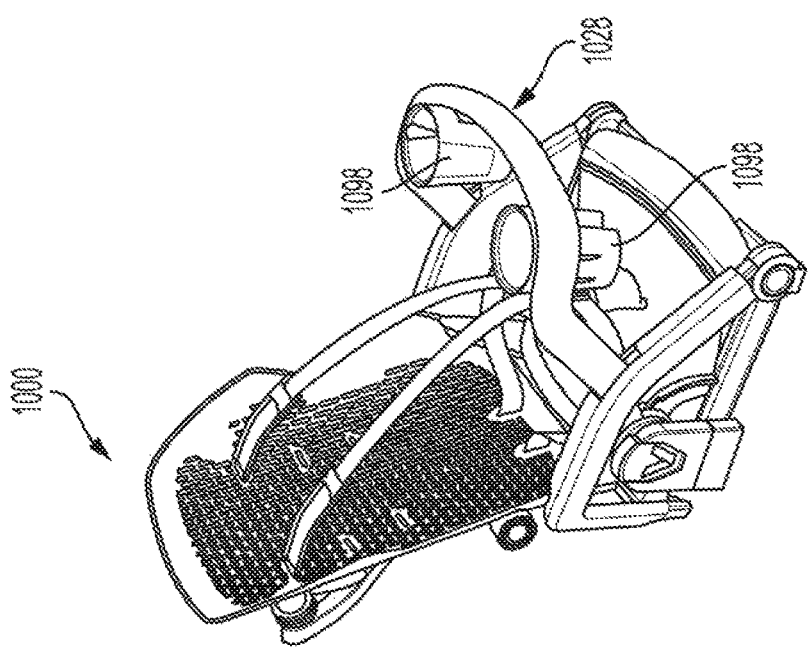

FIG. 21A depicts an optional arm bar 1028 coupled to the seat 1000. The arm bar 1028 may include one or more cup holders 1098. The arm bar 128 may be coupled to the seat 1000 at openings 1100*a*, 1100*b* in the frame member 1032 of the seat 1000 though other suitable fastening or securing means may be used, for example fastening or securing means that apply mechanical, electromechanical, piezoelectric, vacuum, magnetic, and/or friction force. In some aspects, the arm bar 1028 may be coupled to the seat 1000 at different locations on the seat 1000, or in some aspects may be coupled to another assembly (e.g. a stroller, a chair, etc.). As shown in FIG. 21B, the arm bar 1028 may be uncoupled from the seat 1000, in addition, the one or more cup holders 1098 may be uncoupled from the arm bar 1028. In some aspects, the one or more cup holders 1098 may be directly coupled to the seat 1000 without the use of the arm bar 1028.

Exemplary Non-Limiting Stroller Embodiments

Figure 22:
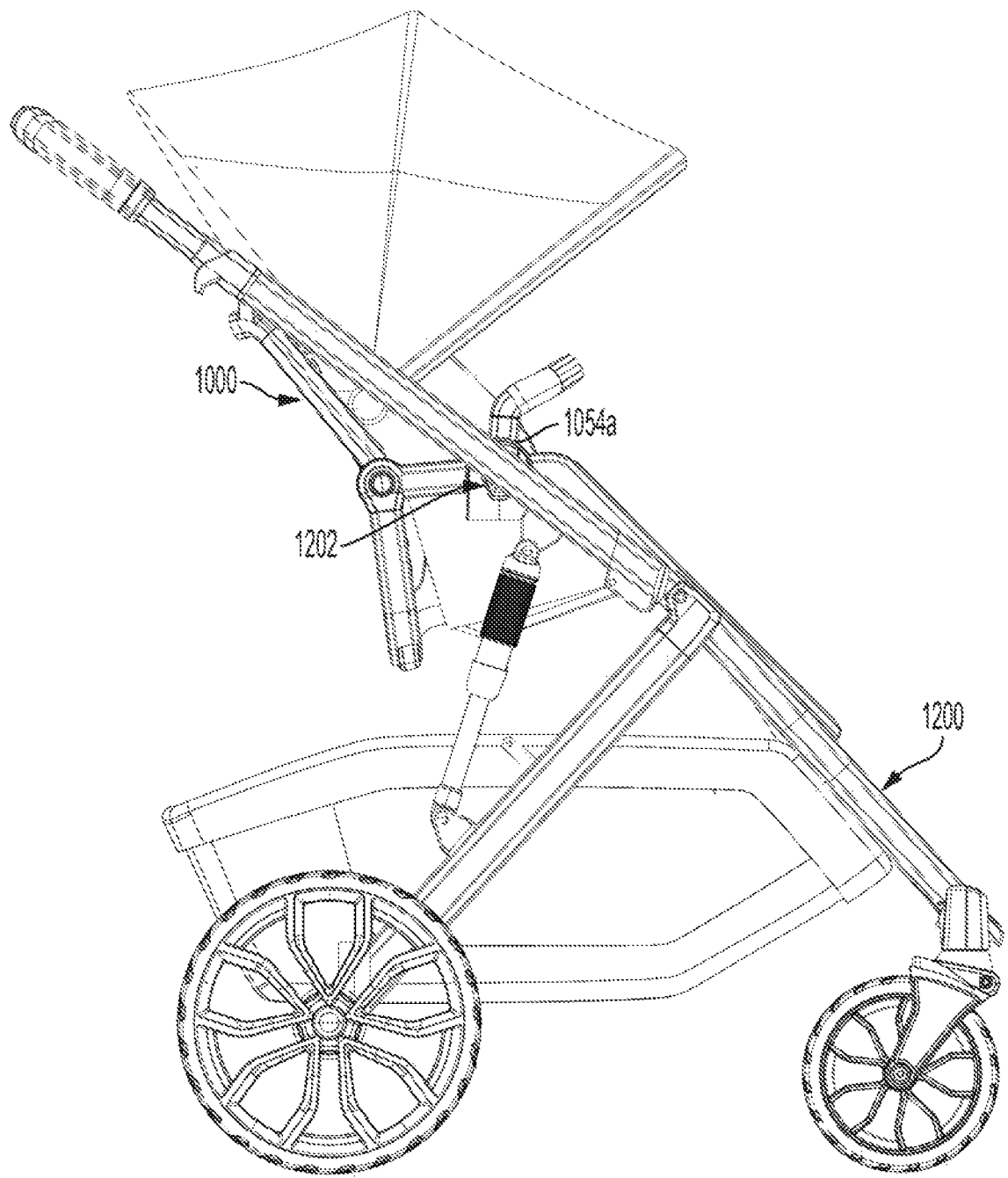
FIG. 22 depicts a system including the seat and a stroller assembly, according to aspects of the present disclosure.

Aspects of the present disclosure include a stroller 1200, depicted in FIG. 22, to which a seat, for example seat 1000, may be removably coupled. In some aspects, the seat may be different from the seat 1000 described above. As described above, the seat 1000 may include mounting components 1054*a*, 1054*b* (only 1054*a* is viewable in FIG. 22) that couple to one or more corresponding mounting components 1202 (shown in FIG. 23) on the stroller 1200 such that the seat 1000 may be selectively coupled to and uncoupled from the stroller 1200.

Figure 23:
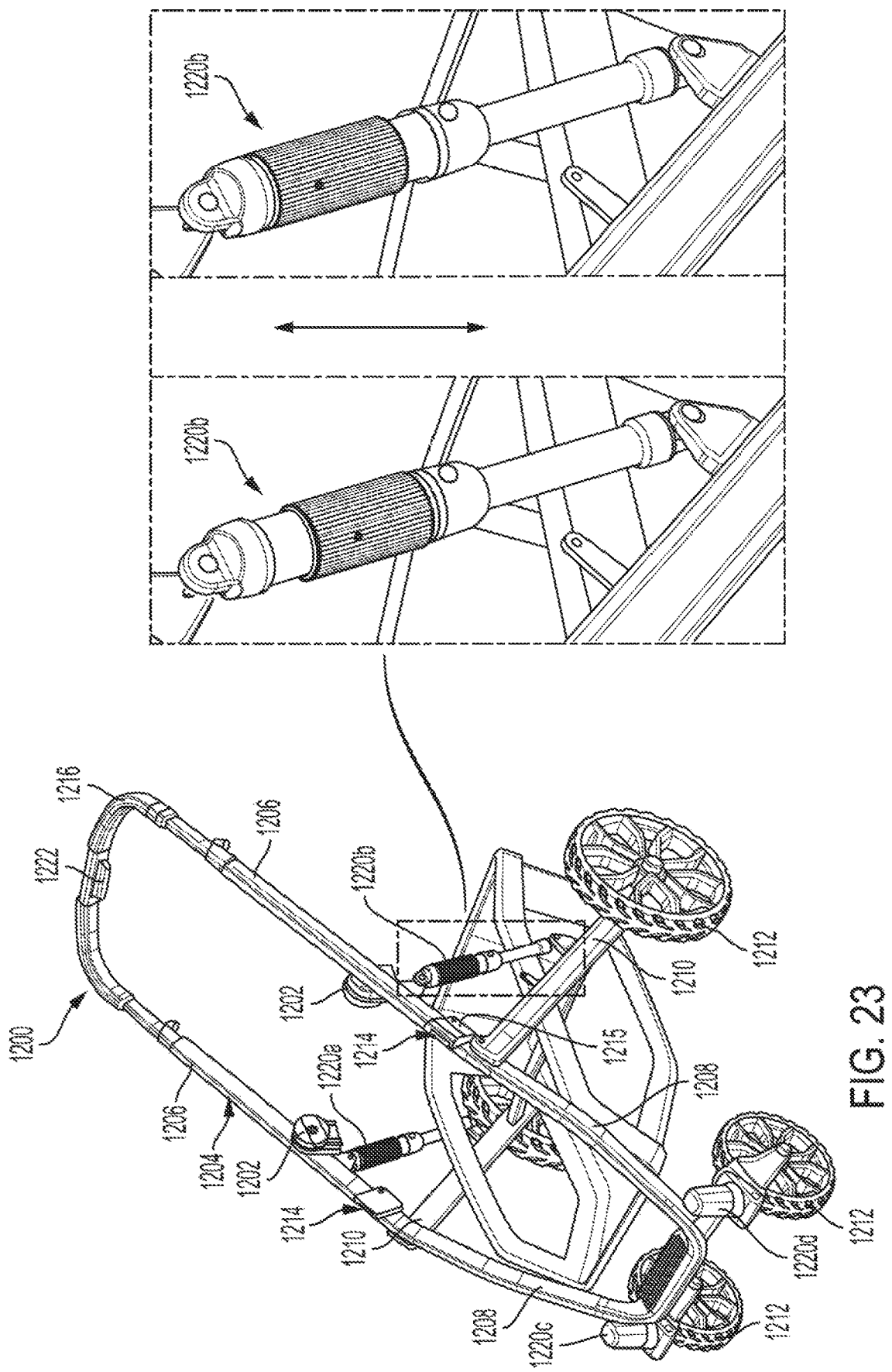
FIG. 23 depicts a stroller assembly, according to aspects of the present disclosure.

Features of the stroller 1200 are described further with reference to FIG. 23 which depicts the stroller 1200 with the seat 1000 removed for ease of viewing the features of the stroller 1200. The stroller 1200 may include a frame 1204 comprising upper frame members 1206, lower frame members 1208, and wheel frame members 1210 that extend between wheels 1212 and junctions 1214 between the upper frame members 1206 and the lower frame members 1208. The stroller 1200 also includes a handle 1216 that may telescopically extend and retract within an inner region of the upper frame members 1206 to adjust to the height of the person pushing the stroller 1200. The stroller 1200 may optionally include a basket or container 1218 that may be removable coupled to the stroller 1200 for carrying things. The seat 1000 may be positionable in various reclined and/or upright positions while coupled to the stroller 1200. In some aspects, an actuator, for example actuator 1026, may control the position of the seat 1000 relative to the stroller 1200 and may be actuated to recline the seat 1000 while the seat 1000 is coupled to the stroller 1200. In some aspects, an actuator on the stroller 1200 may control the recline angle of the seat 1000 when the seat 1000 is coupled to the stroller 1200. In some aspects, the actuator may be positioned on the frame 1204 of the stroller 1200.

The stroller may include suspension components 1220a, 1220b, 1220c, and 1220d. While four suspension components 1220a-d are depicted in FIG. 23, in some embodiments fewer or more suspension components may be used in the stroller 1200. The suspension components 1220a-d may be spring suspension components that absorb energy for improving the smoothness of the ride for the child riding in the stroller 1200. For example, the suspension components 1220a, 1220b may each include one or more spring elements designed to selectively engage in response to the weight of the child in the stroller 1200. For example, an infant in the seat 1000 coupled to the stroller 1200 may be relatively light (e.g. less than approximately 20 lbs) which may engage only a single spring of the suspension components 1220a, 1220b. In infant use, the single spring may retain the suspension components 1220a, 1220b in an engaged (i.e. the spring may not be fully compressed or bottomed out) such that the suspension components 1220a, 1220b absorb energy and provide for a smoother ride for the child.

A heavier child (e.g. greater than approximately 20 lbs for example), for example a toddler or older child may weigh significantly more than the infant and may cause a second spring of the suspension components 1220a, 1220b to engage in addition to the engagement of the first spring. The additional engagement of the second spring may prevent the two springs from being fully compressed or bottomed out, thereby maintaining the shock or energy absorbing characteristics of the suspension components 1220a, 1220b when a heavier child is in the stroller. The enlarged view of suspension component 1220b in FIG. 23 depicts the ability of the suspension component 1220b to adjust the number of springs engaged based on the weight of the child to aid in providing shock absorption during use with larger children where the the suspension component 1220b would otherwise bottom in the "firm" position if only a single spring were used. In other words, the suspension components 1220a, 1220b may include multiple suspension settings. Each suspension setting may be designed to be optimal for a weight range of a child to maximize comfort. For example, a first spring may always be active as a shock absorber in each of the suspension components 1220a, 1220b. An optional second spring in each of the suspension components 1220a, 1220b may be activated when the first spring is in the "firm" position. The "firm" position may correspond to a position in which the first spring is fully compressed or substantially compresses. The springs may be metallic or polymer coil springs (e.g. stainless steel, carbon fiber, etc.), though in some aspects the spring may comprise an elastomeric member as the spring member. In addition, the suspension components 1220a-d may automatically adjust for the road surface the stroller 1200 is being pushed on as well as the activity the stroller 1200 is engaging in. In such a manner, the suspension components 1220a-d absorb energy that would otherwise be transmitted to the child in the seat 1000 which may result in a bumpy or otherwise uncomfortable ride for the child. Suspension components 1220c, 1220d may also include one or more springs as discussed above with respect to suspension components 1220a, 1220b. In addition, as discussed with reference to FIG. 1B, the seat 1000 may also include additional energy absorbing shocks that may include one or more springs, or may comprise different shock absorption features.

As shown in FIG. 23, the upper frame members 1206 of stroller 1200 may be angled relative to the lower frame members 1208 such that the upper frame members 1206 and lower frame members 1208 are not parallel with one another. Instead, the upper frame members 1206 and be positioned at an angle α relative to the lower frame members 1208 at junctions 1214. In some aspects, the upper frame members 1206 may not be angled relative to the lower frame member 1208. The angle α may be between about 3 degrees and about 20 degrees, between about 10 degrees and about 13 degrees, or about 11 degrees to about 13 degrees. As a result, a user pushing the stroller 1200 may have better leverage for controlling the stroller 1200 in a variety of environments, including unpaved or uneven terrain. In other words, the angle α between the upper frame members 1206 and the lower frame members 1208 at junctions 1214 (and the location of junctions 1214) can provide for better control and easier pushing of the stroller 1200 by a user, including on uneven terrain or when overcoming obstacles (i.e., rocks, hills, dips, curbs, cracks, potholes, etc.). The location of the of the junctions 1214 and the angle α may be at least partially dependent on other features of the stroller 1200 including but not limited to the positions of the wheel frame members 1210 relative to the frame 1204, the length of the upper frame members 1206, the length of the lower frame members 1208, the position of the seat 1000, and/or other features of the stroller 1200. The angle α also provides for a greater kick space behind the stroller 1200 than if the upper frame member 1206 were parallel to the lower frame members 1208.

Figure 24:
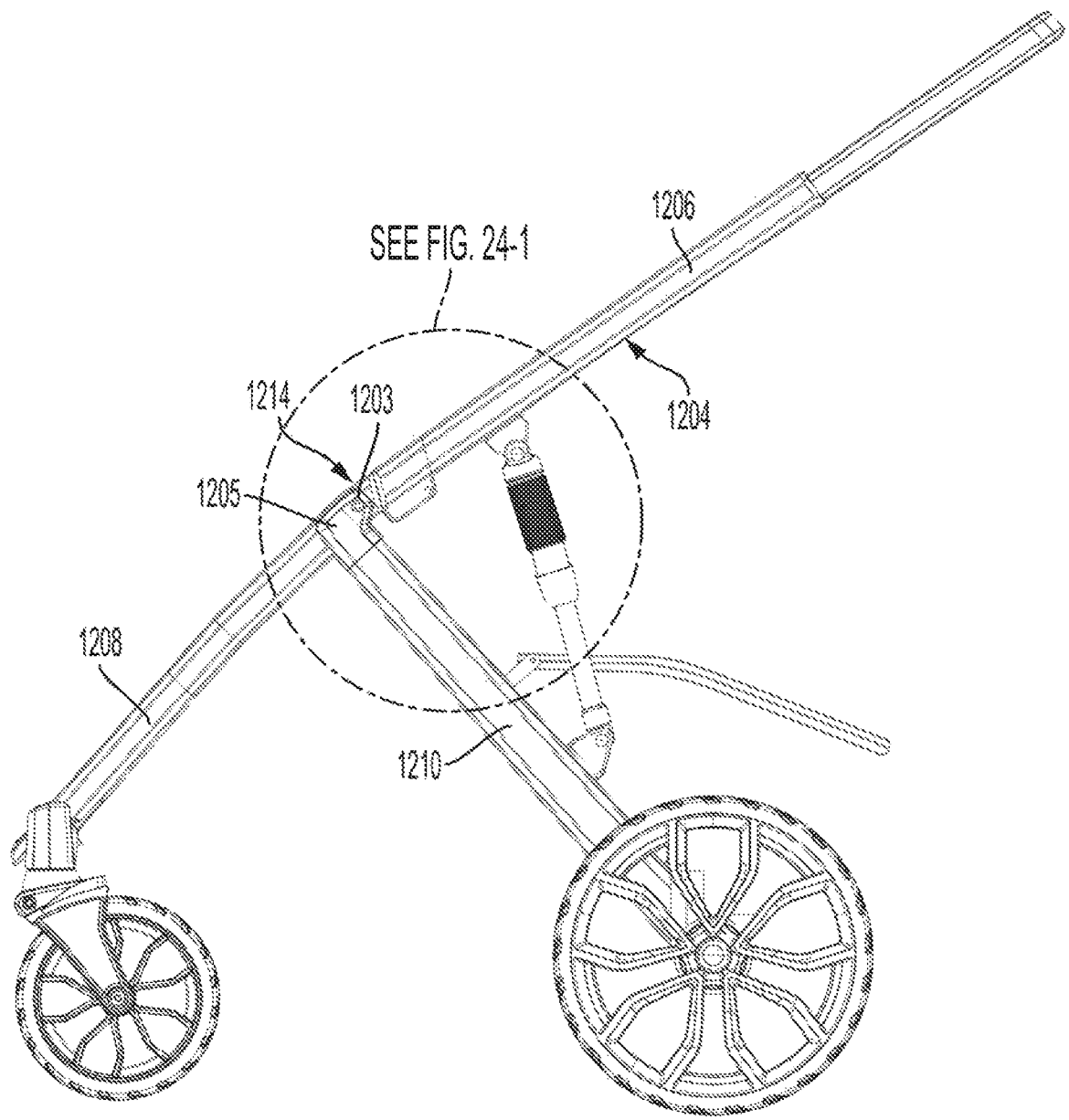
FIGS. 24 and 24-1 depict the stroller assembly, according to aspects of the present disclosure.
Figures 1, 24:
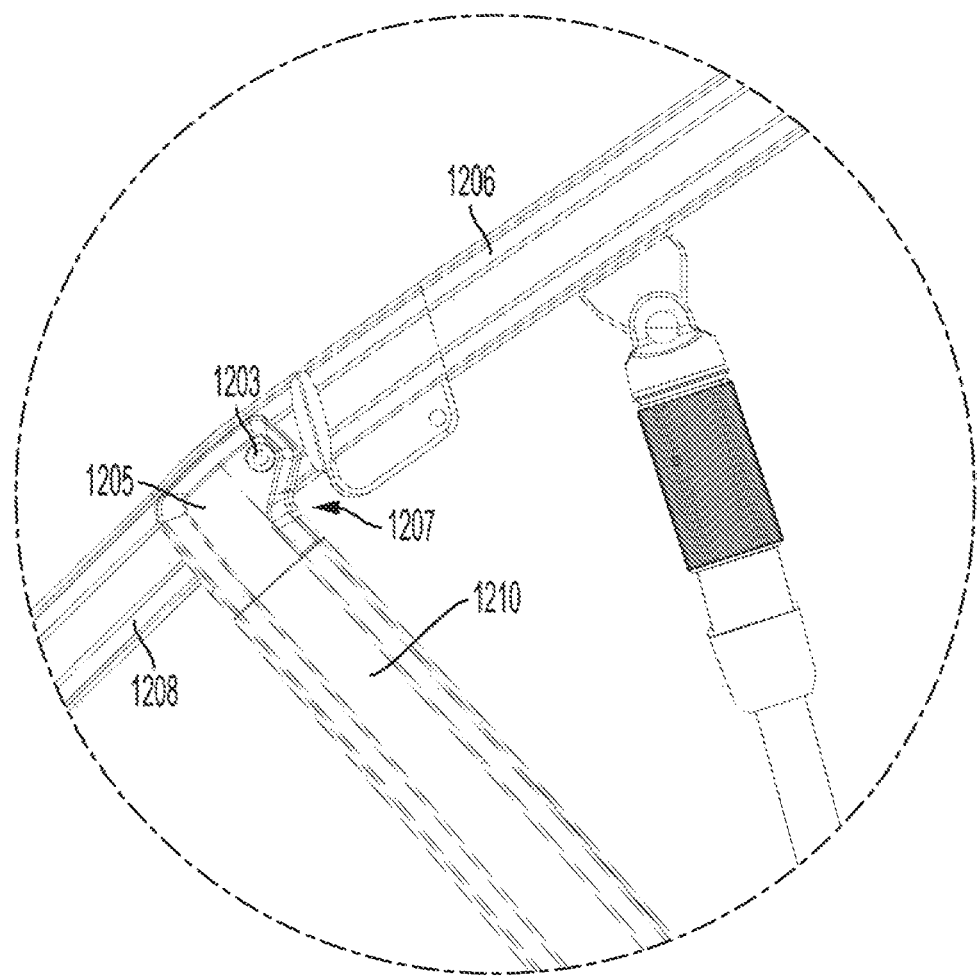

FIG. 24 depicts a side view of the stroller 1200 with the basket 1218 removed and the seat 1000 removed. As shown in FIG. 24 and FIG. 24-1, the wheel frame members 1210 are coupled to the frame 1204 at a pivot point 1203 positioned proximate to the junction 1214 between the upper frame members 1206 and the lower frame members 1208 by a connector 1205. The connector 1205 may be generally L-shaped or dog-legged so as to position the wheel frame members 1210 below the pivot point 1203 (i.e. closer to the ground when the stroller 1200 is in the use position). In other words, the connector 1205 may have an angle or a curved portion 1207 such that the wheel frame members 1210 extend from the connector 1205 at a point lower than or below the pivot point 1203. The shape of the connector 1205 can thereby permit the pivot point 1203 to be at a select location along the frame 1204 while providing the wheel frame members 1210 to extend relative to the frame 1204 from a position below the pivot point 1203 (i.e. at a location closer to the lower frame members 1208 than the pivot points 1203). In the storage (or folded) position (see FIGS. 25B, 25C), the wheel frame members 1210 may fold towards the lower frame members 1208 about the pivot point 1203 for minimizing the size of the stroller 1200 for storage or transport.

Figure 25A:
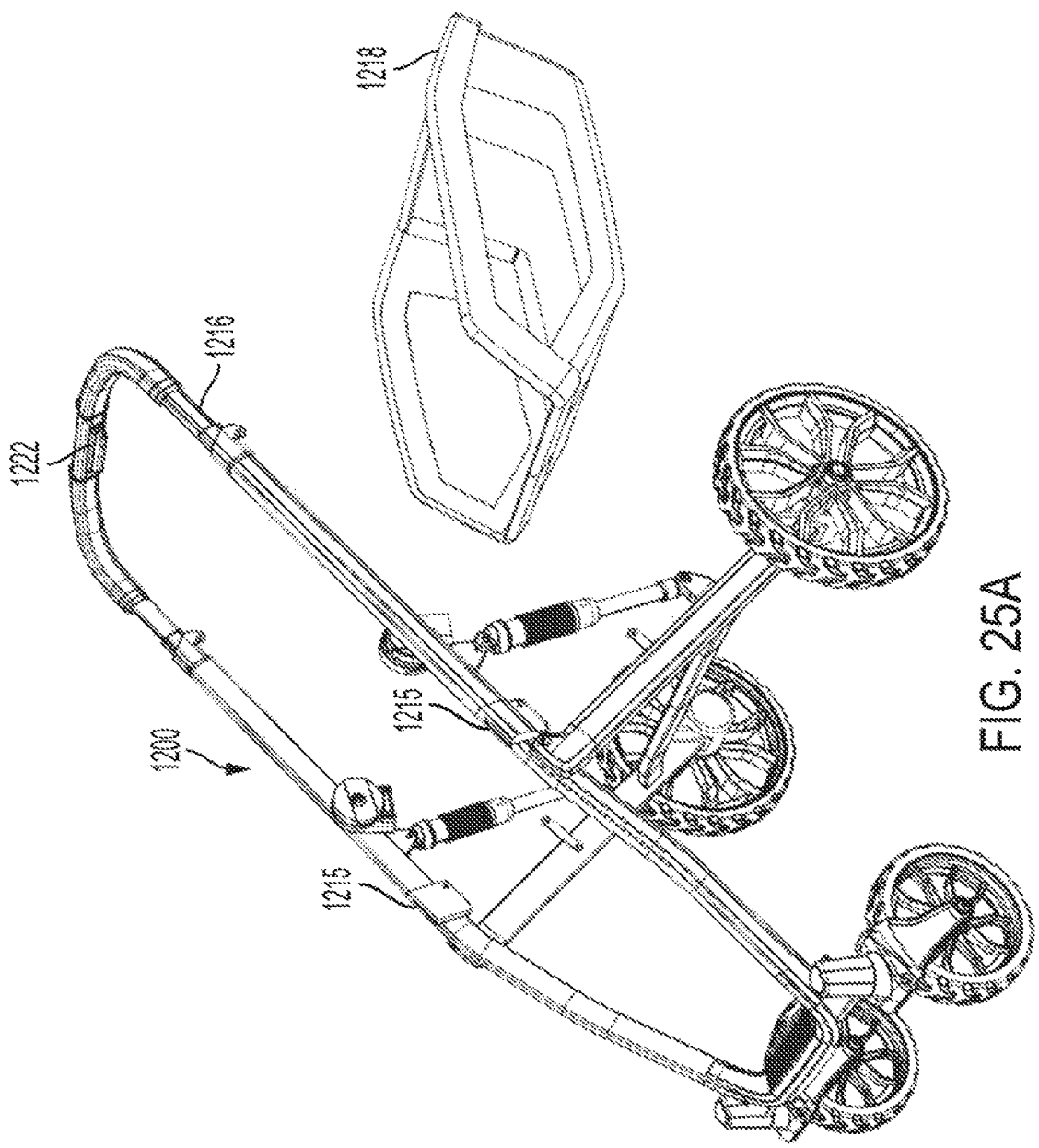
FIG. 25A depicts the stroller assembly, according to aspects of the present disclosure.
Figure 25C:
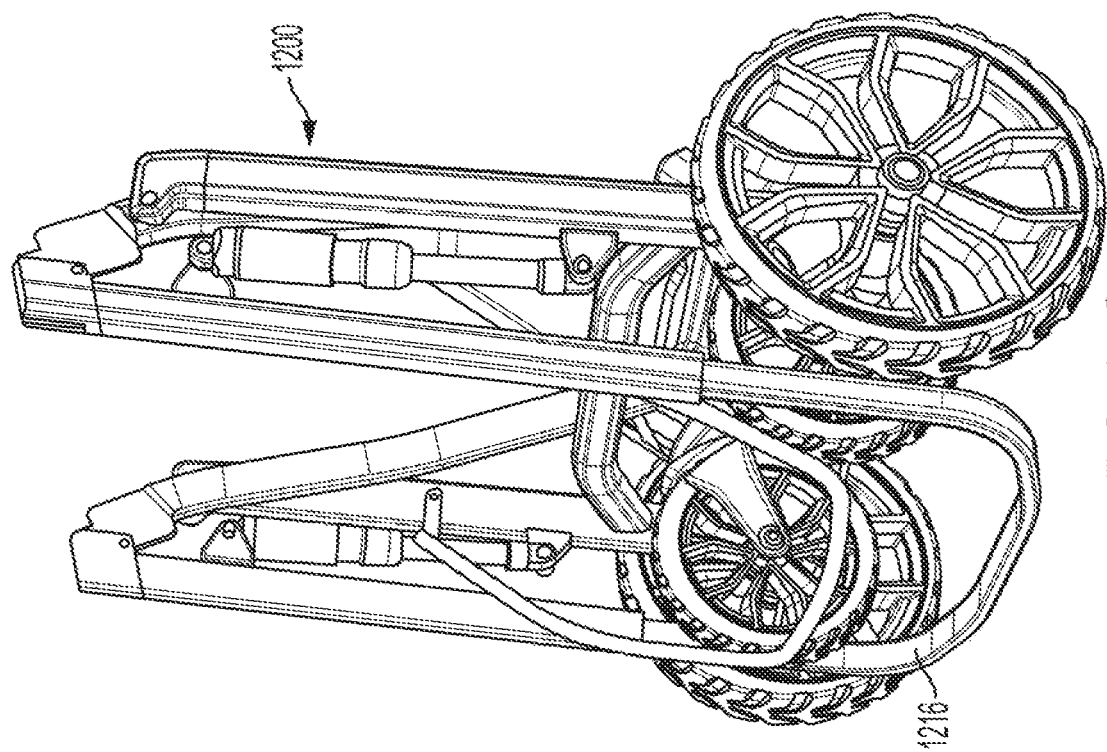
FIG. 25C depicts a rear perspective view of the stroller assembly in the storage position, according to aspects of the present disclosure.
Figure 25B:
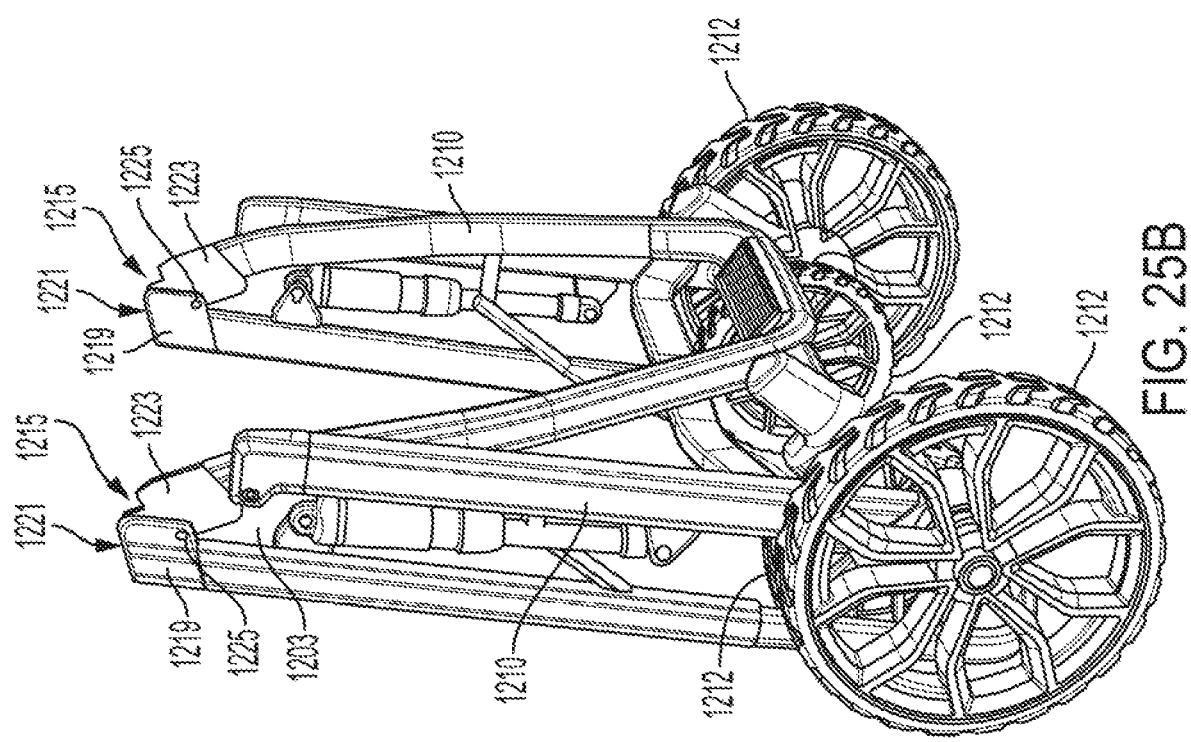
FIG. 25B depicts a front perspective view of the stroller assembly in a storage position, according to aspects of the present disclosure.

FIG. 25A depicts a perspective view of the stroller 1200. The stroller 1200 may have a use position (as shown in FIG. 25A without the basket 1218) and a storage (or folded) position (as shown in FIGS. 25B, 25C). In the use position the stroller 1200 may have a maximum width, for example 24 inches, 26 inches, 28 inches, 30 inches, 32 inches, or 36 inches, to provide for easier passage within a door frame. As shown in FIG. 24A, the basket 1218 has been uncoupled from the stroller 1200. The stroller 1200 may fold into the storage position by activating an actuator 1222 and applying a force to the handle 1216 of the stroller 1200 to force the stroller 1200 to fold at a pair of hinges 1215 in the frame 1204. FIG. 24B depicts the stroller 1200 in the storage position in which the frame 1204 of the stroller 1200 has been folded, with the handle 1216 folding town towards the wheels 1212 to minimize the size of the stroller 1200. As shown in FIG. 24B, the hinges 1215 include a first hinge element 1219 comprising a groove 1221 sized and shaped to receive a second hinge element 1223. The first hinge element 1219 and the second hinge element 1223 rotated relative to one another about a pivot point 1225. The second hinge element 1223 may be moved from a locked and unlocked position within the groove 1221 of the first hinge element 1219 via the actuator 1222. The wheel frame members 1210 fold toward the lower frame members 1208 about the pivot point 1203. As shown in FIG. 24C, in the folded position, the handle 1216 may act in part as a kickstand or other balance feature to retain the stroller 1200 in a standing position when in the storage position. The position of the hinges 1215 may be at least partially dependent on the position of the mounting components 1202, the junctions 1214 between the upper frame members 1206 and the lower frame members 1208, the position of the wheel frame members 1210 relative to the frame 1204, the position of the seat (e.g. seat 1000) when coupled to the stroller 1200, and/or other features of the stroller 1200. Similarly, the location of the hinges 1215 may influence or define the positions of the wheel frame members 1210 relative to the frame 1204, the junctions 1214 between the upper frame members 1206 and the lower frame members 1208, the position of the seat 1000, and/or other features of the stroller.

Figure 26:
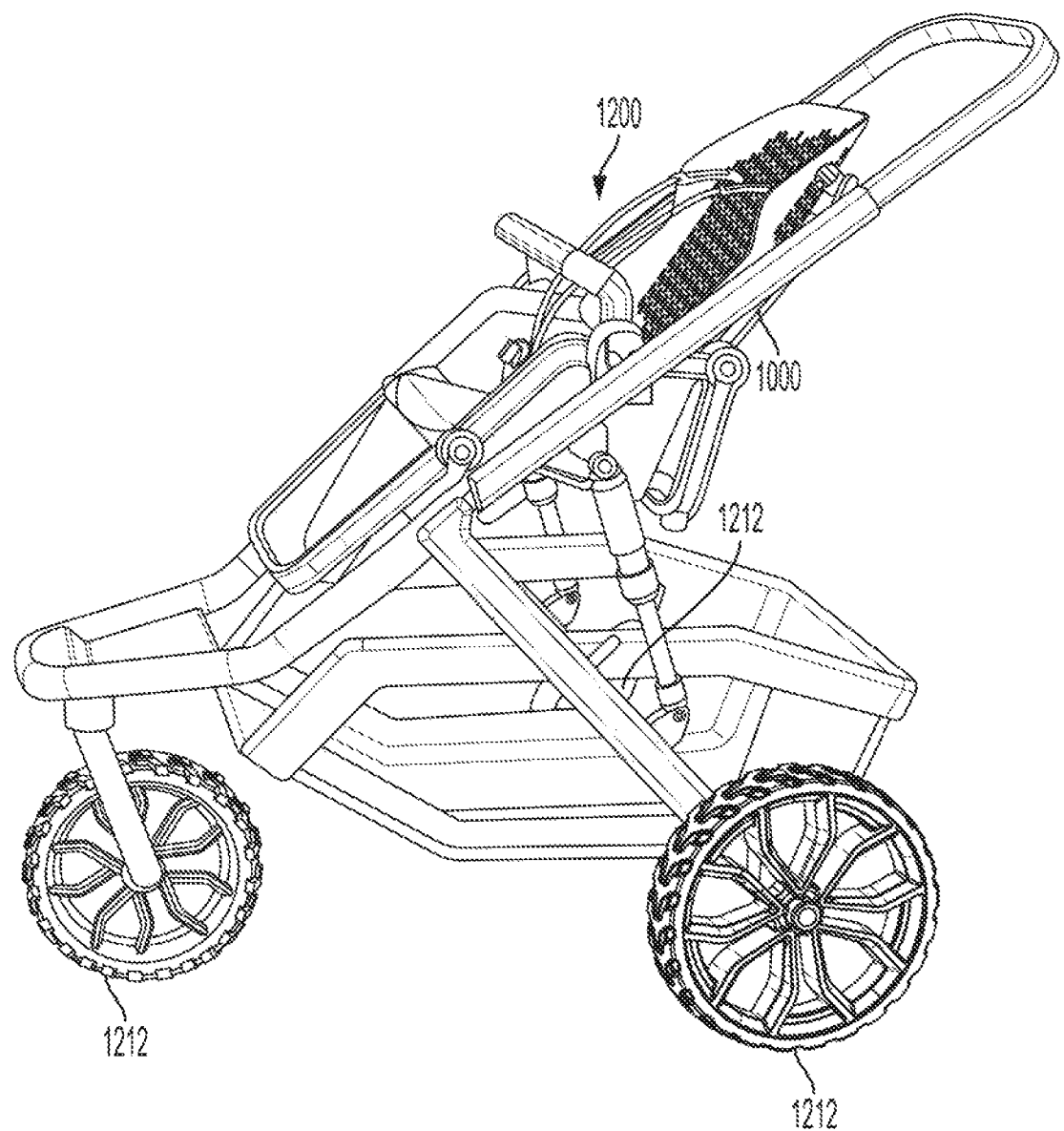
FIG. 26 depicts a stroller assembly, according to aspects of the present disclosure.

As shown in FIG. 26, in some aspects, the stroller 1200 may be what is commonly referred to as a jogging stroller. In such an aspect, the stroller 1200 may have only three wheels 1212. A seat, including for example seat 1000, may be coupled to the jogging stroller in the same or different manner as described above. In some aspects, the stroller 1200 may be a more lightweight stroller, for example an umbrella stroller or other similar stroller.

Figure 27B:
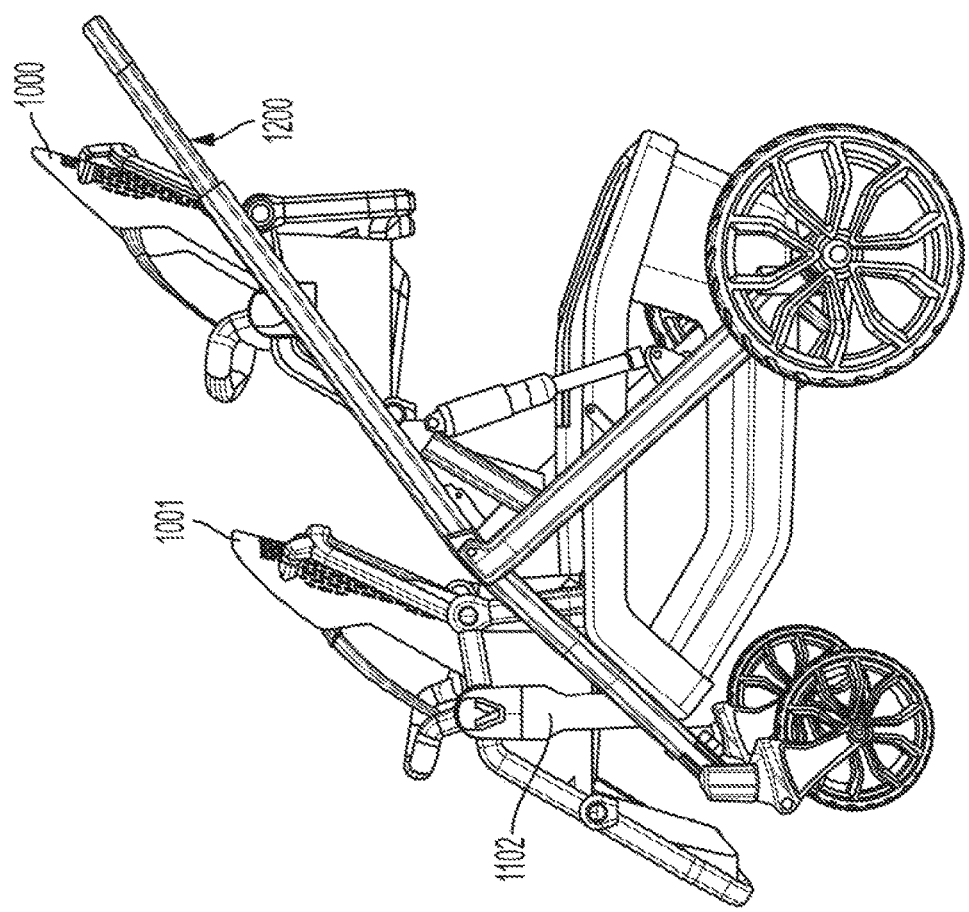
FIG. 27B depicts a side view of the stroller assembly including two seats, according to aspects of the present disclosure.
Figure 27A:
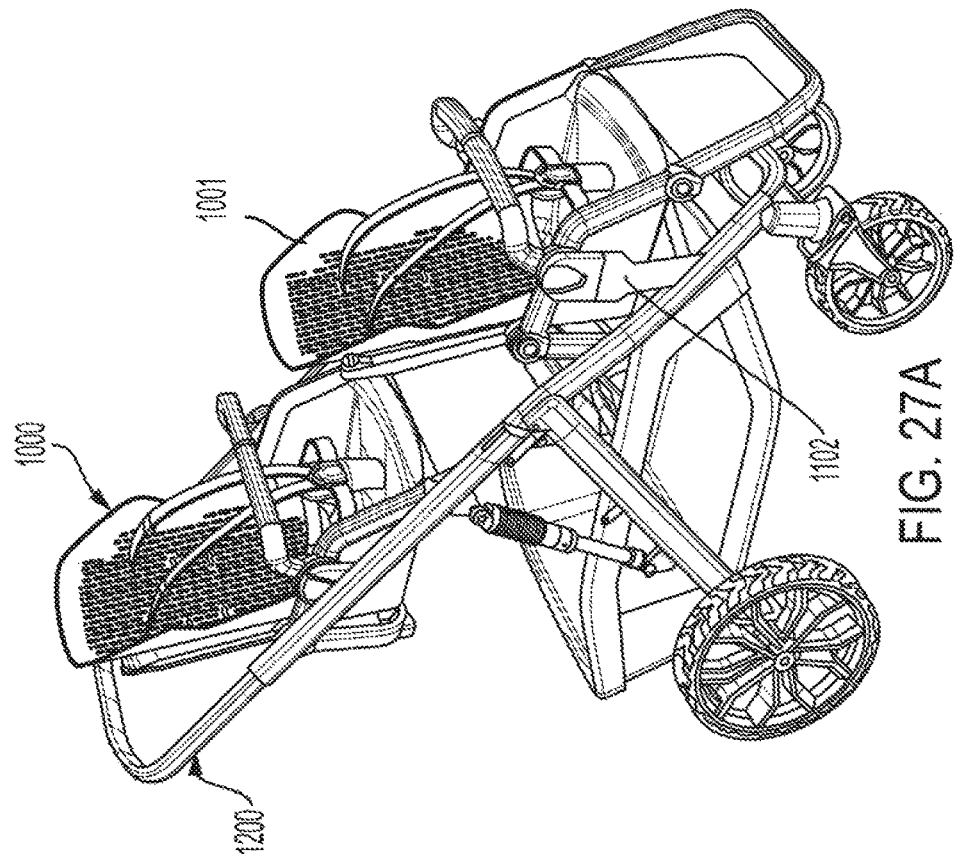
FIG. 27A depicts a front perspective view of a stroller assembly including two seats, according to aspects of the present disclosure.

In some aspects, when the seat 1000 is coupled to the stroller 1200 an additional seat 1001 may also be coupled to the stroller 1200. For example, as shown in FIGS. 27A-B. As shown in FIGS. 27A-B, the additional seat 1001 may couple to the stroller 1200 via a seat adapter 1102, in some aspects the seat adapter 1102 may be integral with the additional seat 1001.

Figure 28B:
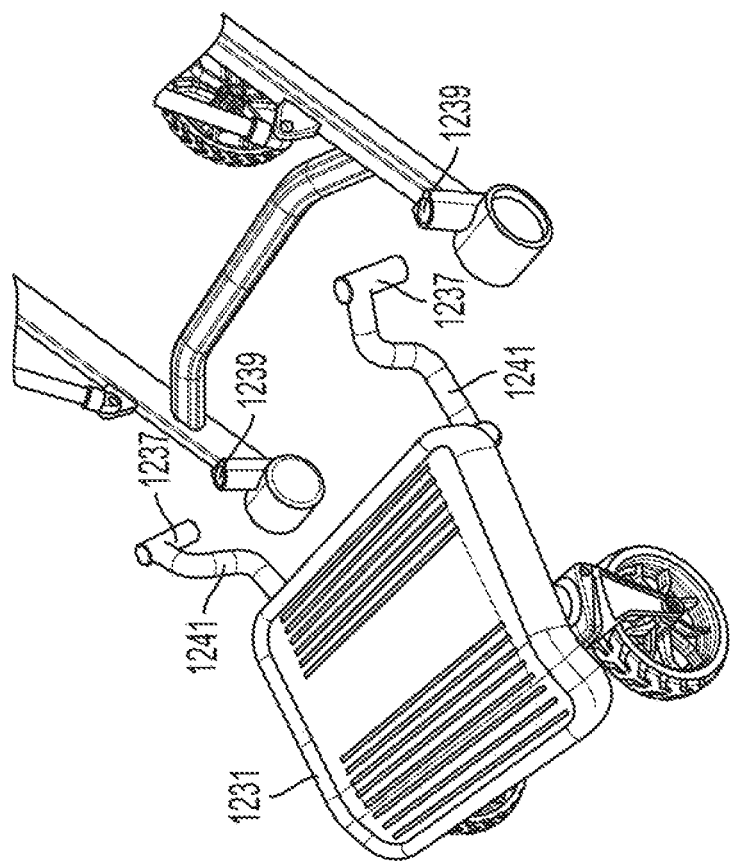
FIG. 28B depicts the standing board, according to aspects of the present disclosure
Figure 28A:
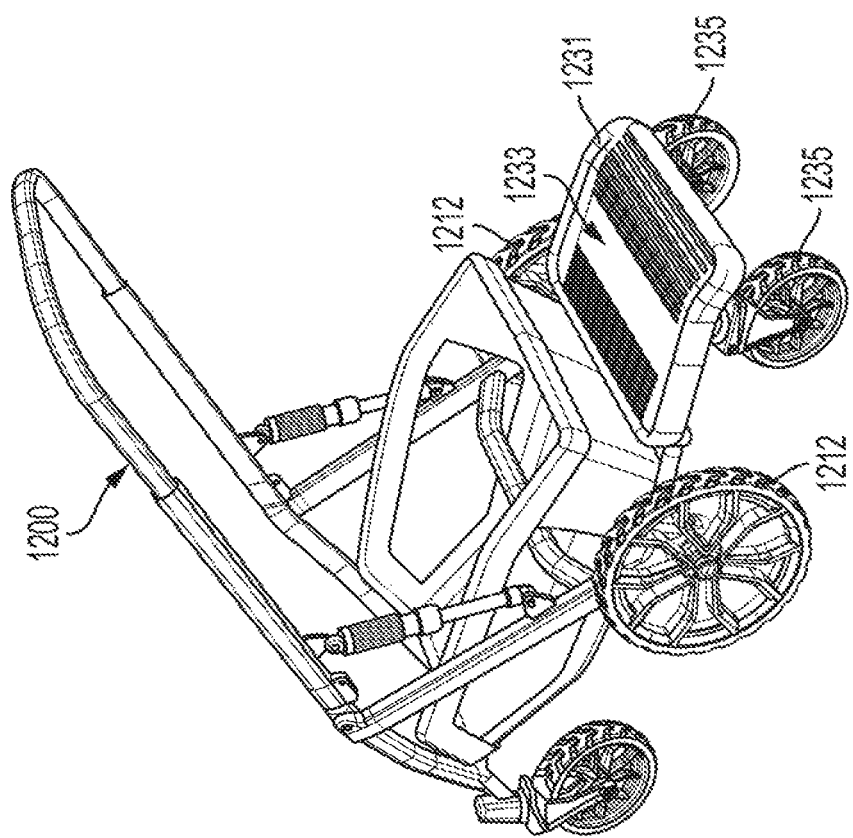
FIG. 28A depicts the stroller assembly including a standing board, according to aspects of the present disclosure.

The stroller 1200 may also be used in conjunction with additional accessories, for example a standing board 1231, shown coupled to the stroller 1200 in FIG. 28A. The standing board 1231 provides for a standing surface 1233 for a child and wheels 1235 such that the standing board 1231 when coupled to the stroller 1200 moves with the stroller 1200 as a child stands on top of the standing board 1231. FIG. 28B depicts the standing board 1231 uncoupled from the stroller 1200. Further, FIG. 28B depicts the wheels 1212 of the stroller 1200 removed so that an exemplary coupling attachment between the standing board 1231 and the stroller 1200 is more easily visible. As shown in FIG. 28B, the standing board 1231 may include mounting arms 1241 and that further include projections 1237. The projections 1237 can be sized and shaped to fit within openings 1239 on the stroller 1200 for securing the standing boards 1231 to the stroller 1200. The openings 1239 may be positioned on the frame 1204 of the stroller 1200 or in any other suitable location.

Exemplary Non-Limiting Bicycle and Bicycle Adapter Embodiments

Figure 29:
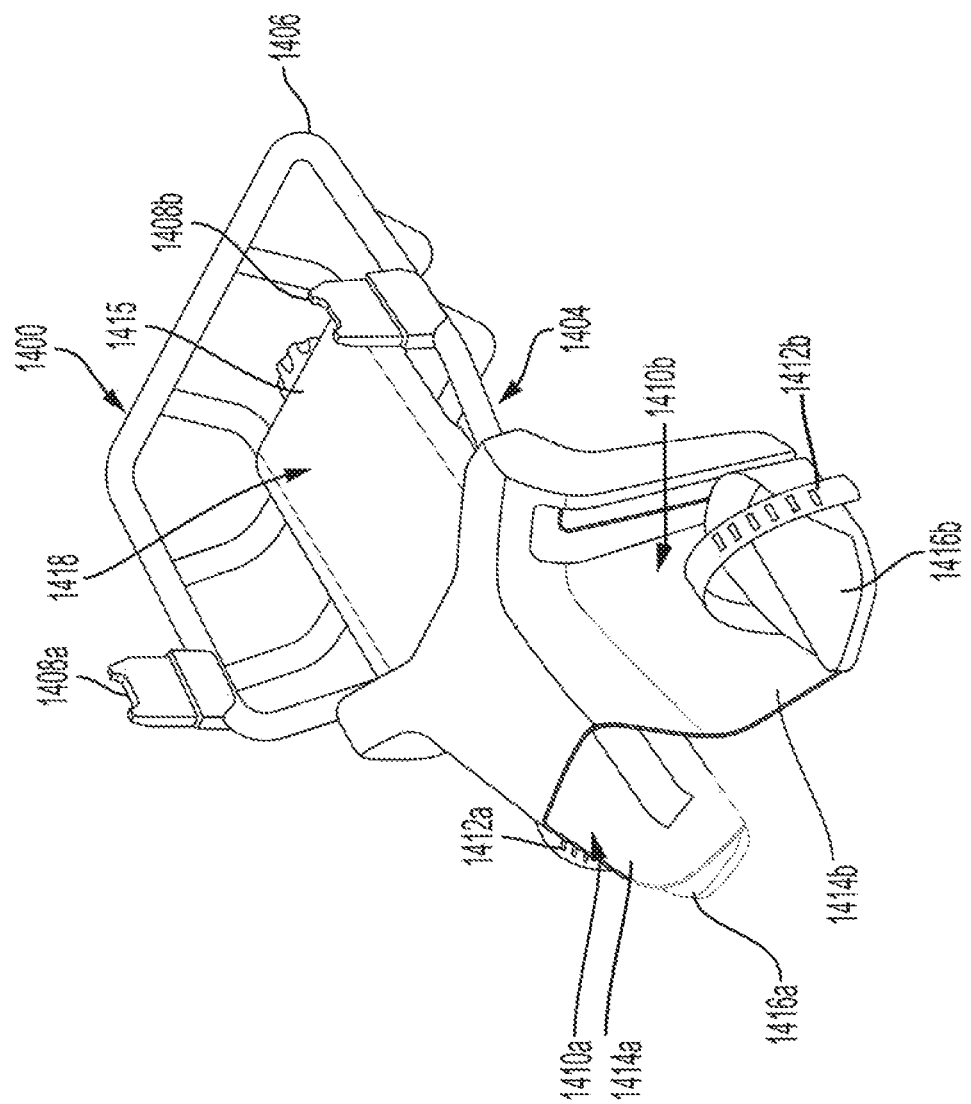
FIG. 29 depicts a bicycle adapter that is coupleable to the seat, according to aspects of the present disclosure.

Aspects of the present disclosure include a seat, for example seat 1000, that may be removably coupled (indirectly or directly) to various assemblies, including for example a bicycle. FIG. 29 depicts a bicycle adapter 1400 that may be coupled to a bicycle 1402 (shown in FIG. 30A-C). The bicycle adapter 1400 may also include a frame 1406 coupled to the base 1415, seat mounting components 1408a, 1408b, and foot guards 1410a, 1410b. The seat mounting components 1408a, 1408b may include snap fit features, though in some aspects other suitable fastening or securing means that apply mechanical, electromechanical, piezoelectric, vacuum, magnetic, and/or friction force may be used. The seat mounting components 1408a, 1408b may mate with the mounting components 1054a, 1054b of the seat 1000 such that the seat 1000 may be easily and quickly be coupled to the bicycle adapter 1400 and thereby to the bicycle 1402. The seat 1000 may also be easily and quickly uncoupled from the bicycle adapter 1400 by actuating one or more actuators on the seat 1000, for example actuators 1055a, 1055b. In some aspects, the seat 1000 may be decoupled by one or more actuators on the bicycle adapter 1400. Thus, the seat 1000 may be coupled to and decoupled from the bicycle adapter 1400 without the use of tools (e.g. screw driver, drill, wrench) and instead may essentially clip into and clip out of the bicycle adapter 1400 for providing a safe seating area for a child on the bicycle 1402. In some aspects, the seat 1000 may couple to the bicycle adapter 1400 via other suitable means without departing from the scope of this disclosure. Thus, the seat 1000 may be coupled to the bicycle adapter 1400 to mount the seat 1000 to the bicycle 1402 and may also be coupled to other assemblies, for example the stroller 1200 (see e.g. FIGS. 22-28). In some aspects, the seat 1000 may couple to the bicycle adapter 1400 and the stroller 1200 via the same mounting components (e.g. mounting components 1054a, 1054b). In some aspects, the seat 1000 may couple to the stroller 1200 and the bicycle adapter 1400 via different mounting components, for example as shown in FIGS. 40-43.

The foot guards 1410a, 1410b provide resting places for the child's legs and feet on either side of the bicycle 1402 when the child is positioned in the seat 1000. The foot guards 1410a, 1410b also prevent a child's foot from getting trapped in a spoke of a wheel of the bicycle 1402 which could cause significant injury to the child. In some aspects, the foot guards 1410a, 1410b may also include securing elements 1412a, 1412b for retaining the child's feet within the foot guards 1410a, 1410b. While in FIG. 29 the securing elements 1412a, 1412b are depicted as straps, in some aspects the securing elements 1412a, 1412b may be foot covers or housings that receive the feet of the child. The foot guards 1410a, 1410b also include wall elements 1414a, 1414b and foot resting surfaces 1416a, 1416b for protecting the child's feet and legs and for providing a comfortable resting spot for the child's feet and legs. The seat 1000 and/or the bicycle adapter 1400 may also include reflector features for reflecting light and increasing the safety of the use of the bicycle 1402.

Figure 32:
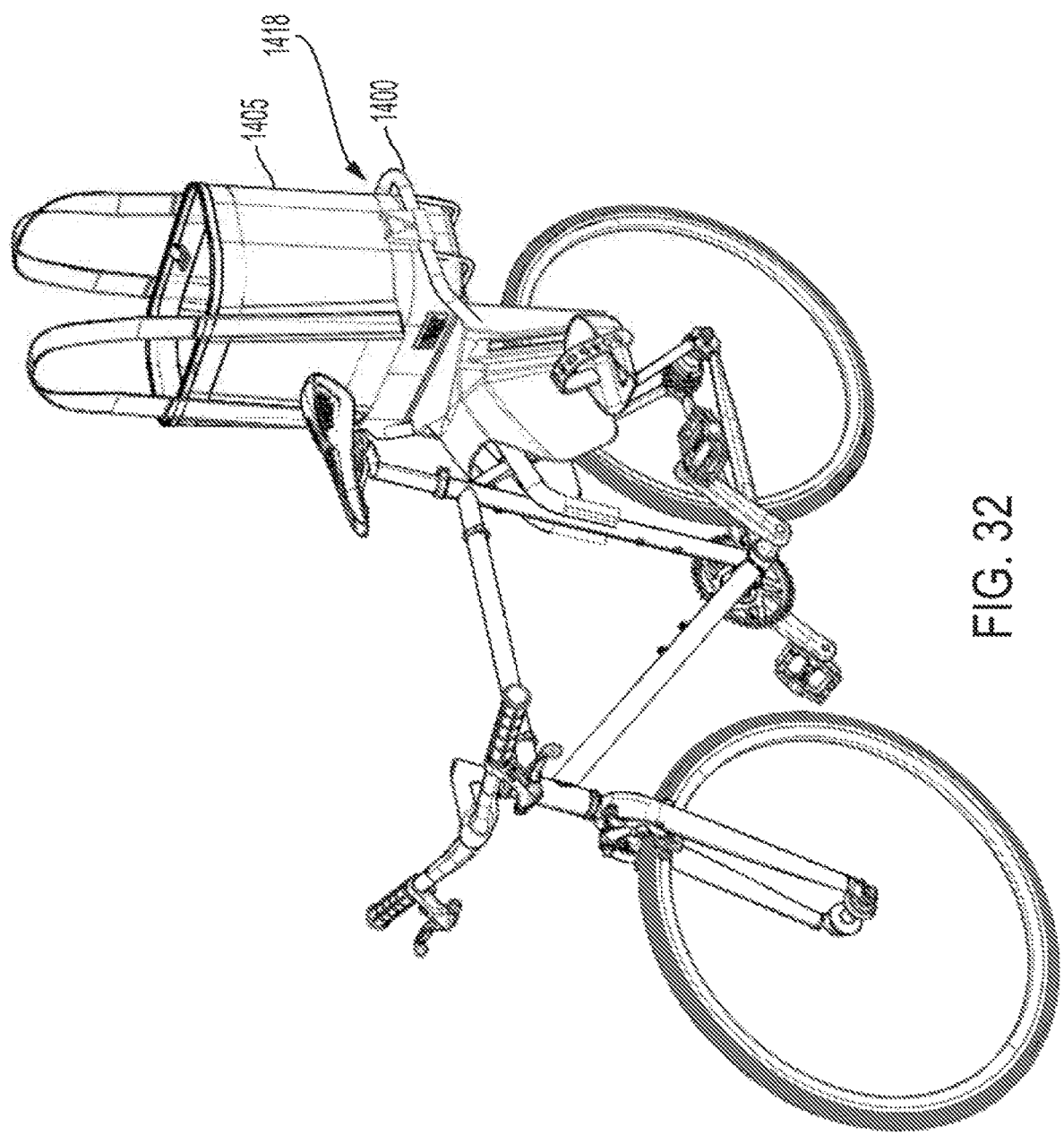
FIG. 32 depicts a bag positioned within the bicycle adapter on the bicycle, according to aspects of the present disclosure.

The bicycle adapter 1400 and the seat 1000 may be designed such that when the seat 1000 is coupled to the bicycle adapter 1400 on the bicycle 1402, the assembly together complies with various safety standards including for example the safety standards identified in Table 1.1.1. In addition, the frame 1406 and the base 1415 of the bicycle adapter 1400 may define a container space or basket 1418 that may receive and retain accessories or items when a seat is not coupled to the bicycle adapter. For example, as shown in FIG. 32, a bag, box, or other item 1405 may be positioned within the container space 1418 for transporting. The honeycomb pattern in the back support 1004 of the seat 1000 can reduce air resistance when biking with the seat 1000 coupled to the bicycle 1402.

Figure 30A:
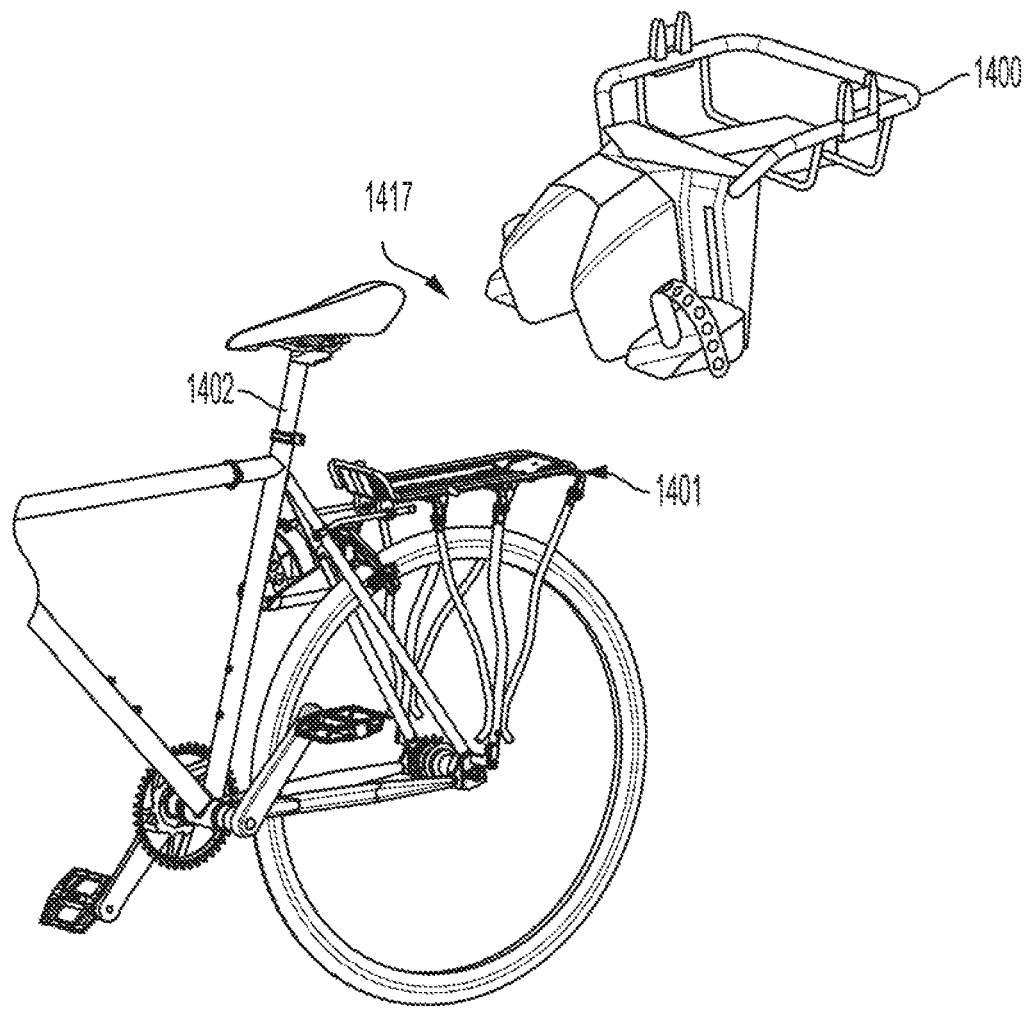
FIG. 30A depicts the bicycle adapter and a bicycle, according to aspects of the present disclosure.
Figure 30C:
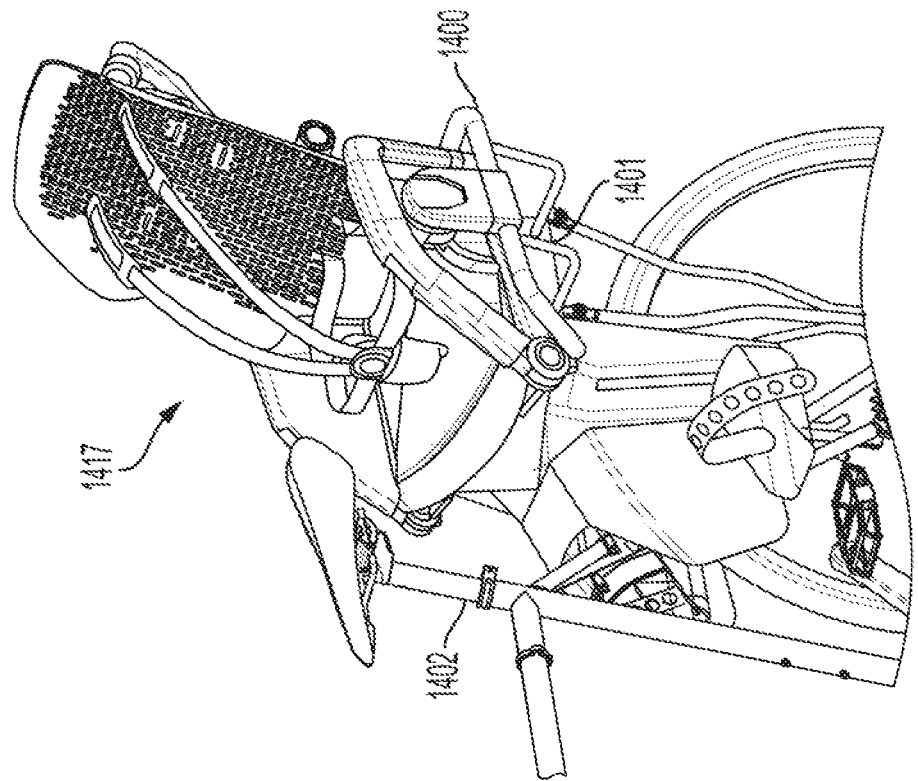
FIG. 30C depicts the bicycle adapter coupled to the bicycle, and the seat coupled to the bicycle adapter, according to aspects of the present disclosure.
Figure 30B:
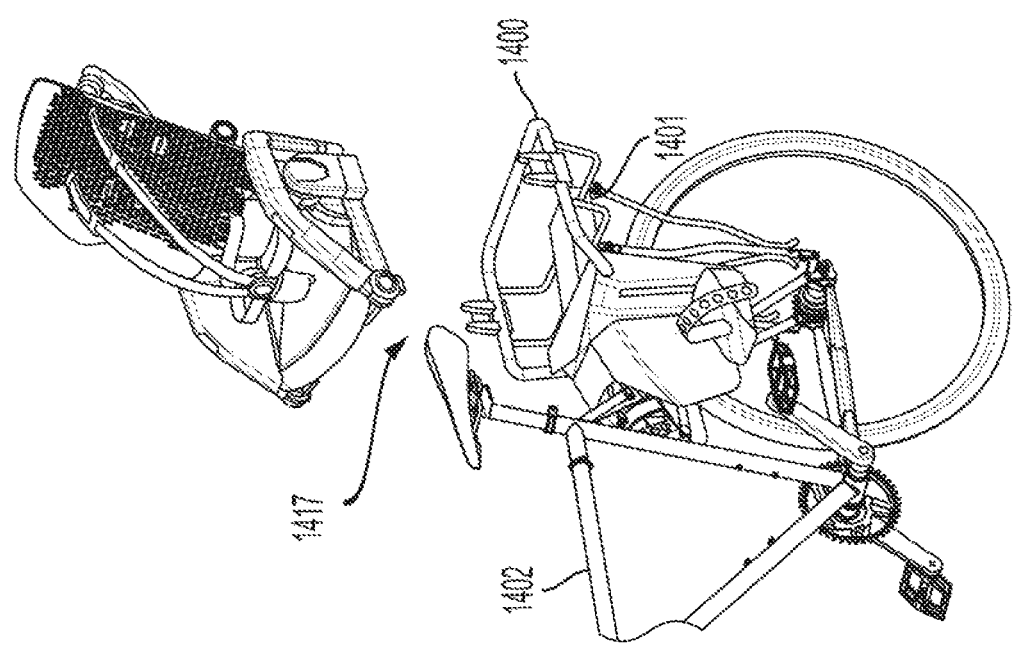
FIG. 30B depicts the bicycle adapter coupled to the bicycle, and the seat, according to aspects of the present disclosure.

As shown in FIGS. 30A-C, the bicycle adapter 1400 may be coupled to a rear region 1417 behind the seat of the bicycle 1402 via one or more bicycle mounting components. In some aspects, the bicycle mounting components may be positioned on an underside of the base 1415 of the bicycle adapter 1400, while in other aspects the bicycle mounting components may be positioned elsewhere on the bicycle adapter 1400 for coupling to the bicycle 1402. The bicycle mounting components 1404 may include latches, screws, ties, or other suitable fastening or securing means that apply mechanical, electromechanical, piezoelectric, vacuum, magnetic, and/or friction force. The bicycle adapter 1400 may require tools (e.g. screw driver, drill, wrench) to secure to the bicycle 1402 via the bicycle mounting components 1404. As such, the bicycle adapter 1400 may not be quickly removed or uncoupled from the bicycle 1402. In some aspects, the bicycle adapter 1400 may be removably mounted to the bicycle 1402 without the use of tools.

In some aspects of the present disclosure, the bicycle adapter 1400 may couple to the bicycle 1402 via a mounting rack 1401 that may be an off the shelf bike rack as shown in FIG. 30A, FIG. 30B (depicting the bicycle adapter 1400 coupled to the mounting rack 1401), and FIG. 30C (depicting the seat 1000 coupled to the bicycle adapter 1400). In such an aspect, the bicycle mounting components may include mechanical fasteners, including for example bolts, washers, nuts, etc.

Figure 31C:
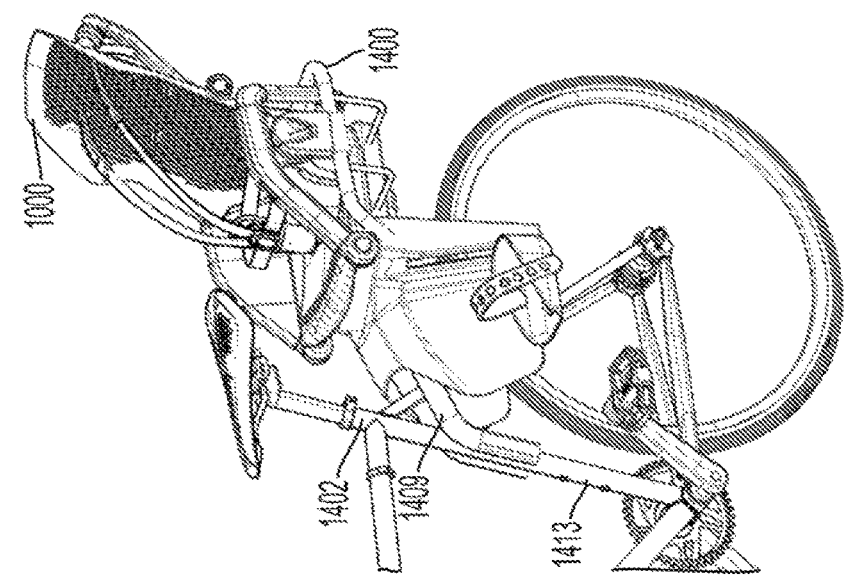
FIG. 31C depicts the bicycle adapter coupled to the bicycle, and the seat coupled to the bicycle adapter, according to aspects of the present disclosure.
Figure 31B:
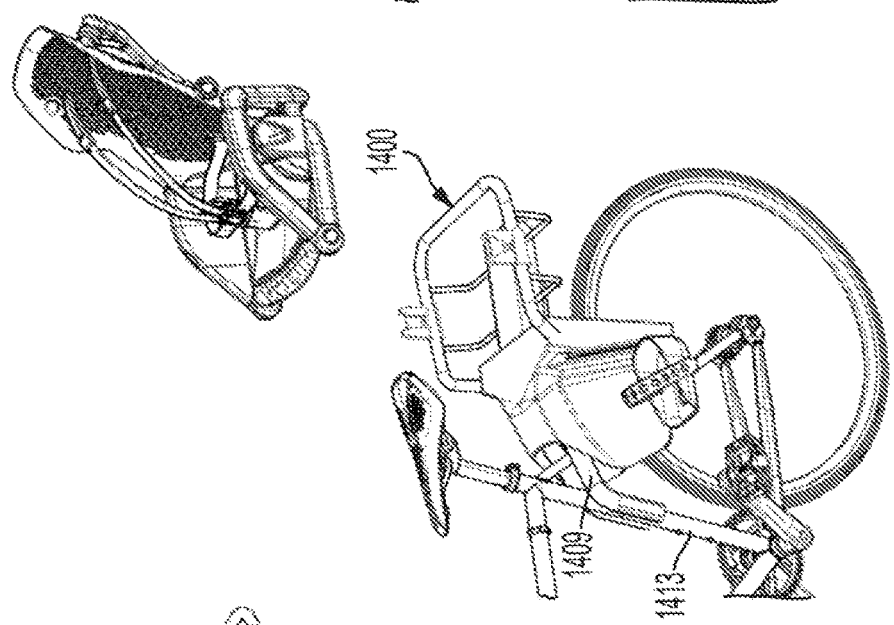
FIG. 31B depicts the bicycle adapter coupled to the bicycle, and the seat, according to aspects of the present disclosure.
Figure 31A:
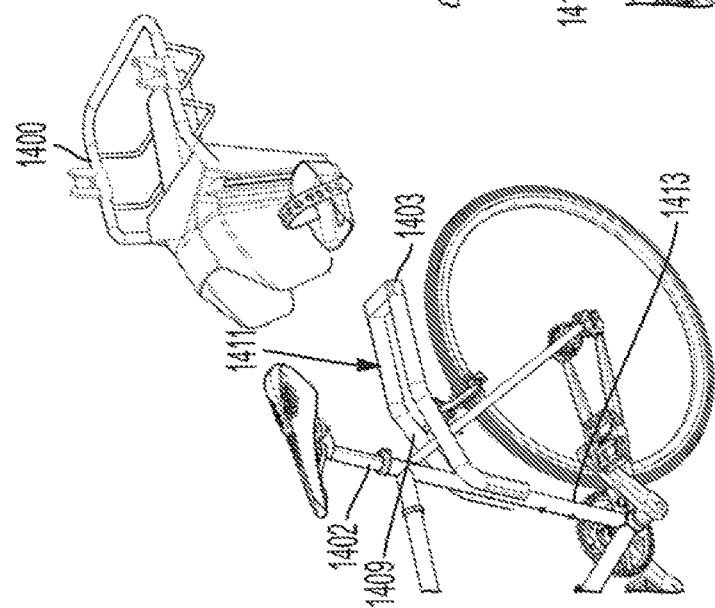
FIG. 31A depicts the bicycle adapter and a bicycle, according to aspects of the present disclosure.

In some aspects, the bicycle adapter 1400 may couple to the bicycle 1402 via a rear mounting rack 1403, as shown in FIG. 31A, FIG. 31B (depicting the bicycle adapter 1400 coupled to the rear mounting rack 1403), and FIG. 31C (depicting the seat 1000 coupled to the bicycle adapter 1400). The rear mounting rack 1403 may include a connector bar 1409 and a base frame 1411. The connector bar 1409 may be secured to the bicycle 1402, for example but not limited to at a crossbar, a seat tube, or at a seat post 1413 (as shown in FIG. 31A). The rear mounting rack 1403, for example but not limited to the base frame 1411, may be sized and shaped to slide into, clip into, or otherwise secure to the bicycle adapter 1400. In such an aspect, the bicycle mounting components may include may include mechanical fasteners, including for example bolts, washers, nuts, etc.

As shown in FIGS. 33A-B, the bicycle adapter 1400 may also couple to a seat that may be an infant seat 1100, for example an infant car seat or bucket seat. The infant seat 1100 may include mounting components 1407a, 1047b (only 1047b mounting component is visible in FIGS. 33A and 33B) that may releasably couple to the seat mounting components 1408a, 1408b of the bicycle adapter 1400 for coupling the infant seat 1100 to the bicycle adapter 1400 as shown in FIG. 33B. In some aspects, the infant seat 1100 could also be mounted to the bicycle adapter 1400 in any number of other configurations.

Figure 34:
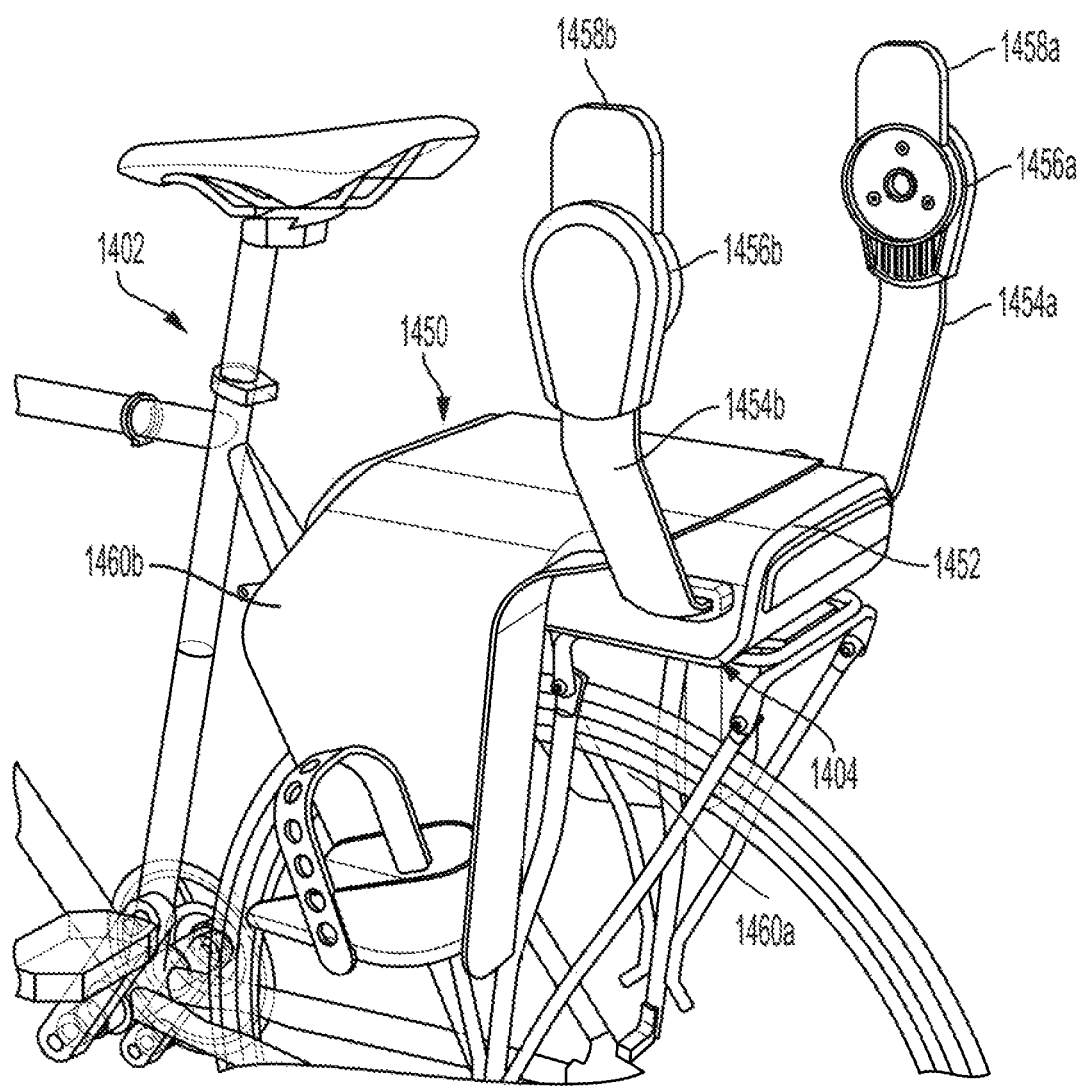
FIG. 34 depicts a bicycle adapter that is coupled to the bicycle, according to aspects of the present disclosure.

FIG. 34 depicts a bicycle adapter 1450 according to aspects of the present disclosure coupled to a bicycle 1402. The bicycle adapter 1450 may be coupled to a rear region 1417 of the bicycle 1402 behind the bike seat via one or more bicycle mounting components 1404 (not visible in FIG. 34) may include screws, ties, or other suitable fastening or securing means that apply mechanical, electromechanical, piezoelectric, vacuum, magnetic, and/or friction force, as described above with respect to the bicycle adapter 1400.

One or more of the bicycle mounting components 1404 may be positioned on, an underside of a base 1452 of the bicycle adapter 1450.

Figure 35:
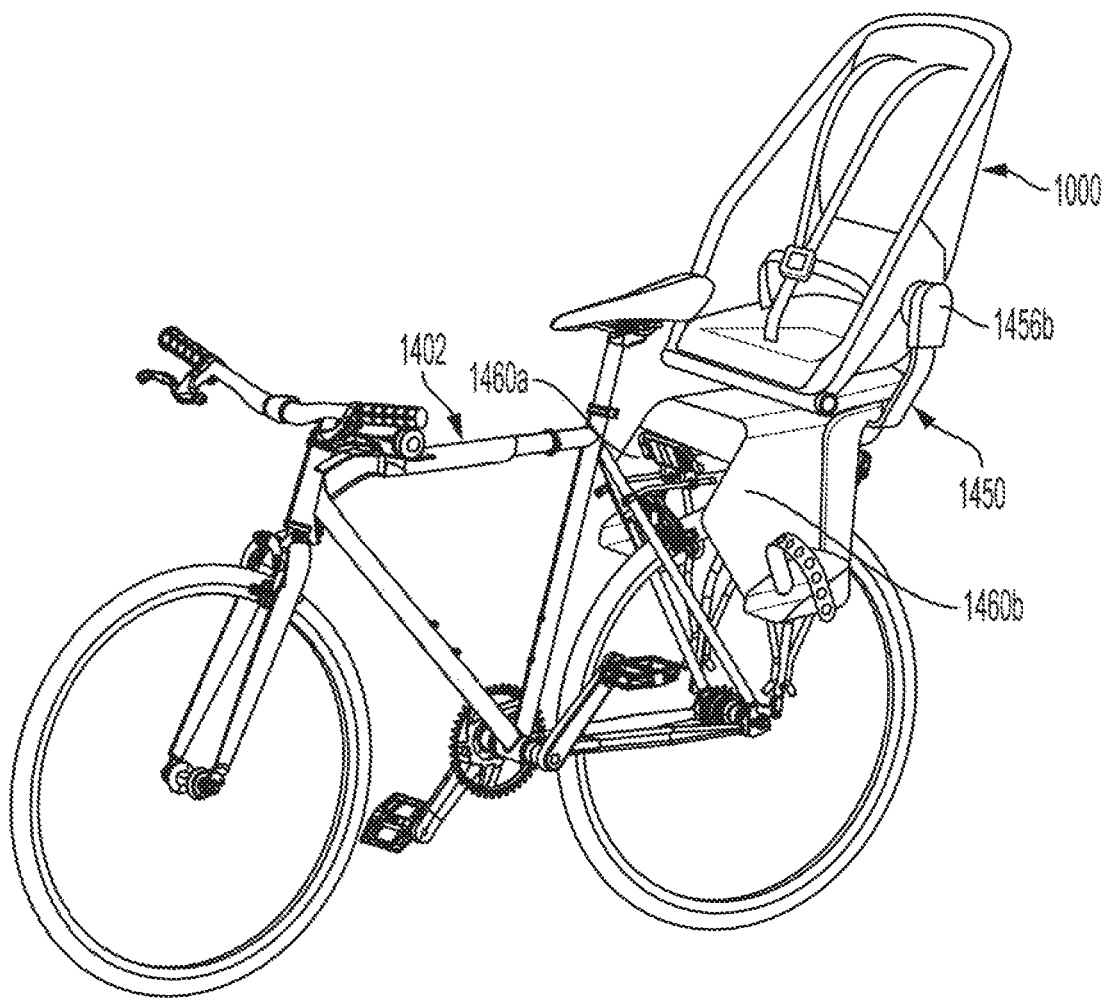
FIG. 35 depicts the seat coupled to the bicycle adapter that is coupled to the bicycle, according to aspects of the present disclosure.

The bicycle adapter 1450 may also include arms 1454a, 1454b, hub assemblies 1456a, 1456b, seat mounting components 1458a, 1458b, and foot guards 1460a, 1460b. The arms 1454a, 1454b may extend upwards from the base 1452. The respective hub assemblies 1456a, 1456b may be positioned on the respective arms 1454a, 1454b. The seat mounting components 1458a, 1458b may in some aspects extend from or be coupled directly or indirectly to the respective hub assemblies 1456a, 1456b. The seat mounting components 1458a, 1458b may include snap fit features, though in some aspects other suitable fastening or securing means that apply mechanical, electromechanical, piezoelectric, vacuum, magnetic, and/or friction force may be used. The seat mounting components 1458a, 1458b may mate with the mounting components 1054a, 1054b of the seat 1000 such that the seat 1000 may be easily and quickly be coupled to the bicycle adapter 1450 and thereby to the bicycle 1402, as shown in FIG. 35. The seat 1000 may also be easily and quickly uncoupled from the bicycle adapter 1450 by actuating one or more actuators on the seat 1000, for example actuators 1055a, 1055b. Thus, the seat 1000 may be coupled to and decoupled from the bicycle adapter 1450 without the use of tools (e.g. screw driver, drill, wrench) and instead may essentially clip into and clip out of the bicycle adapter 1450 for providing a safe seating area for a child on the bicycle 1402. In some aspects, one or more actuators that may actuate to uncouple the seat 1000 from the bicycle adapter 1450 may be positioned on the bicycle adapter 1450, for example but not limited on the hub assemblies 1456a, 1456b. The seat 1000 may couple to the bicycle adapter 1450 via other suitable means without departing from the scope of this disclosure. Thus, the seat 1000 may be coupled to the bicycle adapter 1450 to mount the seat 1000 to the bicycle 1402 (as shown in FIG. 35) and may also be coupled to other assemblies, for example the stroller 1200 (see e.g. FIGS. 22-28). In some aspects, the seat 1000 may couple to the bicycle adapter 1450 and the stroller 1200 via the same mounting components (e.g. mounting components 1054a, 1054b), while in other aspects the seat 1000 may couple to the bicycle adapter 1450 via different mounting components.

Figure 37:
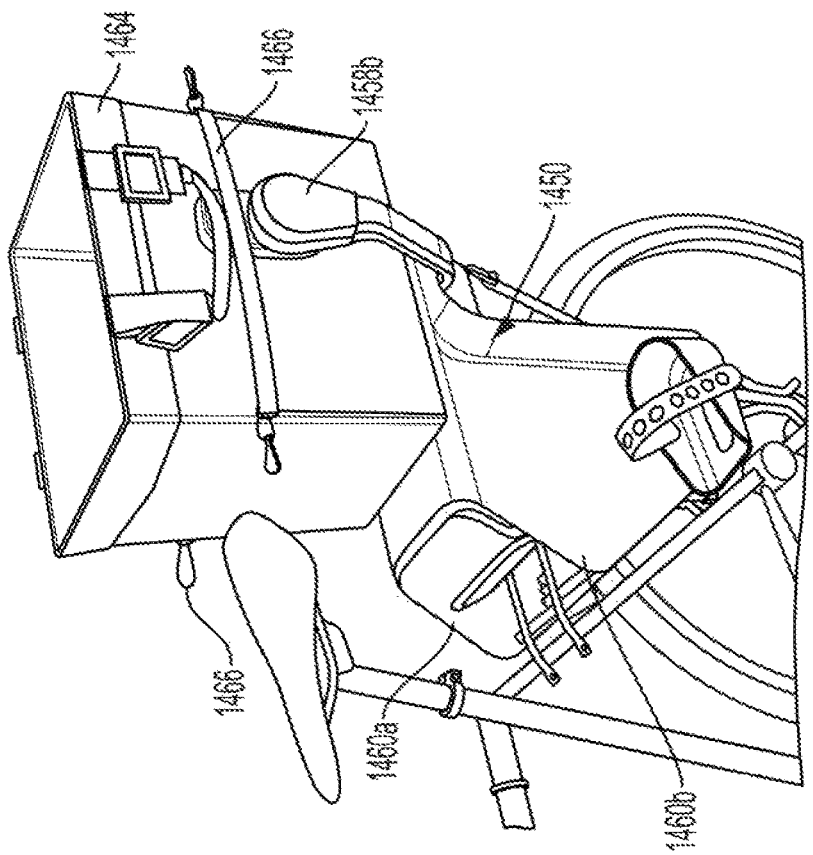
FIG. 37 depicts a container coupled to the bicycle adapter that is coupled to the bicycle, according to aspects of the present disclosure.
Figure 36:
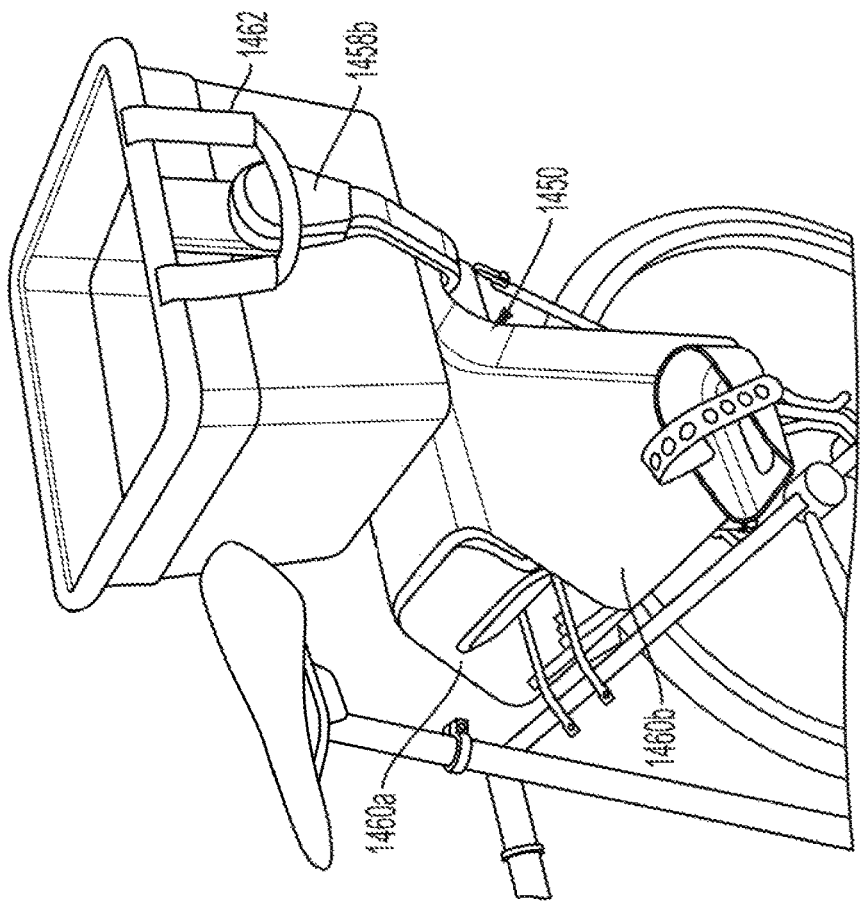
FIG. 36 depicts a container coupled to the bicycle adapter that is coupled to the bicycle, according to aspects of the present disclosure.

The foot guards 1460a, 1460b may comprise the same features as the foot guards 1410a, 1410b of the bicycle adapter 1400. The bicycle adapter 1450 and the seat 1000 may be designed such that when the seat 1000 is coupled to the bicycle adapter 1450 on the bicycle 1402 (as shown in FIG. 35), the assembly together complies with various safety standards including for example the safety standards identified in Table 1.1.1. In addition, as shown in FIG. 36, the bicycle adapter 1450 may also be coupleable to a container 1462 that may receive and retain accessories or items when a seat is not coupled to the bicycle adapter 1450. For example, a bag, box, or other item may be positioned within the container 1462 for transporting the items. The container 1462 may include mounting components (not visible in FIG. 36) that couple to the seat mounting components 1458a, 1458b of the bicycle adapter 1450. The container 1462 may couple to the bicycle adapter 1450 via snap fit engagement or any suitable fastening or securing means that apply mechanical, electromechanical, piezoelectric, vacuum, magnetic, and/or friction force In other aspects, for example as shown in FIG. 37, a container 1464 may be secured to the bicycle adapter 1450 via straps 1466 or other features. In some aspects, as shown in FIG. 37, the straps 1466 may couple to the bicycle adapter 1450, for example via the seat mounting components 1458*a*, 1458*b* of the bicycle adapter 1450.

Figure 38:
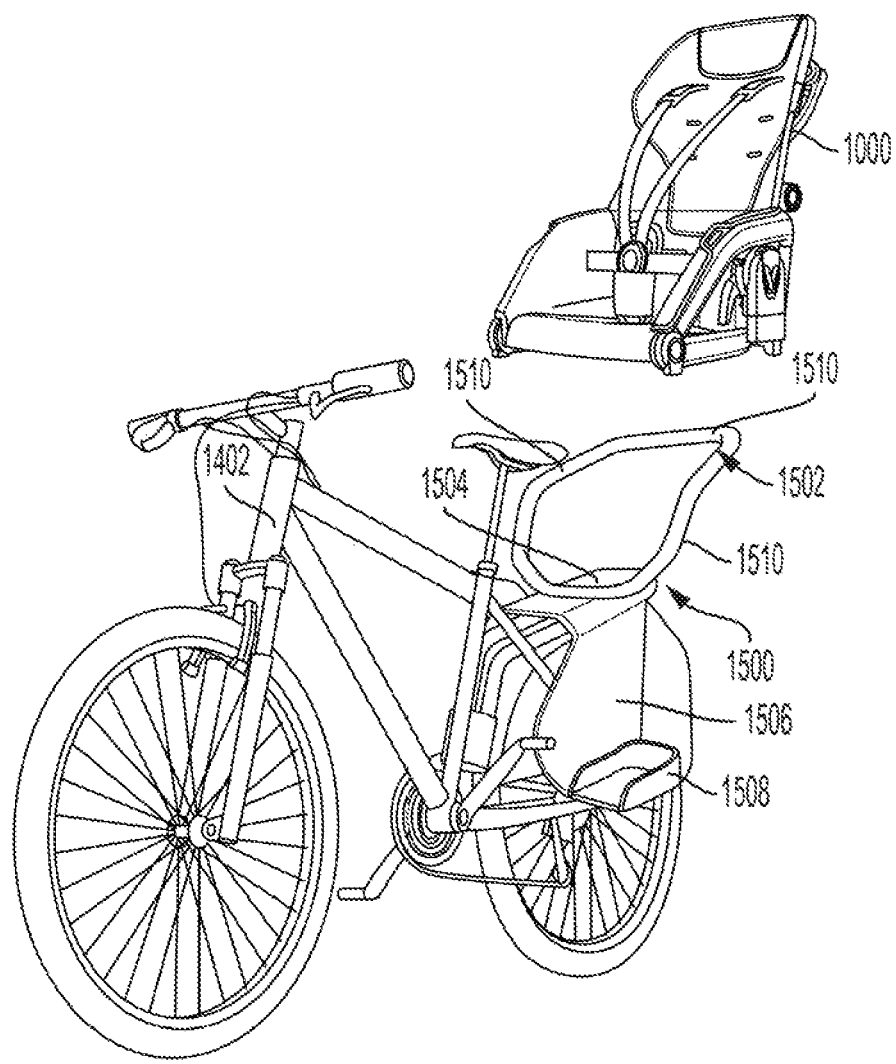
FIG. 38 depicts a bicycle adapter coupled to the bicycle, according to aspects of the present disclosure.

FIG. 38 depicts a bicycle adapter 1500 according to aspects of the present disclosure. The bicycle adapter 1500 comprises a frame 1502, a base 1504, foot guards 1506, and foot housings 1508. The bicycle adapter 1500 may be secured to the bicycle 1402 via bicycle mounting components on the bicycle adapter 1500. In some aspects the bicycle mounting components may be positioned on an underside of the base 1504 of the bicycle adapter 1500. The frame 1502 may comprise multiple frame members or rods 1510 which provide surfaces that may engage with corresponding surface on a seat, for example seat 1000, to securely couple the seat 1000 to the bicycle adapter 1500. In some aspects, the seat 1000 may sit within a space defined by the frame 1502 of the bicycle adapter 1500 and may be held in frictional engagement with the frame 1502. In some aspects, one or more surfaces of the seat 1000 may be sized and shaped to receive one or more frame members 1510 of the frame 1502 so as to secure the seat 1000 to the bicycle adapter 1500. For example, the seat 1000 may include a recess or other similar feature that receives a frame member 1510 of the bicycle adapter 1500. In some aspects a latch or other additional security feature may secure the frame member 1510 within the recess. The latch may actuate between a locked and an unlocked position for securely coupling the seat 1000 to the bicycle adapter 1500 and uncoupling the seat 1000 from the bicycle adapter 1500 for removal. In addition, as shown in FIG. 39, the frame 1502 may also define a space for receiving an accessory such as a bag or container 1512 for transporting goods or items with the bicycle 1402.

Figure 40A:
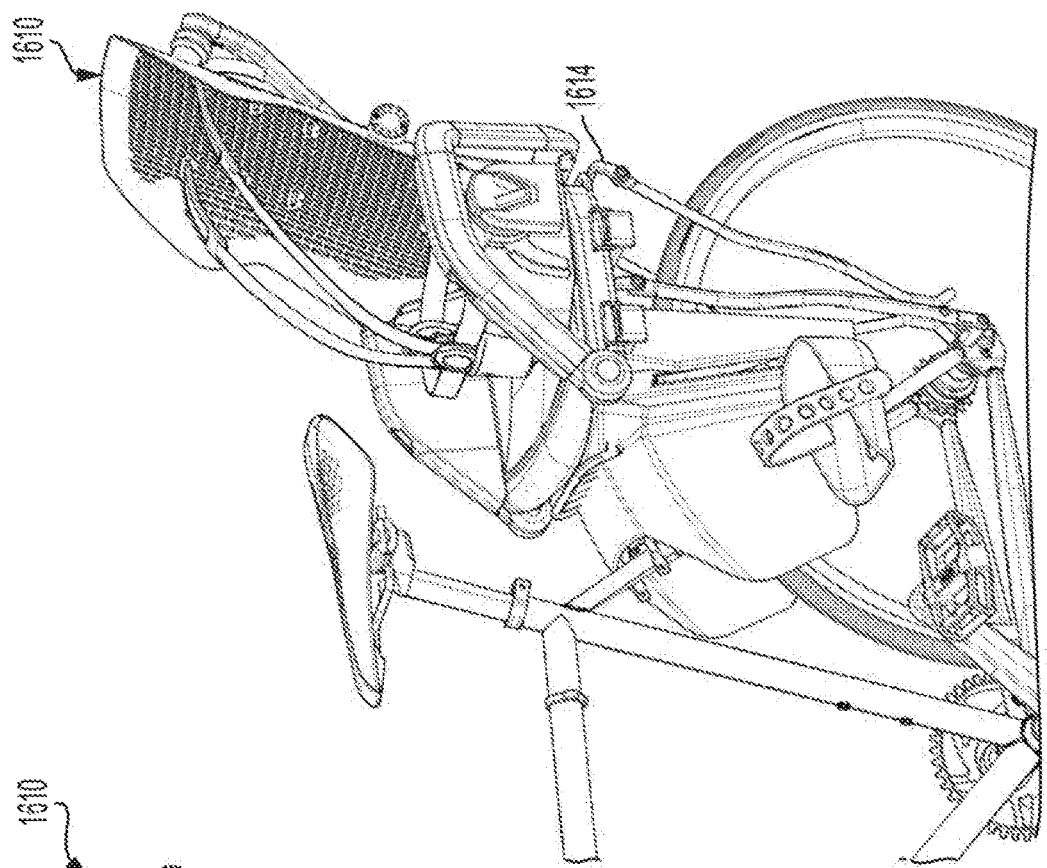
FIG. 40A depicts a bicycle adapter, a seat, and a bicycle, according to aspects of the present disclosure.
Figure 40B:
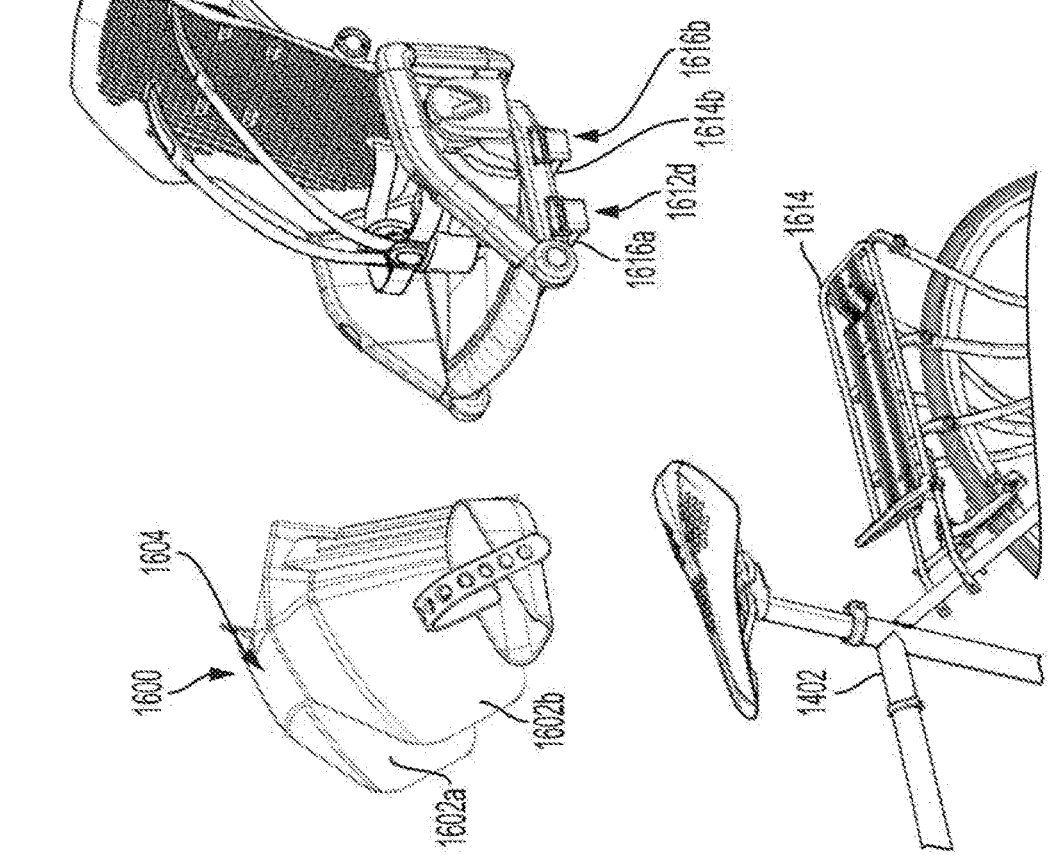
FIG. 40B depicts the seat coupled to the bicycle adapter, with the bicycle adapter coupled to the bicycle, according to aspects of the present disclosure.

FIGS. 40A-B depict aspects of the present disclosure in which a bicycle adapter 1600 comprises foot guards 1602*a*, 1602*b*. The bicycle adapter 1600 may be coupled to the bicycle 1402 via bicycle mounting components on the bicycle adapter 1600. In some aspects the bicycle mounting components may be positioned on an underside of a base 1604 of the bicycle adapter 1600, though in some aspects the bicycle mounting components may be positioned elsewhere. A seat, for example a seat 1610, may include mounting components 1612*a*, 1612*b*, that may releasably coupled to a bike seat 1614. The mounting components 1612*a*, 1612*b* may comprise clamps designed to connect to a mounting rack on the bicycle 1402. In some aspects, the mounting components 1612*a*, 1612*b* may be clamps that couple to the bike seat 1614, as shown in FIG. 40B. The mounting components 1612*a*, 1612*b*, may removably couple to the bike seat 1614 via snap fit engagement or any suitable fastening or securing means that apply mechanical, electromechanical, piezoelectric, vacuum, magnetic, and/or friction force. The seat 1610 may include one or more of the features described with respect to the seat 1000.

FIGS. 41A-B depict aspects of the present disclosure in which a bicycle adapter 1700 comprises foot guards 1702*a*, 1702*b* and a base 1704. The bicycle adapter 1700 may be coupled to the bicycle 1402 via bicycle mounting components on the bicycle adapter 1700 that secure to a bike seat 1703. In some aspects the bicycle mounting components may be positioned on an underside of the base 1704 of the bicycle adapter 1700, though in some aspects the bicycle mounting components may be positioned elsewhere. A seat, for example a seat 1706, may include one or more mounting components 1712A, 1712*b*, that may releasably coupled to the bike seat 1703. The base 1704 of the bicycle adapter 1700 may be sized and shaped to fit within rails 1714 of the seat 1706 for releasably coupling the seat 1706 to the bicycle adapter 1700. In some aspects, the seat 1706 may also include one or more mounting components that may releasably couple to the base 1704 of the bicycle adapter 1700 for aiding in securing the seat 1706 to the bicycle adapter 1700. The one or more mounting components may couple to the base 1704 via snap fit engagement or any suitable fastening or securing means that apply mechanical, electromechanical, piezoelectric, vacuum, magnetic, and/or friction force. FIG. 41B depicts the seat 1706 coupled to the bicycle 1402 via the bicycle adapter 1700. The seat 1706 may include one or more of the features of the seat 1000 in addition to the features described herein.

FIGS. 42A-B depict aspects of the present disclosure in which a bicycle adapter 1800 comprises foot guards 1802*a*, 1802*b* a base 1804, and a frame 1806. The bicycle adapter 1800 may be coupled to the bicycle 1402 via bicycle mounting components on the bicycle adapter 1800 that secure to a bike seat 1803. In some aspects the bicycle mounting components may be positioned on an underside of the base 1804 of the bicycle adapter 1800, though in some aspects the bicycle mounting components may be positioned elsewhere. A seat, for example a seat 1808, may include mounting components 1810*a*, 1810*b*, that may releasably coupled to the frame 1806 of the bicycle adapter 1800. For example, as shown in FIGS. 42A and 42B, the mounting components 1810*a*, 1810*b* may comprise projections that are sized and shaped to couple to a rod 1812 of the frame 1806. For example, the mounting components 1810*a*, 1810*b* may be curved such that they snap fit onto the rod 1812 of the frame 1806 to releasably secure the seat 1808 to the bicycle adapter 1800. In other aspects of the present disclosure the seat 1808 may include different or additional mounting components that may couple to the bicycle adapter 1800 via snap fit engagement or any suitable fastening or securing means that apply mechanical, electromechanical, piezoelectric, vacuum, magnetic, and/or friction force. The seat 1808 may include one or more of the features of the seat 1000 in addition to the features described herein.

Figure 43B:
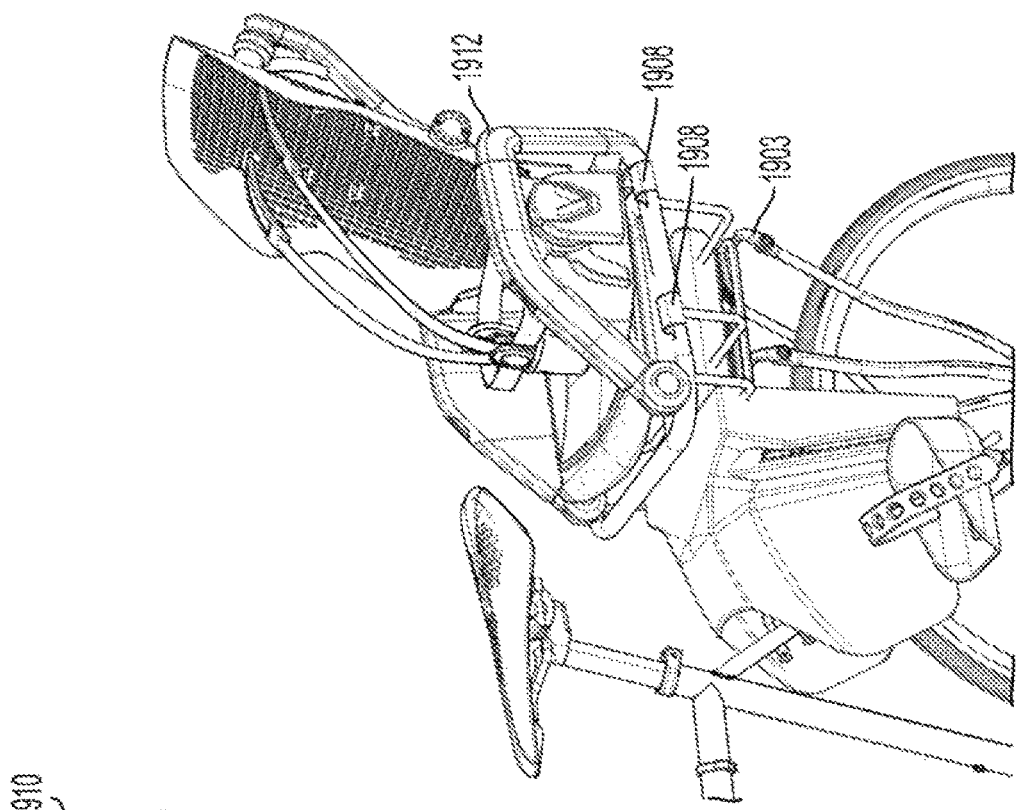
FIG. 43B depicts the seat coupled to the bicycle adapter, with the bicycle adapter coupled to the bicycle, according to aspects of the present disclosure.
Figure 43A:
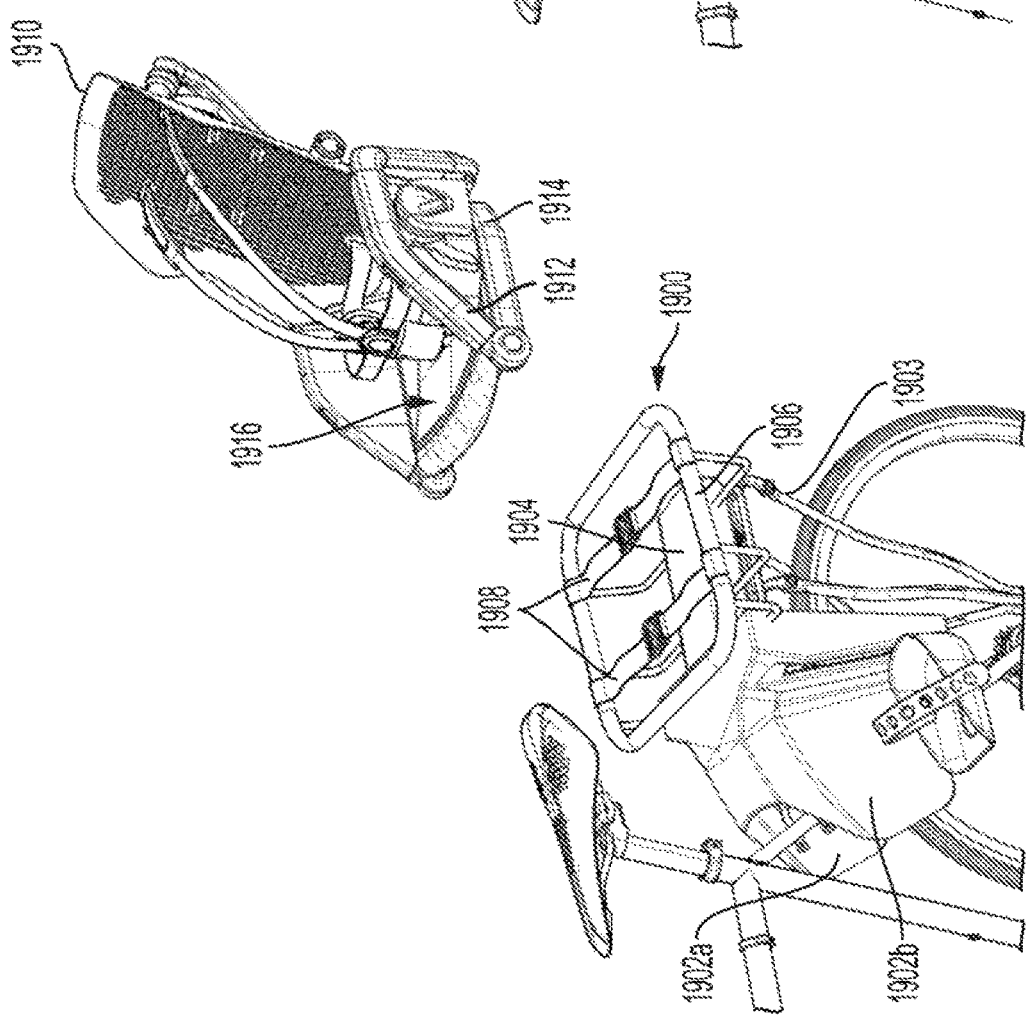
FIG. 43A depicts a bicycle adapter, a seat, and a bicycle, according to aspects of the present disclosure.

In still yet another aspect of the present disclosure, as shown in FIGS. 43A-B, a bicycle adapter 1900 comprises foot guards 1902*a*, 1902*b* a base 1904, a frame 1906, and straps 1908. The bicycle adapter 1900 may be coupled to the bicycle 1402 via bicycle mounting components on the bicycle adapter 1900 that secure to a bike seat 1903. In some aspects the bicycle mounting components may be positioned on an underside of the base 1904 of the bicycle adapter 1900, though in some aspects the bicycle mounting components may be positioned elsewhere. The straps 1908 may be used to couple a, for example, seat 1910 to the bicycle adapter 1900, for example by passing the straps 1908 through openings in a frame 1912, a calf support 1914, and/or a seat pan 1916 of the seat 1910. In some aspects, the straps 1908 may pass through alternate areas or features of the seat 1910. The frame 1906 of the bicycle adapter 1900 may also support and secure the seat 1910 in place, as shown in FIG. 43B. In other aspects of the present disclosure the seat 1910 may include different or additional mounting components that may couple to the bicycle adapter 1900 via snap fit engagement or any suitable fastening or securing means that apply mechanical, electromechanical, piezoelectric, vacuum, magnetic, and/or friction force. The seat 1910 may include one or more of the features of the seat 1000 in addition to the features described herein.

Figure 44B:
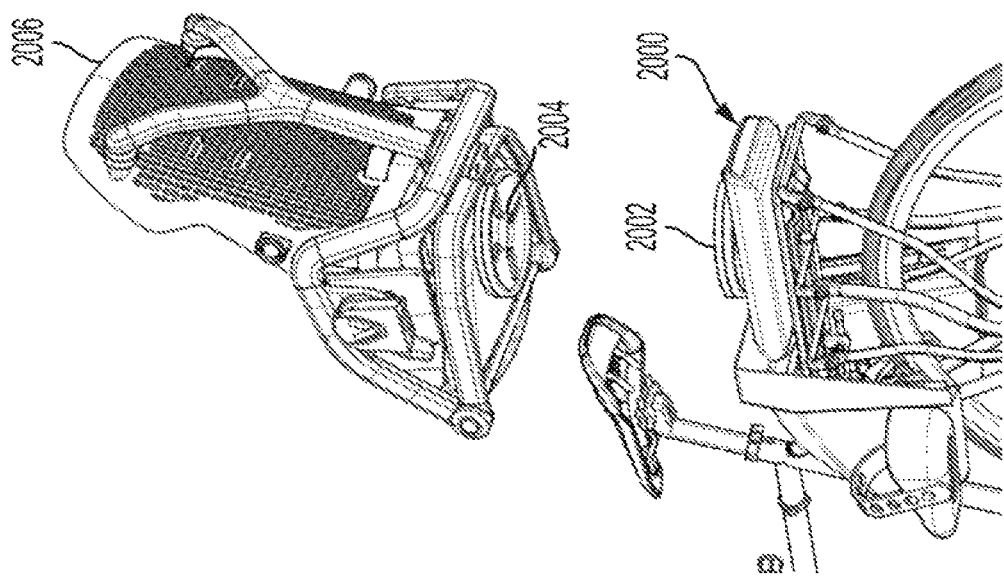
FIG. 44B depicts the seat coupled to the bicycle adapter, with the bicycle adapter coupled to the bicycle, according to aspects of the present disclosure.
Figure 44A:
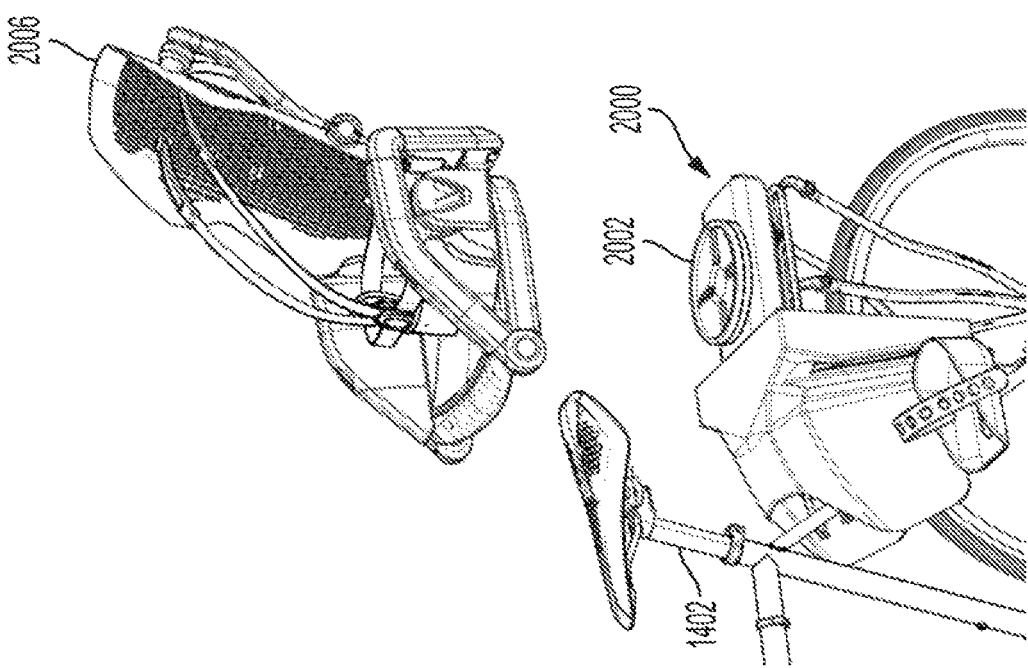
FIG. 44A depicts a bicycle adapter, a seat, and a bicycle, according to aspects of the present disclosure.

FIGS. 44A-B depict an embodiment in which the bicycle adapter 2000 comprises a locking ring or plate 2002 that engages with a mating surface 2004 on a bottom region of a seat 2006. The seat 2006 may include additional features as described with respect to seat 1000. The locking ring 2002 may engage with the mating surface 2004 of the seat 2006 to removably couple the seat 2006 to the bicycle adapter 2000. The bicycle adapter 2000 may be coupled to the bicycle 1402 in the same manner as described above with respect to FIGS. 29-43B. The seat 2006 may include one or more of the features of the seat 1000 in addition to the features described herein.

Figure 45A:
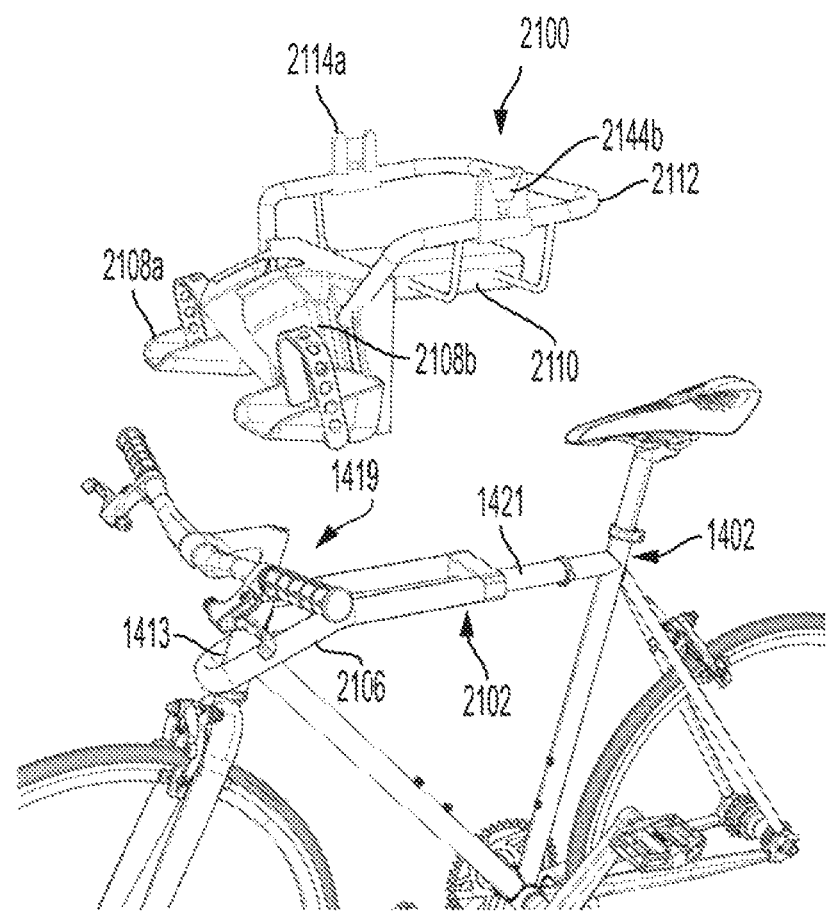
FIG. 45A depicts a bicycle adapter coupleable to a front region of the bicycle, according to aspects of the present disclosure.
Figure 45B:
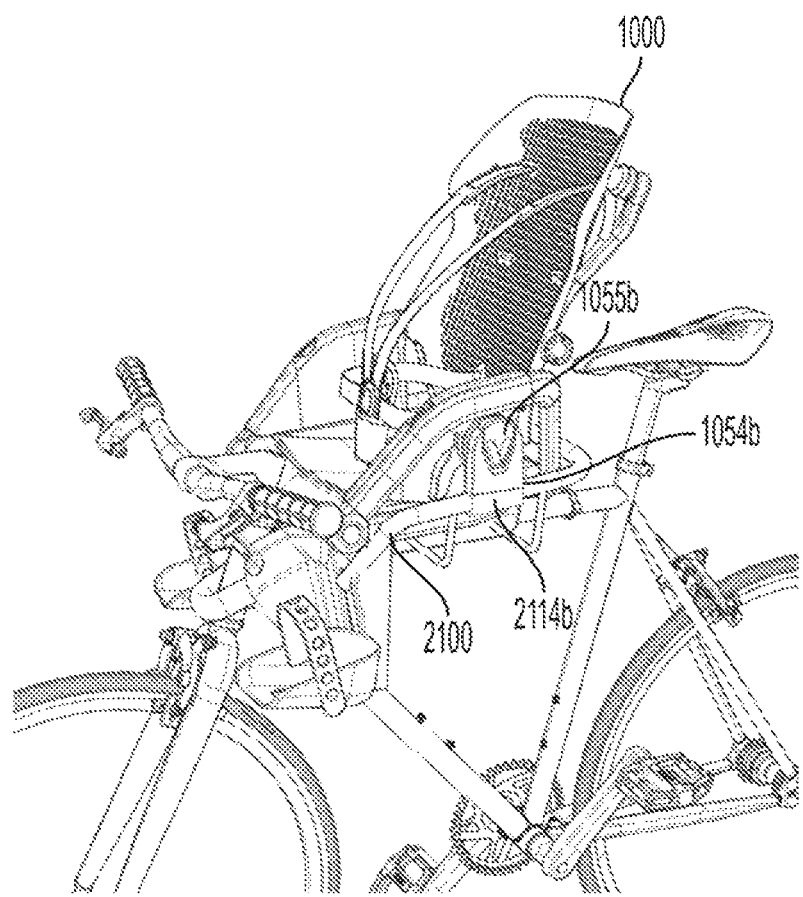
FIG. 45B depicts the seat coupled to the bicycle adapter, with the bicycle adapter coupled to the bicycle, according to aspects of the present disclosure.
Figure 46A:
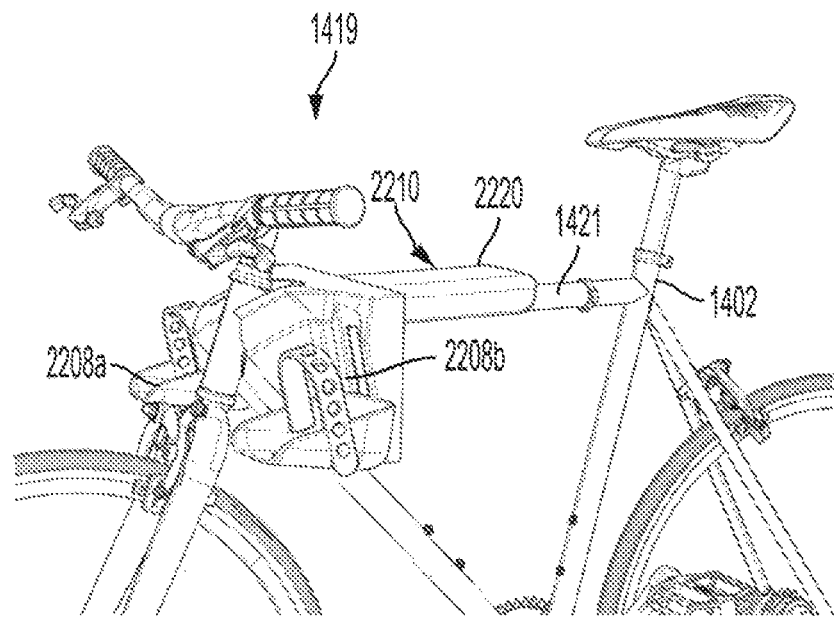
FIG. 46A depicts a bicycle adapter coupled to a front region of the bicycle, according to aspects of the present disclosure.
Figure 46B:
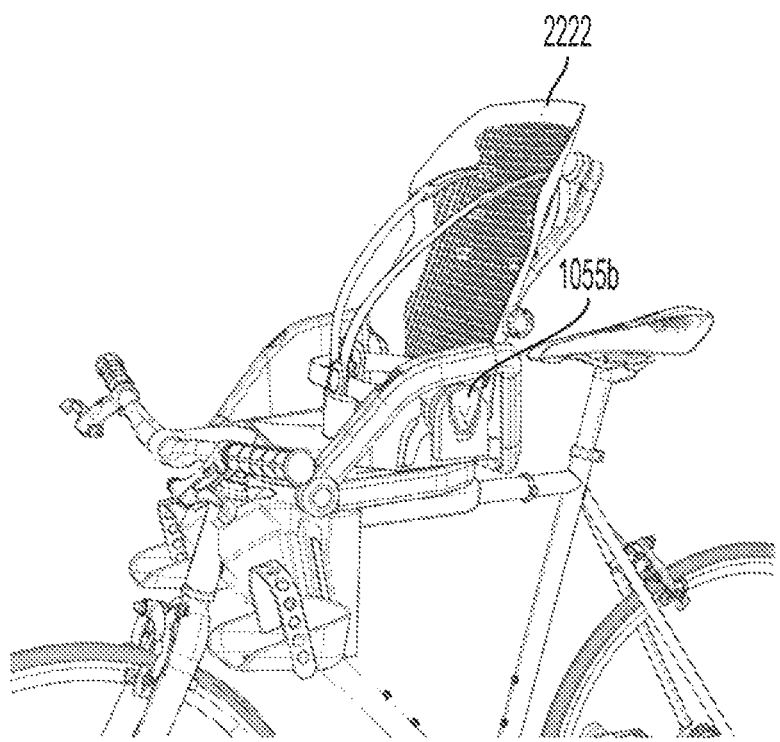
FIG. 46B depicts a seat coupled to the bicycle adapter, with the bicycle adapter coupled to the bicycle, according to aspects of the present disclosure.

FIG. 45A depicts a bicycle adapter 2100 according to an aspect of the present disclosure. The bicycle adapter 2100 may couple to a mounting rack 2102. As shown in FIG. 45A, the mounting rack 2102 may be coupled to a front region 1419 of the bicycle 1402. For example, as shown in FIG. 45A the mounting rack 2102 may include a frame 2106 that extends around a head tube or frame member 1423 of the bicycle 1402. The mounting rack 2102 may also couple to a crossbar 1421 of the bicycle 1402. In some aspects, the bicycle adapter 2100 may couple to the bicycle 1402 with different clamping or affixing assemblies or systems. The bicycle adapter 2100 may be coupled to the bicycle 1402 via bicycle mounting components on the bicycle adapter 2100 that secure to the mounting rack 2102. The bicycle adapter 2100 comprises foot guards 2108*a*, 2108*b*, a base 2110, a frame 2112, and mounting components 2114*a*, 2114*b*. In some aspects the bicycle mounting components may be positioned on an underside of the base 2110 of the bicycle adapter 2100, though in some aspects the bicycle mounting components may be positioned elsewhere. As shown in FIG. 45B, a seat, for example the mounting components 1054*a*, 1054*b* of the seat 1000 may couple to the mounting components 2114*a*, 2114*b* of the bicycle adapter 2100. The mounting components 2114*a*, 2114*b* and 1054*a*, 1054*b* may couple together via snap fit engagement or any suitable fastening or securing means that apply mechanical, electromechanical, piezoelectric, vacuum, magnetic, and/or friction force, such that the seat 1000 may easily be coupled to and removed from the bicycle adapter 2100. As described above with respect to FIG. 4B the seat 1000 may include actuators 1055*a*, 1055*b* that may independently or when activated together decouple or unlock the seat 1000 from the bicycle adapter 2100. The seat FIGS. 46A-B depicts a bicycle adapter 2200 according to an aspect of the present disclosure. As shown in FIG. 46A, the bicycle adapter 2200 may be coupled to a front region 1419 of the bicycle 1402. The bicycle adapter 2200 may couple to the bicycle 1402, for example by coupling to the crossbar 1421 of the bicycle 1402. The bicycle adapter 2200 may be coupled to the bicycle 1402 via bicycle mounting components on the bicycle adapter 2200 that secure to the bicycle. The bicycle adapter 2200 comprises foot guards 2208*a*, 2208*b*, a base 2210, a frame 2112, and mounting components 2214*a*, 2214*b*. In some aspects the bicycle mounting components may be positioned on an underside of the base 2210 of the bicycle adapter 2200, though in some aspects the bicycle mounting components may be positioned elsewhere. As shown in FIG. 46B, a seat, for example seat 2222 may couple to the mounting components 2214*a*, 2214*b* of the bicycle adapter 2200. The mounting components 2214*a*, 2214*b* may couple together with mounting components on the seat 2222 via snap fit engagement or any suitable fastening or securing means that apply mechanical, electromechanical, piezoelectric, vacuum, magnetic, and/or friction force, such that the seat 2222 may easily be coupled to and removed from the bicycle adapter 2200. The bicycle adapter 2200 may couple to the bicycle 1402 in the same manner as described above. The seat 2222 may include the same features of the seat 1000, for example, the seat 2222 may include actuators 1055*a*, 1055*b* that may independently or when activated together decouple or unlock the seat 2222 from the bicycle adapter 2200.

Figure 47A:
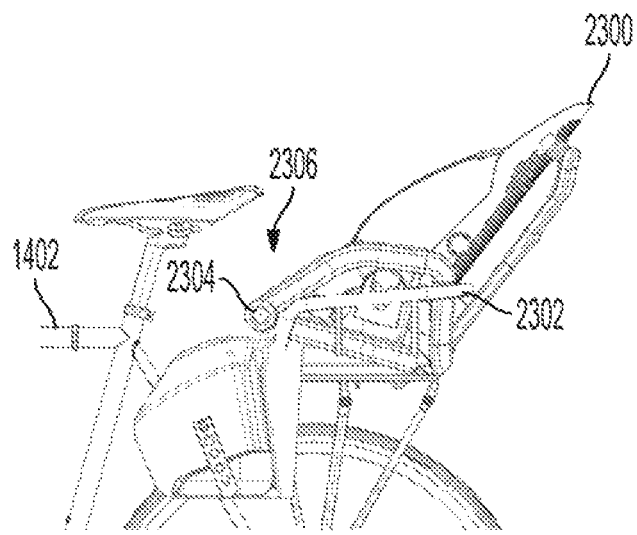
FIGS. 47A-47B depict a seat coupled to the bicycle adapter in a recline position, according to aspects of the present disclosure.
Figure 47B:
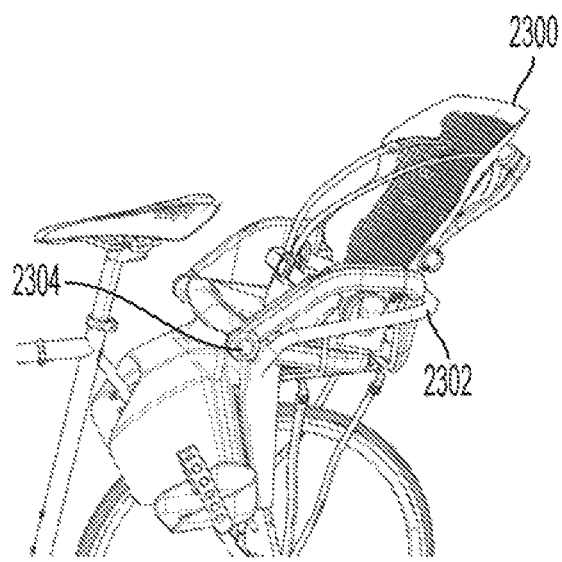

As shown in FIGS. 47A-B, in some aspects a seat, for example seat 2300, may be rotate relative to a bicycle adapter, for example bicycle adapter 2302, such that the seat 2300 may recline relative to the bicycle adapter 2302 (i.e. be positioned in at least one reclined position). In some aspects, the seat 2300 may be positionable in multiple varying reclined positions. FIGS. 47A-B depict the seat 2300 pivoting about a pivot point 2304 positioned in a front region 2306 of the seat 2300. The seat 2300 may rotate between an upright or initial position to a reclined position about the pivot point 2304. The seat 2300 may include the same features as the various seats described herein, including seats 1000, 1610, 1706, 1808, 1910, 2222 described above. Similarly, the bicycle adapter 2302 may include the same features and be coupled to the bicycle 1402 the same way as the various bicycle adapters described herein, including bicycle adapters 1400, 1450, 1500, 1600, 1700, 1800, 1900, 2000, 2100, 2200, described above. The seat 2300 may couple to the bicycle adapter 2302 in the same ways as the various seats and adapters described above.

Figure 48A:
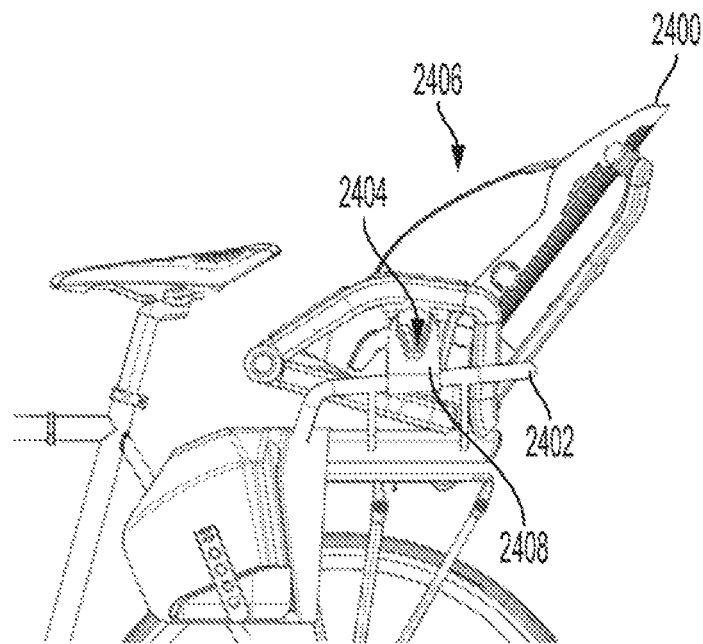
FIGS. 48A-48B depict a seat coupled to the bicycle adapter in a recline position, according to aspects of the present disclosure.
Figure 48B:
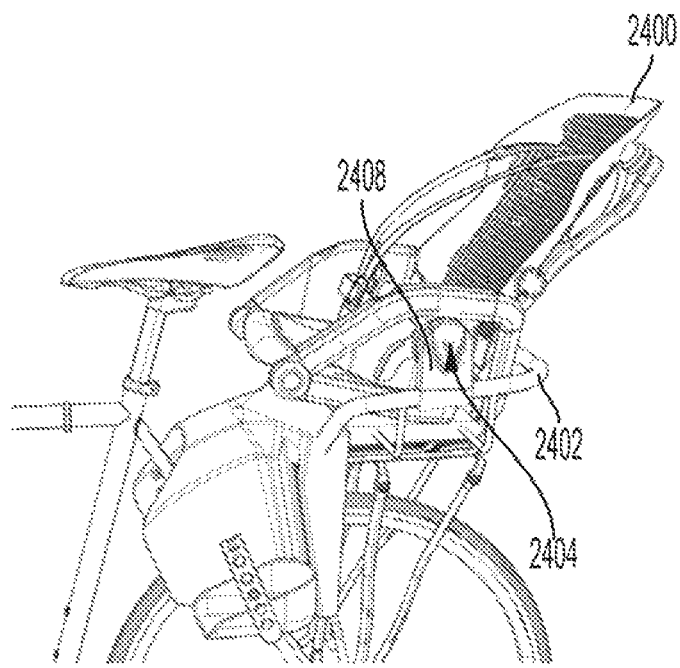

As shown in FIGS. 48A-B a seat 2400 may be rotate relative to a bicycle adapter 2402 such that the seat 2400 may recline relative to the bicycle adapter 2402 (i.e. be positioned in at least one reclined position). In some aspects, the seat 2400 may be positionable in multiple varying reclined positions. FIGS. 47A-B depict the seat 2400 pivoting about a pivot point 2404 positioned in a mid-region 2406 of the seat 2400. For example the seat 2400 may pivot about a hub assemblies 2408 of the seat 2400. The seat 2400 may rotate between an upright or initial position to a reclined position about the pivot point 2404. The seat 2400 may include the same features as the various seats described herein, including seats 1000, 1610, 1706, 1808, 1910, 2222, 2300, described above. Similarly, the bicycle adapter 2402 may include the same features and be coupled to the bicycle 1402 the same way as the various bicycle adapters described herein, including bicycle adapters 1400, 1450, 1500, 1600, 1700, 1800, 1900, 2000, 2100, 2200, 2302 described above. The seat 2400 may couple to the bicycle adapter 2402 in the same ways as the various seats and adapters described above.

Figure 49A:
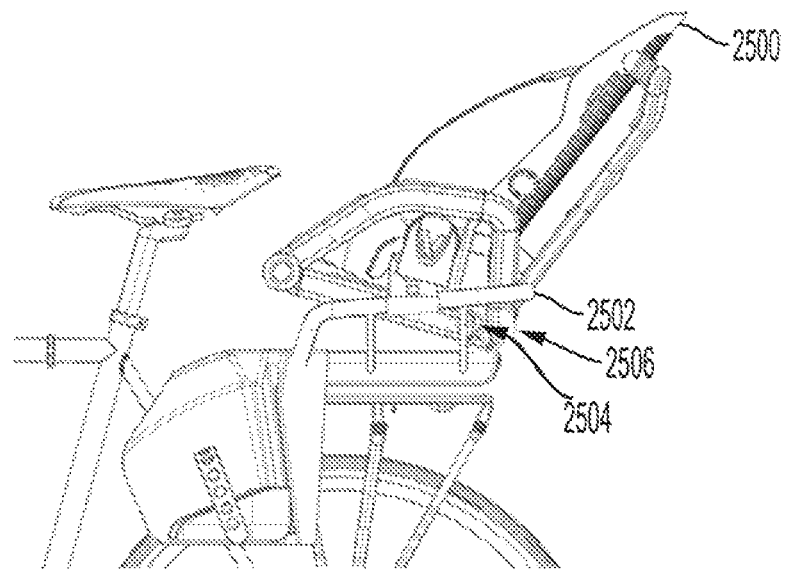
FIGS. 49A-49B depict a seat coupled to the bicycle adapter in a recline position, according to aspects of the present disclosure.
Figure 49B:
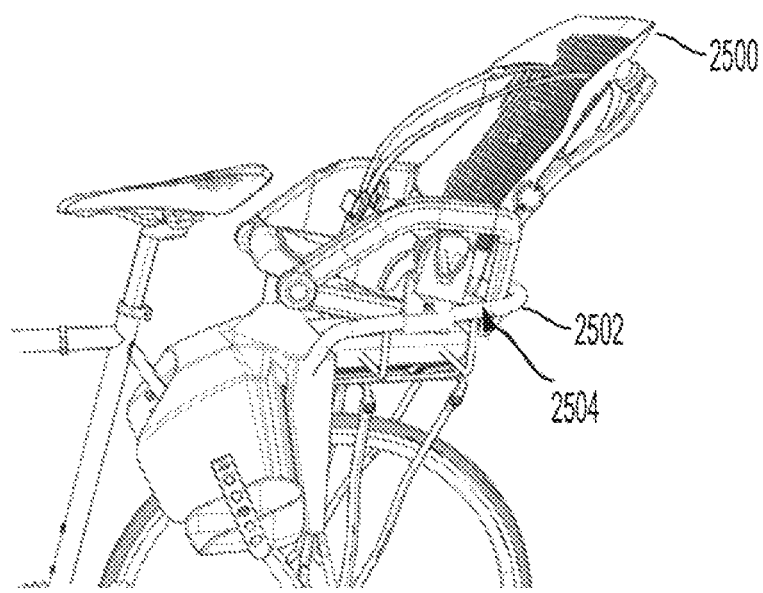

As shown in FIGS. 49A-B a seat 2500 may be rotate relative to a bicycle adapter 2502 such that the seat 2500 may recline relative to the bicycle adapter 2502 (i.e. be positioned in at least one reclined position). In some aspects, the seat 2500 may be positionable in multiple varying reclined positions. FIGS. 49A-B depict the seat 2500 pivoting about a pivot point 2504 positioned in a rear-region 2506 of the seat 2500. The seat 2500 may rotate between an upright or initial position to a reclined position about the pivot point 2504. The seat 2500 may include the same features as the various seats described herein, including seats 1000, 1610, 1706, 1808, 1910, 2222, 2300, 2400, described above. Similarly, the bicycle adapter 2502 may include the same features and be coupled to the bicycle 1402 the same way as the various bicycle adapters described herein, including bicycle adapters 1400, 1450, 1500, 1600, 1700, 1800, 1900, 2000, 2100, 2200, 2302, 2402, described above. The seat 2500 may couple to the bicycle adapter 2502 in the same ways as the various seats and adapters described above.

Figure 50A:
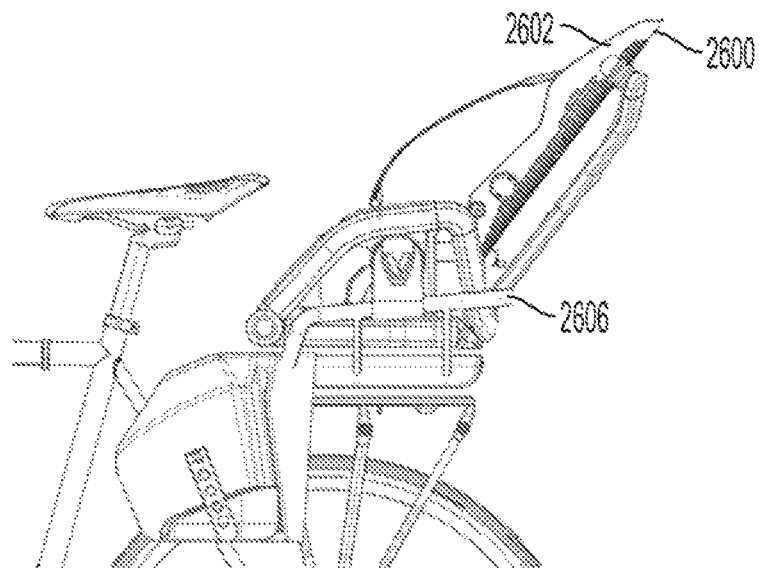
FIGS. 50A-50B depict a seat coupled to the bicycle adapter in a recline position, according to aspects of the present disclosure.
Figure 50B:
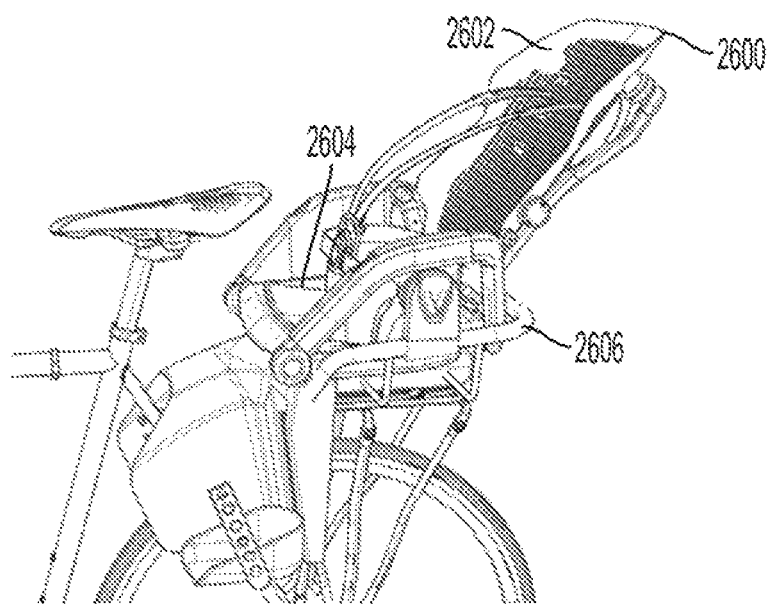

As shown in FIGS. 50A-B a seat 2600 may recline by rotating a back support 2602 of the seat 2600 in a backwards direction from an upright position to a reclined position. In such an example, the back support 2602 may rotate relative to a seat pan 2604 so provide for the reclined position. Thus, the seat 2600 may have an upright position and one or more reclined positions while coupled to a bicycle adapter 2606. The seat 2600 may include the same features as the various seats described herein, including seats 1000, 1610, 1706, 1808, 1910, 2222, 2300, 2400, 2500 described above. Similarly, the bicycle adapter 2606 may include the same features and be coupled to the bicycle 1402 the same way as the various bicycle adapters described herein, including bicycle adapters 1400, 1450, 1500, 1600, 1700, 1800, 1900, 2000, 2100, 2200, 2302, 2402, 2502 described above. The seat 2600 may couple to the bicycle adapter 2606 in the same ways as the various seats and adapters described above.

Exemplary Non-Limiting Wagon and Wagon Adapter Embodiments

Figure 52:
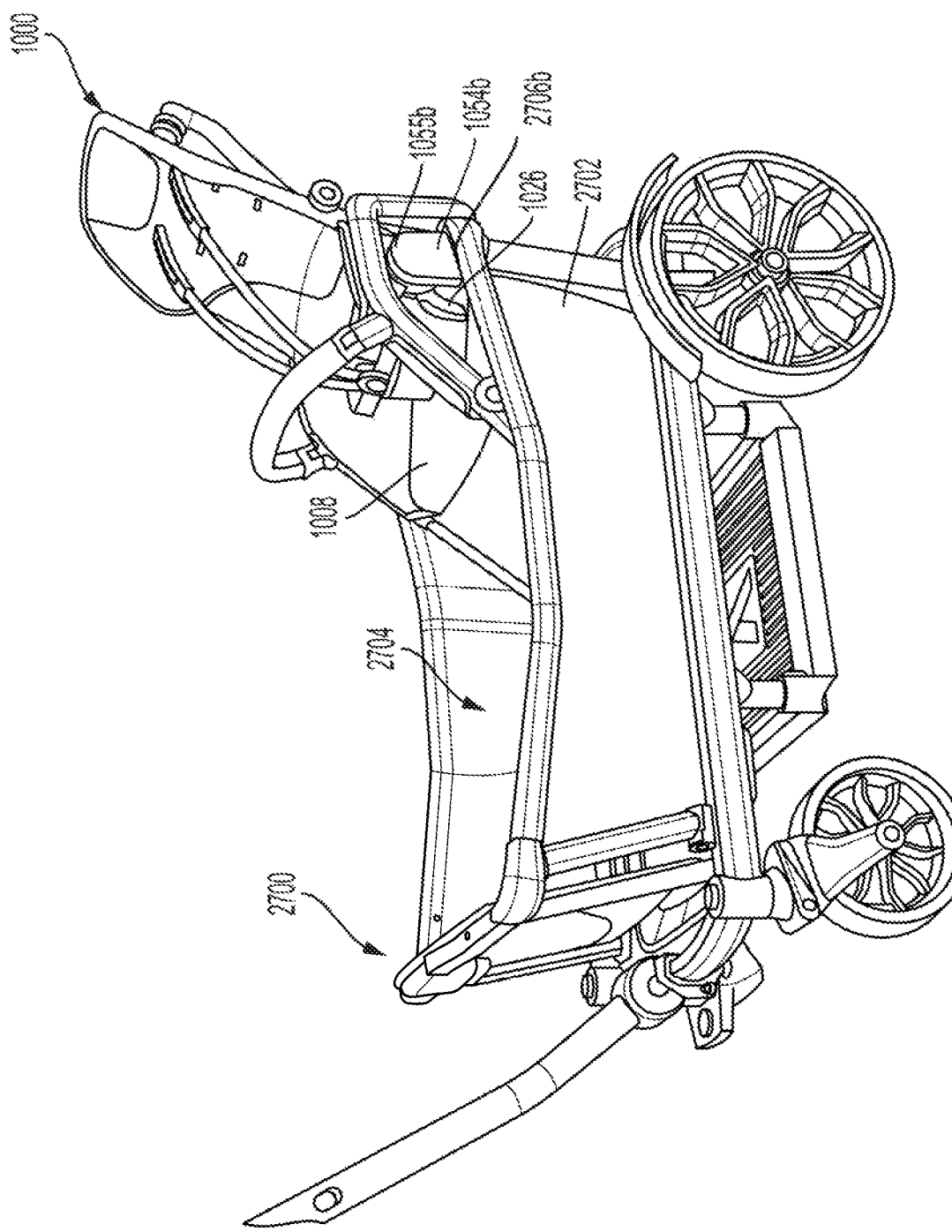
FIG. 52 depict a system including a seat coupled to a wagon assembly, according to aspects of the present disclosure.

FIG. 52 depicts a seat, for example seat 1000, coupled to a wagon 2700. The wagon 2700 may include one or more walls 2702 that define a container 2704 that may receive children or items. The seat 1000 may couple to the wagon 2700 via the mounting components 1054a, 1054b. The mounting components 1054a, 1054c may couple to receiving components (not visible in FIG. 52) via snap fit engagement or any suitable fastening or securing means that apply mechanical, electromechanical, piezoelectric, vacuum, magnetic, and/or friction force. In some aspects of the present disclosure the receiving components may be positioned on an adapter that may be coupled to the wagon 2700. For example, the seat 1000 may couple to an adapter that couples to the wagon 2700 as described in U.S. Pat. No. 10,077,062, the contents of which are hereby incorporated by reference. For example, the adapter may be coupled to the wagon 2700 via clamping, clipping, or any other suitable fastening or securing means that apply mechanical, electromechanical, piezoelectric, vacuum, magnetic, and/or friction force.

Figure 53C:
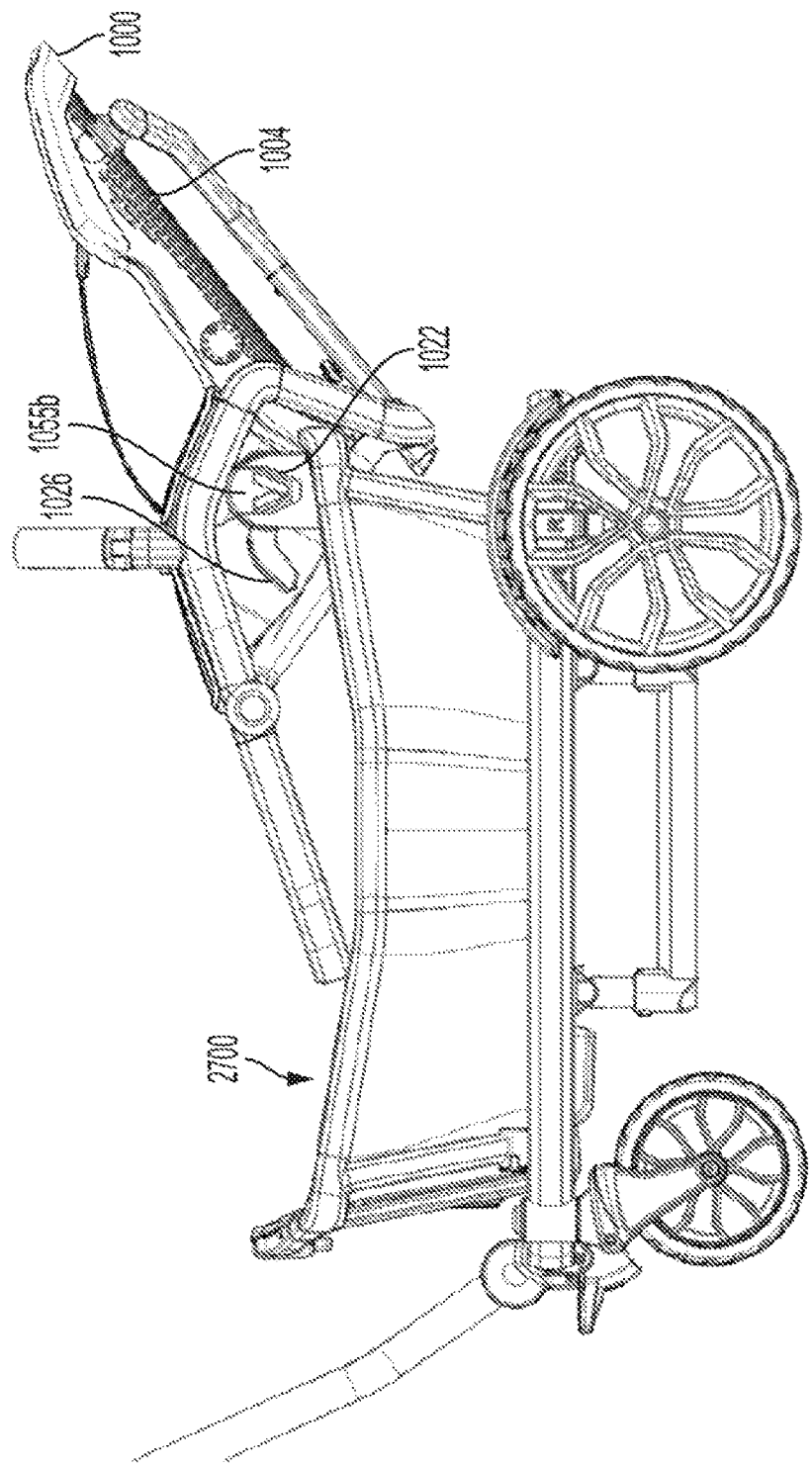

FIGS. 53A-C depict the seat 1000 coupled to the wagon 2700 in various positions. For example, FIG. 53A depicts the seat 1000 in an upright position in which the seat 1000 is positioned generally upright. FIG. 53B depicts the seat 1000 in a first reclined position in which the seat 1000 reclines in a rearward direction. FIG. 53C depicts the seat 1000 in a second position in which the seat 1000 is reclined further in the rearward direction. The seat 1000 may recline via the mounting components 1054a, 1054b, via the hub assemblies 1022, or via other suitable assemblies or features of the seat 1000 and/or the wagon 2700. In some aspects, the seat 1000 may recline by the back support 1004 reclining relative to the seat pan 1008. The seat 1000 may be moved between the upright and the one or more reclined positions by actuating the actuator 1026 of the hub assembly 1022. The actuator 1026 may thereby actuate between a locked and an unlocked position for controlling the recline of the back support 1004 relative to the seat pan 1008. In some aspects, the actuator 1026 may also lock or unlock the seat 1000 from the wagon 2700 for removal of the seat 1000 from the wagon 2700. In some aspects, a different actuator may control the locking or securing of the seat 1000 to the wagon 2700 and the position of the seat 1000 (i.e. move the seat 1000 between the upright and the one or more reclined positions). For example, the actuators 1055a, 1055b may be actuated to unlock the mounting components 1054a, 1054b from the receiving components 2706a, 2706b of the wagon 2700 to unlock the seat 1000 from the wagon 2700. In still yet other aspects, one or more additional actuators on either the wagon 2700 or the seat 1000 may actuate between a locked and an unlocked position to control coupling between the mounting components 1054a, 1054b and the receiving components 2706a, 2706b.

Exemplary Non-Limiting Booster Seat Embodiments

Figures 54A, 54B:
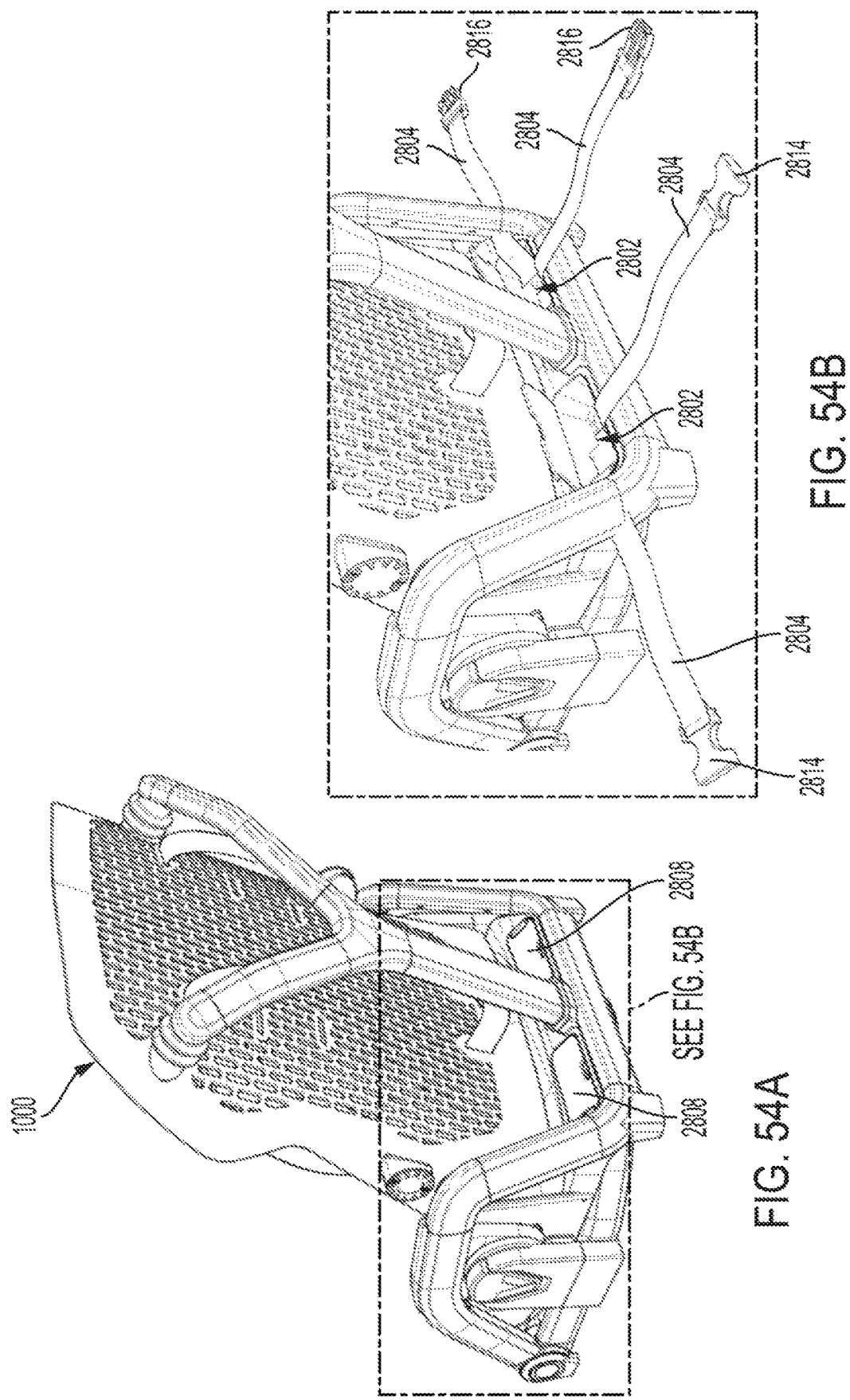
FIGS. 54A-54B depict a system including the seat and a harness assembly, according to aspects of the present disclosure.
Figure 55:
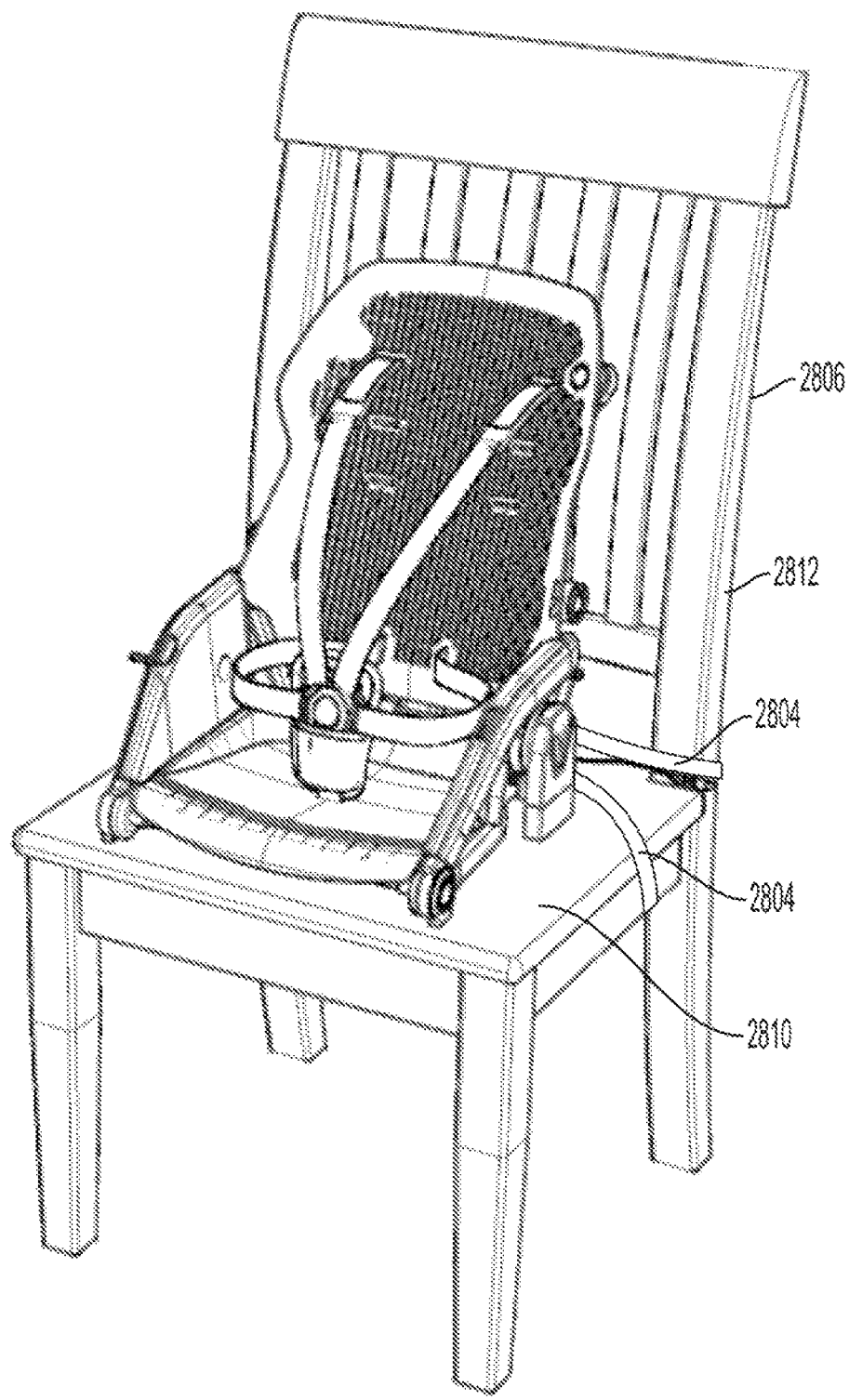
FIG. 55 depict the coupled to a chair via the harness assembly, according to aspects of the present disclosure.
Figure 56A:
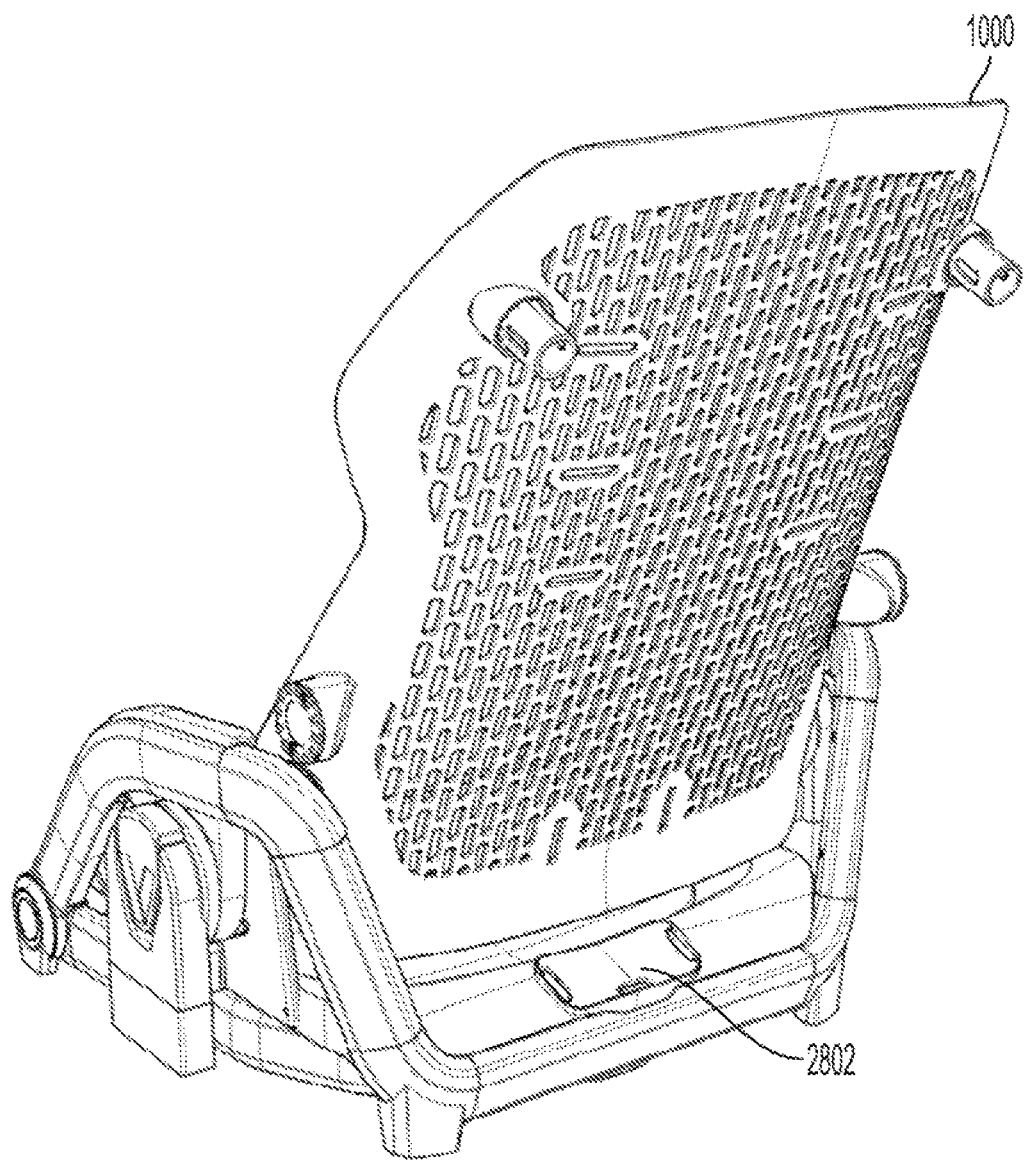
FIGS. 56A-56B depict a system including the seat and a harness assembly, according to aspects of the present disclosure.
Figure 56B:
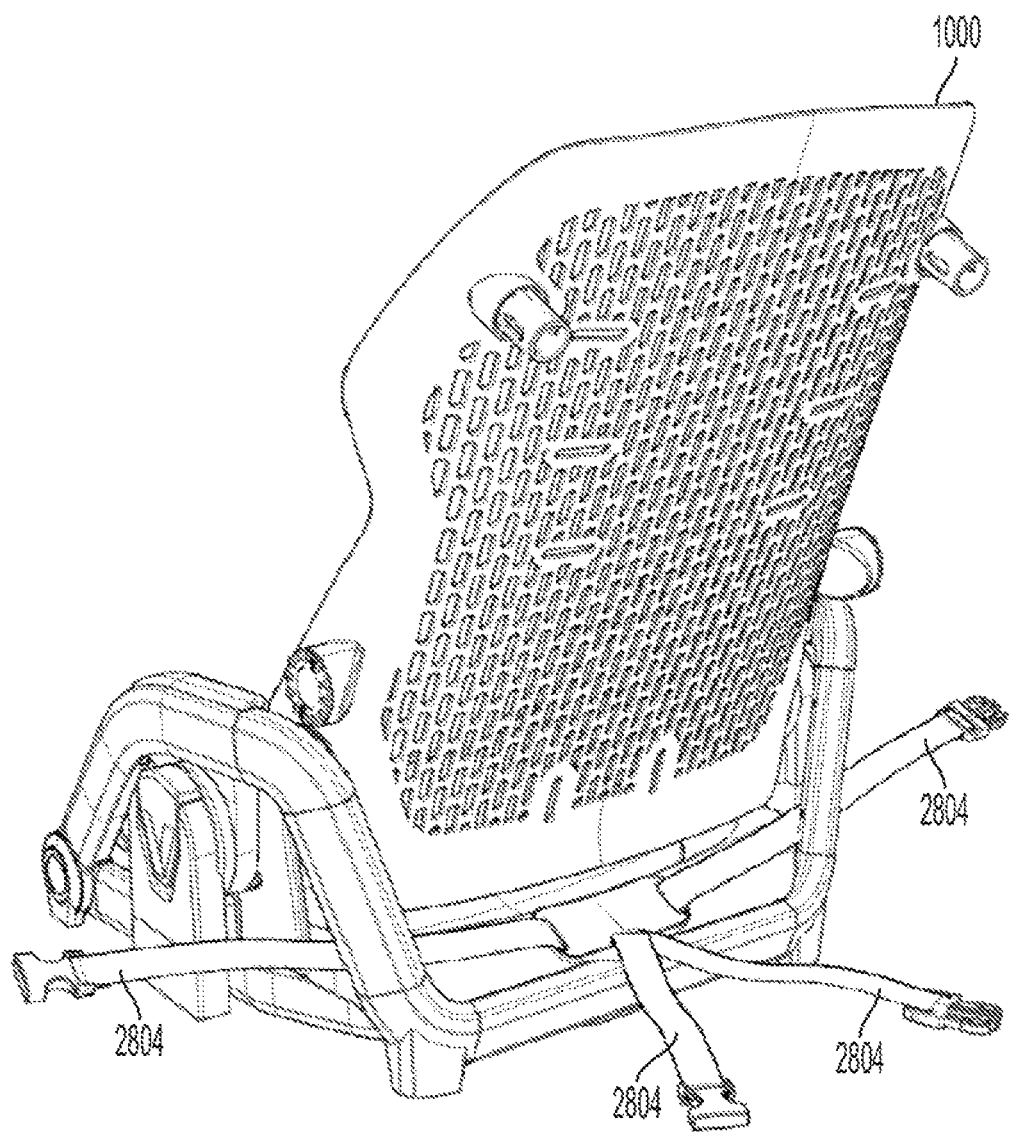

A seat according to aspects of the present disclosure, for example seat 1000, may be convertible to a booster seat for use on a dining chair for feeding an infant or child. FIGS. 54A-B depict an aspect of the present disclosure in which the seat 1000 includes one or more compartments 2802 which may house harness elements 2804 for securing the seat 1000 to a dining chair 2806, as shown in FIG. 55. The compartments 2802 may include covers 2808 that may retain the harness elements 2804 within the compartments 2802 when the seat 1000 is not in use as a booster seat, as shown in FIG. 54A. Though FIGS. 54A-B depict two compartments 2802, in some aspects a single compartment may be used, for example as shown in FIGS. 56A-B. When the seat 1000 is to be converted for use as a booster seat, the harness elements 2804 may be extended out of the compartments 2802, as shown in FIG. 54B. The harness elements 2804 may be permanently coupled to the seat 1000 within the compartments 2802 or may be removably coupled to the seat 1000, for example via snap fit engagement or any suitable fastening or securing means. In some aspects, the harness elements 2804 may be made of a washable material (i.e. nylon, cotton, polyester, etc.) or a wipeable material (i.e. a plastic, rubber, or otherwise wipeable material).

As shown in FIG. 55, the seat 1000 may secure to the dining chair 2806 in any suitable means using the harness elements 2804, including but not limited to by securing a pair of harness elements 2804 together around the seat base 2810 of the dining chair 2806 and securing another pair of harness elements 2804 together around a seat back 2812 of the dining chair 2806. The harness elements 2804 may include mating components that may mate via snap fit engagement or any other suitable fastening or securing means. For example, as shown in FIG. 54B, the harness elements 2804 may include a side release buckle having a frame member 2814 or a prong member 2816 that snap fit or couple together to secure pairs of the harness elements 2804 together about the dining chair 2806.

FIGS. 57A-B depict an aspect of the present disclosure in which the seat 1000 includes harness elements 2850 which may removably couple to the seat 1000. As shown in FIG. 57A, the harness elements 2850 may include coupling elements 2852 that may removably couple to receiving components 2854 on the seat 1000. FIGS. 57A-B depict the coupling elements 2852 as hook or clip elements and the receiving components 2854 as openings or recesses that the hook or clip elements may couple to. When not in use as a booster seat, the harness elements 2850 may be stored separate from the seat 1000. The harness elements 2850 may also be washed or cleaned when decoupled from the seat 1000. FIG. 57B depicts the harness elements 2850 coupled to the seat 1000. The seat 1000 may be secured to a dining chair via the harness elements 2850 as shown in FIG. 55. In some aspects, the harness elements 2850 may be separate elements or may be a single unitary assembly. In some aspects, the harness elements 2850 may removably or permanently connect to the seat 1000 in one or more locations.

Exemplary Non-Limiting Chair and High Chair Embodiments

Figure 58:
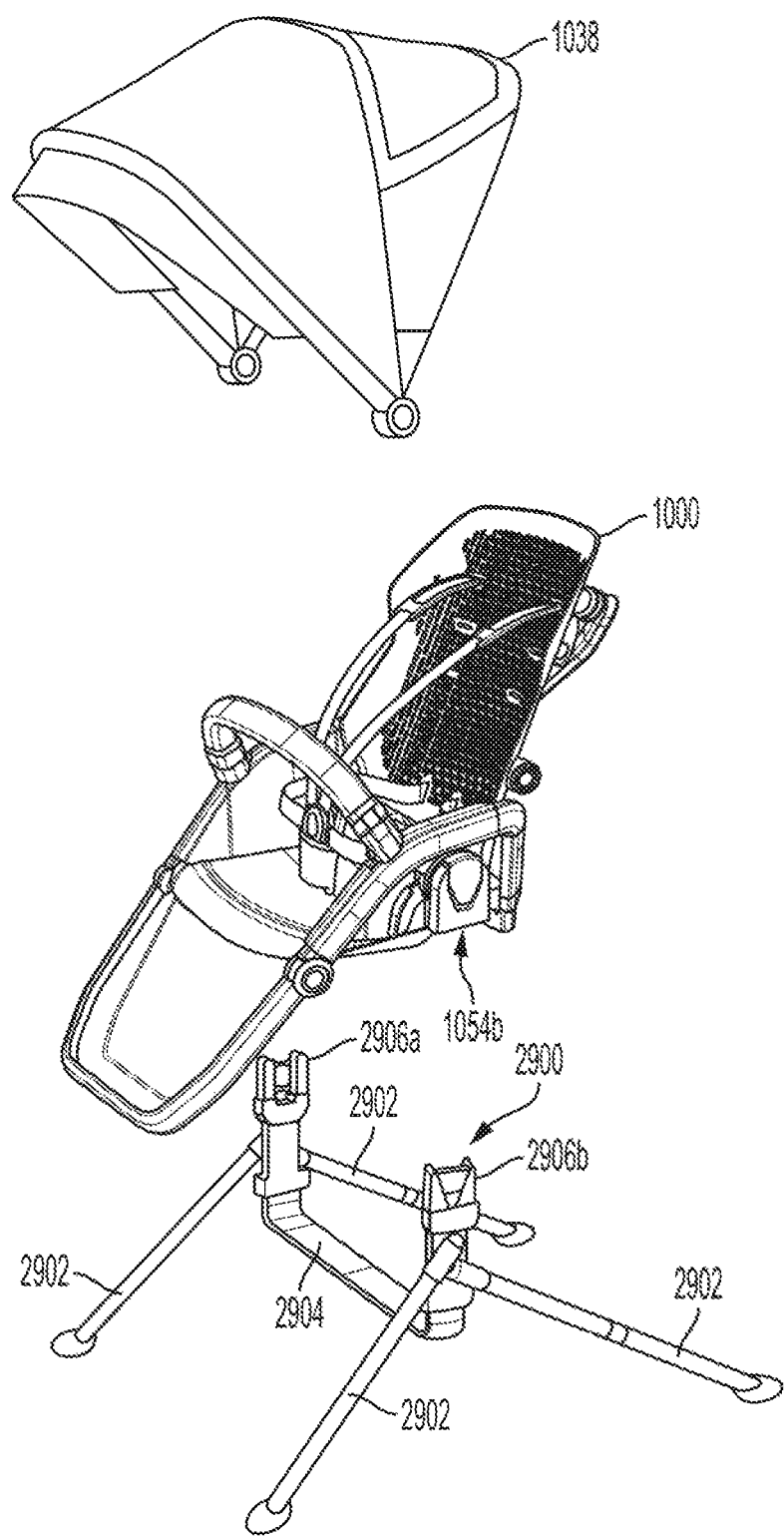
FIG. 58 depicts a system including the seat and a chair assembly, according to aspects of the present disclosure.
Figure 59:
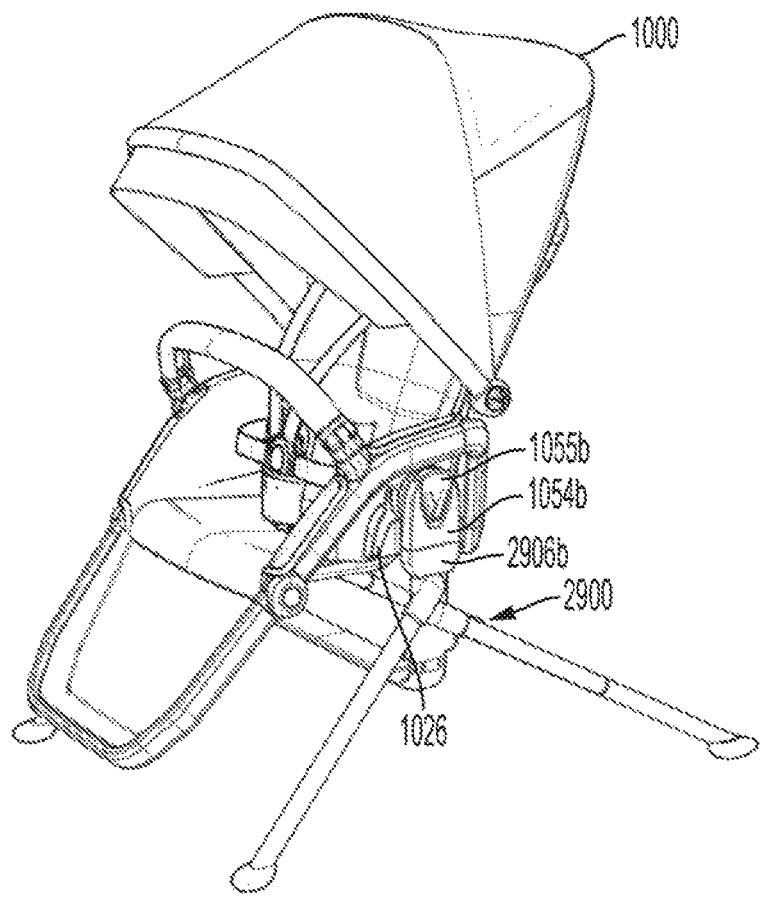
FIG. 59 depicts the system of the seat coupled to the chair assembly, according to aspects of the present disclosure.

Aspects of the present disclosure include a seat, for example seat 1000, that may be removably coupled (indirectly or directly) to various assemblies or convertible to various uses. As shown in FIG. 58, according to aspects of the present disclosure, the seat 1000 may be coupled to a chair assembly 2900 for converting the seat 1000 to a camping seat or outdoor chair. The chair assembly 2900 may include legs 2902, a base 2904, and coupling components 2906*a*, 2906*b*. The base 2904 may provide lateral stability when the seat 1000 is coupled to the chair assembly 2900. The coupling components 2906*a*, 2906*b* may be sized and shaped to couple with mounting components 1054*a*, 1054*b* of the seat 1000. The mounting components 1054*a*, 1054*b* may couple to coupling components 2906*a*, 2906*b* via snap fit engagement or any suitable fastening or securing means that apply mechanical, electromechanical, piezoelectric, vacuum, magnetic, and/or friction force. The seat 1000 coupled to the chair assembly 2900 for converting to an outdoor chair is shown in FIG. 59 (shown with the canopy 1038 coupled to the seat 1000). The seat 1000 may be decoupled from the chair assembly 2900 by actuating an actuator from a locked to an unlocked position, for example the actuators 1055*a*, 1055*b*. In some aspects, a different actuator, for example but not limited to the actuator 1026 or the release button 1024. In some aspects one or additional actuators positioned on either the seat 1000 or the chair assembly 2900 may be actuated to unlock the mounting components 1054*a*, 1054*b* from the coupling components 2906*a*, 2906*b* of the chair assembly 2900 to unlock the seat 1000 from the chair assembly 2900.

Figure 60A:
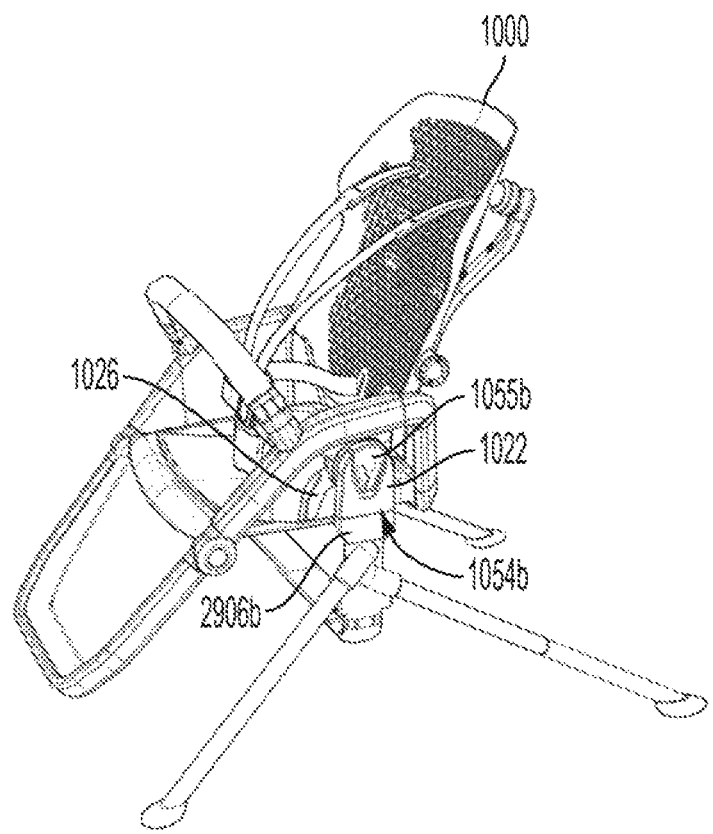
FIGS. 60A-60C depict the seat in various reclined positions relative to the, according to aspects of the present disclosure.
Figure 60B:
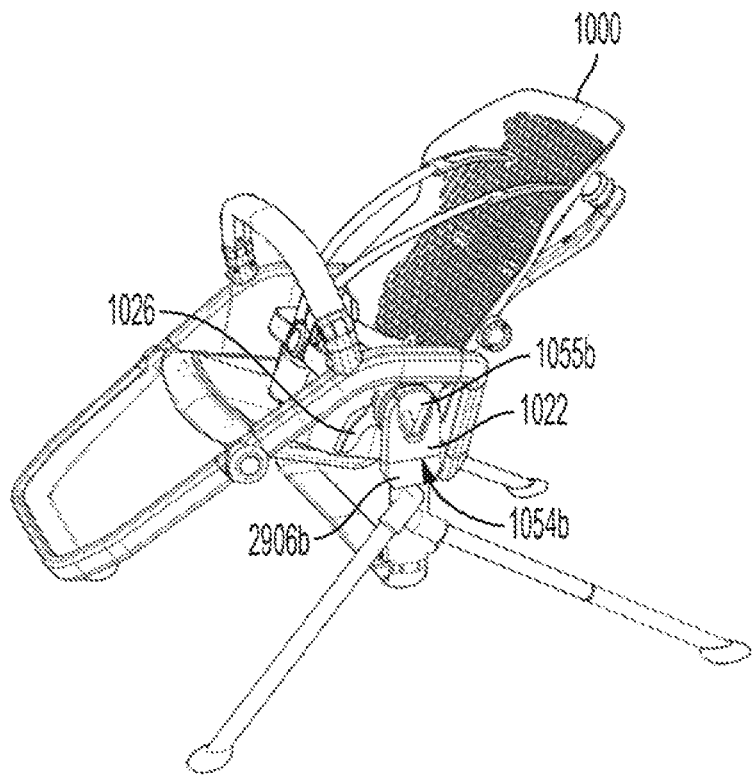
Figure 60C:
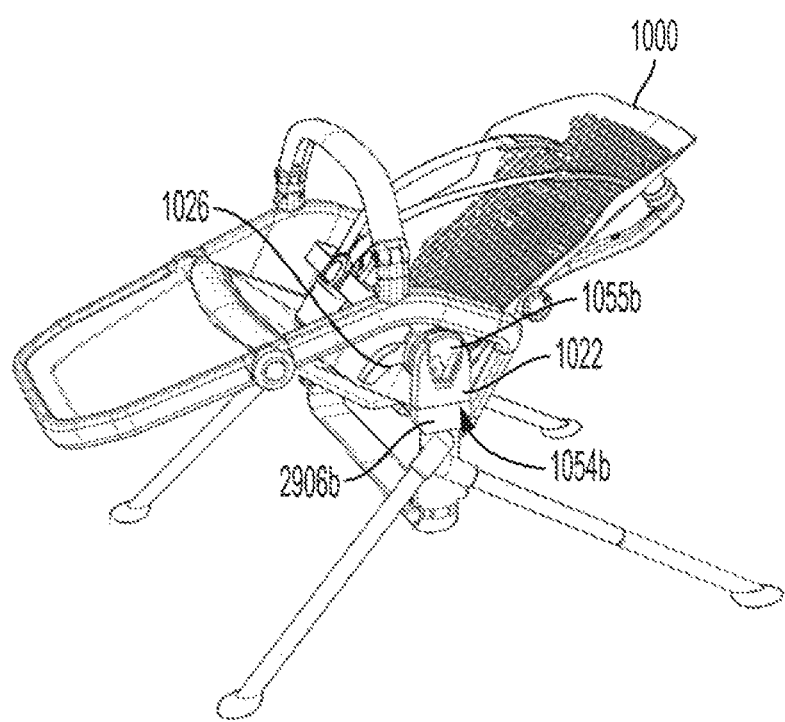
Figure 61:
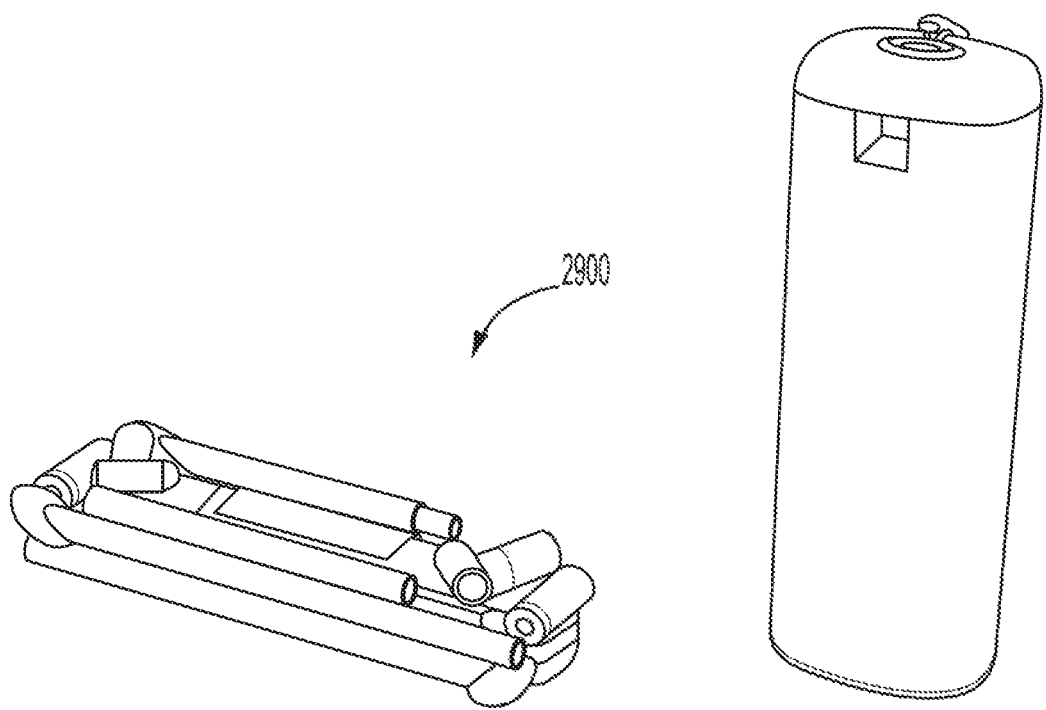
FIG. 61 depict the chair assembly in a storage position, according to aspects of the present disclosure.

The seat 1000 may rotate or recline when coupled to the chair assembly 2900 as shown in FIGS. 60A-B. For example, FIG. 60A depicts the seat 1000 in an upright position in which the seat 1000 is positioned generally upright. FIG. 60B depicts the seat 1000 in a first reclined position in which the seat 1000 reclines in a rearward direction. FIG. 60C depicts the seat 1000 in a second reclined position in which the seat 1000 is reclined further in the rearward direction. The seat 1000 may recline via the mounting components 1054*a*, 1054*b*, via the hub assemblies 1022, or via other suitable assemblies or features of the seat 1000 and/or chair assembly 2900. The seat 1000 may be moved between the upright and the one or more reclined positions by actuating the actuator 1026 of the hub assembly 1022 and applying a force to the seat 1000. The actuator 1026 may thereby lock or unlock the seat 1000 for reclining purpose. In some aspects, the actuator 1026 may also lock or unlock the seat 1000 from the chair assembly 2900 for removal of the seat 1000 from the chair assembly 2900. In some aspects, a different actuator may control the locking or securing of the seat 1000 to the chair assembly 2900 and the position of the seat 1000 (i.e. move the seat 1000 between the upright and the one or more reclined positions). For example, the actuators 1055*a*, 1055*b* may be actuated to unlock the mounting components 1054*a*, 1054*b* from the coupling components 2906*a*, 2906*b* of the chair assembly 2900 to unlock the seat 1000 from the chair assembly 2900. In still yet other aspects, one or more additional actuators on either the chair assembly 2900 or the seat 1000 may decouple or unlock the mounting components 1054*a*, 1054*b* from the coupling components 2906*a*, 2906*b*. As shown in FIG. 61, the chair assembly 2900 may be folded into a storage position and may be stored in a storage bag 2908.

Figure 62B:
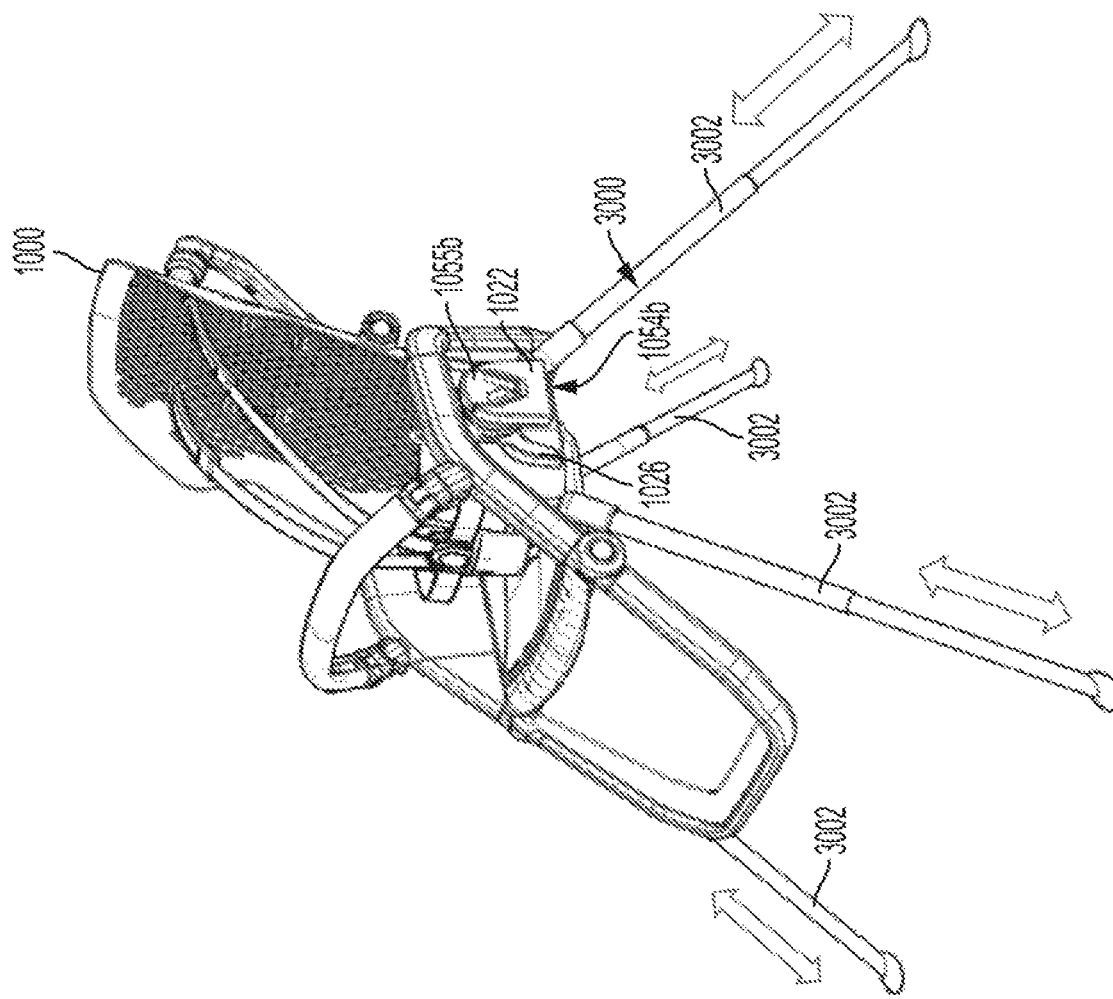
FIGS. 62A-62B depict a system including the seat and a chair assembly at various heights, according to aspects of the present disclosure.
Figure 62A:
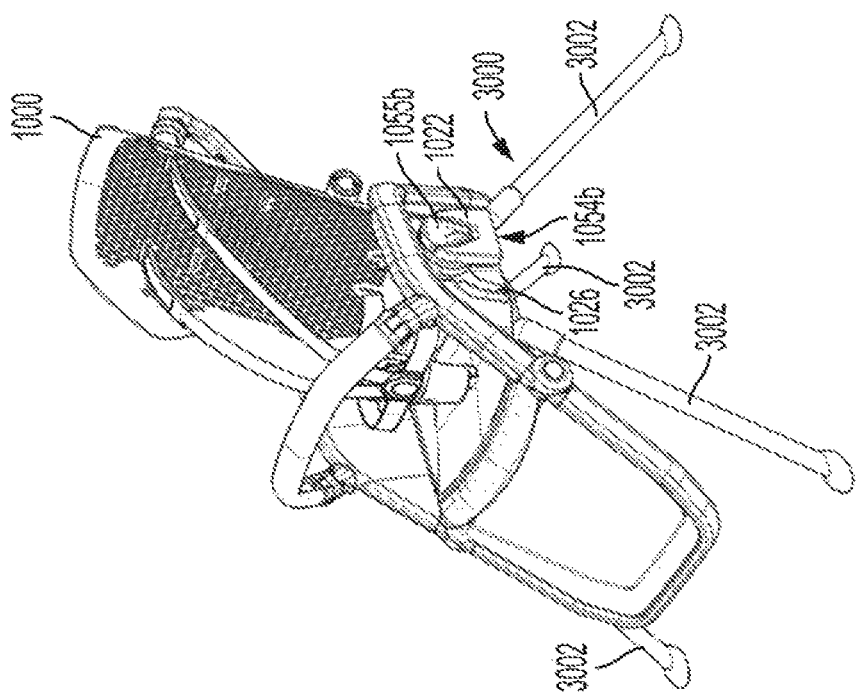

As shown in FIG. 62A, according to aspects of the present disclosure, a seat, for example the seat 1000, may be coupled to a chair assembly 3000 for converting the seat 1000 to a camping seat or outdoor chair. The chair assembly 3000 may include legs 3002 and coupling components (not visible in FIG. 62A). In some aspects, the coupling components or other features of the chair assembly 3000 may be sized and shaped to couple with mounting components 1054*a*, 1054*b* of the seat 1000. In some aspects, as shown in FIG. 62, the coupling components of the chair assembly 3000 may be tubes that may couple to slots or other openings on the seat 1000 sized to receive the coupling components The seat 1000 may couple to coupling components of the chair assembly 3000 via snap fit engagement or any suitable fastening or securing means that apply mechanical, electromechanical, piezoelectric, vacuum, magnetic, and/or friction force.

In some aspects, the seat 1000 may rotate or recline when coupled to the chair assembly 3000. For example, the seat 1000 may rotate between an upright position in which the seat 1000 is positioned generally upright and one or more reclined positions in which the seat 1000 reclines in a rearward direction. The seat 1000 may recline via the mounting components 1054*a*, 1054*b*, via the hub assemblies 1022, or via other suitable assemblies or features of the seat 1000 and/or chair assembly 3000. The seat 1000 may be moved between the upright and the one or more reclined positions by actuating the actuator 1026 of the hub assembly 1022 and applying a force to the seat 1000. The actuator 1026 may thereby lock or unlock the seat 1000 for reclining purpose. In some aspects, the actuator 1026 may also lock or unlock the seat 1000 from the chair assembly 3000 for removal of the seat 1000 from the chair assembly 2900. In some aspects, a different actuator may control the locking or securing of the seat 1000 to the chair assembly 3000 and the position of the seat 1000 (i.e. move the seat 1000 between the upright and the one or more reclined positions). For example, the actuators 1055*a*, 1055*b* may be actuated to unlock the mounting components 1054*a*, 1054*b* from the coupling components 3004*a*, 3004*b* of the chair assembly 3000 to unlock the seat 1000 from the chair assembly 3000. In still yet other aspects, one or more additional actuators on either the chair assembly 2900 or the seat 1000 may decouple or unlock the mounting components 1054*a*, 1054*b* from the coupling components 3000*a*, 3000*b*.

As shown in FIG. 62B, the legs 3002 may be extendable between one or more lengths for altering a height at which the seat 1000 sits when coupled to the chair assembly 3000. In some aspects, the legs 3002 may telescopically extend and retract to change the length of the legs 3002. In other aspects the legs 3002 may be removable from the chair assembly 3000 and different legs having a different length may be coupled to the chair assembly 3000. In still yet other aspects another chair assembly may have legs of a different length. In aspects in which the legs 3002 of the chair assembly 3000 are a sufficient length the seat 1000 when coupled to the chair assembly 3000 may act as a high chair for feeding an infant or child.

Figure 63A:
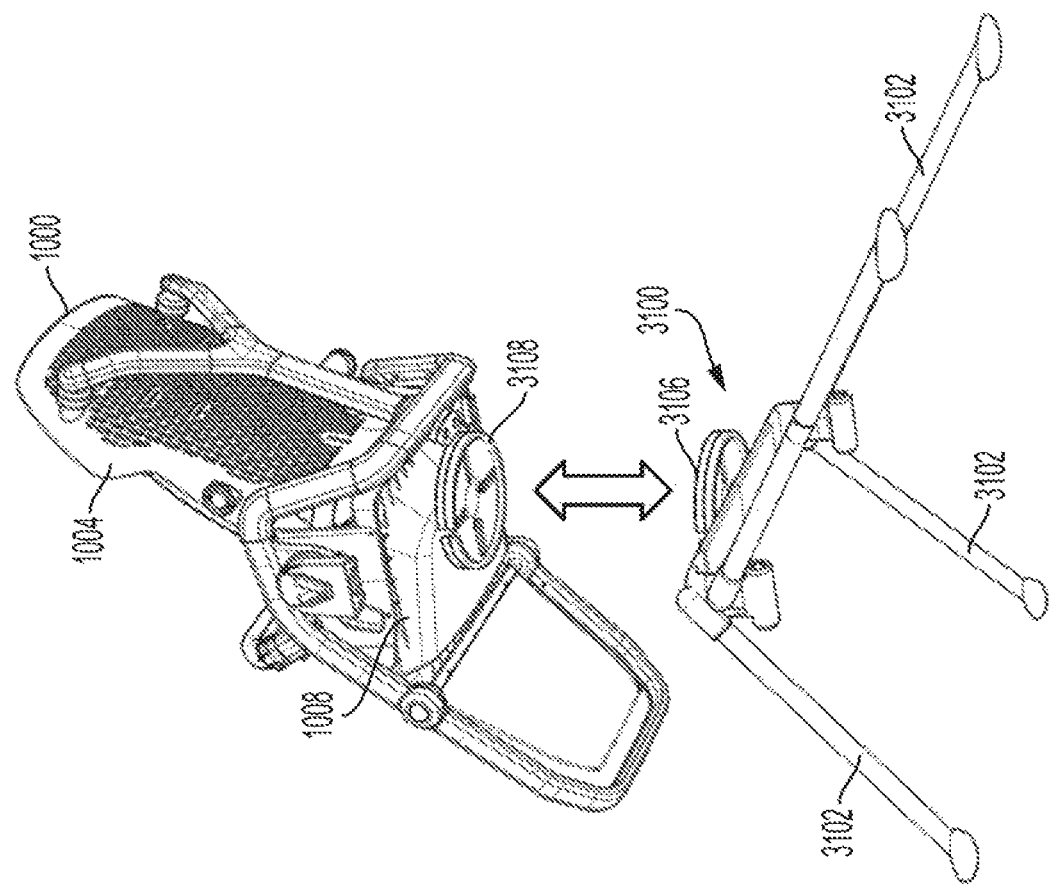
FIGS. 63A-63B depict a system including the seat and a chair assembly, according to aspects of the present disclosure.
Figure 63B:
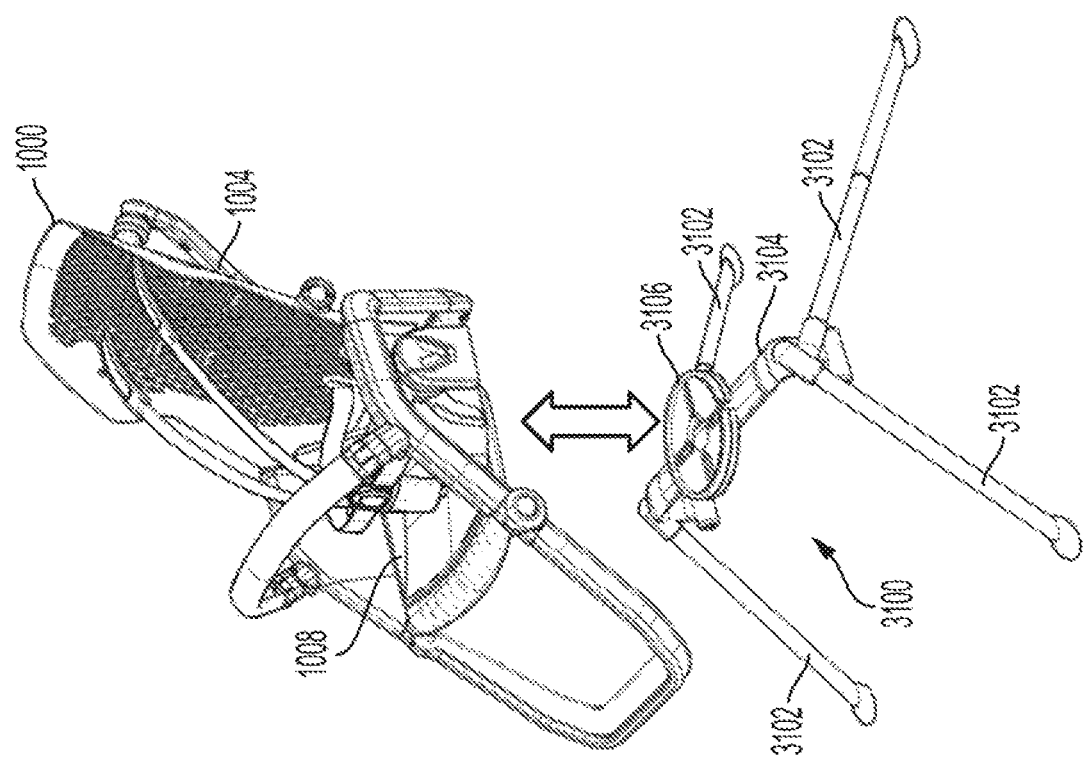

As shown in FIGS. 63A-B, according to aspects of the present disclosure, the seat 1000 may be coupled to a chair assembly 3100 for converting the seat 1000 to a camping seat or outdoor chair. The chair assembly 3100 may include legs 3102, a frame member 3104, and a coupling component 3106, shown in FIGS. 63A-B as a locking ring or plate that mechanically connects or couples to a corresponding locking ring or plate 3108 on the seat 1000. The coupling component 3106 in some aspects may be another generally centered mechanical attachment. In some aspects, the seat 1000 may couple to the chair assembly 3100 may couple to together via snap fit engagement or any suitable fastening or securing means that apply mechanical, electromechanical, piezoelectric, vacuum, magnetic, and/or friction force. The seat 1000 may recline when coupled to the chair assembly 3100, for example by the back support 1004 reclining relative to the seat pan 1008. The seat 1000 may couple to the chair assembly 3100 in the same way as described with respect to chair assemblies 2900 and 3000.

Figure 64B:
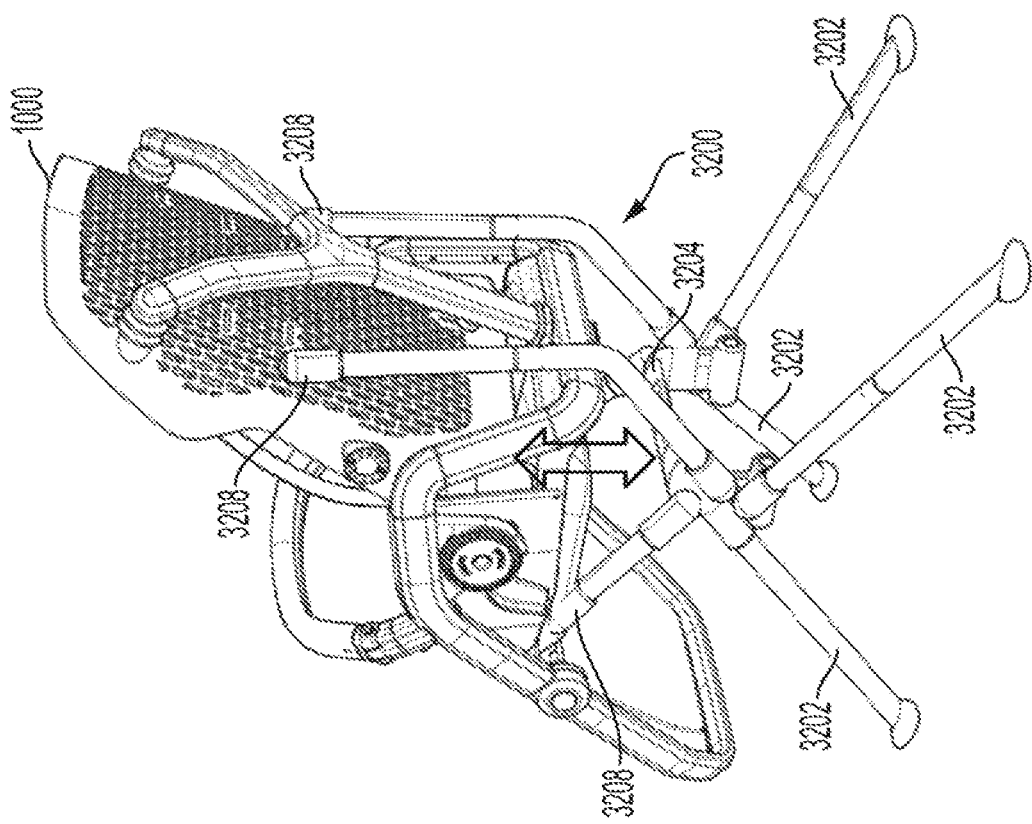
FIGS. 64A-64B depict a system including the seat and a chair assembly, according to aspects of the present disclosure.
Figure 64A:
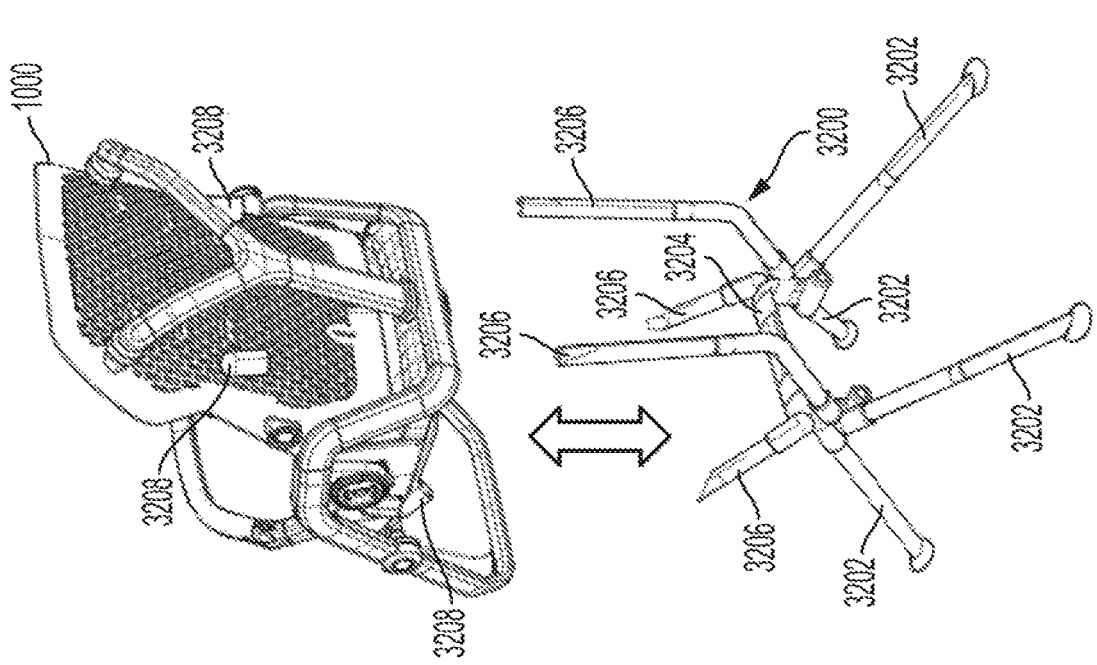

As shown in FIGS. 64A-B, according to aspects of the present disclosure, the seat 1000 may be coupled to a chair assembly 3200 for converting the seat 1000 to a camping seat or outdoor chair. The chair assembly 3200 may include legs 3102, a frame member 3204, and coupling components 3206. As shown in FIGS. 64A-B the coupling components 3206 may be projections or rods that may be sized and shaped to fit within housings 3208 on the seat 1000 (as shown in FIG. 64B). In some aspects, a chair assembly may include a rocking chair assembly or glider chair assembly that may couple to a seat (e.g. seat 1000) for rocking or gliding of the seat. In some aspects, the coupling components 3206 may couple to the housings 3208 via snap fit engagement or any suitable fastening or securing means that apply mechanical, electromechanical, piezoelectric, vacuum, magnetic, and/or friction force.

Exemplary Non-Limiting Picnic/Stadium Seat Embodiments

Figure 65A:
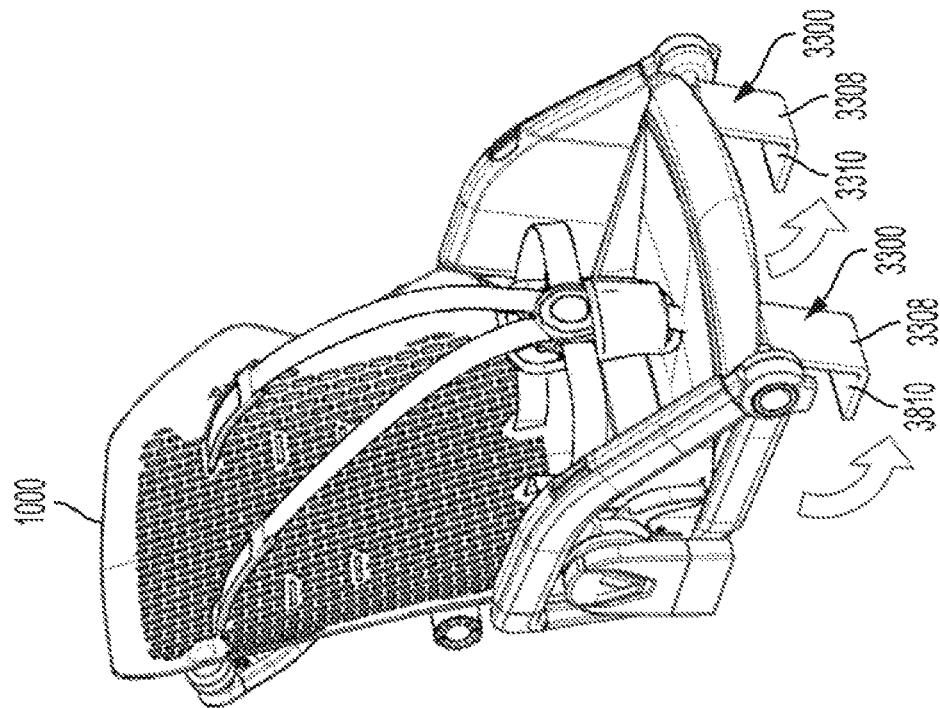
FIGS. 65A-65B depict the seat including coupling elements, according to aspects of the present disclosure.
Figure 65B:
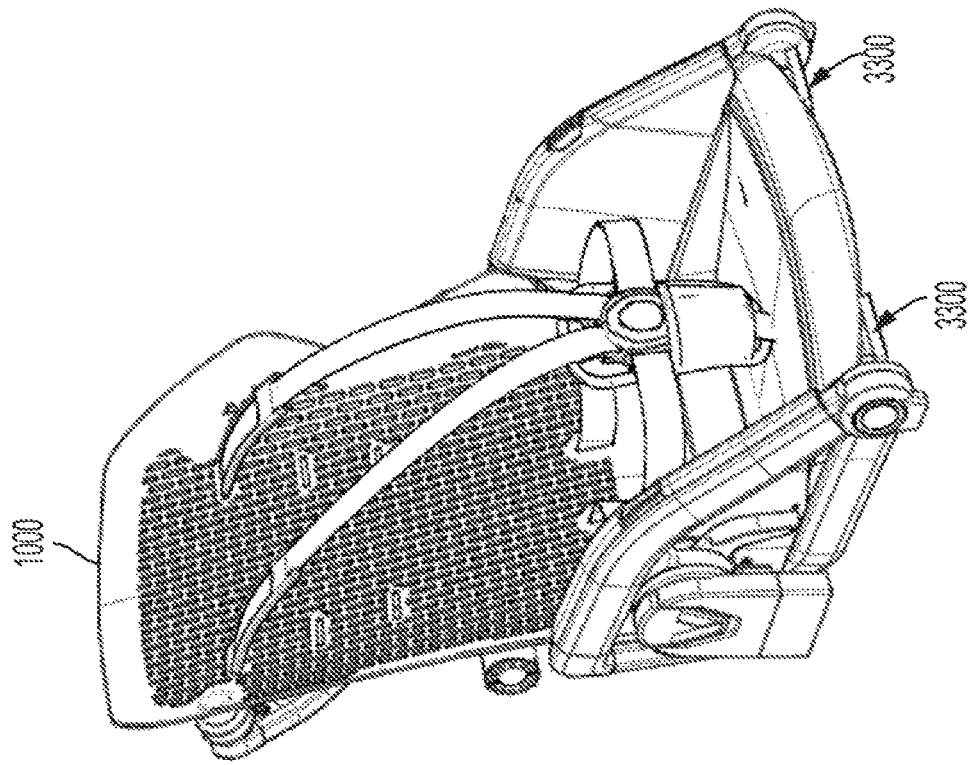
Figure 66:
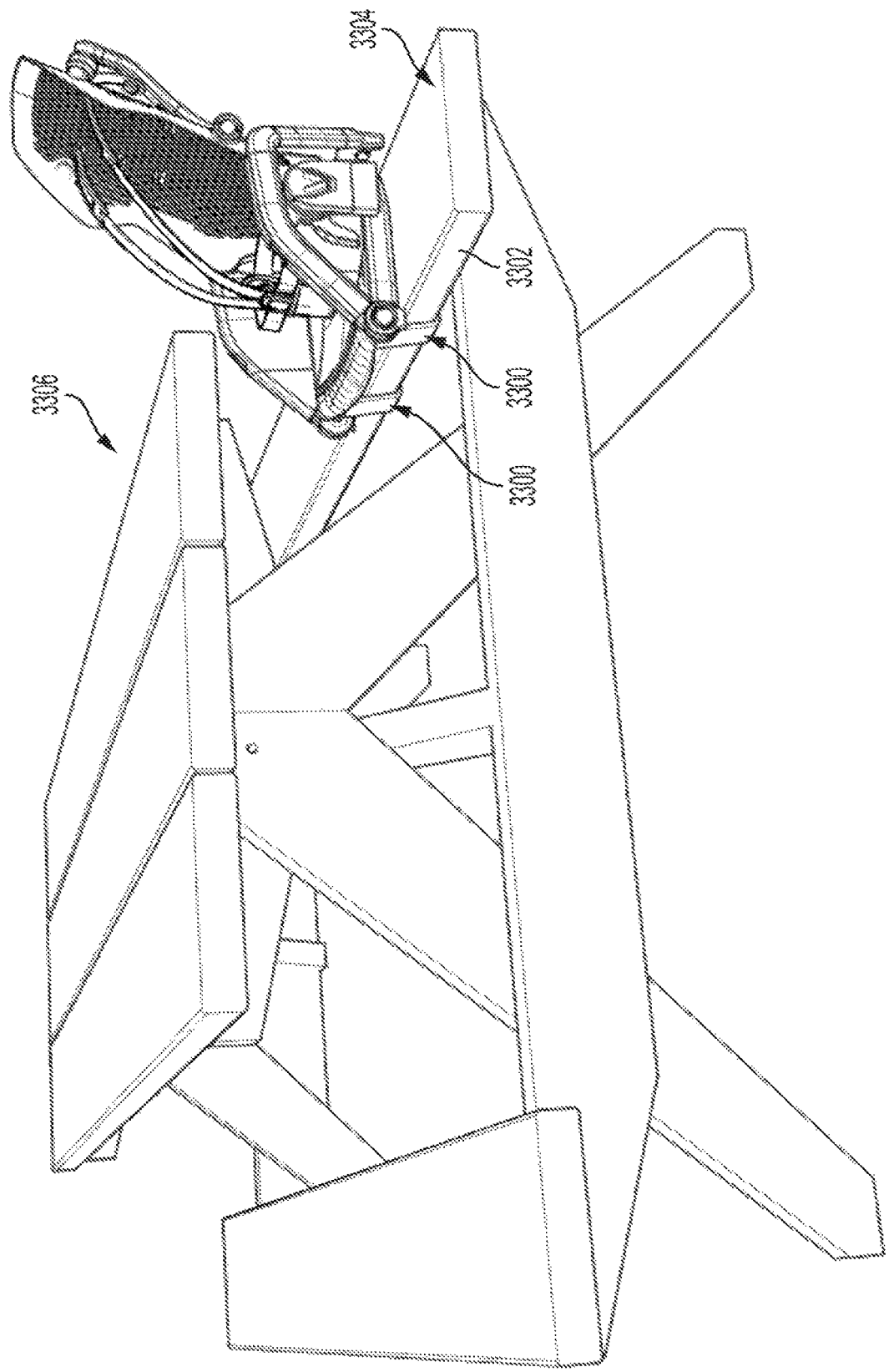
FIG. 66 depicts the seat coupled to a picnic table, according to aspects of the present disclosure.

Aspects of the present disclosure include a seat, for example seat 1000, that may be removably coupled (indirectly or directly) to various assemblies or convertible to various uses. As shown in FIG. 65A-B, according to aspects of the present disclosure, the seat 1000 may include coupling elements 3300 which may be sized and shaped to receive an edge 3302 of a seat 3304 of a picnic table 3306 (see FIG. 66). As shown in FIG. 65B the coupling elements may include a vertical projection 3308 and a horizontal projection 3310 that are sized and shaped to receive the edge 3302 of the seat 3304. The coupling elements 3300 may be coupled to the bottom surface 1304 of the seat pan 1008 or may be a portion of the calf support 1006 that may extend from the calf support 1006. In some aspects, a seat, including but not limited to seat 1000 may also include an attachment feature in a rear region of the seat for coupling to a picnic table or stadium seat for preventing the seat from falling forward and decoupling from the picnic table or stadium seat. The attachment feature may be a coupling element similar to coupling elements 3000, it may be a strap, or other suitable feature for retaining the seat in place if a child leans forward in the seat while coupled to the picnic table or stadium seat.

Exemplary Non-Limiting Hiking Pack Embodiments

Figure 67B:
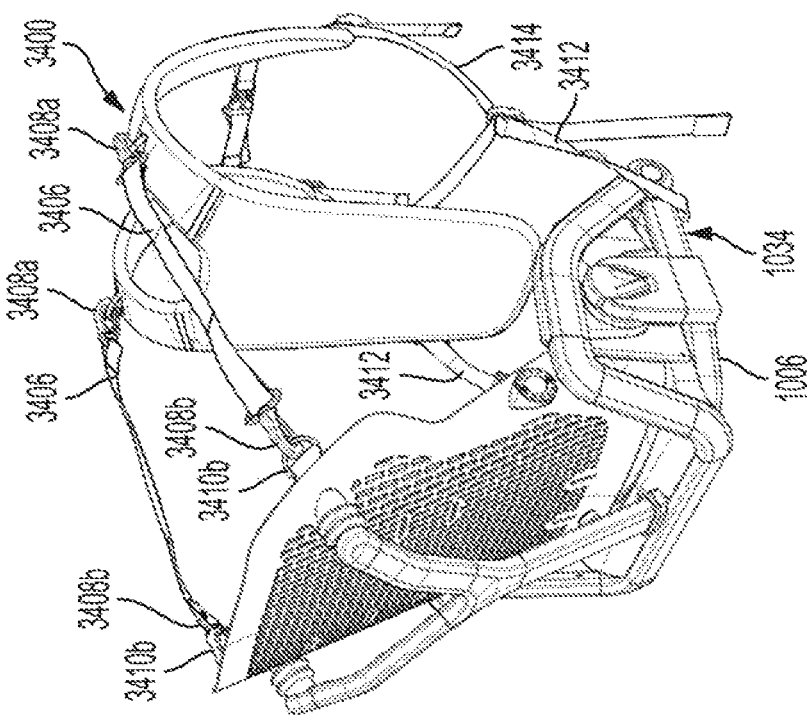
FIGS. 67A-67B depict a system including the seat and a pack assembly, according to aspects of the present disclosure.
Figure 67A:
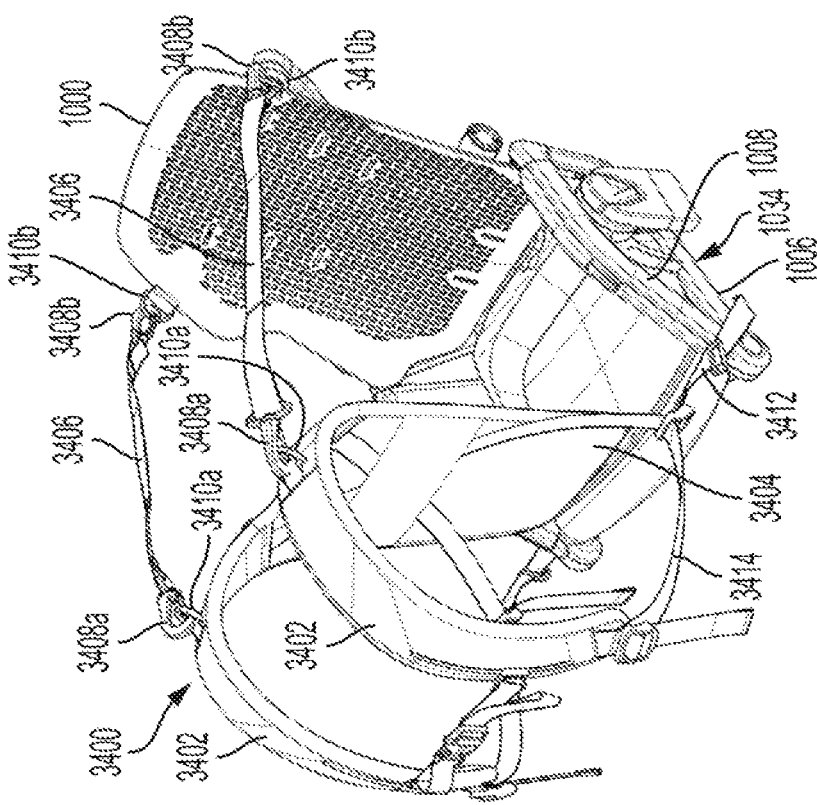
Figure 68B:
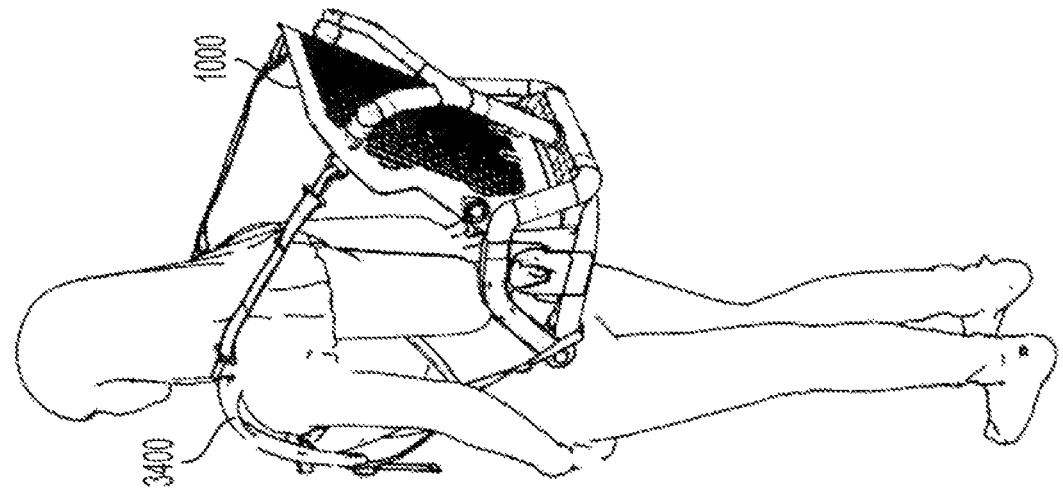
FIGS. 68A-68B depict a user wearing the seat coupled to the pack assembly, according to aspects of the present disclosure.
Figure 68A:
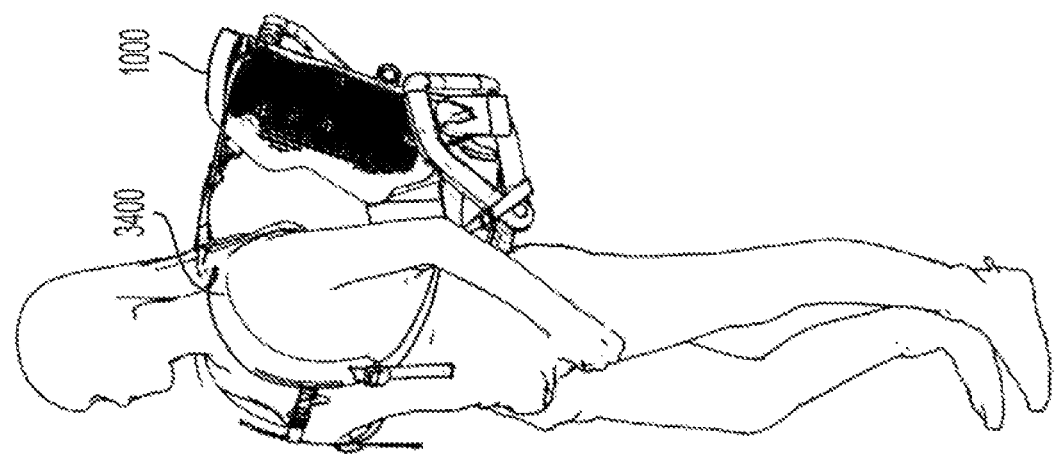

Aspects of the present disclosure include a seat, for example seat 1000, that may be removably coupled (indirectly or directly) to various assemblies or convertible to various uses. As shown in FIG. 67A-B, according to aspects of the present disclosure, the seat 1000 may couple to a pack assembly 3400 to convert the seat 1000 to a hiking pack for carrying an infant or child. The pack assembly 3400 may include straps 3402 and lumbar support 3404. The seat 1000 may be coupled to the pack assembly 3400 via straps 3406. The straps 3406 may couple at one end to the pack assembly 3400 via fasteners 3408a and at an opposite end to the seat 1000 via fasteners 3408b. The fasteners 3408a may couple to loops 3410a on the straps 3402. The fasteners 3408b may couple to loops 3410b on the seat 1000. Additional straps 3412 may further couple to adjustment straps 3414 of the seat 1000. The additional straps 3412 may be coupled to a bottom surface 1034 of the seat 1000 or to the calf support 1006 of the seat 1000, though in still yet other aspects, the additional straps 3412 may couple elsewhere to the seat 1000. While FIGS. 67A-B depict the straps 3406 coupling between the pack assembly 3400 and the seat 1000 via a fastener and loop engagement, in other aspects the straps 3406 may couple between the seat and the pack assembly 3400 via snap fit engagement or any suitable fastening or securing means that apply mechanical, electromechanical, piezoelectric, vacuum, magnetic, and/or friction force. FIGS. 68A-B depict the hiking pack comprising the seat 1000 and the pack assembly 3400 on a user from a front perspective view (FIG. 68A) and from a rear perspective view (FIG. 68B).

Exemplary Non-Limiting Infant Carrier Embodiments

Aspects of the present disclosure include a seat, for example seat 1000, that may be removably coupled (indirectly or directly) to various assemblies or convertible to various uses. As shown in FIG. 69A (exploded view) and FIG. 69B (assembly view), according to aspects of the present disclosure, the seat 1000 may couple to a carrier assembly 3500 to convert the seat 1000 to an infant carrier or front carrier for an infant. The carrier assembly 3500 may include a cover 3502 and harness assembly 3504. The cover 3502 may comprise a fabric material or other soft material for the comfort of the infant and/or the person wearing the front carrier. In some aspects, the cover 3502 may also be the seat cover 1052. The cover 3502 may slide over or otherwise cover at least a portion of the seat 1000, for example as described with respect to the seat cover 1052. The cover 3502 may also couple to the seat 1000 via at least one snap fit coupling system or any suitable fastening or securing means that apply mechanical, electromechanical, piezoelectric, vacuum, magnetic, and/or friction force. The harness assembly 3504 may provide for straps 3506 through which a user may position their arms to wear the infant carrier. The harness assembly 3504 may also include a strap 3508 that may extend around a user's back when they wear the infant carrier. While FIG. 69A illustrates a single strap 3508, the seat 1000 may include more than one strap 3508. The harness assembly 3504 may couple to the cover 3502 via clips 3510 that couple to loops 3512 on the cover 3502, though other suitable means for coupling the harness assembly 3504 to the cover 3502 may be used. For example, in some aspects, the harness assembly 3504 may be coupled to the cover 3502 by suitable fastening or securing means that apply mechanical, electromechanical, piezoelectric, vacuum, magnetic, and/or friction force.

Exemplary Non-Limiting Car Seat/Booster Seat Embodiments

Figure 70:
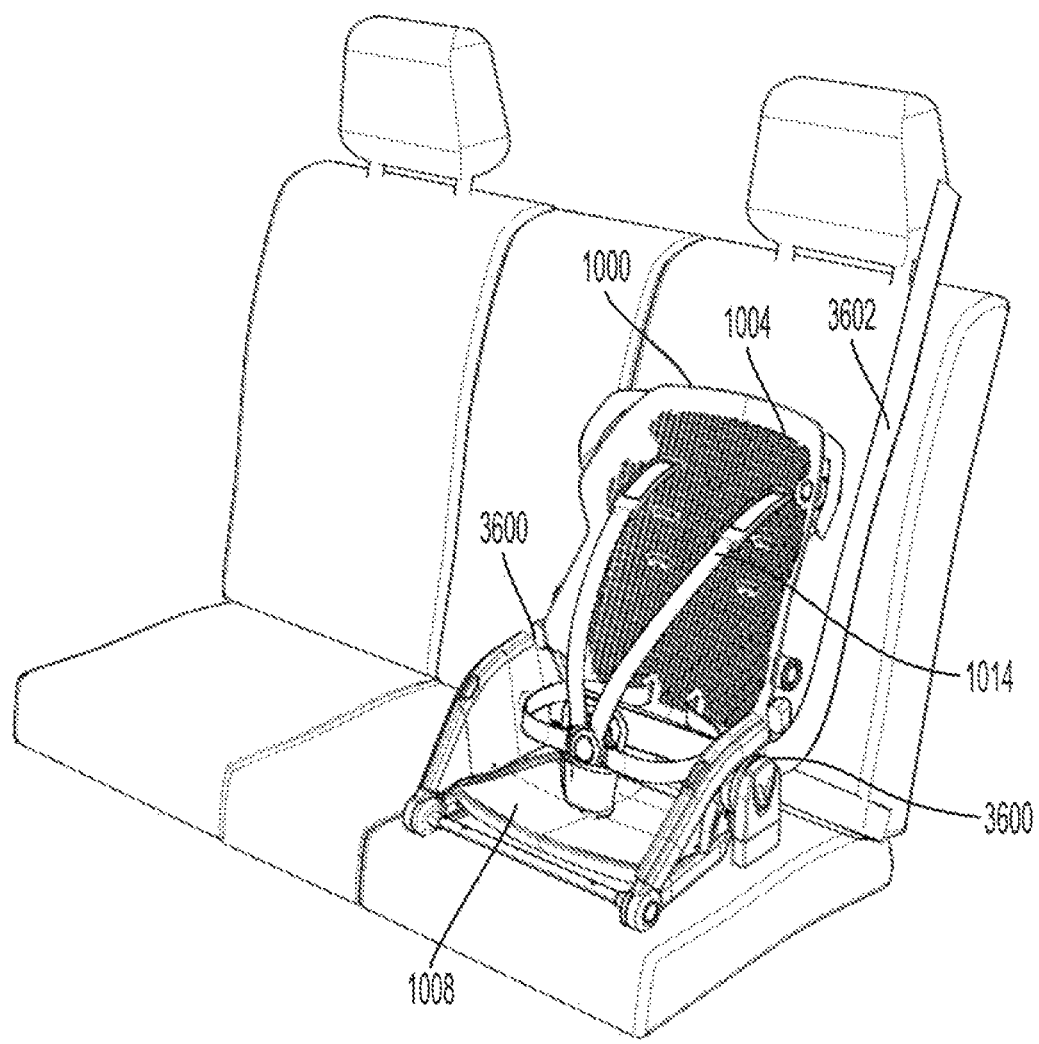
FIG. 70 depicts the seat in use as a car seat or booster seat, according to aspects of the present disclosure.

Aspects of the present disclosure include a seat, for example seat 1000, that may be removably coupled (indirectly or directly) to various assemblies or convertible to various uses. As shown in FIG. 70, according to aspects of the present disclosure, the seat 1000 may be used as a car seat. The seat 1000 may include a pass through regions 3600 that a seat belt 3602 may pass through for securing the seat 1000 in place in the car via the seat belt 3602. In some aspects, as shown in FIG. 70, the pass through regions 3600 may extend between the back support 1004 and the seat pan 1008. For example, the seat belt 3602 may pass around the rear frame member 1002 (not visible in FIG. 70 due to obstruction of the seat belt 3602) for securing the seat 1000 in place via the seat belt 3602. The seat 1000 may comply with safety standards required of car seats, for example the safety standards set forth in Table 1.1.1. As shown in FIG. 70 the seat belt 3602 may secure the seat 1000 in place while the harness apparatus 1014 may secure the child within the seat 1000 as a five point harness. The seat 1000 may comply with safety standards of harness booster or toddler car seats, for example the safety standards set forth in Table 1.1.1.

Figure 71:
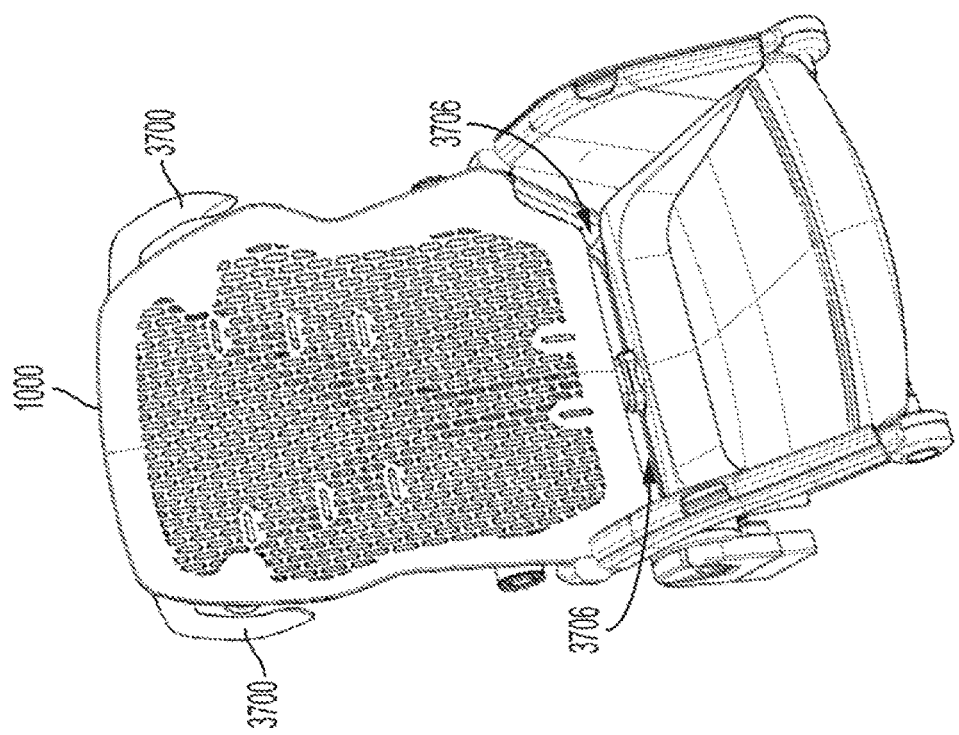
FIG. 71 depicts the seat which may used as a booster seat, according to aspects of the present disclosure.

Similarly, aspects of the present disclosure include a seat, for example seat 1000 that may be used a belt positioning booster car seat. As shown in FIG. 71, the seat 1000 may include one or more shoulder belt guides 3700 for guiding the positioning of a vehicle shoulder belt 3702 of a seat belt 3704 (shown in FIG. 72) in the proper position for a child sitting in the seat 1000. The seat 1000 may also include pass through regions 3706 through which a lap belt portion 3708 of the seat belt 3704 may pass for securing the seat 1000 in place via the seat belt 3704. In use, the seat 1000 may not require the harness apparatus 1014 to secure the child safely to the seat 1000 when the child is a sufficient height. FIG. 71 depicts the vehicle seat belt 3704 securing the seat 1000 in place as a booster seat. The seat may comply with safety standards of booster car seats, for example the safety standards set forth in Table 1.1.1.

Exemplary Non-Limiting Airline Seat Embodiments

Figure 73:
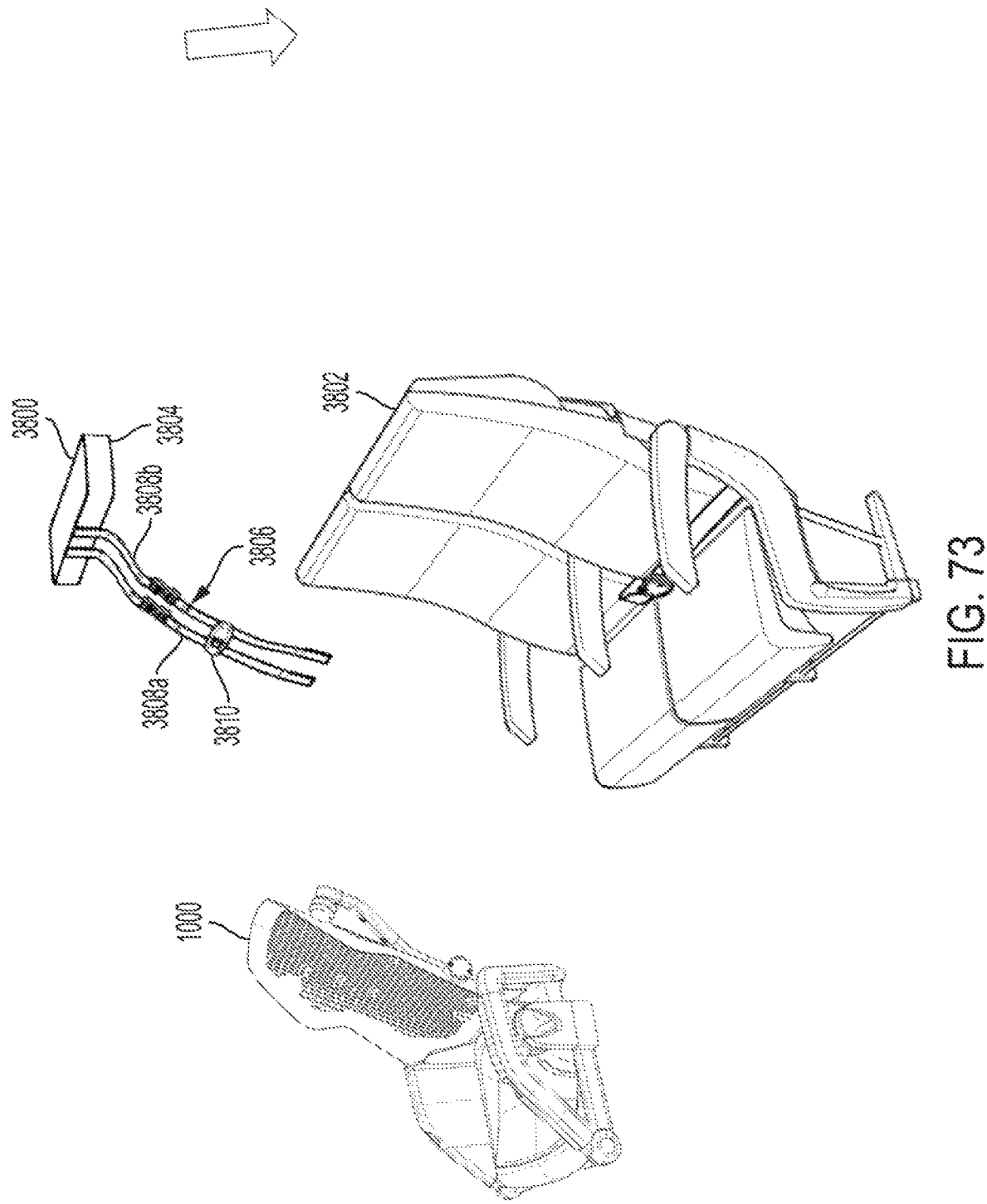
FIG. 73 depicts the seat and an airplane harness, according to aspects of the present disclosure.
Figure 74:
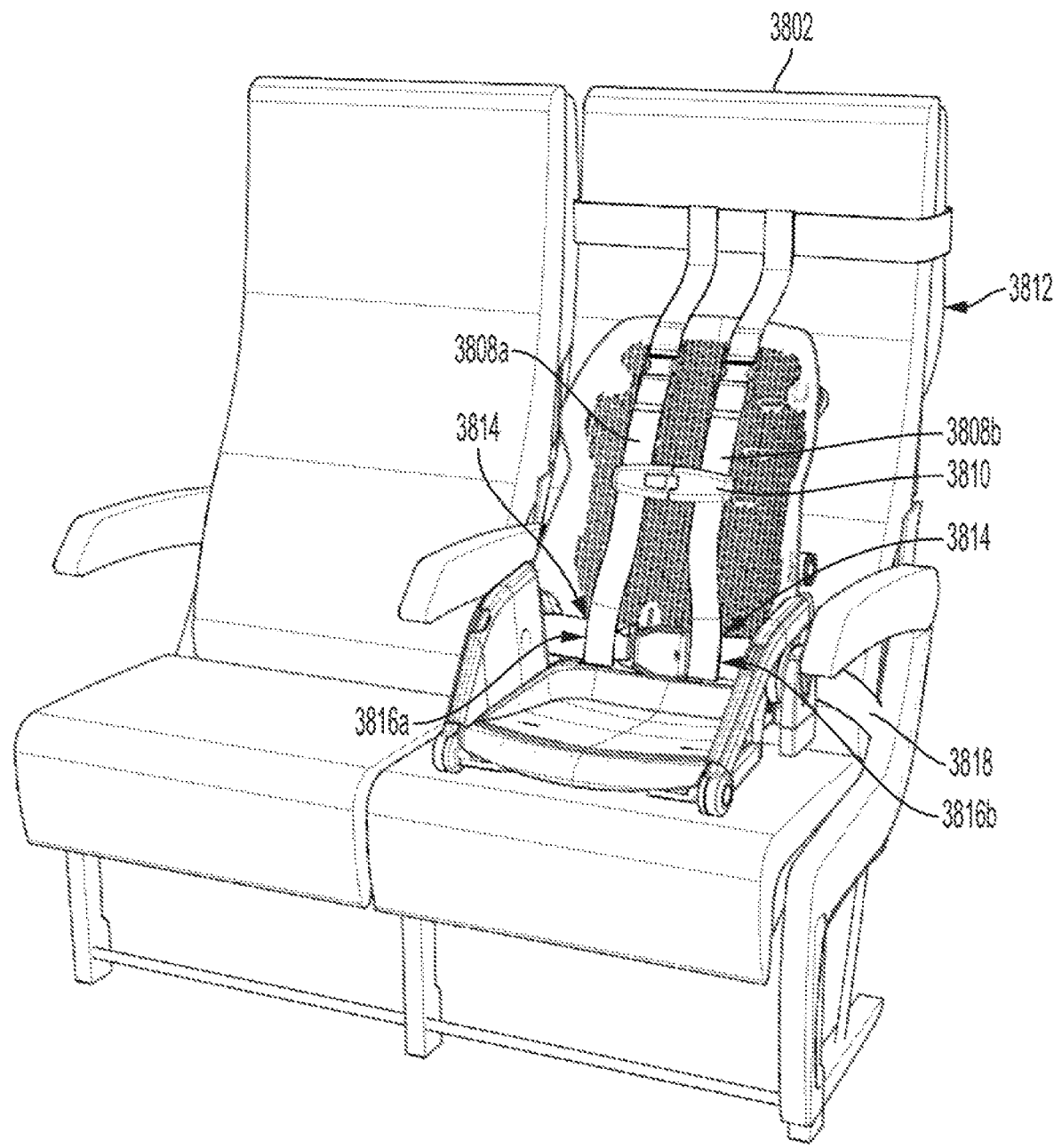
FIG. 74 depicts the seat coupled to the airplane harness in an airplane seat, according to aspects of the present disclosure.

Aspects of the present disclosure include a seat, for example seat 1000, that may be converted to an airplane seat 3802 for use on an airplane using an airplane harness 3800 as shown in FIGS. 73-74. When the seat 1000 is installed using the airplane harness 3800, the system together may comply with FAA regulations for a child seat for use on an airplane. The airplane harness 3800 may include a seat back harness 3804 and a harness assembly 3806 that includes straps 3808a, 3808b and a clip 3810. While FIGS. 73-74 illustrate two straps 3808a, 2808b, in some aspects, the seat 1000 may include more or fewer straps. Similarly, the seat 1000 may include multiple clips 3810. As shown in FIG. 74, the seat back harness 3804 may be positioned around the seat back 3812 of the airplane seat 3802. The harness assembly 3806 may be coupled to the seat back harness 3804 via loops, straps, or other features. The straps 3808a, 3808b of the harness assembly 3806 may extend downwards in front of the back support 1004 and may lay across the chest of a child sitting within the seat 1000. A bottom region 3814 of each of the straps 3808a, 3808b may include a coupling feature, for example loops 3816a, 3816b that may be sized and shaped to receive a seat belt 3818 of the airplane. The seat 1000 when coupled to the airplane harness 3800 may comply with airline safety standards, for example the safety standards set forth in Table 1.1.1. In some aspects, the seat belt 3818 of the airplane may be used to secure the seat 1000 to the airplane seat 3802, for example the seat belt 3818 may extend through openings in the seat 1000 to secure the seat 1000 in place (including but not limited by extending around a rear frame member of the seat, for example rear frame member 1002).

Figure 75:
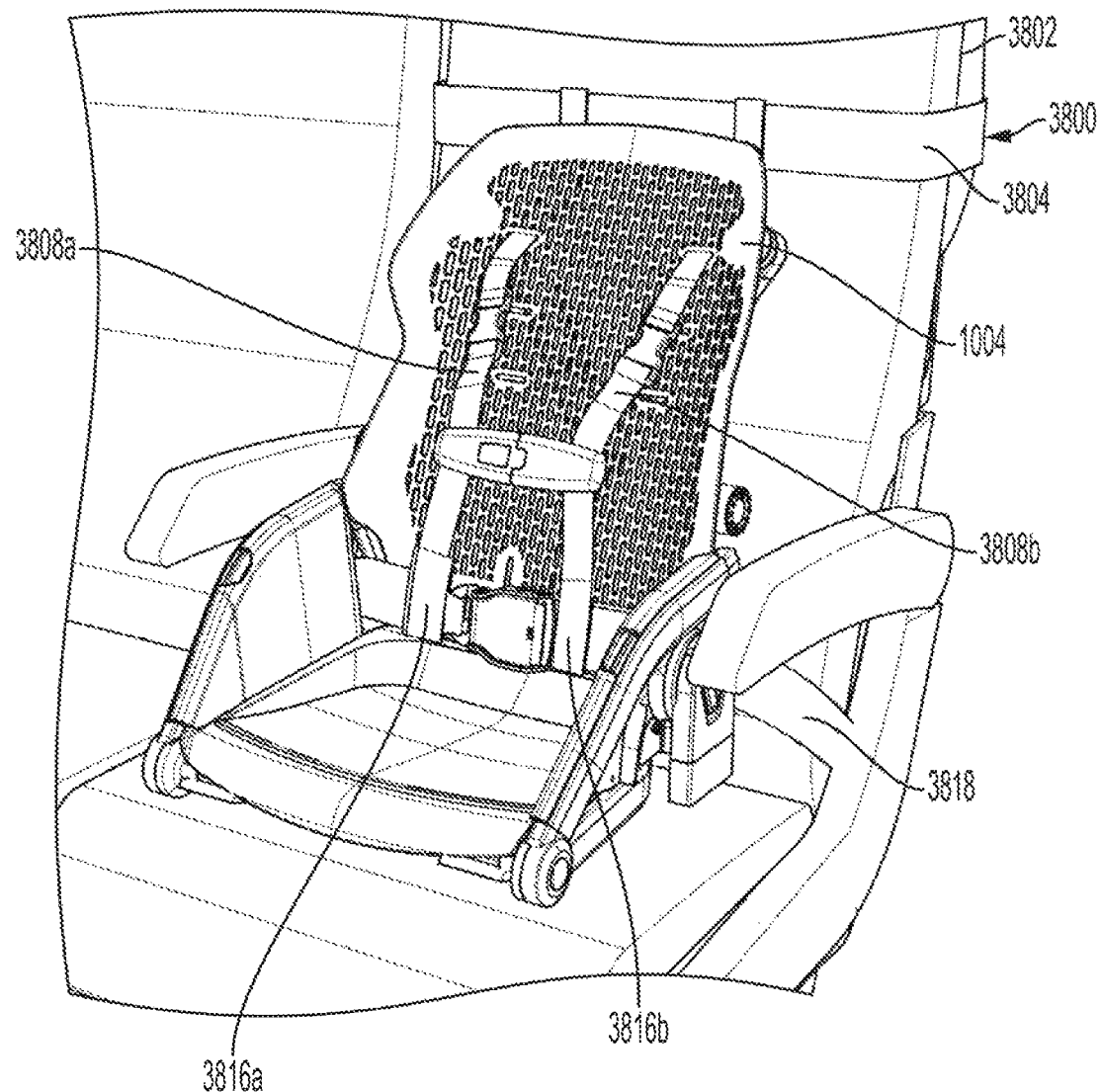
FIG. 75 depicts the seat coupled to the airplane harness in an airplane seat, according to aspects of the present disclosure.

As shown in FIG. 75, in some aspects, the straps 3808a, 3808b may pass through openings 1012a, 1012b from a rear side of the back support 1004 to a front side of the back support 1004. The straps 3808a, 3808b may receive the seat belt 3818 to aid in securing the child in the seat 1000 as disclosed above with respect to FIGS. 73-74. The seat may comply with safety standards of booster car seats, for example the safety standards set forth in Table 1.1.1. In particular, consistent with airline safety requirements, the straps retaining the child in place (e.g. the seat belt 3818, the straps 3808a, 3808b) may be secured to the airplane seat 3802.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

As used below, any reference to a series of examples is to be understood as a reference to each of those examples disjunctively (e.g., "Examples 1-4" is to be understood as "Examples 1, 2, 3, or 4").

Example 1: A system comprising: a stroller assembly comprising a coupling component; an additional assembly comprising at least one of a chair assembly, a wagon assembly, a wagon adapter assembly, a bicycle, or a bicycle adapter assembly, wherein the additional assembly comprises a coupling component; and a seat further comprising: a seat pan; a back rest; a mounting component configured to removably couple to the coupling component of the strolling assembly, the mounting component also configured to removably couple to coupling component of the additional assembly; an actuator that actuates the mounting component between a locked and an unlocked position for decoupling the mounting component of the seat from the coupling component of the stroller assembly, wherein the actuator actuates the mounting component between the locked and the unlocked position for decoupling the mounting component of the seat from the coupling component of the additional assembly.

Example 2 is the system of example 1, wherein the seat comprises a polymer material and wherein the back rest comprises a plurality of opens that define a honeycomb pattern for providing air flow through the back rest.

Example 3 is the system of any of examples 1-2, further comprising a seat cover that removably couples to the seat via at least one mechanical fastener, wherein the seat cover comprises a washable material.

Example 4 is the system of example 3, wherein the seat cover is machine washable.

Example 5 is the system of any of examples 1-4, wherein the seat further comprises a recline actuator for positioning the seat between an upright and a reclined position relative to the stroller assembly when the seat is coupled to the stroller assembly.

Example 6 is the system of any of examples 1-5, wherein the seat comprises a calf support that is positionable between a use and a storage position.

Example 7 is the system of example 6, wherein the calf support rotates between the use and the storage position, and wherein in the storage position a rear surface of the calf support is positioned adjacent to a bottom surface of the seat pan.

Example 8 is the system of example 7, wherein the seat comprises a calf support actuator which is actuates between a locked position and an unlocked position, wherein in the unlocked position the calf support is rotatable between the use position and the storage position.

Example 9 is the system of example 8, wherein the calf support actuator is a button positioned on the seat.

Example 10 is the system of example 6, wherein the calf support is coupled to the seat via a mechanical fastener and wherein in the storage position the calf support is decoupled from the seat.

Example 11 is the system of any of examples 6-10, wherein the seat further comprises at least three feet, wherein each of the three feet are sized and shaped to contact a surface on which the seat is positioned for stabilizing the seat on the surface when the calf support is in the storage position.

Example 12 is the system of example 11, wherein the feet extend from a frame member of the seat.

Example 13 is the system of any of examples 1-10, wherein the additional assembly is a bicycle adapter, and wherein the bicycle adapter comprises: a base; a frame coupled to the base; the coupling component sized and shaped to removably couple with the mounting component of the seat for coupling the seat to the bicycle adapter; a pair of foot guards, each foot guard of the pair of foot guards including a wall element extending in a generally downwards direction from the frame of the bicycle adapter and a foot resting surface; wherein the actuator of the seat actuates the mounting component of the seat between the locked and the unlocked position for decoupling the mounting component of the seat from the coupling component of the bicycle adapter.

Example 14 is the system of any of examples 1-13, wherein the back rest is positionable in a use position and in a storage position, the storage position corresponding to the back rest being positioned substantially parallel to the seat pan, and wherein the seat further comprises a fold actuator, wherein the fold actuator actuates the back rest from a locked to an unlocked orientation, and wherein in the unlocked orientation the back rest is foldable in a direction towards the seat pan for positioning the back rest in the storage position.

Example 15 is the system of any of examples 1, wherein the additional assembly is the chair assembly and wherein the chair assembly comprises a plurality of legs; a frame member; and the coupling component sized and shaped to removably couple with the mounting component of the seat for coupling the seat to the chair assembly.

The invention claimed is:

1. A system comprising:
   a stroller assembly comprising a coupling component;
   an additional assembly comprising at least one of a chair assembly, a wagon assembly, a wagon adapter assembly, a bicycle, or a bicycle adapter assembly, wherein the additional assembly comprises a coupling component; and
   a seat further comprising:
   a seat pan;
   a back rest;
   a call support having a front surface configured to support a calf of an occupant and a rear surface, the calf support is positionable between a first position and a second position, wherein the calf support rotates between the first position and the second position, and wherein in the second position the rear surface of the calf support is positioned adjacent to and substantially parallel to a bottom surface of the seat pan;
   a mounting component configured to removably couple to the coupling component of the stroller assembly, the mounting component also configured to removably couple to the coupling component of the additional assembly; and
   an actuator that actuates the mounting component between a locked and an unlocked position for decoupling the mounting component of the seat from the coupling component of the stroller assembly, wherein the actuator actuates the mounting component between the locked and the unlocked position for decoupling the mounting component of the seat from the coupling component of the additional assembly.

2. The system of claim 1, wherein the seat comprises a polymer material and wherein the back rest comprises a pattern of openings for providing air flow through the back rest.

3. The system of claim 1, further comprising a seat cover that removably couples to the seat via at least one mechanical fastener, wherein the seat cover comprises a washable material.

4. The system of claim 3, wherein the seat cover is machine washable.

5. The system of claim 1, wherein the seat further comprises a recline actuator for positioning the seat between a first position and a second position relative to the stroller assembly when the seat is coupled to the stroller assembly.

6. The system of claim 1, wherein the seat comprises a calf support actuator which is actuatable between a locked orientation and an unlocked orientation, wherein in the unlocked orientation the calf support is rotatable between the first position and the second position.

7. The system of claim 6, wherein the calf support actuator is a button positioned on the seat.

8. The system of claim 1, wherein the seat further comprises at least three feet, wherein each of the three feet are sized and shaped to contact a surface on which the seat is positioned for stabilizing the seat on the surface when the calf support is in the second position.

9. The system of claim 8, wherein the feet extend from a frame member of the seat.

10. The system of claim 1, wherein the additional assembly is a bicycle adapter, and wherein the bicycle adapter comprises:
    a base;
    a frame coupled to the base;
    the coupling component sized and shaped to removably couple with the mounting component of the seat for coupling the seat to the bicycle adapter; and
    a pair of foot guards, each foot guard of the pair of foot guards including a wall element extending in a generally downwards direction from the frame of the bicycle adapter and a foot resting surface;
    wherein the actuator of the seat actuates the mounting component of the seat between the locked and the unlocked position for decoupling the mounting component of the seat from the coupling component of the bicycle adapter.

11. The system of claim 1, wherein the back rest is positionable in a first position and in a second position, the second position corresponding to the back rest being positioned substantially parallel to the seat pan, and
    wherein the seat further comprises a fold actuator, wherein the fold actuator actuates from a locked orientation to an unlocked orientation, and wherein in the unlocked orientation the back rest is foldable in a direction towards the seat pan for positioning the back rest in the second position.

12. The system of claim 1, wherein the additional assembly is the chair assembly and wherein the chair assembly comprises:
- a plurality of legs;
- a frame member; and
- the coupling component is sized and shaped to removably couple with the mounting component of the seat for coupling the seat to the chair assembly.

13. The system of claim 1, wherein the first position is a use position and the second position is a storage position.

14. The system of claim 1, wherein the first position of the seat is an upright position and the second position of the seat is a reclined position.

15. The system of claim 11, wherein the first position is a use position and the second position is a storage position.

16. A seat, the seat comprising:
- a seat pan including a frame member;
- a back rest;
- a calf support positionable between a first position and a second position, wherein when the calf support is in the first position, the calf support is configured to support a calf of an occupant, and wherein when the calf support is in the second position: (i) the calf support is configured to provide no support for a calf of an occupant, and (ii) when the seat is placed on a surface, the seat pan is configured to be substantially parallel to the surface on which the seat is placed;
- a mounting component configured to removably couple the seat to a coupling component of an additional assembly; and
- a first actuator that is configured to actuate the mounting component between a locked and an unlocked position for decoupling the mounting component of the seat from the coupling component.

17. The seat of claim 16, wherein when the calf support is in the second position, the seat is configured to be coupled to the additional assembly without interference from the calf support.

18. The seat of claim 16, wherein the additional assembly comprises one or more of a stroller assembly, a chair assembly, a wagon assembly, a wagon adapter assembly, a bicycle, or a bicycle adapter assembly.

19. The seat of claim 16, further comprising a hub assembly that couples the calf support to the seat pan, the calf support rotatable via the hub assembly about a pivot point between the first position and the second position, the hub assembly comprising a second actuator movable between a locked position and an unlocked position, wherein when the second actuator is in the unlocked position, the calf support is rotatable between the first position and the second position.

20. The seat of claim 19, wherein the hub assembly provides for an angle between the frame member of the seat pan and the calf support when the calf support is in the second position to prevent a pinch point between the frame member and the calf support.

21. The seat of claim 19, wherein the second actuator is a button positioned on the seat.

22. The seat of claim 16, wherein in the second position at least a portion of the calf support nests against the seat pan.

23. The seat of claim 16, wherein in the first position, the calf support is coupled to the seat pan, and in the second position, the calf support is decoupled from the seat pan.

24. A seat, the seat comprising:
- a first frame;
- a seat pan coupled to the first frame;
- a second frame coupled to the first frame;
- a hub assembly;
- a calf support coupled to the first frame, the calf support having a rear surface wherein the calf support is configured to rotate with respect to the seat pan about the hub assembly between a first position and a second position, and wherein in the second position the rear surface of the calf support is positioned adjacent to and substantially parallel to a bottom surface of the seat pan; and
- a back support coupled to the second frame via energy absorbing shocks.

25. The seat of claim 24, wherein the back support and the second frame are configured to rotate with respect to the seat pan and the first frame between a first position and a second position.

26. The seat of claim 25, wherein the first position is a use position and the second position is a storage position.

27. The seat of claim 24, wherein the hub assembly further comprises an actuator movable between a locked position and an unlocked position, wherein when the actuator is in the unlocked position, the calf support is rotatable between the first position and the second position.

28. The seat of claim 24, further comprising:
- a mounting component configured to removably couple the seat to a coupling component of one or more of a stroller assembly, a chair assembly, a wagon assembly, a wagon adapter assembly, a bicycle, or a bicycle adapter assembly; and
- an actuator that is configured to actuate the mounting component between a locked and an unlocked position for decoupling the mounting component of the seat from the coupling component.

\* \* \* \* \*